US012499738B2

(12) United States Patent
DeWaal

(10) Patent No.: US 12,499,738 B2
(45) **Date of Patent: *Dec. 16, 2025**

(54) SYSTEM AND METHOD FOR CONTROLLING OPERATION OF A GAME DEVICE

(71) Applicant: deWaal IP LLC, Reno, NV (US)

(72) Inventor: Daniel Jacobus DeWaal, Reno, NV (US)

(73) Assignee: deWaal IP LLC, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/423,857

(22) Filed: Jan. 26, 2024

(65) Prior Publication Data

US 2024/0331501 A1 Oct. 3, 2024

Related U.S. Application Data

(63) Continuation of application No. 17/962,711, filed on Oct. 10, 2022, now Pat. No. 11,972,666, which is a continuation of application No. 17/153,624, filed on Jan. 20, 2021, now Pat. No. 11,514,755, and a continuation-in-part of application No. 16/719,608, filed on Dec. 18, 2019, now Pat. No. 11,100,755, which is a continuation of application No. 16/056,914, filed on Aug. 7, 2018, now Pat. No. 10,540,850, which is a continuation-in-part of application No. 16/002,910, filed on Jun. 7, 2018, now Pat. No. 10,720,020, which is a continuation of application No. PCT/US2016/066183, filed on Dec.

(Continued)

(51) Int. Cl.
*G07F 17/32* (2006.01)

(52) U.S. Cl.
CPC ...... *G07F 17/3267* (2013.01); *G07F 17/3227* (2013.01); *G07F 17/3239* (2013.01); *G07F 17/3244* (2013.01); *G07F 17/3258* (2013.01); *G07F 17/3276* (2013.01); *G07F 17/3293* (2013.01)

(58) Field of Classification Search
CPC ........................................................ G07F 17/32
See application file for complete search history.

(56) References Cited

U.S. PATENT DOCUMENTS

| | | | |
|---|---|---|---|
| 5,511,781 | A | 4/1996 | Wood et al. |
| 6,019,374 | A | 2/2000 | Breeding |

(Continued)

OTHER PUBLICATIONS

Aquarius Productions Ltd 2000, Skins Blackjack, 2 pages.

(Continued)

*Primary Examiner* — Omkar A Deodhar
(74) *Attorney, Agent, or Firm* — Howard & Howard Attorneys PLLC

(57) ABSTRACT

A system, and method of operating a system, including a dealer device and at least one player device located at a gaming device. The dealer device configured to allow a dealer to enter funds received from a player to a respective player account, to allow the dealer to finalize wagers and enter an outcome of a game; to calculate a change in the player account based on the outcome of the game. The player device configured to display a player screen including computer generated graphics; to allow each respective player to enter a wager on the game; to display an outcome of the instance of the game; and to display wager and player account data to the player.

20 Claims, 104 Drawing Sheets

Related U.S. Application Data

12, 2016, which is a continuation of application No. 14/994,072, filed on Jan. 12, 2016, now Pat. No. 9,626,835, which is a continuation-in-part of application No. 14/076,088, filed on Nov. 8, 2013, now Pat. No. 9,269,232.

(60) Provisional application No. 62/963,930, filed on Jan. 21, 2020, provisional application No. 62/542,036, filed on Aug. 7, 2017, provisional application No. 62/293,972, filed on Feb. 11, 2016, provisional application No. 62/266,612, filed on Dec. 12, 2015, provisional application No. 61/724,941, filed on Nov. 10, 2012.

(56) References Cited

U.S. PATENT DOCUMENTS

| | | | |
|---|---|---|---|
| 6,279,910 | B1 | 8/2001 | de Keller |
| 6,283,474 | B1 | 9/2001 | de Keller |
| 6,719,291 | B1 | 4/2004 | deKeller |
| 8,439,362 | B1 | 5/2013 | deKeller |
| 9,165,431 | B2 | 10/2015 | Chun |
| 2002/0039923 | A1 | 4/2002 | Cannon et al. |
| 2004/0132519 | A1 | 7/2004 | Holm |
| 2008/0108429 | A1 | 5/2008 | Davis et al. |
| 2010/0004051 | A1 | 1/2010 | Walker et al. |
| 2010/0069145 | A1 | 3/2010 | Velu et al. |
| 2011/0115158 | A1 | 5/2011 | Gagner et al. |
| 2012/0049455 | A1 | 3/2012 | Yap et al. |
| 2014/0135094 | A1 | 5/2014 | deWaal |
| 2014/0291932 | A1 | 10/2014 | Castle, II et al. |

OTHER PUBLICATIONS

Aquarius Productions 2002-2006, Skins Blackjack with Bad Beat Progressive Jackpot, 1 page.

International Search Report & Written Opinion (International Application No. PCT/US2016/66183; O/R: 060935.00011); Date of Mailing: Apr. 14, 2017.

| | Variable Betting Options for Pari Mutuel Baccarat | | | | |
|---|---|---|---|---|---|
| RTP% | **Pays** | **Player** | **Banker** | **Pays** | RTP% |
| 88.80% | 3 x Pot Shares | ⊘ N | ⊘ N | 3 x Pot Shares | 85.10% |
| | 2 x Pot Shares | Player | Banker | 2 x Pot Shares | |
| | 4 x Pot Shares | < 8 | < 8 | 4 x Pot Shares | |
| | 6 x Pot Shares | < 7 | < 7 | 7 x Pot Shares | |
| | 9 x Pot Shares | < 6 | < 6 | 14 x Pot Shares | |
| | 16 x Pot Shares | < 5 | < 5 | 22 x Pot Shares | |
| | 34 x Pot Shares | < 4 | < 4 | 36 x Pot Shares | |
| | 70 x Pot Shares | < 3 | < 3 | 70 x Pot Shares | |
| | 200 x Pot Shares | < 2 | < 2 | 200 x Pot Shares | |
| | | < 1 | < 1 | | |

FIG. 26

| | Probabilities | | Paytable | | RTP | |
|---|---|---|---|---|---|---|
| | Banker | Player | Banker (xBet) | Player (xBet) | Banker | Player |
| Win | 45.86% | 44.62% | 1.95 | 2 | 98.94% | 98.76% |
| +9 | 8.59% | 8.59% | 11 | 11 | 94.53% | 94.53% |
| +8 | 7.67% | 7.67% | 12 | 12 | 91.99% | 91.99% |
| Not Natural | 29.60% | 28.37% | 3 | 3 | 88.80% | 85.10% |
| 9> | 26.45% | 24.69% | 0 | 0 | 0.00% | 0.00% |
| 8> | 23.52% | 21.24% | 4 | 4 | 94.07% | 84.96% |
| 7> | 15.83% | 13.08% | 6 | 7 | 94.98% | 91.53% |
| 6> | 10.44% | 6.82% | 9 | 14 | 93.99% | 95.49% |
| 5> | 6.11% | 4.36% | 16 | 22 | 97.71% | 95.99% |
| 4> | 2.84% | 2.64% | 34 | 36 | 96.52% | 95.01% |
| 3> | 1.38% | 1.38% | 70 | 70 | 96.59% | 96.59% |
| 2> | 0.49% | 0.49% | 200 | 200 | 97.20% | 98.59% |

| | Probability | Paytable (xBet) | RTP |
|---|---|---|---|
| Tie | 9.52% | 9 | 85.64% |

FIG. 28

| Theoretical Base Calcs | | | |
| --- | --- | --- | --- |
| | Combinatio | Probability | Probability w/Ties Push |
| Banker | 2.2923E+15 | 0.458597 | 0.50682483 |
| Player | 2.2305E+15 | 0.446247 | 0.49317517 |
| Tie | 4.7563E+14 | 0.095156 | |
| | 4.9984E+15 | 1 | 1 |

| | Ties Break Run | | Ties Push through Run | | | Ties Break Run | | | Ties Push through Run | |
| --- | --- | --- | --- | --- | --- | --- | --- | --- | --- | --- |
| | Banker Run Probability | Player Run Probability | Banker Run Probability | Player Run Probability | Pay (Tie Breaks) | Max RTP | Min RTP | Pay (Tie Win) | Max RTP | Min RTP |
| 1 | 45.8597% | 44.6247% | 50.6825% | 49.3175% | - | 0.0000% | 0.0000% | - | 0.0000% | 0.0000% |
| 2 | 21.0312% | 19.9136% | 25.6871% | 24.3222% | - | 0.0000% | 0.0000% | - | 0.0000% | 0.0000% |
| 3 | 9.6448% | 8.8864% | 13.0189% | 11.9951% | 10 | 96.4484% | 88.8638% | 7 | 91.1322% | 83.9656% |
| 4 | 4.4231% | 3.9655% | 6.5983% | 5.9157% | 22 | 97.3081% | 87.2414% | 14 | 92.3761% | 82.8195% |
| 5 | 2.0284% | 1.7696% | 3.3442% | 2.9175% | 48 | 97.3642% | 84.9407% | 28 | 93.6370% | 81.6891% |
| 6 | 0.9302% | 0.7897% | 1.6949% | 1.4388% | 105 | 97.6740% | 82.9161% | 55 | 93.2202% | 79.1352% |
| 7 | 0.4266% | 0.3524% | 0.8590% | 0.7096% | 225 | 95.9851% | 79.2879% | 109 | 93.6336% | 77.3455% |
| 8 | 0.1956% | 0.1573% | 0.4354% | 0.3500% | 500 | 97.8189% | 78.6266% | 215 | 93.6055% | 75.2399% |

| | Game 1 | Game 2 | Game 3 | Game 4 |
| --- | --- | --- | --- | --- |
| **Player** | select | select | select | select |
| **Banker** | select | select | select | select |
| **Pays** | | | **x7** | **x14** |

FIG. 29

| Sample games results with 10 players | | | | | | | | | | | | | | |
|---|---|---|---|---|---|---|---|---|---|---|---|---|---|---|
| | Player 1 | Player 2 | Player 3 | Player 4 | Player 5 | Player 6 | Player 7 | Player 8 | Player 9 | Player 10 | Dealer | Pot | Shares | House |
| Wager | 5 | 5 | 5 | 5 | 5 | 5 | 5 | 5 | 5 | 5 | | 45 | | 10% |
| Hand | 17 | 18 | 19 | 20 | 21 | 21 | 20 | 19 | 18 | 17 | 20 | | | |
| Result | lose | lose | lose | draw | BJ | BJ | draw | lose | lose | lose | | | | |
| Shares | 0 | 0 | 0 | 1 | 2 | 2 | 1 | 0 | 0 | 0 | | | 6 | |
| Award | 0 | 0 | 0 | 7.5 | 15 | 15 | 7.5 | 0 | 0 | 0 | | | | 5 |
| Legacy | 0 | 0 | 0 | 5 | 10 | 10 | 5 | 0 | 0 | 0 | | | | 20 |
| Wager | 5 | 5 | 5 | 5 | 5 | 5 | 5 | 5 | 5 | 5 | | 45 | | |
| Hand | 17 | 18 | 17 | 18 | 20 | 17 | 19 | 17 | 19 | 19 | 20 | | | |
| Result | lose | lose | lose | lose | draw | lose | lose | lose | lose | lose | | | | |
| Shares | 0 | 0 | 0 | 0 | 1 | 0 | 0 | 0 | 0 | 0 | | | 1 | |
| Award | 0 | 0 | 0 | 0 | 45 | 0 | 0 | 0 | 0 | 0 | | | | 5 |
| Legacy | 0 | 0 | 0 | 0 | 5 | 0 | 0 | 0 | 0 | 0 | | | | 45 |

FIG. 30

| BonusBacc Pot | | Shared Progressive Trigger: Player/Banker Tie on 2 | |
|---|---|---|---|
| Pays | Tie Pays 10 Pot Shares | | Pays |
| 1 Share | Player | Banker | 1 Share |
| 2 Shares | Not Natural | Not Natural | 2 Shares |
| 4 Shares | Natural | Natural | 4 Shares |
| 6 Shares | <6 | <6 | 8 Shares |
| Player/Banker choice Pays 1 Pot Shae, even if exact number isn't predicted | | | |
| Dealer Never Wins, Pot rolls over next hand! | | | |

FIG. 40B

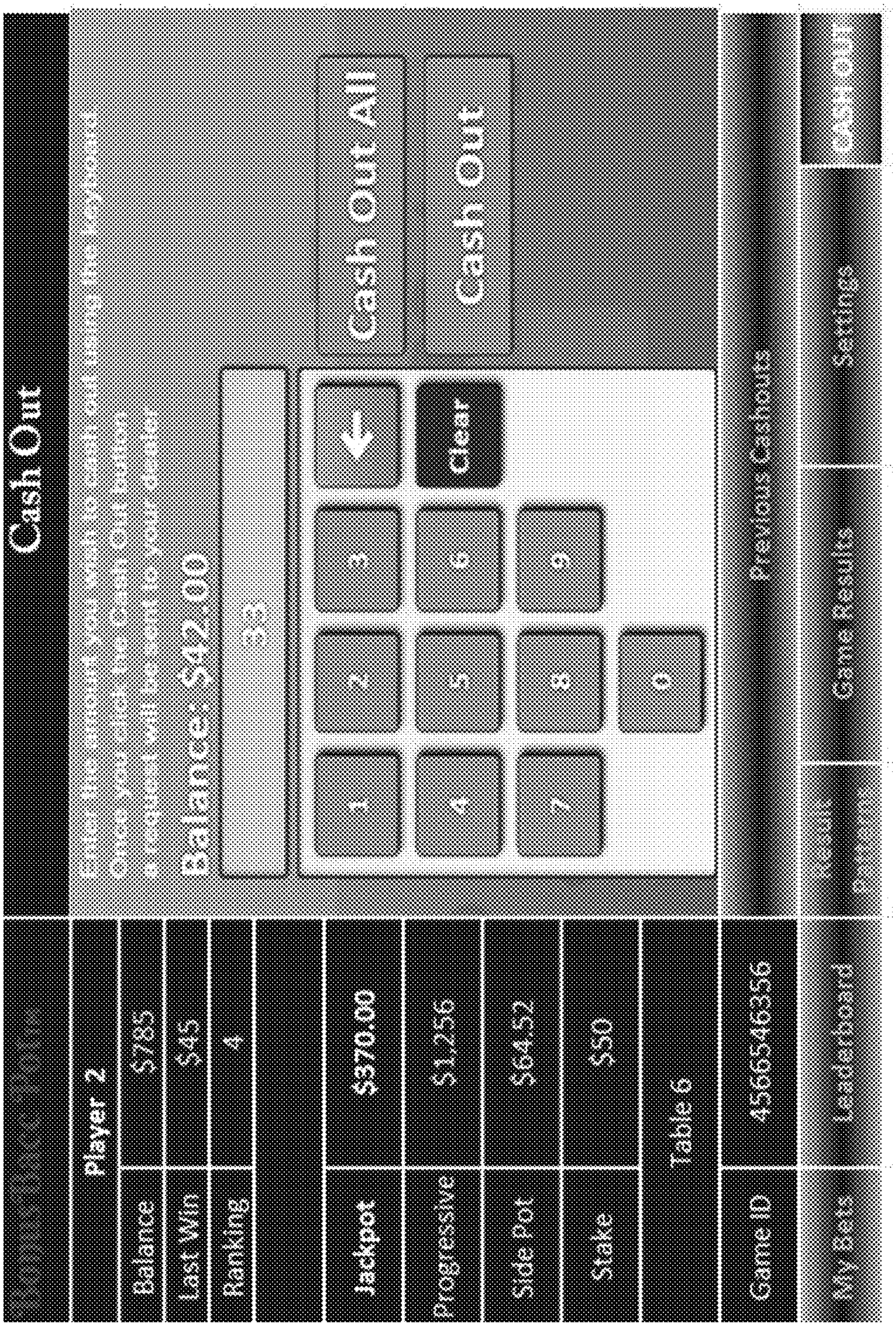
FIG. 40A-A

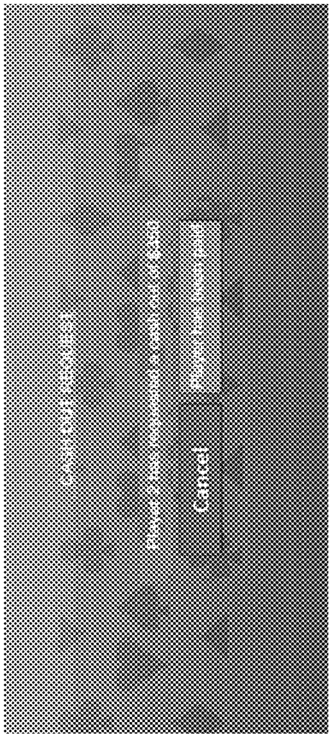
FIG. 40A-B

FIG. 43B
Player wf joined
Player ddw left
Player jimbo joined
Player Richard left
Player Richard Buy For Dealer $1

FIG. 44A
Enter ID:
Richard
BLACKJACK
Side Pot: $0
Game ID: 19
Table1
Seat: 6
BUY IN
SIDE BET
BUY FOR DEALER
RE-BET ALL
CASH OUT
You have been awarded $15 Side Bet
Balance:
$656
Total Win:
Minimum Bet:
$10

FIG. 44B
Table1
Minimum Bet: $10
BLACKJACK
Game No. 19
11/29/2018 11:27:09 AM
SEAT NAME RANK BET RESULT WIN
1 Daniel deWaal
5 ddw $10.00 PUSH $10.00
4 Lukasz $10.00 LOSE $0.00
6 Richard $10.00 BUST $15.00
7 sw $20.00 BUST $0.00
2 john
3 Jim McMann

FIG. 45B
Dealer login
ID:
PIN:
7
8
9
6
Clear
1
2
3
0
OK

FIG. 45H
BLACKJACK
Table
Minimum Bet
Dealer ID
Game ID
Menu
Switch Display
Player Buy In
Cash:
$77,777
Enter
Back

FIG. 45I
Enter ID: Seat1
BLACKJACK
LV3
Game ID: 3
Seat: 1
BUY IN
BUY FOR DEALER
RE-BET ALL
CASH OUT
MENU
Balance:
Last Total Win:
$0

FIG. 45L
BLACKJACK
Table
Minimum Bet
Dealer ID
Game ID
Menu
Switch Display
Start Game
Other
Cashier
Leave Table
Clear Bets

FIG. 45M
Enter ID: Seat1
BLACKJACK
LV3
Game ID: 4
Seat: 1
DOUBLE DOWN
SPLIT
INSURANCE
SURRENDER
CASH OUT
MENU
Balance:
$77,772
Last Total Win:
Bet:

FIG. 450
Enter ID: Seat1
Game ID: 4
BLACKJACK
LV3
Seat: 1
Are you sure you want to select Split option?
YES
NO
Balance:
Last Total Win:
Bet:

FIG. 45S
BLACKJACK
Table
LV3
Minimum Bet
Dealer ID
15
Game ID
6
Menu
Switch Display
End Game
Dealer outcome
20
Change outcome
Game settled
Select Player for More Actions

FIG. 45U
BLACKJACK
Table
Minimum Bet
Dealer ID
Game ID
Menu
Switch Display
End Game
Dealer outcome
20
Change outcome
Game settled
Select Player for More Actions

FIG. 45V
LV3
Minimum Bet: $5
BLACKJACK
Game No. 6
2/20/2019 11:16:39 AM
SEAT
NAME
RANK
BET
RESULT
WIN
1
Seat1
$5.00
LOSE
$0.00
2
Seat2
$30.00
LOSE
$0.00
3
Seat3
$105.00
LOSE
$0.00

SYSTEM AND METHOD FOR CONTROLLING OPERATION OF A GAME DEVICE

CROSS-REFERENCE TO RELATED APPLICATION

This application is a continuation application of U.S. patent application Ser. No. 17/962,711, filed Oct. 10, 2022, which is a continuation application of U.S. patent application Ser. No. 17/153,624, filed Jan. 20, 2021, which claims priority to and the benefit of U.S. Provisional Patent Application Ser. No. 62/963,930, filed Jan. 21, 2020, and is a continuation-in-part of U.S. patent application Ser. No. 16/719,608, filed Dec. 18, 2019, which is continuation of U.S. patent application Ser. No. 16/056,914, filed Aug. 7, 2018 (now U.S. Pat. No. 10,540,850, issued Jan. 21, 2020), which claims priority to and the benefit of U.S. Provisional Patent Application Ser. No. 62/542,036, filed Aug. 7, 2017 and is a continuation-in-part application of U.S. patent application Ser. No. 16/002,910, filed Jun. 7, 2018 (now U.S. Pat. No. 10,720,020, issued Jul. 21, 2020), which is continuation of International Patent Application No. PCT/US2016/066183, filed Dec. 12, 2016, and claims priority to and the benefit of U.S. Provisional Patent Application Ser. No. 62/293,972, filed Feb. 11, 2016 and U.S. Provisional Patent Application Ser. No. 62/266,612, filed Dec. 12, 2015, and is a continuation of U.S. patent application Ser. No. 14/994,072, filed Jan. 12, 2016 (now U.S. Pat. No. 9,626,835, issued Apr. 18, 2017), which is a continuation-in-part of U.S. patent application Ser. No. 14/076,088, filed Nov. 8, 2013 (Now U.S. Pat. No. 9,269,232, issued Feb. 23, 2016), which claims the priority to and the benefit of U.S. Provisional Patent Application Ser. No. 61/724,941, filed Nov. 10, 2012, all the disclosures of which are hereby incorporated by reference in their entirety for all purposes.

COPYRIGHT NOTICE

The figures included herein contain material that is subject to copyright protection. The copyright owner has no objection to the facsimile reproduction by anyone of this patent document as it appears in the U.S. Patent and Trademark Office, patent file or records, but reserves all copyrights whatsoever in the subject matter presented herein.

BACKGROUND OF THE INVENTION

Historically Felt Table Games like Blackjack or Baccarat that are dealt by dealers have out of necessity required to be relatively simple so that dealers can easily and quickly deal the game and calculate and make payouts to players. As a result, new games and game innovations for this market have been limited mostly to simple side bets or game variants that are similar in dealer complexity to existing games. The present invention is directed to satisfying these needs.

SUMMARY OF THE INVENTION

The present invention is generally directed to systems and methods for providing a table manager to simplify the player, dealer and administrative activities related to complex table game variants in Casino settings using real cards, a live dealer and virtual chips or game credits. The table manager automates many dealer/surveillance/supervisory/

Cash Desk activities adding controls and efficiencies to existing legacy games and enabling the next generation of dealer dealt table games.

In one aspect of the present invention, a standardized, chipless, table management system includes a table game device configured to provide a game to a plurality of players and a dealer device located at the table game device. The dealer device includes a dealer display unit configured to display a dealer screen including computer generated graphics, a memory device configured to store a data structure and a dealer execution program, the data structure for storing a plurality of player accounts, a dealer prompter device located in front of a dealer to prompt the dealer how to deal cards, and a dealer control unit, coupled to the dealer display unit and the memory device, for executing the dealer execution program for allowing a dealer to manage the player accounts. The dealer control unit includes a processor programmed with an algorithm to display a dealer display structure on the dealer display unit, the dealer display structure forming at least part of a dealer graphical user interface, allow a dealer to accept players at a table, transfer credits to a specific seat credit meters, register players, start and end games, verify or override game results, view player inputs, game history, view/generate dealer and session reports and generate cash-outs. The table management system also includes at least one player device located at the table game device, each player device including a player display unit configured to display a player screen including computer generated graphics and a player control unit, coupled to the player display unit. The player control unit is programmed with an algorithm to allow each respective player to enter a wager on the instance of the game, display the outcome of the instance of the game; and, display wager and player account data to the player. The at least one player device also includes a player wallet unit to allow players to store credentials and electronic funds and is connected to the table game device so that funds can be converted and transferred to game credit meters for game play and, in turn, receive funds that have been converted from game credits when players complete game play and cash out The present invention provides systems and methods for simplifying the player, dealer and administrative activities related to complex table game variants in Casino settings using real cards, a live dealer and virtual chips or game credits.

In one aspect of the present invention, a system including a dealer device and a player device is provided. The dealer device is located at a gaming device. The gaming device is configured to provide a game to a plurality of players. The dealer device includes a dealer display unit, a memory device and a dealer control unit. The dealer display unit is configured to display a dealer screen including computer generated graphics. The memory device is configured to store a data structure and a dealer execution program. The data structure for storing a plurality of player accounts. The dealer control unit is coupled to the dealer display unit and the memory device and executes the dealer execution program for allowing a dealer to manage the player accounts. The dealer control unit includes a processor programmed to display a dealer display structure on the dealer display unit. The dealer display structure forms at least part of a dealer graphical user interface. The processor of the dealer control unit is further programmed to allow a dealer to enter funds, received from one of the players, to a respective one of the plurality of player accounts. The funds are stored in a financial unit utilized by the system. The financial unit has a base financial unit. The processor of the dealer control unit is further programmed to allow the dealer to finalize wagers made on an instance of the game after one or more players have entered a wager, to allow the dealer to enter an outcome of the instance of the game played on the gaming device, to calculate a change in the player account of each player who made a wager on the instance of the game and to effectuate the respective change in each player account. The change in at least one of the player accounts is a fractional amount of the base financial unit. The at least one player device is located at the gaming device. Each player device includes a player display unit and a player control unit. The player display unit is configured to display a player screen including computer generated graphics. The player control unit is coupled to the player display unit and is programmed to allow each respective player to enter a wager on the instance of the game, to display the outcome of the instance of the game and to display wager and player account data to the player.

In another aspect of the present invention, a control method for operating a system is provided. The system includes a dealer device and at least one player device. The dealer device is located at a gaming device. The gaming device is configured to provide a game to a plurality of players. The dealer device includes a dealer display unit, a memory device and a dealer control unit. The dealer control unit includes a processor. The at least one player device includes a player display unit and a player control unit. The dealer display unit is configured to display a dealer screen including computer generated graphics. The memory device is configured to store a data structure and a dealer execution program. The data structure stores a plurality of player accounts. The dealer display unit is coupled to the dealer display unit and the memory device and executes the dealer execution program for allowing a dealer to manage the player account. The method including the step of displaying a dealer display structure on the dealer display unit. The dealer display structure forms at least part of a dealer graphical user interface. The method includes the step of allowing a dealer to enter funds, received from one of the players, to a respective one of the plurality of player accounts. The funds are stored in a financial unit utilized by the system. The financial unit having a base financial unit. The method also includes the steps of allowing the dealer to finalize wagers made on an instance of the game after one or more players have entered a wager, allowing the dealer to enter an outcome of the instance of the game played on the gaming device, calculating a change in the player account of each player who made a wager on the instance of the game, and effectuating the respective change in each player account. The change in at least one of the player accounts is a fractional amount of the base financial unit. The method further includes the steps of displaying a player screen including computer generated graphics on the player display unit, allowing each respective player to enter a wager on the instance of the game, displaying the outcome of the instance of the game and displaying wager and player account data to the player.

In still another aspect of the present invention, one or more non-transitory computer-readable storage media, having computer-executable instructions embodied thereon are provided. When executed by one or more processors, the computer-executable instructions cause the one or more processors to display a dealer display structure on a dealer display unit of a dealer device. The dealer display structure firm at least part of a dealer graphical user interface. When executed by the one or more processors, the computer-executable instructions also cause the one or more processors to allow a dealer to enter funds on the dealer device, received from one of the players, to a respective one of the plurality of player accounts. The funds are stored in a financial unit utilized by the system, the financial unit having a base financial unit. When executed by the one or more processors, the computer-executable instructions also cause the one or more processors to allow the dealer to finalize, using the dealer device, wagers made on an instance of the game after one or more players have entered a wager, to allow the dealer to enter, using the dealer device, an outcome of the instance of the game played on the gaming device, to calculate, by the dealer device, a change in the player account of each player who made a wager on the instance of the game and to effectuate, by the dealer device, the respective change in each player account. The change in at least one of the player accounts is a fractional amount of the base financial unit. When executed by the one or more processors, the computer-executable instructions further cause the one or more processors to display, on a player display unit of a player device, a player screen including computer generated graphics, to allow each respective player to enter a wager on the instance of the game using the player device, to display, on the player device, the outcome of the instance of the game and to display, on the player device, wager and player account data to the player.

Some embodiments of the invention are directed to methods and systems for providing a secondary contest involving a plurality of players, each player playing a primary wagering game at a live dealer table where live gaming activities such as wagers placed, and game results such as cards dealt or dice rolls are interpolated by computing devices such as RFID chip readers, laser chip trays, chipping machines, optic or other sensors and "Smart Shoes," and are communicated to an eligible gaming device within a communication network. Players using eligible computing devices are provided secondary game communications which provide for or involve the steps of: displaying a query to each player of the primary game through a display device on each of the eligible computing devices within the communication network, wherein the query notifies the player of a preset time period for entering a wager in a secondary contest; receiving a secondary contest wager from one or more players during the preset time period; adding those secondary wagers to a game specific pari-mutuel pool; interpolating the actuating of an instance of the primary game upon the expiration of the preset time period for the one or more secondary contest players; comparing the resulting outcome of the primary game for each secondary contest player, wherein each of the resulting outcomes is associated with a number of credits or chips won; awarding at least a portion of the wagers placed in the secondary contest to the winning secondary contest players identified based on the number of credits or chips won in the primary game. It should be understood, that for purposes of this description including the claims and the figures, the term "interpolate" or any form of the word is interchangeable with the term "interpret" or its variations.

Some embodiments of the invention are directed to methods and systems for providing a secondary contest involving a plurality of players, each player playing a primary wagering game on an eligible computing device within a communication network, which provide for or involve the steps of displaying a query to each player of the primary game through a display device on each of the eligible computing devices within the communication network, wherein the query notifies the player of a preset time period for entering a wager in a secondary contest; receiving a secondary contest wager from one or more players during the preset time period; actuating an instance of the primary game upon the expiration of the preset time period for the one or more secondary contest players; comparing the resulting outcome of the primary game for each secondary contest player, wherein each of the resulting outcomes is associated with a rank; determining an outcome of the instance of the secondary contest, wherein the outcome includes at least one of an identification of a winning secondary contest player, wherein the winning secondary contest player is the player having the resulting outcome of the highest rank, and an identification of a tie outcome, wherein the tie outcome includes two or more players having a resulting outcome of the highest rank; responsive to the identification of a winning secondary contest player, awarding at least a portion of the wagers placed in the secondary contest to the winning secondary contest player identified; and responsive to the identification of a tie, repeating some or all of the aforementioned steps.

Some embodiments of the invention are directed to a method for providing a secondary contest including a plurality of players involved in the play of a primary wagering game on one or more computing devices, each computing device including a display device and communication interface enabling communication within a network including other computing devices and a secondary contest controller, the method comprising the steps of displaying a secondary contest notification on the display device of each computing device in the network prior to the actuation of an instance of the primary wagering game, wherein the secondary contest notification provides information relating to an opportunity to enter a wager in a secondary contest through the communication interface; receiving data relating to the entry of a secondary contest wager identifying the computing device from which the data is received; receiving outcome data relating to a subsequent instance of the primary wagering game actuated at each computing device of the identified eligible computing devices, wherein the outcome data includes a randomly generated result in the primary wagering game for each identified eligible computing device; comparing the randomly generated result for each identified eligible computing device with a preset criteria for determining an outcome of the secondary wagering contest, wherein the outcome is a winning, partial winning or a non-winning outcome for one or more identified eligible computing devices; responsive to the satisfaction of the preset criteria for a winning or partial winning outcome, displaying an award notification on the display device of the one or more identified eligible computing devices satisfying the preset criteria for the winning outcome of an awarding of at least a portion of the secondary contest wagers received; and responsive to the satisfaction of the preset criteria for a non-winning outcome, repeating some or all of the aforementioned steps for the one or more identified eligible computing devices satisfying the preset criteria for the non-winning outcome.

In some embodiments, the notification further identifies an amount of time remaining for receiving data relating to the entry of a wager in the secondary contest, and the data relating to the entry of a secondary contest wager may only be received during the amount of time remaining.

In some embodiments, the randomly generated result comprises an amount of credits or chips won. Alternatively, the randomly generated result comprises cards that are dealt a poker ranking or roll of the dice value.

The preset criteria for determining a winning or partial winning outcome of the secondary wagering contest may be the randomly generated result associated with cards that are dealt, a roll of the dice or the highest poker rank. In other embodiments, the preset criteria for determining a winning or partial winning outcome of the secondary wagering contest is the randomly generated result associated with the number of credits or chips won, or a threshold amount of credits or chips. The preset criteria for determining a non-winning outcome of the secondary wagering contest may be the failure of the outcome data to satisfy the preset criteria for a winning or partial winning outcome.

In some embodiments, the aforementioned method further comprises the step of actuating the primary wagering game on each identified eligible computing device.

Some embodiments of the invention are directed to a system comprising: a computing device including a display device and communication interface enabling communication within a network including other computing devices and a secondary contest controller, wherein the computing device is operatively associated with a processor for facilitating play of a primary wagering game; the secondary contest controller facilitating the displaying of a secondary contest notification on the display device of each computing device in the network prior to the actuation of an instance of the primary wagering game, wherein the secondary contest notification provides information relating to an opportunity to enter a wager in a secondary contest through the communication interface, wherein the controller includes a communication interface and a processor for: receiving data relating to the entry of a secondary contest wager identifying the computing device from which the data is received; receiving outcome data relating to a subsequent instance of the primary wagering game actuated at each computing device of the identified eligible computing devices, wherein the outcome data includes a randomly generated result in the primary wagering game for each identified eligible computing device; comparing the randomly generated result for each identified eligible computing device with a preset criteria for determining an outcome of the secondary wagering contest, wherein the outcome is one of a winning outcome or a non-winning outcome for one or more identified eligible computing devices; responsive to the satisfaction of the preset criteria for a winning or partial winning outcome, displaying an award notification on the display device of the one or more identified eligible computing devices satisfying the preset criteria for the winning outcome of an awarding of at least a portion of the secondary contest wagers received; and responsive to the satisfaction of the preset criteria for a non-winning outcome, retrieving one or more subsequent instances of the primary wagering game actuated at each computing device of the identified eligible computing devices for comparison with the preset criteria. In some embodiments, the computing device is an electronic gaming machine. The computing device may be operatively associated with the processor of the controller.

Some embodiments of the invention are directed to a method for providing a secondary contest operated by a secondary contest controller to include a plurality of players involved in the play of a primary wagering game on one or more computing devices, each computing device including a display device and communication interface, the method comprising the steps of: a) transmitting content for display on the display device of each computing device in the network prior to the actuation of an instance of the primary wagering game, wherein the content includes a secondary contest notification relating to an opportunity to enter a wager in a secondary contest through the computing device; b) receiving data relating to the entry of a secondary contest wager identifying the computing device from which the data is received; c) retrieving outcome data relating to a subsequent instance of the primary wagering game actuated at each computing device of the identified eligible computing devices, wherein the outcome data includes a randomly generated result in the primary wagering game for each identified eligible computing device; d) comparing the randomly generated result for each identified eligible computing device with a preset criteria for determining an outcome of the secondary wagering contest, wherein the outcome is one of a winning, partial winning or a non-winning outcome for one or more identified eligible computing devices; e) responsive to the satisfaction of the preset criteria for a winning or partial winning outcome, transmitting content for display on the display device of the one or more identified eligible computing devices satisfying the preset criteria for the winning outcome including information relating to an awarding of at least a portion of the secondary contest wagers received; and f) responsive to the satisfaction of the preset criteria for a non-winning outcome, repeating steps c) through f) for the one or more identified eligible computing devices satisfying the preset criteria for the non-winning outcome.

Some embodiments of the invention are directed to methods and systems for providing a secondary contest involving a plurality of players, each player playing a primary wagering game in which a live dealer emulates a primary gaming controller and some aspects of a secondary game controller using an input device to capture primary game activities such as wagers placed, cards dealt, rolls of the dice, poker rankings and credits or chips won into one or more computing devices. A display associated with the secondary game controller notifies players of a preset time period for entering a wager in a secondary contest; using a data input device the dealer enters data related to receiving a secondary contest wager from one or more players during the preset time period into one or more computers, The secondary game controller adding those secondary wagers to a game specific pari-mutuel pool; the dealer actuating an instance of the primary game upon the expiration of the preset time period for the one or more secondary contest players; the secondary game controller comparing the resulting outcome of the primary game for each secondary contest player, wherein each of the resulting outcomes is associated with cards dealt, a roll of the dice, a poker ranking or a number of chips won and awarding participant players portions of the pari-mutuel pool based on winning or partial winning outcomes by printing payment "Chits" that can be redeemed for cash, these "Chits" are then distributed by the dealer.

Other features and advantages of the invention will be readily appreciated as the same becomes better understood by reference to the following detailed description when considered in connection with the accompanying drawings.

BRIEF DESCRIPTION OF THE DRAWINGS

FIG. 26 is an exemplary Pari-mutuel Baccarat pay table, according to an embodiment of the present invention.

FIG. 28 is a second exemplary Pari-mutuel Baccarat pay table, according to an embodiment of the present invention.

FIG. 29 is an exemplary Pari-mutuel Baccarat side bet pay table, according to an embodiment of the present invention.

FIG. 30 is a table containing a number of sample game results comparing traditional Class III Blackjack game payouts with volatility-controlled payouts.

DETAILED DESCRIPTION OF THE PREFERRED EMBODIMENT(S)

The exemplary embodiments herein relate to various systems and methods used in gaming applications. It should be understood that each of the methods and individual steps recited herein may be partially or wholly carried out in a variety of ways and/or systems, which may include, but are not limited to, an electronic gaming machine ("EGM") for use by one or more players, a multiplayer platform which may include a player interface such as a touchscreen display and involve physical or virtual game symbols, a home computer and/or portable computing device, such as a tablet computer or mobile phone capable of communicating with a network or over the Internet, global telecommunication network or world wide web.

It should further be understood that the invention is directed to, among other things, methods of providing, conducting and resolving wagering games that include a sequence of controlled and concrete transformative events. Some of these events may involve communications between computing components, establishing the eligibility of such computing components based on location and game specific rules, indication preferences, placing wagers, debiting and awarding credits stored in an account, the generation or interpretation of random data and results for one or more players, the application of randomly-generated data to predefined rules, the ranking of results relative to all players in a game, the pooling of all wagers placed, the determination of wager outcomes in accordance with preset outcome determining criteria, and the notification of such outcomes along with the designation of a portion of the wager pool as a commission for the operator or game provider. The generation of random data may be facilitated by computerized and/or physical implements, such as a random number generator ("RNG") or a cards dealt, a roll of the dice or credits/chips awarded. The transformative events may also include parsing of the data for comparative purposes with preset criteria to determine an outcome in a second, bonus or associated wagering game.

A selected embodiment of the invention will now be explained with reference to the drawings. It will be apparent to those skilled in the art from this disclosure that the following description of the embodiment of the invention is provided for illustration only and not for the purpose of limiting the invention as defined by the appended claims and their equivalents.

Figure 1:
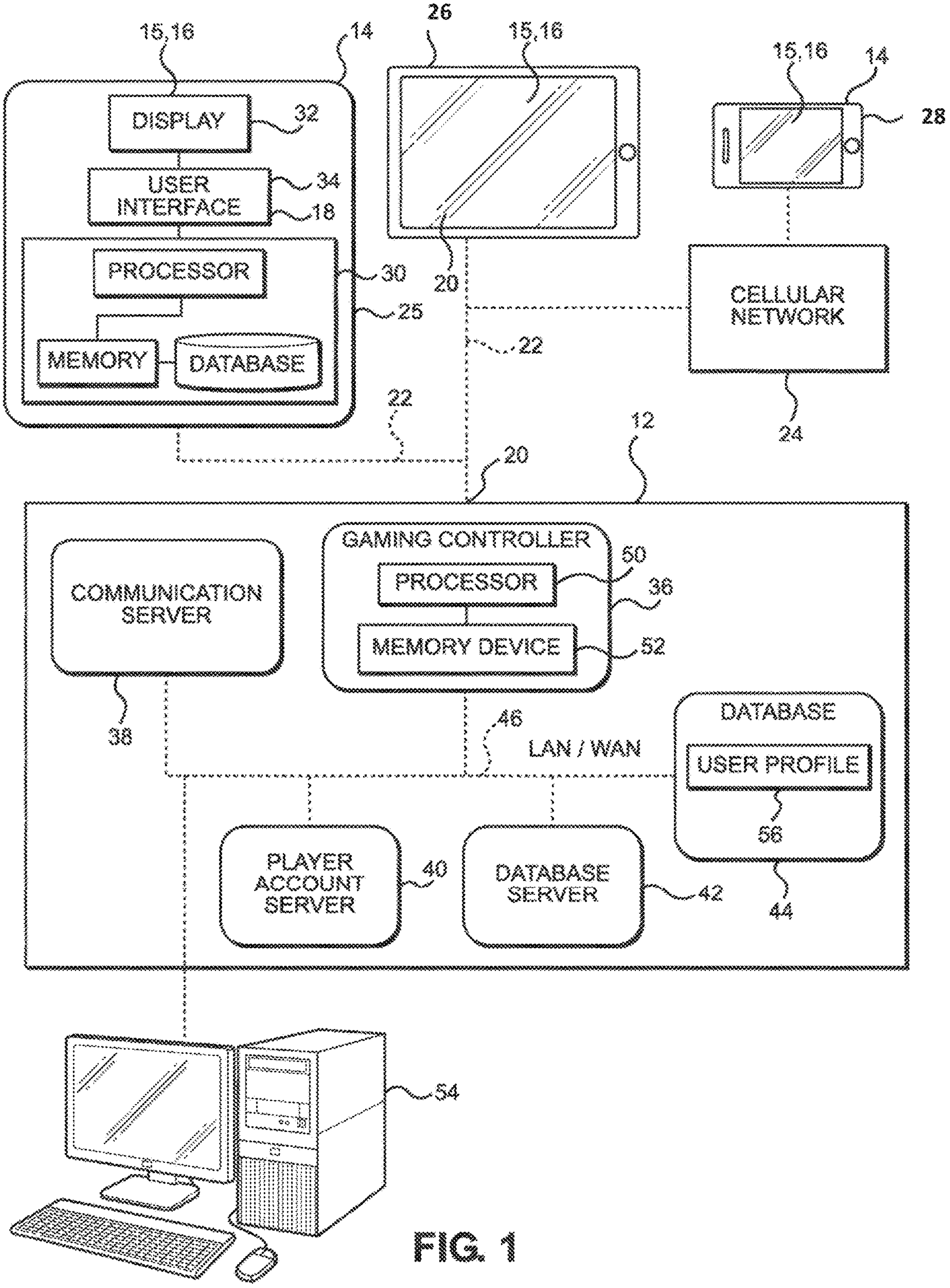
FIG. 1 is a schematic representation of an exemplary system for allowing a player to play a primary game and a secondary contest via a user computing device, according to an embodiment of the invention.

FIG. 1 is a schematic representation of the system 10, according to an embodiment of the invention. In the illustrated embodiment, the system 10 includes a server system 12 that is coupled to one or more user computing devices 14. Each user computing device 14 is configured to transmit and receive data to and/or from the server system 12 to display a primary game 15 and graphical interfaces 18 (such as those shown in FIGS. 4-14) to enable a user to participate in both instances of the primary game 15, which may involve the player competing against a pay table in a game operated by a processing device, such as for example, a draw poker game, and instances of a secondary contest 16 in which the result in the primary game 15 is compared with a preset criteria to determine a winning or non-winning outcome. For example, the preset criteria may be the result in one or more instances of the primary game 15, such as a poker rank achieved, credits won over one or more games, game score, the appearance of symbols or patterns, achieving certain hands, such as losing hands, consecutive losing outcomes or hands, consecutive winning outcomes or hands, reaching a threshold after tracking players such as on a leader board, reaching a threshold based on credits earned or games played, such as a prize zone, which is then used to compare against similar results from other players playing the primary game 15 on their own computing device 14. The status of the player relative to reaching a threshold may be visualized on a display screen in any manner, such as a rising bar on a bar graph or a needle on a dial completing a circle, for example.

In some embodiments, the reaching of a threshold, based on a score, credits earned or games played for example, will entitle the player having reached the threshold to entrance into one or more prize zones, wherein each prize zone may be associated with an additional bonus prize awarded to the player. In some embodiments, reaching certain thresholds for prize zones or other awards may be based on and achieved by more than one player involved in the secondary contest 16, such as all or a portion of the players in the secondary contest 16 having played in a certain amount of games, achieving a score which is the sum of their combined scores, credits, poker ranks or winning hands or other results taken from the primary wagering game 15. The players' scores relative to the threshold may be tracked on a leader board which may be displayed on a display device associated with the computing device 14 or an independent display device. In some embodiments, the opportunity to reach thresholds may be reset upon the occurrence of certain events, such as reaching a particular threshold for a prize or should a player fail to enter the secondary contest 16. Alternatively, the scores or points added due to the departing player from the secondary contest 16 may be deducted from the remaining players cumulative score applied towards reaching a threshold.

In the illustrated embodiment, the server system 12 is coupled to each user computing device 14 via a communications link 20 that enables each user computing device 14 to access server system 12 over a network 22 such as, for example, a local network, the Internet, a cellular telecommunications network 24, a wireless network and/or any suitable telecommunication network that enables the user computing devices 14 to access the server system 12. For example, in one embodiment, user computing devices 14 may include a gaming machine 25, a mobile computing device 26 and a smartphone 28. Computing device 14 may communicate with server system 12 via a local network, while mobile computing device 26 and smartphone 28 communicate with the server system 12 via the cellular telecommunications network 24 and/or the Internet, for purposes of facilitating play of the primary game 15 and/or one or more instances of the secondary contest 16 among a wide range of players at the same time. In another embodiment, the user computing device 14 may include a personal computer, laptop, cell phone, tablet computer, smartphone/tablet computer hybrid, personal data assistant, and/or any suitable computing device that enables a user to connect to or communicate with the server system 12 and display the graphical interfaces 18 for purposes of facilitating instances of the secondary contest 16 while players may also be engaging in play of a primary wagering game 15 apart from the secondary contest 16.

In the illustrated embodiment, each user computing device 14 generally includes a controller 30 that is coupled to a display device 32 and a user input device 34. The controller 30 may include a processor, memory and database. Controller 30 receives and transmits information to and from the server system 12 for enabling the display and interaction between a player during play of a primary game 15, as well as facilitating the play of the secondary contest 16, and the graphical interfaces 18 (shown in FIGS. 4-14) on the display device 32 to enable the user to interact with the server system 12 to enter into and play the secondary contest 16 in accordance with the embodiments described herein. Controller 30 may include a random number generator for generating random results in instances of the primary wagering game 15.

The display device 32 may include and consist of, without limitation, a flat panel display, such as a cathode ray tube display (CRT), a liquid crystal display (LCD), a light-emitting diode display (LED), active-matrix organic light-emitting diode (AMOLED), a plasma display, and/or any suitable visual output device capable of displaying graphical data and/or text to a user. Moreover, the user input device 34 may include and consist of, without limitation, a keyboard, a keypad, a touch-sensitive screen, a scroll wheel, a pointing device, a barcode reader, a magnetic card reader, a radio frequency identification (RFID) card reader, an audio input device employing speech-recognition software, and/or any suitable device that enables a user to input data, such as making selections and placing wagers, into the controller 30 and/or to retrieve data from the controller 30. Alternatively, a single component, such as a touch screen, a capacitive touch screen, and/or a touchless screen, may function as both the display device 32 and as the user input device 34.

In the illustrated embodiment, the server system 12 includes a gaming controller 36, a communications server 38, a player account server 40, a database server 42 and a database 44. The servers 38, 40, and 42, gaming controller 36, and database 44 are connected through a network 46 such as, for example, a local area network (LAN), a wide area network (WAN), dial-in-connections, cable modems, wireless modems, and/or special high-speed Integrated Services Digital Network (ISDN) lines. Moreover, at least one administrator workstation 48 may also be connected to the network 46 to enable communication with the server system 12. The communications server 38 communicates with the user computing devices 14 and the administrator workstation 48 to facilitate transmitting data over the network 22 via a private network, the Internet and/or the cellular network 24, respectively.

The database server 42 is connected to the database 44 to facilitate transmitting data to and from the database 44. The database 44 contains information relating to a variety of matters, such as, for example, account information related to a user, user profile information, a primary game type, a number of game symbols such as card representations associated with a game, a number of game outcomes, a payout value associated with each game outcome, wagers, wager amounts, wager types, average wagers per game or contest, and image data for producing game or contest images and/or screens on the user computing device 14 and temporarily stores variables, parameters, and the like that are used by the gaming controller 36 for enabling play of a secondary contest 16. In one embodiment, the database 44 includes a centralized database that is stored on the server system 12 and is accessed directly via the user computing devices 14. In an alternative embodiment, the database 44 is stored remotely from the server system 12 and may be non-centralized.

The gaming controller 36 includes a processor 50 and a memory device 52 that is coupled to the processor 50. The memory device 52 includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the processor 50 to store, retrieve, and/or execute instructions and/or data. Controller 36 may be further connected to a computer system 54 for administrative and backend support, among other things.

The processor 50 executes various programs, and thereby controls other components of the server system 12 and the user computing device 14 according to user instructions and data received from the user computing devices 14. The processor 50 in particular displays some or all of the graphical interfaces 18 (shown in FIGS. 4-14), may operate the primary game 15, but is involved in executing a secondary contest program, and thereby enables the system 10 to generate instances of the secondary contest 16 along with the primary game 15. For example, the system 10 may be enabled to query users of each computing device 14 while playing the primary game 15 as to whether they would like to enter into an instance of the secondary contest 16, and thereafter allow users or players to enter wagers in an instance of the secondary contest 16, and apply the outcome data of the primary game 15, which may include randomly generated results, to the outcome data in the primary games 15 of other players also competing in the same instance of the secondary contest 16, to determine a winner of the instance of the secondary contest based on a comparison of the respective outcome data of all players involved with a preset criteria for winning. In some embodiments, if the preset criteria for winning is not satisfied, then the outcome of the secondary contest 16 is non-winning, which may include a tie occurrence between one or more players, and the players will be automatically entered into a subsequent instance of the primary wagering game 15. The computing device 14 from which the results that satisfied the preset criteria for winning were received may receive a notification of the winning outcome in the secondary contest 16.

The memory device 52 stores programs and information used by the processor 50. Moreover, the memory device 52 stores and retrieves information in the database 44 including, but not limited to, image data for producing images and/or screens on the display device 32, and temporarily stores variables, parameters, and the like that are used by the processor 50.

In the illustrated embodiment, the gaming controller 36 is configured for actuating and administering multiple instances of the secondary contest 16 on computing devices 14. Instances of the secondary contest 16 may be actuated periodically or at preset timing intervals, such that players may be offered the opportunity to enter into the secondary contest 16 after each outcome of the primary game 15 and before beginning a new instance of the primary game 15. Each user of a computing device 14 may be queried through display device 32 as to whether they would like to enter into one or more of the currently available instances of the secondary contests 16. Entry into an instance of the secondary contest 16 may be accomplished by receiving or detecting a player selection to place a wager in response to the query displayed on display device 32 in a currently available instance of the secondary contest 16 through input device 34. In some embodiments, instances of the secondary contest 16 are made available to users of the computing devices 14 for a limited period of time prior to actuating an instance of the primary game 15, which may be enabled by controller 30, and then a new instance of the secondary contest 16 is made available after the period of time has ended or after the primary game 15 is completed. In some embodiments, the query and time periods are uniformly provided throughout all computing devices 14 connected with network 22. Thus, any players entering into the secondary contest 16 during the same time period from any computing device 14 connected through network 22 would be entered into the same instance of the secondary contest 16. Alternatively, gaming controller 36 may enable players to play in the same or different instances of secondary contests 16 through the user computing devices 14. In some embodiments, once it is detected that a player wishes to enter into a secondary contest 16, such as by placing a secondary contest wager, the instance of the secondary contest in which the player will be entered is dependent on the point in time upon which the outcome in the primary game 15 is determined.

In some embodiments, the player account server 40 stores information associated with a plurality of user profile accounts and a plurality of corresponding unique user identifiers in a user profile program 56 in the database 44 in order to facilitate player identity and play of the secondary contest 16. Each user profile account may also include financial account information associated with each user. The financial account information may include information relating to an amount of game credits available for use in playing games and/or any suitable financial information that enables the system 10 to function as described herein.

In the embodiment discussed herein, gaming controller 36 further includes or is in communication with a display module 58, a random-number generator (RNG) module 60, a credit module 62, a betting module 64, a game module 66, and an award module 68, for providing instances of a primary wagering game 15, particularly with regard to computing devices 14 other than electronic gaming machines that use controller 30, such as thin client platforms or mobile platforms for example. Thus, system 10 is capable of extending the primary game 15 and the secondary contest 16 to larger groups of players, among other things.

The display module 58 controls the display device 32 to display various images on the graphical interface 18 preferably by using computer graphics and/or image data stored in the database 44. More specifically, the display module 58 controls the symbols being displayed in a primary wagering game 15 or secondary contest 16, such as for example, virtual representations of playing cards on the display device 32 or another display device by using computer graphics and/or the image data. In one embodiment, the display module 58 is configured to display a query or statement inviting a user of a computing device 14 to enter into an instance of a secondary contest 16 within a preset period of time. For example, the display module 58 may display the primary game 15 including a game display area 70 and a statement or query 72 notifying players of the opportunity to place a wager in a secondary contest 16 within a time period, including a timer counting down the remaining time available for a player to place a wager to be involved in the secondary contest 16. Gaming controller 36 may also provide additional statements and progress updates on display device 32 or another display device as the countdown to entry continues and the instance of the secondary contest 16 develops. Player outcome data in the primary game 15 for players involved in the secondary contest 16 may be displayed on the display device 32 or other display device for all players to see. In other words, as game controller 36 receives outcome data through randomly generated results and/or player decisions in the primary game 15 for each player involved in secondary contest 16, this information may be communicated to all players involved in secondary contest 16.

The credit module 62 communicates with the player account server 40 to manage the amount of player's credits available for use in playing the secondary contest 16. The credit module 62 receives a user selection indicative of a request from a user computing device 14 to place wagers in the secondary contest 16, including an amount of game credits associated with each wager, if appropriate, and deliver credits to the computing device 14 of the player having won an instance of the secondary contest 16.

The game module 66 includes a game program for use in playing the secondary contest 16 based on user selection input receive from a user computing device 14. The game module 66 receives game information in the primary game 15 and performs various functions and calculations to play the secondary contest 16. Game module 66 compares the game outcome data received in the primary game 15, such as the final hand rank in the primary game 15, with the final hand rank achieved by any other players in the secondary contest 16 to determine a winning hand.

In some embodiments, the game module may also provide a primary game 15 on a computing device 14, particularly with regard to the computing devices 14 other than electronic gaming machines that use controller 30 to provide the primary wagering game 15. Alternatively, another random number generator or game module may be used. For these types of computing devices 14, the game module 66 retrieves game elements from the database 44 and causes the display module 58 to display the primary game 15 on the display device 32. The game module 66 receives signals indicative of user selection input via the user input device 34 and generates an outcome of the primary game 15 based on the predetermined game rules and the received user selection input, and displays the game outcome on the display device 32. In such embodiments, a RNG module 60 generates and outputs random numbers to the game module 66 for use in playing the primary game 15. In addition, the game module 66 may use random numbers generated by the RNG module 60 to determine if a winning condition has occurred in the outcome of the primary game 15, and to determine whether or not to provide an award to a player. For example, if the game is the poker-type game 16, the game module 66 uses the RNG module 60 to randomly select one or more virtual representations of playing cards. The game module 66 compares the randomly selected cards with a paytable to determine the payout amount, if any, in the instance of the primary game 15.

It should be understood that the game outcome data may include any information relating to the wager determining result for the primary game 15, such as for example, the final hand condition or rank in a poker game, the numerical score of a blackjack or hand in a baccarat game, dice roll result in craps, roulette result determined by the ball, etc., which would be used for comparative purposes in the secondary contest 16. In other embodiments, the primary game 15 may be a slot game and the game outcome data for determining the outcome of the wager in the secondary contest 16 may be based on the results of one or more slot games, such as the amount won. In some embodiments, a leaderboard may be used to track results of the primary game 15 for comparative purposes in a secondary contest 16 relative to the scores of other players.

In the illustrated embodiment, the betting module 64 receives a user selection input from the input device 34 indicative of a wager being placed by the player on an instance of the secondary contest 16 and may display a notification indicative of the player's selection on the graphical interface 18. In addition, the betting module 64 transmits the player's selection to the game module 66 so that module 66 may apply the game outcome data from the subsequent instance of the primary game 15 in the instance of the secondary contest 16, particularly for any computing devices 14 that rely on module 66 for providing the primary wagering game 15. Betting module 64 may also store each wager associated with the primary game 15 and secondary contest 16. In some embodiments, players are permitted to buy into further rounds of the secondary game 16

Each instance of the primary game 15 is generally played in a conventional manner. In the illustrated embodiment, the game module 66 determines an outcome of the instance of the primary game 15 for any computing device 14 relying on module 66 and an outcome for the instance of the secondary game 16 for all computing devices 14. The award module 68 awards a payout in the primary game 15 for any computing device 14 relying on module 66 and a payout in the secondary contest 16, if appropriate. The payout in the secondary contest 16 may be a portion or all of a pool of all wagers received in instance of the secondary contest 16. A commission for the operator may be subtracted from the pool of wagers upon payout of the wagers in any instance of the secondary contest 16.

Should game module 66 determine a tie outcome has occurred in the instance of the secondary contest 16, system 10 may automatically enter or offer entry to a new instance of the secondary contest 16 to the players having the tying game outcome data, which may or may not require receipt of an additional secondary contest wager and/or primary game wager from the computing device 14 associated with the tying players. Alternatively, the wagers received in the secondary contest 16 may be divided amongst the players having the highest ranked tying hands.

In some embodiments, a qualifying criteria must be met in order to win the secondary contest 16. If the qualifying criteria is not satisfied, the players involved in the instance of the secondary contest 16 may be automatically entered or offered entry to a new instance of the secondary contest 16, which may or may not require receipt of an additional secondary contest wager and/or primary game wager. In some embodiments, the qualifying criteria relates to the outcome data, such as achieving a hand rank of at least a preset poker ranking.

Figure 3:
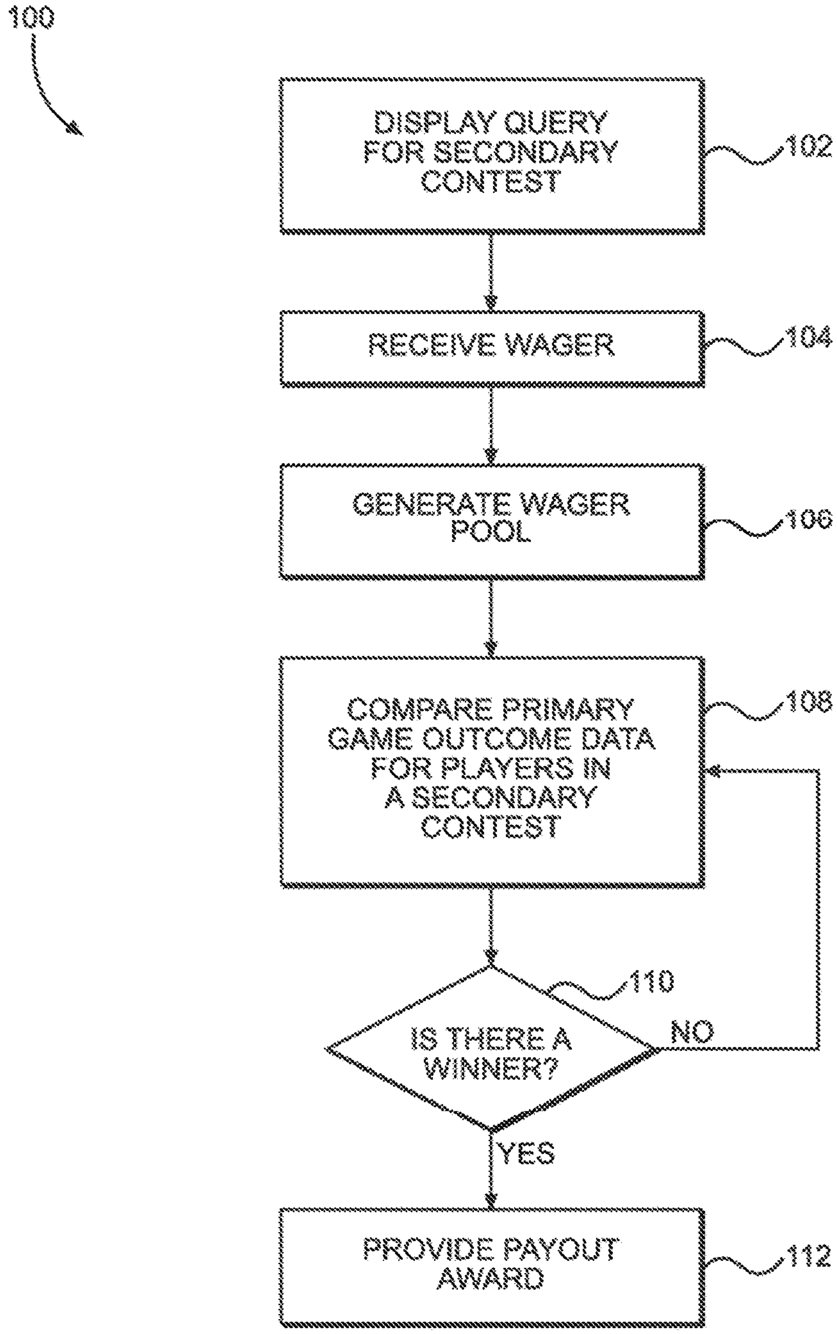
FIG. 3 is a flowchart of a method that may be used with the system shown in FIG. 1 for allowing a player to play a primary game and secondary game via a user computing device, according to an embodiment of the invention.
Figure 4:
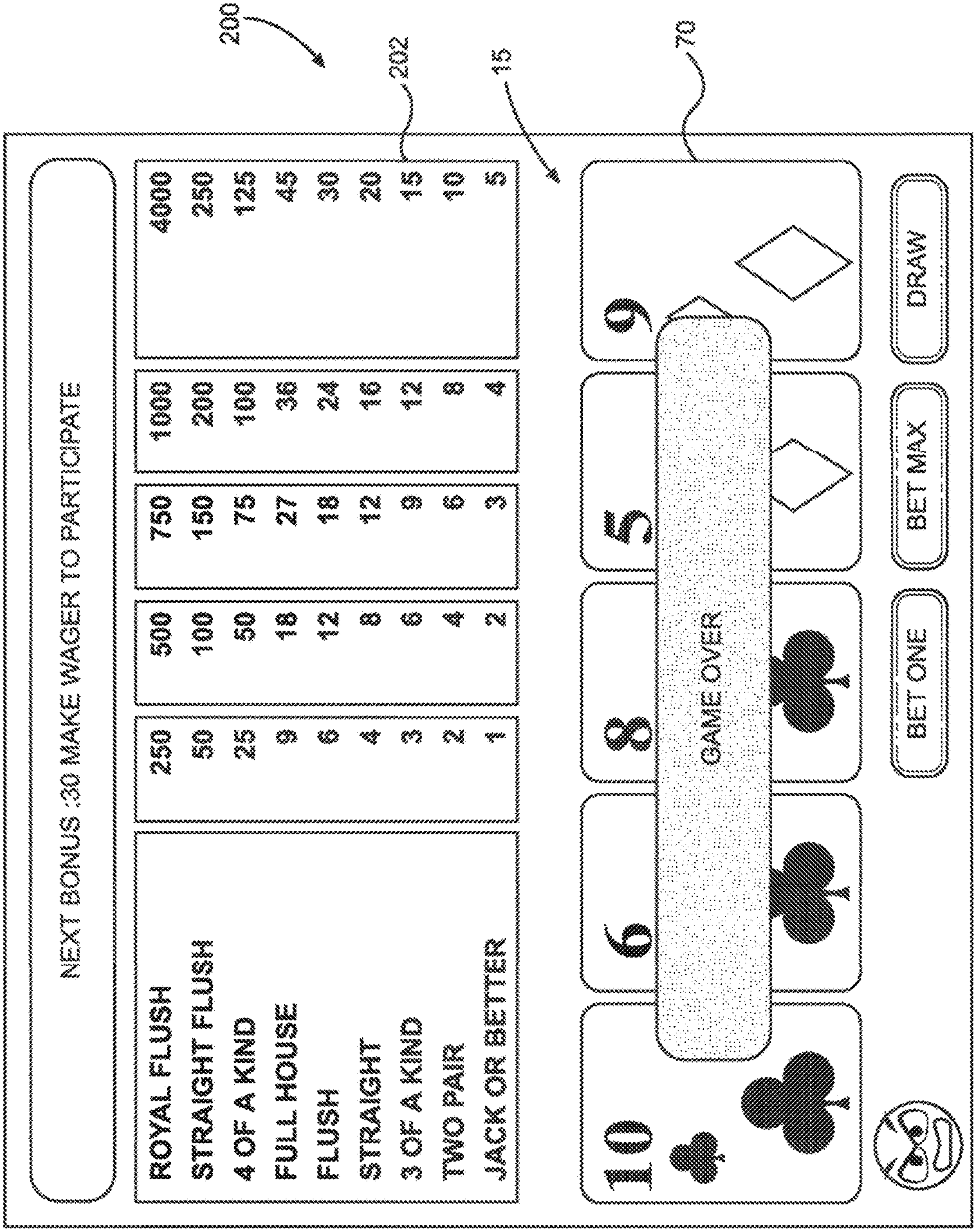
FIGS. 4-14 are exemplary graphical user interfaces or displays of a primary game and secondary contest that may be used with the method shown in FIG. 3, according to an embodiment of the present invention.
Figure 5:
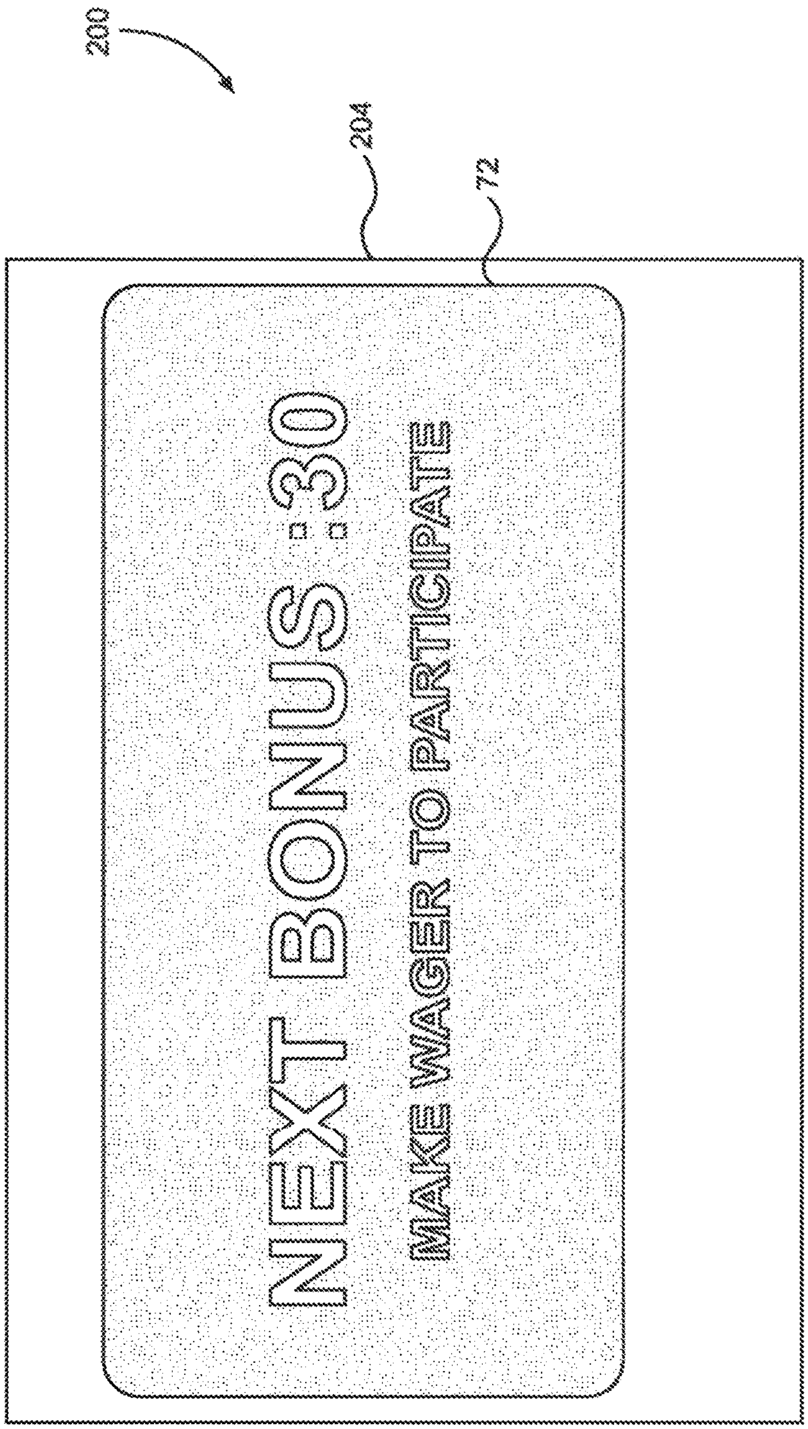
Figure 6:
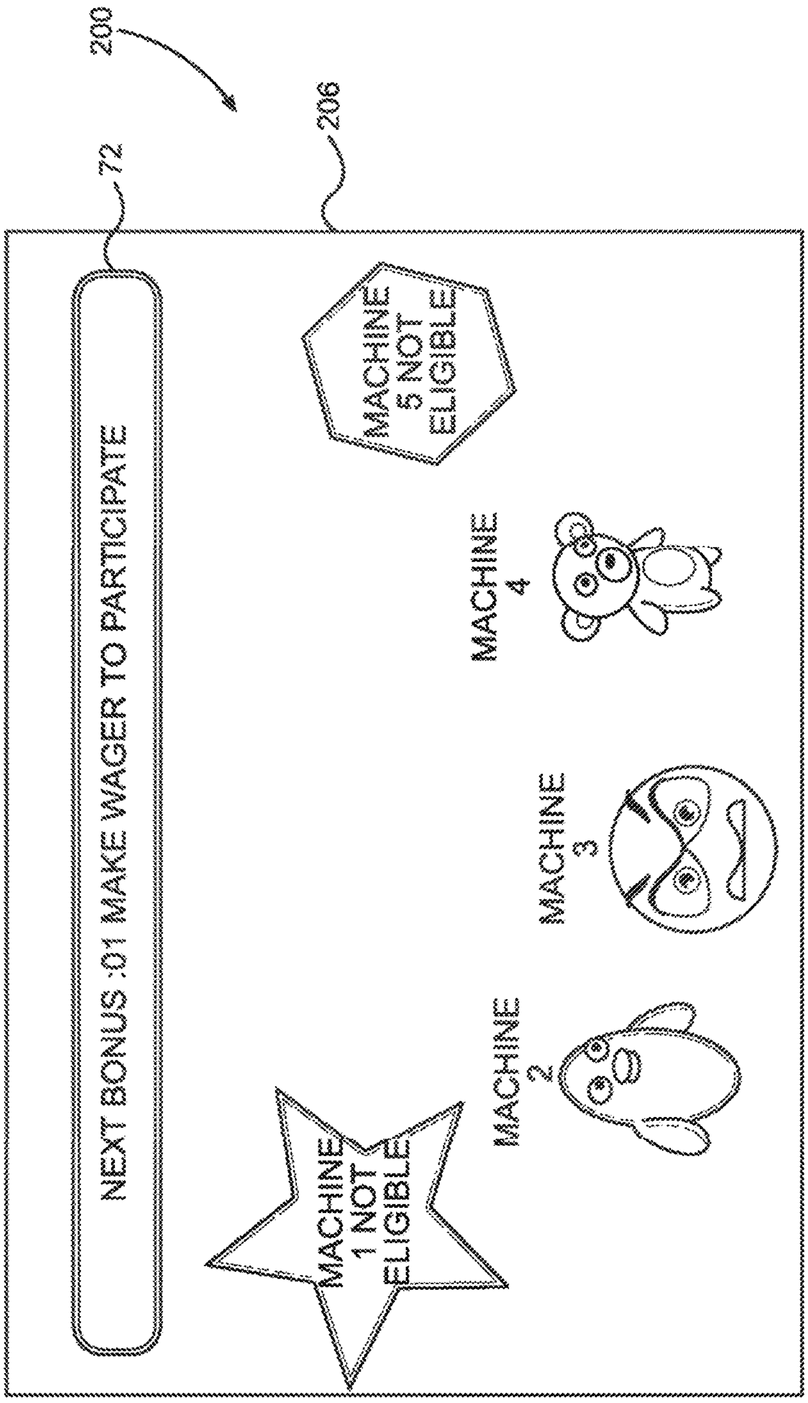
Figure 7:
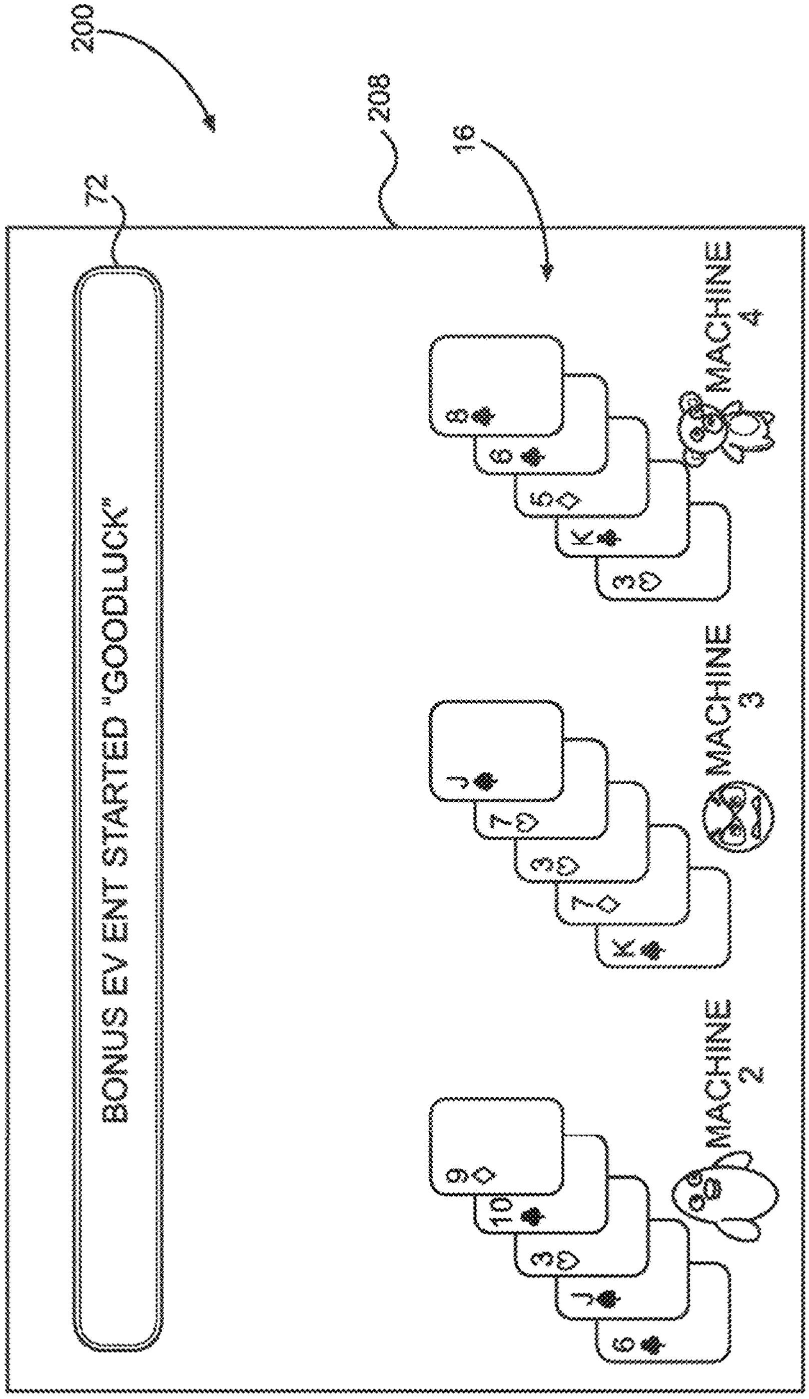
Figure 8:
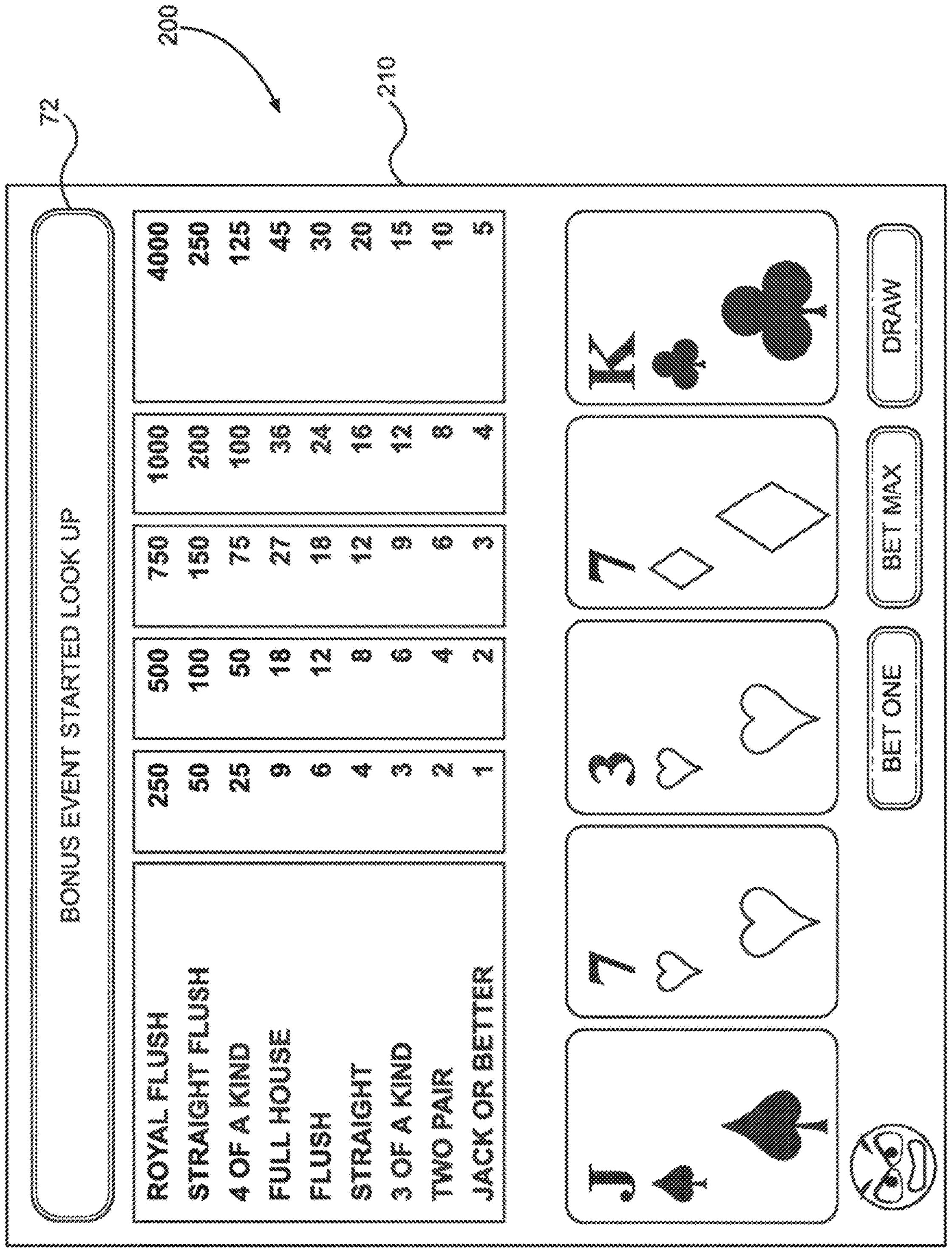
Figure 9:
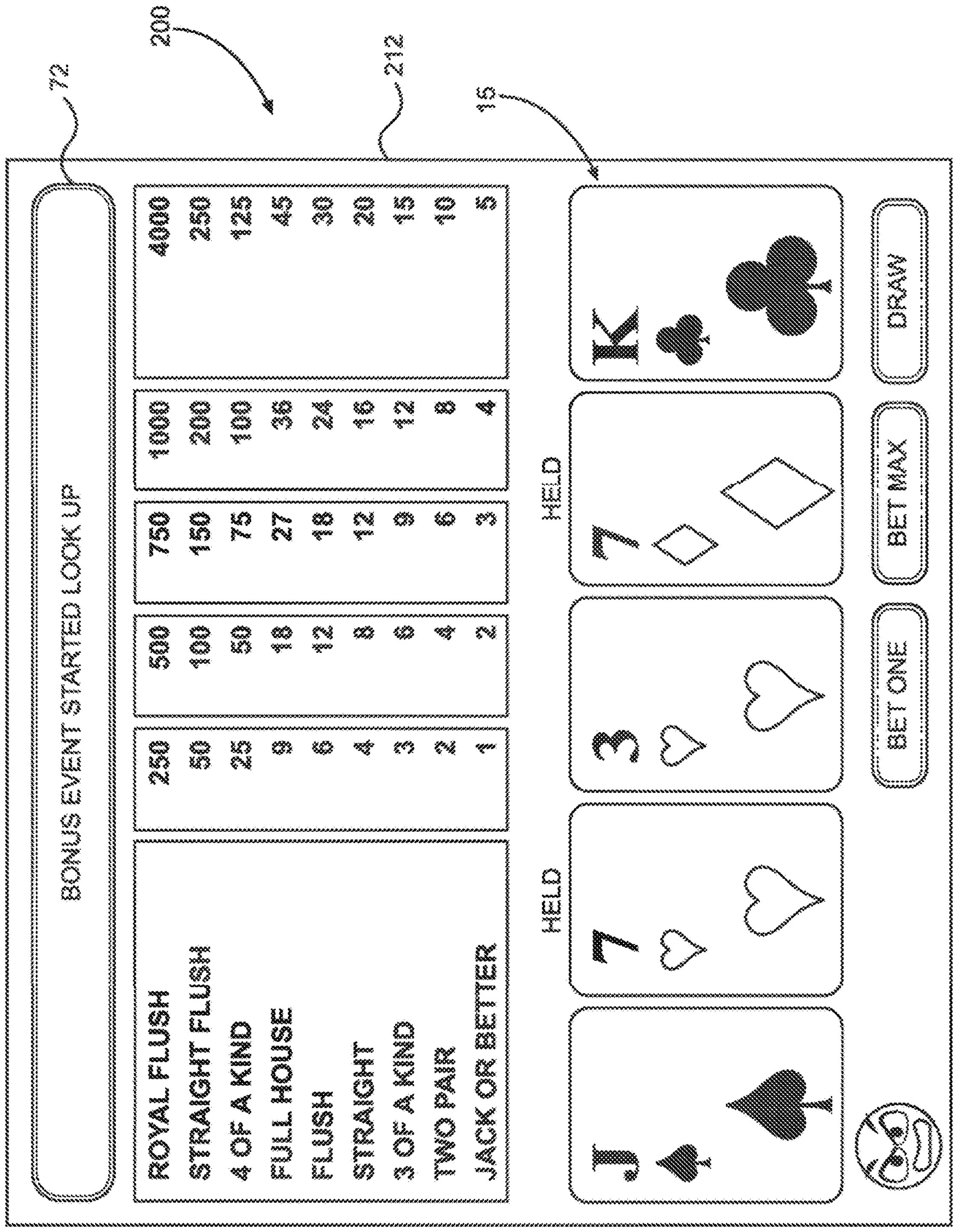
Figure 10:
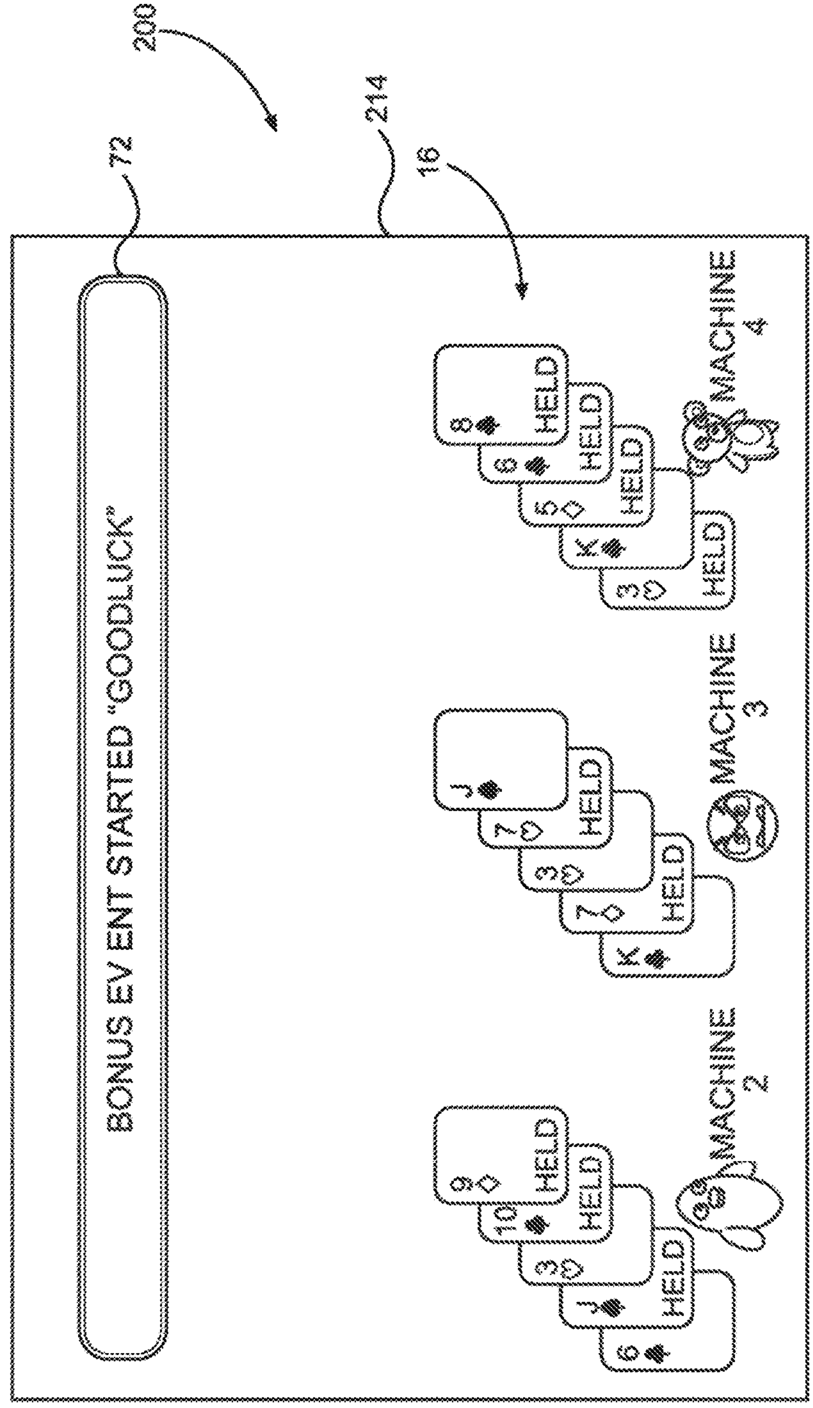
Figure 11:
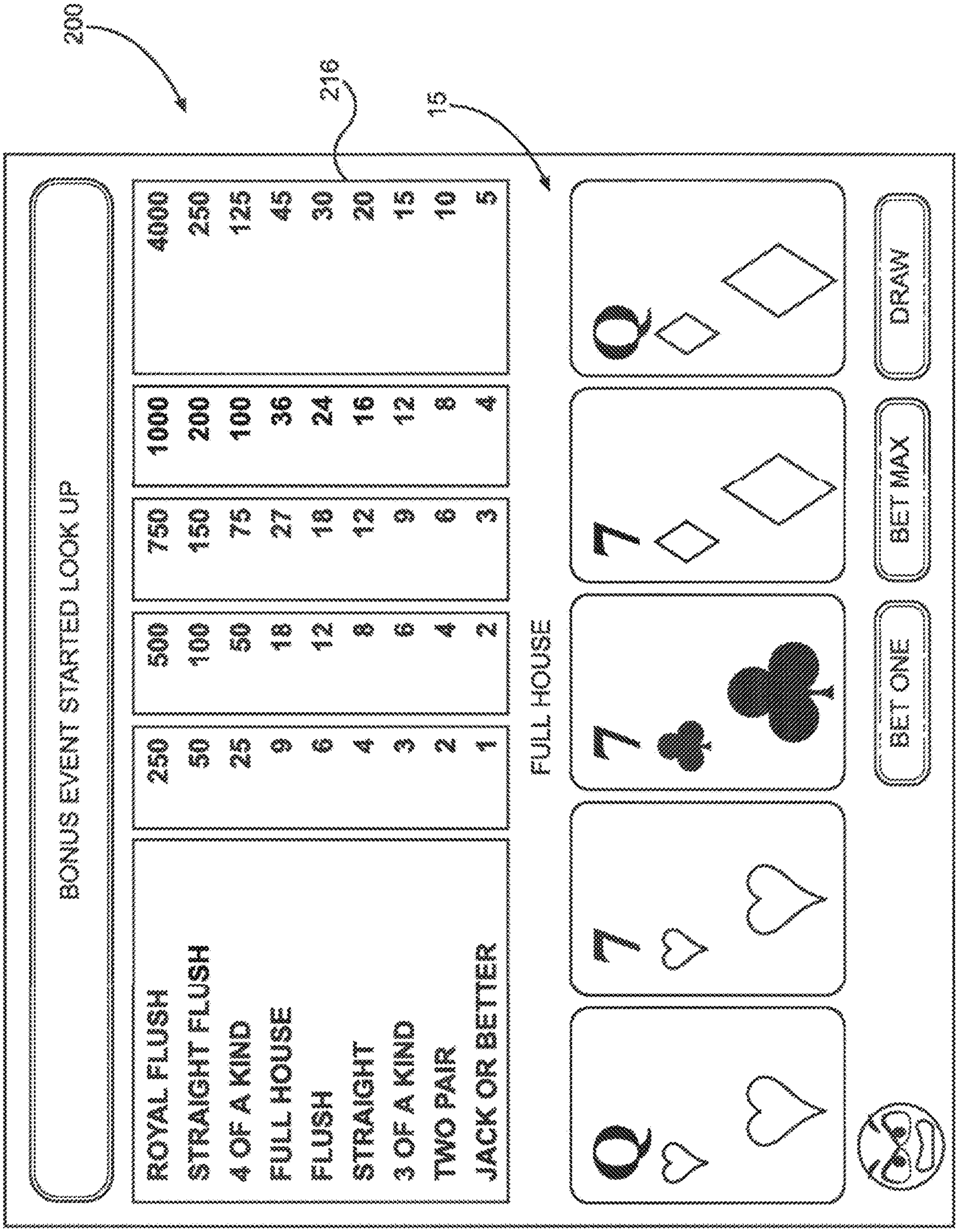
Figure 12:
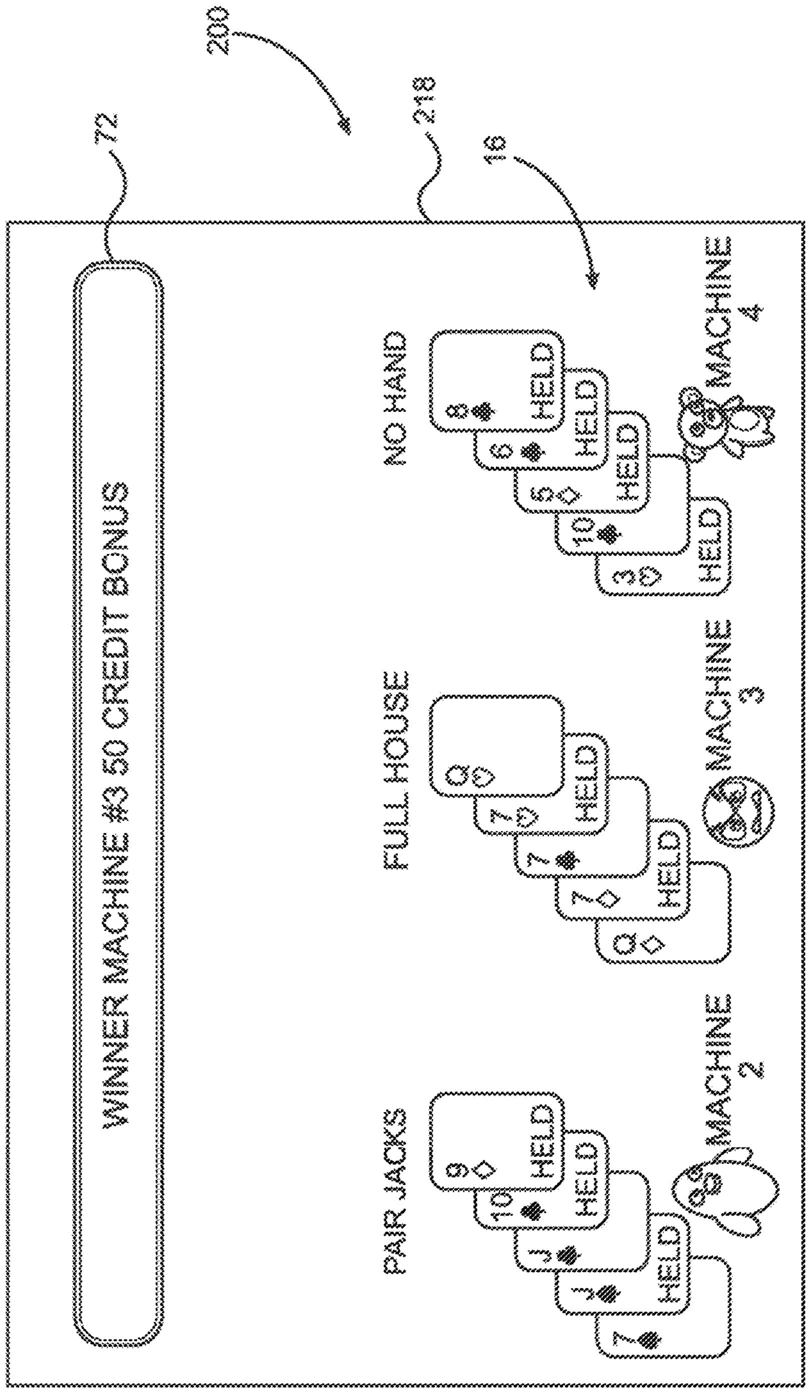
Figure 13:
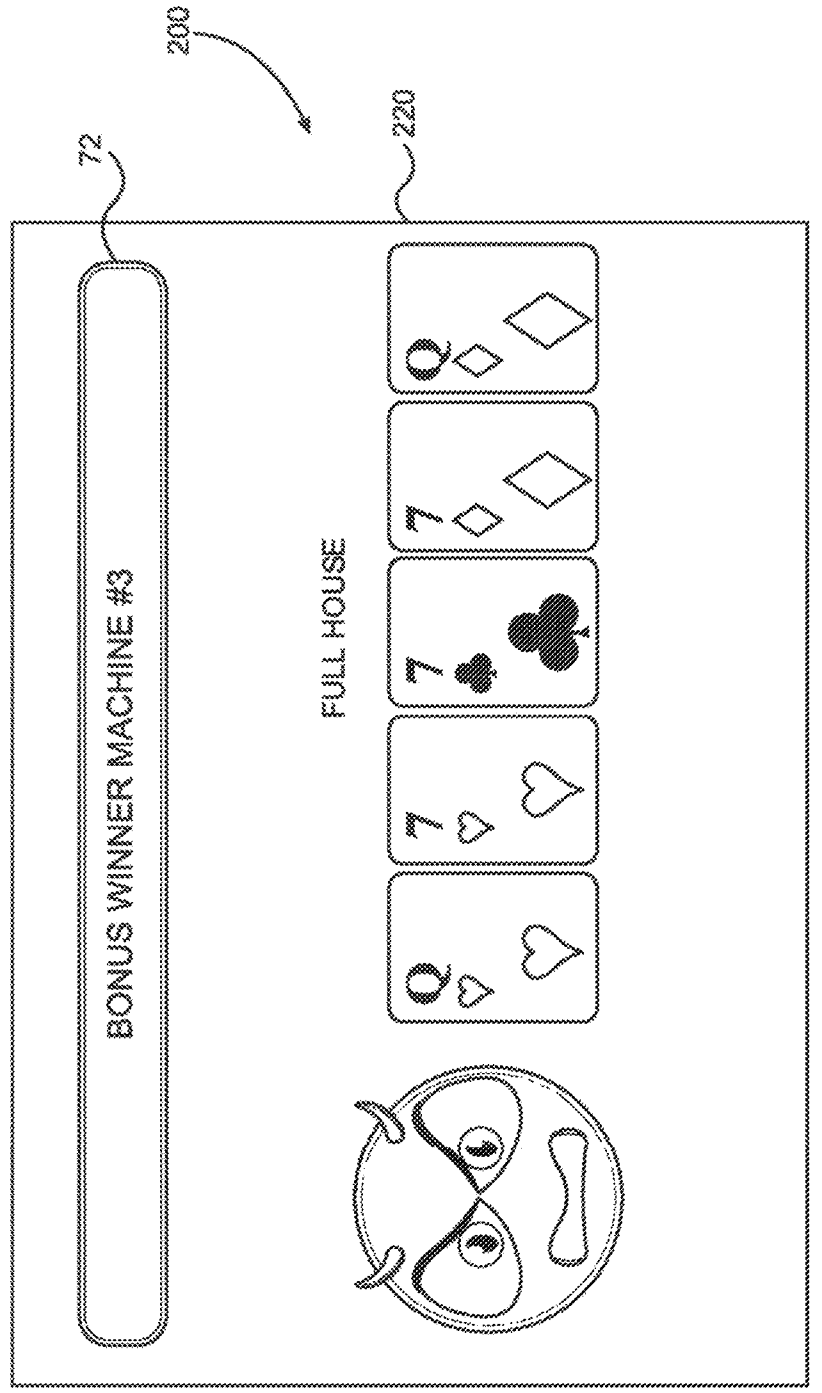
Figure 14:
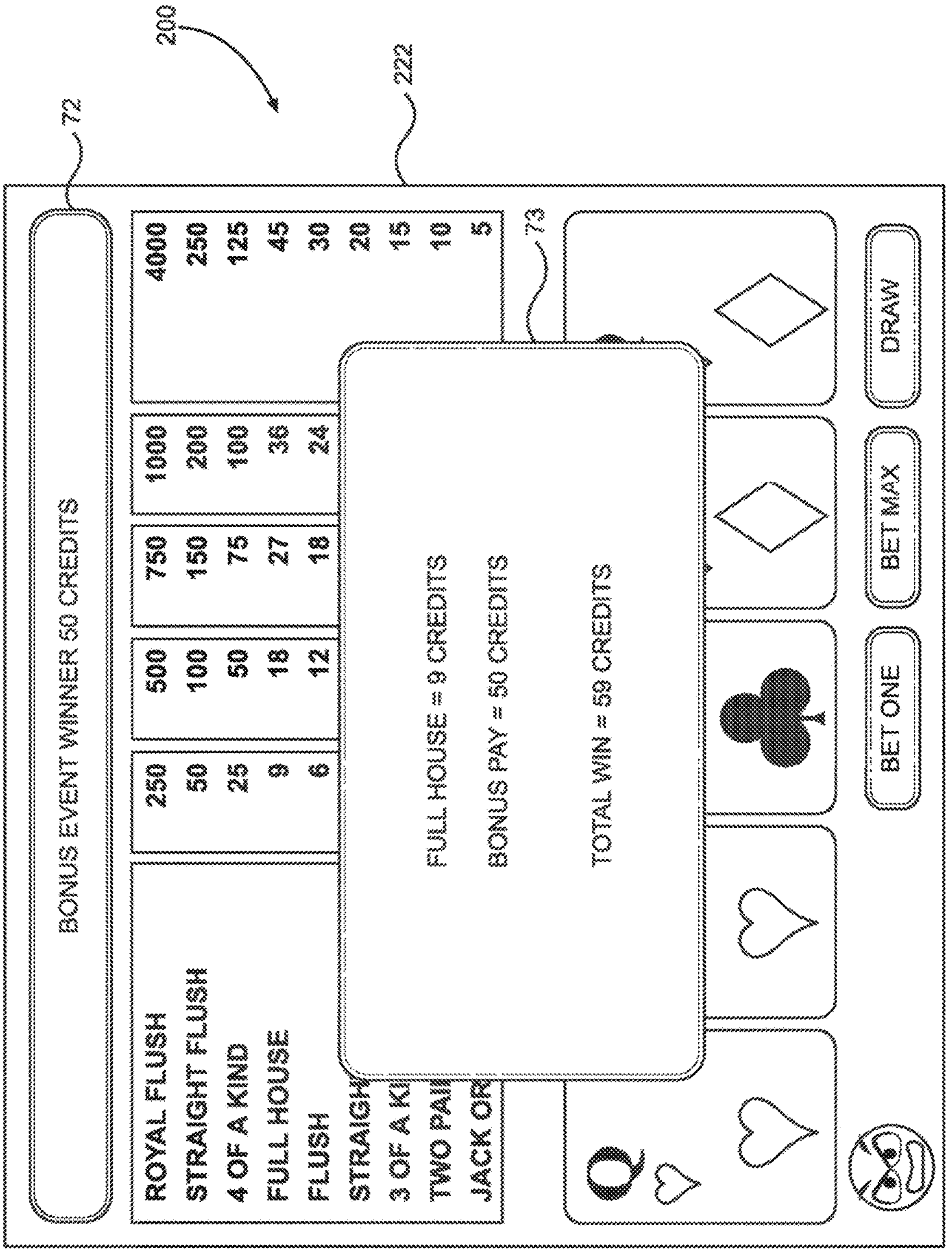

FIG. 3 is a flowchart of a method 100 that may be used with the system 10 for allowing a player to play a game via a user computing device 14. Each method step may be performed independently of, or in combination with, other method steps. Portions of the method 200 may be performed by any one of, or any combination of, the components of the system 10. Player selections involved in method 100 may be received via the user input device 34 of the user computing device 14 and may be transmitted by the user computing device 14 to the server system 12 via the network 22.

In the illustrated embodiment, in the method step 102, the gaming controller 36 transmits a query invitation on display device 32 to the user computing device 14 relating to placing a wager in the secondary contest 16. As discussed above, entering into the instance of the secondary contest 16 may be time-sensitive. If system 10 receives a wager in step 104, then it will be added to a pool of wagers in step 106 for the instance of the secondary contest 16. The primary game 15 is actuated and the game outcome data for each player in the secondary contest 16 is compared in step 108. If there is a winner, such as the highest ranking poker hand amongst all players in the instance of the secondary contest 16, then the winning player is identified by system 10 and credited at their user computing device 14 with a payout award from the wager pool accordingly. If there is no winner, which may be the result of a tie or failure to satisfy some qualifying criteria, then in this embodiment, then one or more playoffs occur in which another primary game is actuated for each of the players and the results of the primary game 15 are compared for purposes of resolving the secondary contest 16 until a winner is determined.

In some embodiments, wagers are made from points or virtual currency achieved which may or may not be exchanged for real money, and awards may also be provided as virtual currency or real money, for the primary game and/or secondary contest. In some embodiments, no wager is required for the primary wagering game 15 and a wager is required for the secondary contest 16 only.

FIGS. 4-14 illustrate exemplary interfaces showing a primary game 15 of draw poker which may be provided on the display 200, which may comprise all or a portion of display 32 of any computing device 14. In this embodiment, display 200 is a touchscreen display, thus including data input capability. Interface 202 shows a draw poker session as having ended. In interface 204, a notification 72 is displayed on display 200 indicating that a "bonus," which is the name given to the secondary contest 16 in this embodiment, may be entered into by the player and a countdown timer of thirty seconds is displayed as part of notification 72. In this embodiment, players may enter a wager to participate in an instance of the secondary contest 16 by touching the display 32 at the location of notification 72. Interface 206 shows the participants in the instance of the secondary contest 16 may be shown on display 32, which may be limited to include only those players involved locally or within certain regions. Interface 206, and other interfaces which provide secondary contest 16 details and results, such as interfaces 208, 214, 218, and 220, discussed further below, may be shown on a display 200 or a portion thereof, or alternatively on a separate display device. Interface 208 shows some initial results of game play occurring at computing devices 14, including the hands of cards dealt in the primary game 15 to each player in the secondary contest 16. For example, the computing device 14 identified as "machine 3" is shown as having been dealt a Jack of spades, Seven of hearts, Three of hearts, Seven of hearts and King of clubs. The display device 32 for this player may look as shown in interface 210. Interface 212 illustrates the player decision to hold the Sevens and discard the remaining cards in their hand in the primary wagering game 15. Interface 214 shows the decision making of some or all of the players in the secondary contest 16, including the decisions to hold the Sevens made by the player at machine 3. Interface 216 shows the results on the computing device 14 at machine 3 in the primary game 15, which reveals that the player was dealt a Seven of clubs, Queen of diamonds, and Queen of hearts to their hand, ranking as a full house in the primary wagering game 15. The game outcome data for the player at machine 3 therefore is a full house rank as shown in interface 218 compared with the game outcome data for others involved in this instance of the secondary contest 16, which is expressed as poker ranks, such as "pair of Jacks" for machine 2 and "no hand" for machine 4. Gaming controller 36 compares the hands and determines the winner, which may be displayed as shown in interface 220. Gaming controller 36 determines the award which may include all of the wagers placed in this instance of the secondary contest 16 minus a commission or rake, and displays the awards as credits in this embodiment as shown in interface 222. Interface 222 also shows the results of the primary wagering game 15 in the notification 73 and the total win based on the results of the primary wagering game and secondary contest, expressed as credits.

Figure 15:
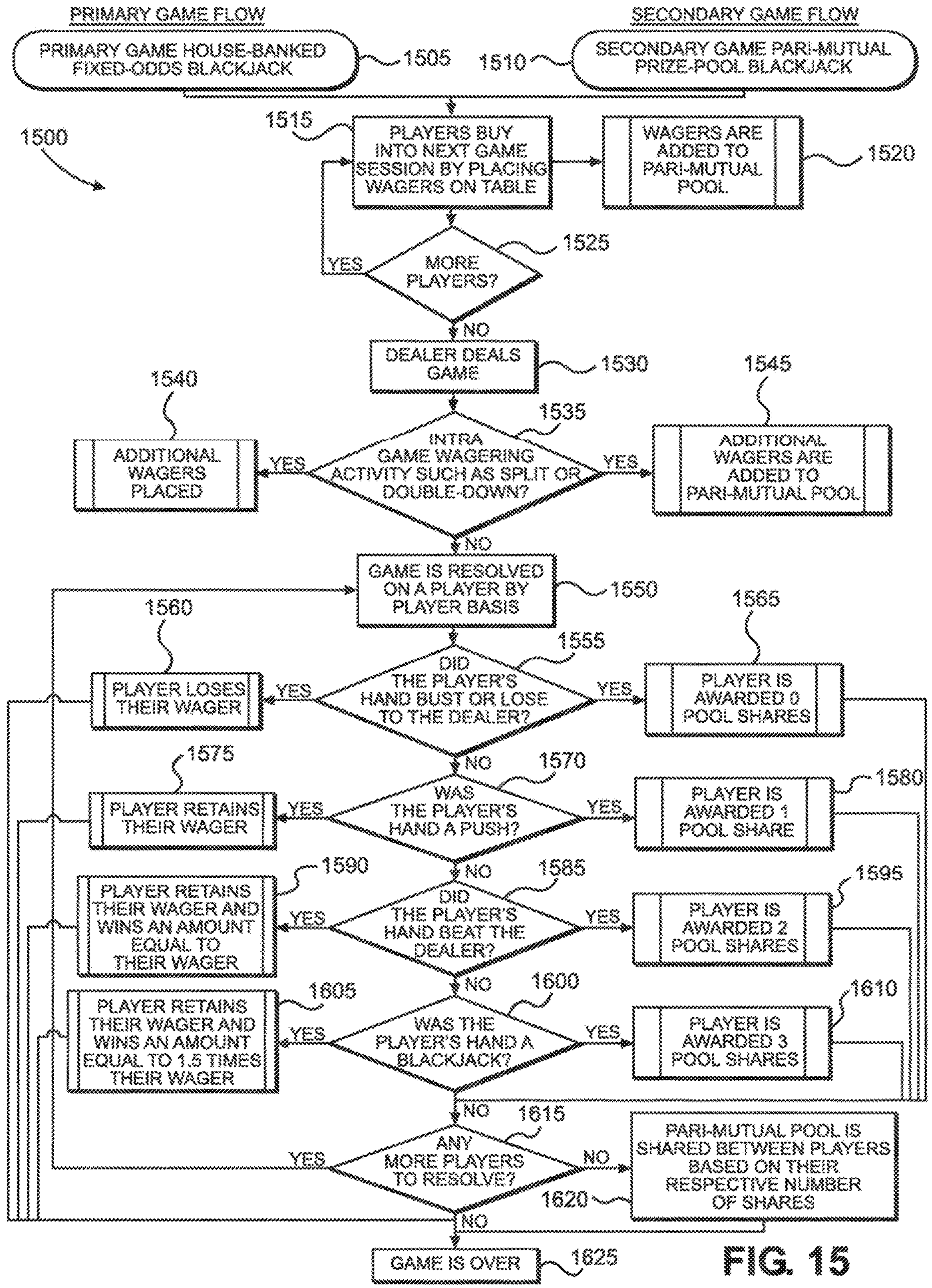
FIG. 15 is a flowchart of exemplary game flows in which the primary game is a traditional fixed-odds, house-banked Blackjack game and the secondary game is a pari-mutuel equivalent.

FIG. 15 is a flowchart representing a method for players participating in a primary traditional blackjack game where they play against the house for fixed odds in a house banked game. A secondary game is a pari-mutuel equivalent where players play against each other for shares of a pari-mutuel prize pool. As shown in flowchart 1500 of FIG. 15, a player elects to start play in either or both of a primary game flow 1505 and a secondary game flow 1510. For either or both, the player buys into the game session by placing wager(s) at step 1515. For pari-mutuel wagers on the secondary game, the wager amount is added to the pari-mutuel pool at step 1520. A waiting loop is then entered during which other players may enter the game at step 1525. As soon as all players have entered, or a time-out occurs, the cards are dealt at step 1530.

Play of the game continues with intra-game wagering activity such as splits and double down actions by the players at step 1535. For any such actions, wagers are placed at step 1540 and wagers are added to the pari-mutuel pool for wagers on the secondary game at step 1545. After completion of wager activity, the game play is completed at step 1550 by remaining cards being dealt and resolving game play for each player. It is determined whether a player busted or otherwise lost to the house at step 1555. If so, the player loses the wager in the primary game 15 as reflected in step 1560, or is awarded 0 shares of the pari-mutuel pool for the secondary game 16 at step 1565. If the player did not bust or lose to the house, it is determined whether the player achieved a push or tie with the house at step 1570. In the case of a tie with the house in the primary game 15, the player retains their wager at step 1575 while in the secondary game, the player is awarded 1 share of the pari-mutuel pool at step 1580.

If the player beats the house at step 1585 in the primary game 15, the player retains the original wager and wins an award that is typically amount equal to the wager at step 1590. If the player beats the house at step 1585 in the secondary game 16, the player is awarded 2 pari-mutuel shares at step 1595. Finally, it is determined whether the player achieved blackjack or 21 at step 1600. If so, the player retains the original wager and wins an amount that is typically equal to 1.5 times their wager for the primary game in step 1605. Or, the player is awarded 3 pool shares of the pari-mutuel pool for a secondary game blackjack or 21 in the secondary game at step 1610. Flowchart 1500 loops back to step 1550 to resolve each player independently at step 1615. Lastly, the amount of each share is determined for the pari-mutuel pool in the secondary game at step 1620 depending on the number of shares awarded during the payout process. The game ends at step 1625.

It should be understood that the player awards described for different wins is intended to be representative only. The actual payout for a win or a blackjack may be set as desired by the game developer or operator.

Figure 16:
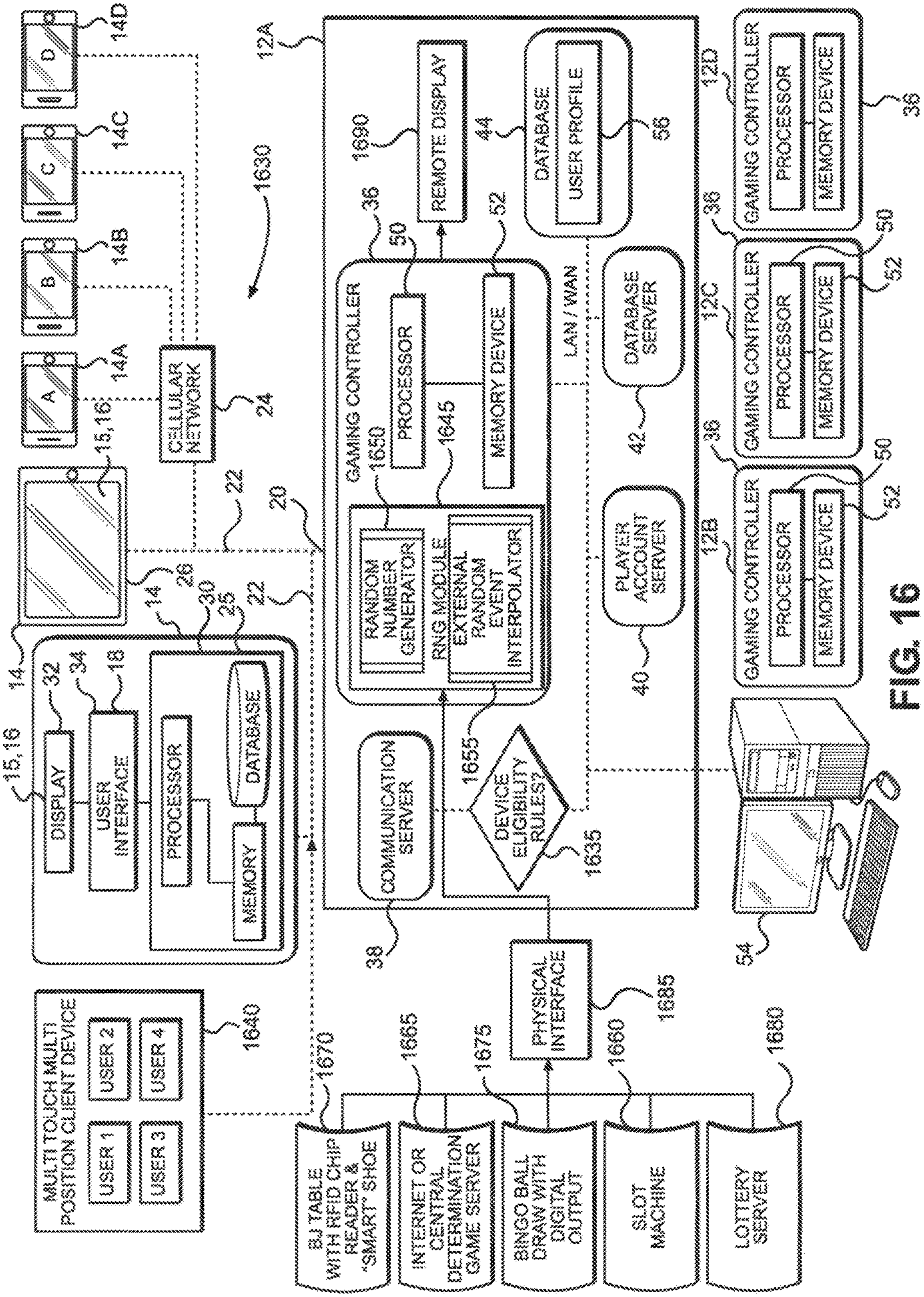
FIG. 16 is a schematic representation of an exemplary system for allowing a plurality of players to play a primary game on a plurality of game servers and a secondary contest via a plurality of user computing devices.

FIG. 16 is a schematic representation of an expanded system 1630 that is similar to system 10 of FIG. 1 with a number of additional components. In this expanded embodiment, system 1630 includes multiple gaming control server's 12A-12D. Each gaming control server 12 has associated device eligibility rules 1635 in communication server 38 such that connectivity of user computing devices 14A-14D with a plurality of corresponding gaming control servers 12A-12D is governed by the corresponding communications server 38 based on a device eligibility rule set 1635. The rule set may, for example, include the user computing device location, game specific player quota criteria and/or other device eligibility criteria. A random number generator module 1645 in gaming control server 12 includes a random number generator (RNG) 1650 and an external random event interpolator 1655. RNG module 1645 outputs random event data to gaming controller 36 that is used by gaming controller 36 to provide game outcomes.

RNG module 1645 operates to produce random numbers using RNG 1650 or by interpolating random events input to external random event interpolator 1655. The external random events are produced and input to external random event interpolator 1655. Production of external random events may come from any number of different alternative sources including, but not limited to a slot machine or other electronic gaming device or machine (EGM) 1660, a networked central determination game server 1665, a blackjack table with RFID chip reader and a smart shoe 1670, a bingo ball draw or other physical randomizer device 1675 with a digital output, a lottery server 1680 or any other method or device configured to provide random or pseudo-random event results as are known in the art. Once the event occurs, it is input in electronic or digital form to a physical interface 1685 where relevant data is converted into a format compatible for interpolation by external random event interpolator 1655. Physical interface 1685 outputs a signal representing the random event to external random event interpolator 1655 of RNG module 1645.

In addition, a multi-touch, multi-position client device 1640 is shown. Multi-touch device 1640 represents a touch screen table or other electronic table or system that is configured to accommodate multiple players participating in primary games 15 and secondary games 16, and playing simultaneously against each other and/or the house. A remote display 1690 is connected to gaming controller 36. Remote display 1690 is used to display secondary contest 16 notifications to the gaming establishment patrons, the players and anyone else present who may or may not be participants in primary or secondary game contest activities.

Exemplary embodiments of a system and method of allowing a player to play and place wagers are described herein. It should be understood that there are a multitude of different combinations of wagering opportunities related to primary and secondary games. For example, the game play as depicted in flowchart 1500 of FIG. 15 allows a player to choose: (a) wagering in a primary game; (b) wagering in a secondary game; or (c) wagering in both a primary game and a secondary game at the same time. The primary and secondary games are described as blackjack games, but they may instead be poker games, bingo games, slot games or other game types.

In each different embodiment, a second game is offered in which the outcome is determined by the outcome data of a first game. The system and method are not limited to the specific embodiments described herein, but rather, components of the system and/or steps of the method may be utilized independently and separately from other components and/or steps described herein. For example, the system may also be used in combination with other wagering systems and methods, and is not limited to practice with only the system as described herein. Rather, an exemplary embodiment can be implemented and utilized in connection with many other wagering applications.

System and Method for Providing Complex Payouts

First Secondary Aspect of the Present Invention

Figure 17:
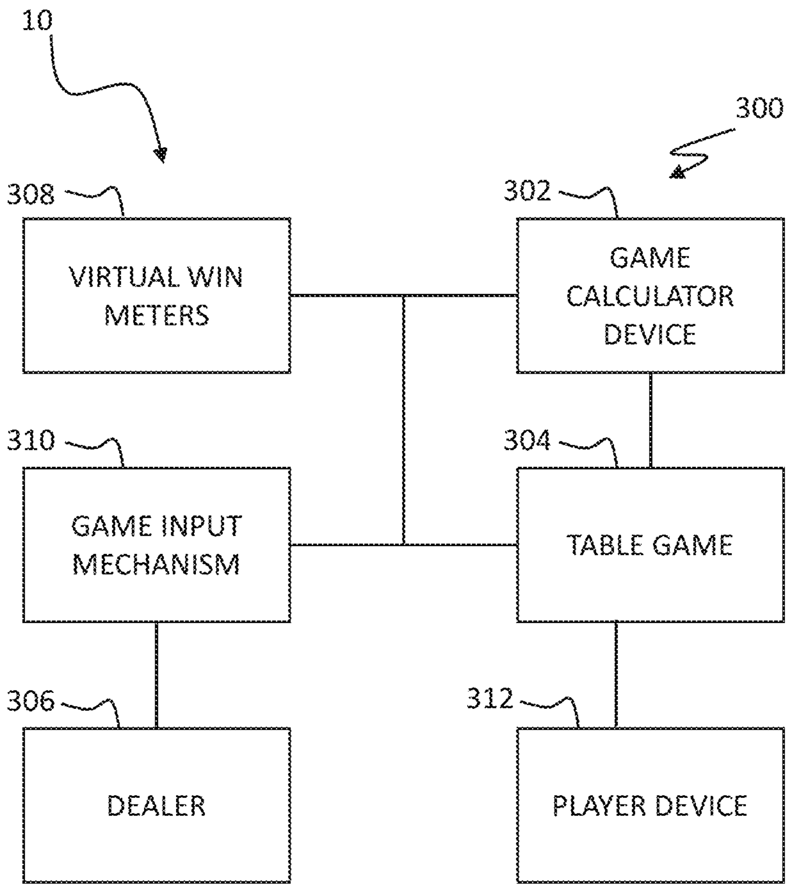
FIGS. 17, 17A, and 17B are block diagrams of a system for providing a dealer device and a player device for use with a table game, according to a first secondary aspect of the present invention.

With reference FIG. 17, in a first secondary aspect of the present invention, the system 10 may provide a dealer device 300 and a player device 312 for use with a gaming device, such as table game 304. In the illustrated embodiment, the dealer device 300 includes a game calculator device 302, one or more virtual win meters 308 and a game input mechanism 310.

The first secondary aspect provides systems and methods for providing a game calculator with associated electronic components and cumulative virtual "Win Meters" to manually dealt "Felt" table games to minimize dealer error, cut down on "chip" movement and provide definitive game results and rating information to game accounting and player tracking systems while allowing for more complex game variations and dealer calculations. The game calculator device 302 may be configured to facilitate game play and may be particularly applicable to facilitate wagering game play on physical tables, without limitation, on which live dealers 306 deal games using real cards, dice or wheels such as Blackjack, Baccarat, Craps or Roulette. The dealer device 300 and the player device 312 provide new wagering opportunities or ways to make games more appealing or efficient are always of interest to players and operators alike. The dealer device 300 may be, at least partially, embodied within the server system 20, as discussed above, or may be embodied in a separate device located within or near the table game 304. The dealer device 300, as discussed, in more detail below, calculates virtual win meters 308, for each player. The virtual win meters 308 are stored in individual player accounts.

Figure 17A:
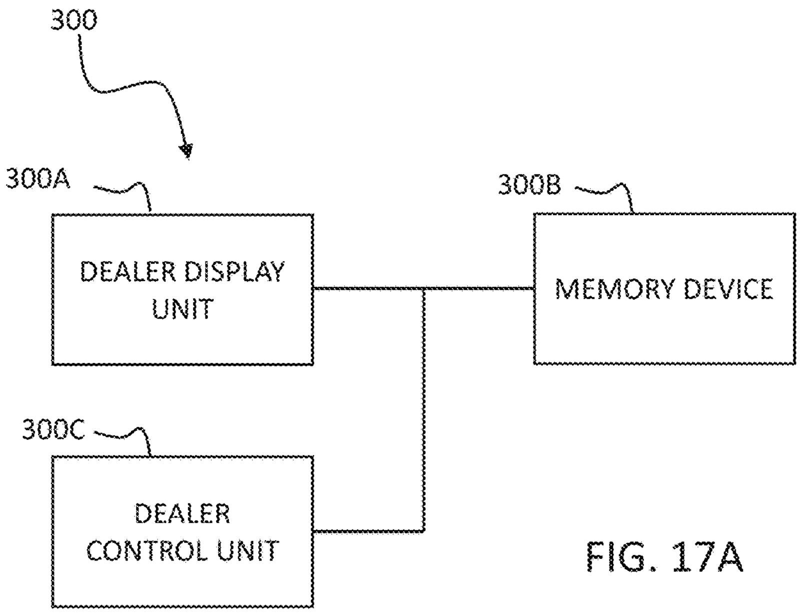
Figure 17B:
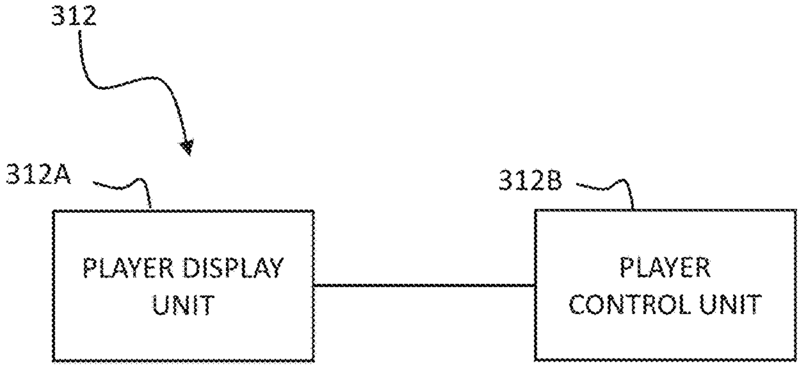

With reference to FIG. 17A, in one embodiment the dealer device 300 may include dealer display unit 300A, a memory device 300B and a dealer control unit 300C. The dealer device may be embodied in a computer or tablet computer located at the table game 304. The dealer control unit 300C may include a processor for executing all or some of the algorithms or steps described below. Alternatively, some of the steps or portions of the algorithms may be performed on processors located on the server system 20. With reference to FIG. 17B, the player device 312 may include player display unit 312A and a player control unit 312B. The player control unit 312 may include a processor for executing all or some of the algorithms or steps described below. Alternatively, the player control unit 312B may be implemented, at least in part, by the processor of the dealer control unit 300C and/or the server system 20.

In one embodiment, the players may place wagers with real or physical chips, but any wins are accrued in, or by, the virtual win meters 308. The virtual win meters 308 may be displayed on or near the table game 304 but may also be displayed on a central remote display that is positioned or located away from the table game 304. In another embodiment, all wagers are made using virtual currency.

In general, the system 10 allows the player to make a variety and/or combination of wagers that would not be permissible under convention systems. For example, on conventional tables using physical or even virtual chips, pay tables and the resultant pay outs or awards are limited to amounts that are payable in a combination of chips. In conventional systems that allow wagers and awards to be made in currency or credits. for example, in some systems, wagers and payouts are made in US dollars, pay tables and the resultant payouts or awards are limited to amounts that are payable in multiples of the lowest unit, e.g., cents.

The system 10 of the present invention allows wagers or bets (or combinations of wagers or bets) to made which result in payouts or awards in fractional amounts of the lowest financial unit being used, e.g., chip, cent or credit.

The game input mechanism 310 is configured to establish wager and other game-related activities or data and to send the established date to the game calculator device 302. The game input mechanism 310 may include any mechanism suitable for establishing such data, including, but not limited to: (1) chip read or identification devices or systems, (2) electronic wagering systems, and/or (3) dealer input systems (see below).

As discussed more fully below, in some embodiment, the game input mechanism 310 may include a touchscreen device in which the dealer enters player wager information, purchase of chips by each player, and other game related information.

In the field of manually dealt table games there have for a long time been initiatives to minimize or end the use of chips in much the same way that coin was over time removed from slot machines. Removing chips from tables would offer operators a number of benefits ranging from the actual cost of chips through the personnel and resources required to control, move, monitor, and reconcile such items. Since manually dealt table games are prone to dealer mistakes, fraud or even dealer/player collusion, removing chips and migrating instead to some form of electronic currency usually offers operators some form of secondary benefit related to being able to automate calculations and payouts and track and log player/dealer win/loss activity.

Often there are opportunities to create secondary wagering opportunities in the form of side bets or variable game odds that would appeal to players but are too hard to implement in the manual table arena as more complex win calculations are just too hard for dealers to deal with. For this reason, there are often electronic devices and computing systems associated with such game variants that are used to track related wagers and at times credit meters or displays located at each player seat to replace the use of traditional chips.

Often new game variants are deemed prohibitively complex to deploy on live dealer dealt tables because they necessitate the payout of fractional "Chips" or currency.

In some instances, efforts have been made to install electronic meters or displays and even "Ticket in/Ticket out" printers at each table seat. Often such measures are also not embraced because they exclude "Back Betting" and limit the number of players that can actively participate in wagering activity at a table and involve costly modifications to existing tables.

In some gaming jurisdictions particular types of wagering games are not permitted. In some of these instances, games that are "non-Banked" and in which players play against each other and in which the "House" does not have an opportunity to win are permitted and so creating contests where players share in pari-mutuel prize pools and the house merely takes a rake or charges a facilitation fee are a way to offer legitimate play of such wagering games that would otherwise be prohibited. Often the calculations associated with dividing up pari-mutuel pools are too complex for dealers and so such games are often not available.

In most instances, efforts to entirely remove chips from manually dealt tables have floundered because of the cost associated with implementing electronic alternatives as well as the reluctance of players to give up the tactile satisfaction of handling chips while gambling, instead there has been a trend toward electronic table games with virtualized dealers, cards and chips to facilitate the introduction of new game variants and wager types while for the most part, manually dealt traditional table games remain unchanged.

For the reasons described above and a number of others, a need exists to create a simple mechanism to facilitate complex dealer calculations and to virtualize complex chip or currency awards related to new more complex game variants, while not adding excessively expensive electronics and processes to manual tables or removing the traditional chips that players are accustomed to handle and use during table gameplay.

In the first secondary aspect of the invention, the system 10 is generally directed to systems and methods for adding a virtual win metering and game calculator system to manually deal table games to facilitate new or complex calculations required when game rules are modified to make games more interesting or to add new features to traditionally house banked table games without adding cost prohibitive electronics or removing physical chips completely from the table. Some embodiments of the invention are directed to methods and systems for facilitating pari-mutuel style prize pools on games while others are directed at new wagering options associated with placing side bets, linking play from multiple tables, paying progressive awards or playing games that have complex payouts.

Some embodiments of the invention are directed towards centrally, on a table by table basis, maintaining an aggregated record of credits/chips/currency won in relation to a nontraditional aspect of a game on a player by player basis and displaying the moving balance for each player in the form of a Virtual "Win Meter" 308 on a single, conveniently located, easily visible display in the form of a located at each table 304.

Some embodiments of the invention allow a dealer to dynamically create additional "Virtual Win' meters 308, utilizing the game input mechanism 310, as needed when players are "Back Betting" or when there are not enough seats at a table to accommodate every player.

In one embodiment of the present invention, the game calculator device 302 is configured to round awards down to the closest whole "chip" or currency and a meter 308 is maintained to track the cumulative total of funds associated with rounding down so that they can be awarded to players or dealers based on some prescribed set of criteria. The game calculator 302 and the virtual win meters 308 may be applied to a variety of suitable table games, including, but not limited to manual Blackjack tables, manual Baccarat tables, manual Roulette tables, and other non-specific forms of live dealer dealt table games.

In some of the embodiments mentioned players are able to place bets using traditional chips but awards are calculated electronically and credited to each player's virtual "Win Meter" 308. Players have to request chips from the dealer when they are running low or need to leave the table, at which point the dealer is responsible for "decrementing or zeroing" the relevant virtual "Win Meter" 308, using the game input mechanism 310, associated with the player and paying the player chips or cash.

In some of the embodiments of the invention chips have been removed from tables completely and bets are placed by players using some form of digital currency managed by portable computing devices or cell phones.

In some embodiments of the invention the dealer is responsible for manually entering the details of each game played into a computing device, i.e., the game input mechanism 310, using a user interface. In other embodiment, the game details are tracked using electronic methods such as video cameras, "smart" shoes that track which cards are dealt, sensors in tables that detect where cards are dealt or chips are placed or in some instances combinations of all or some of the above mentioned scenarios.

With reference to FIGS. 17-21, a graphic representation of an exemplary system in which a traditional Felt Blackjack table 312 has been configured to support both traditional wagers and wagers placed in a pari-mutuel pool. Wagers are placed using conventional chips. The game input mechanism 310 includes a touch screen terminal 314. The dealer 306 utilizes the touch screen terminal 314 to input wagers and aspects of gameplay related to the pari-mutuel pool. The virtual win meters 308 are displayed on a customer display 316 located on or near the table 312 that is configured to show amongst other things a cumulative "Win Meter" for every seat at the table. Players are able to place wagers related to pari-mutuel gameplay as well as separately placing wagers in a concurrent fixed odds version of the game.

Figure 19:
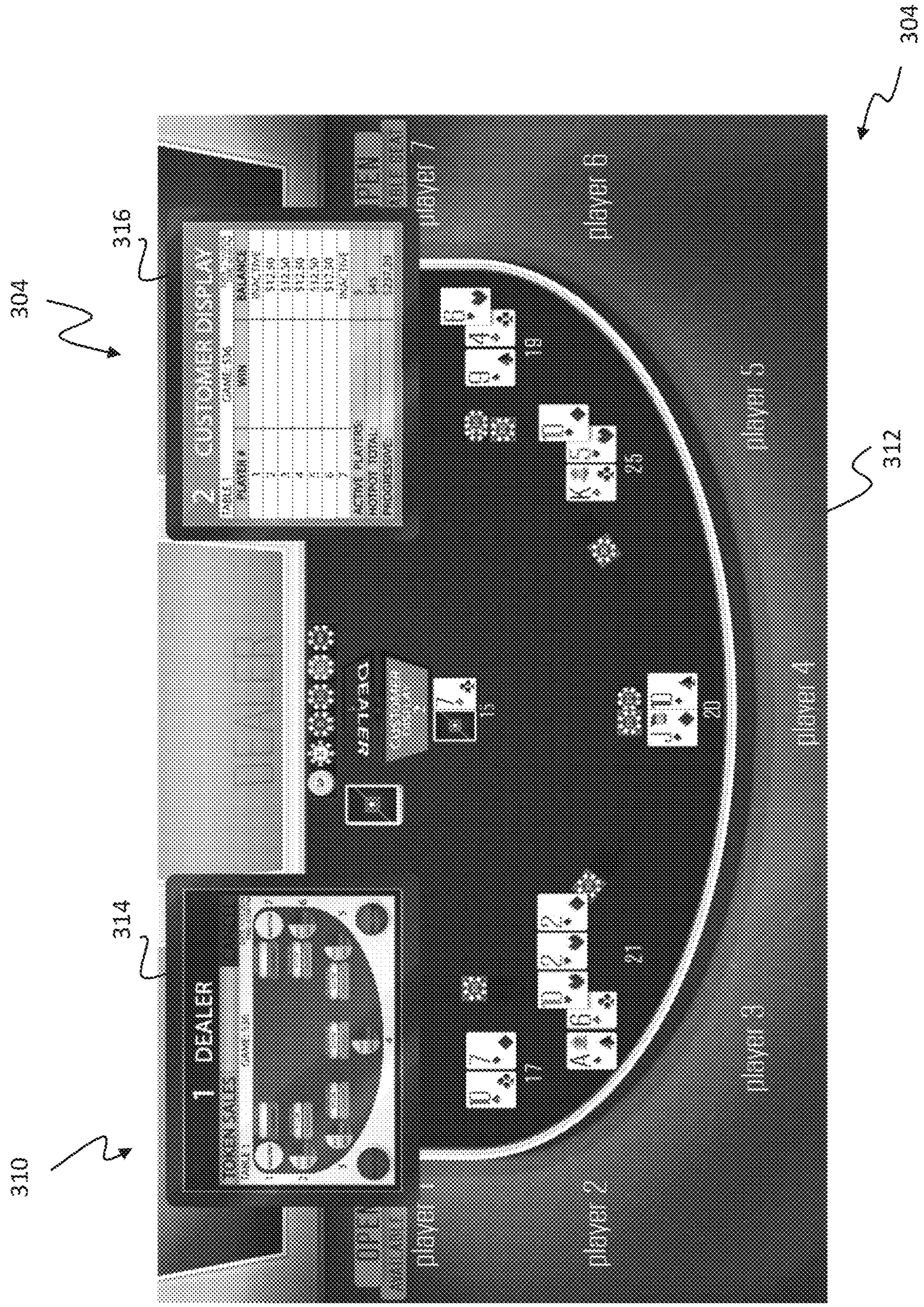
Figure 20:
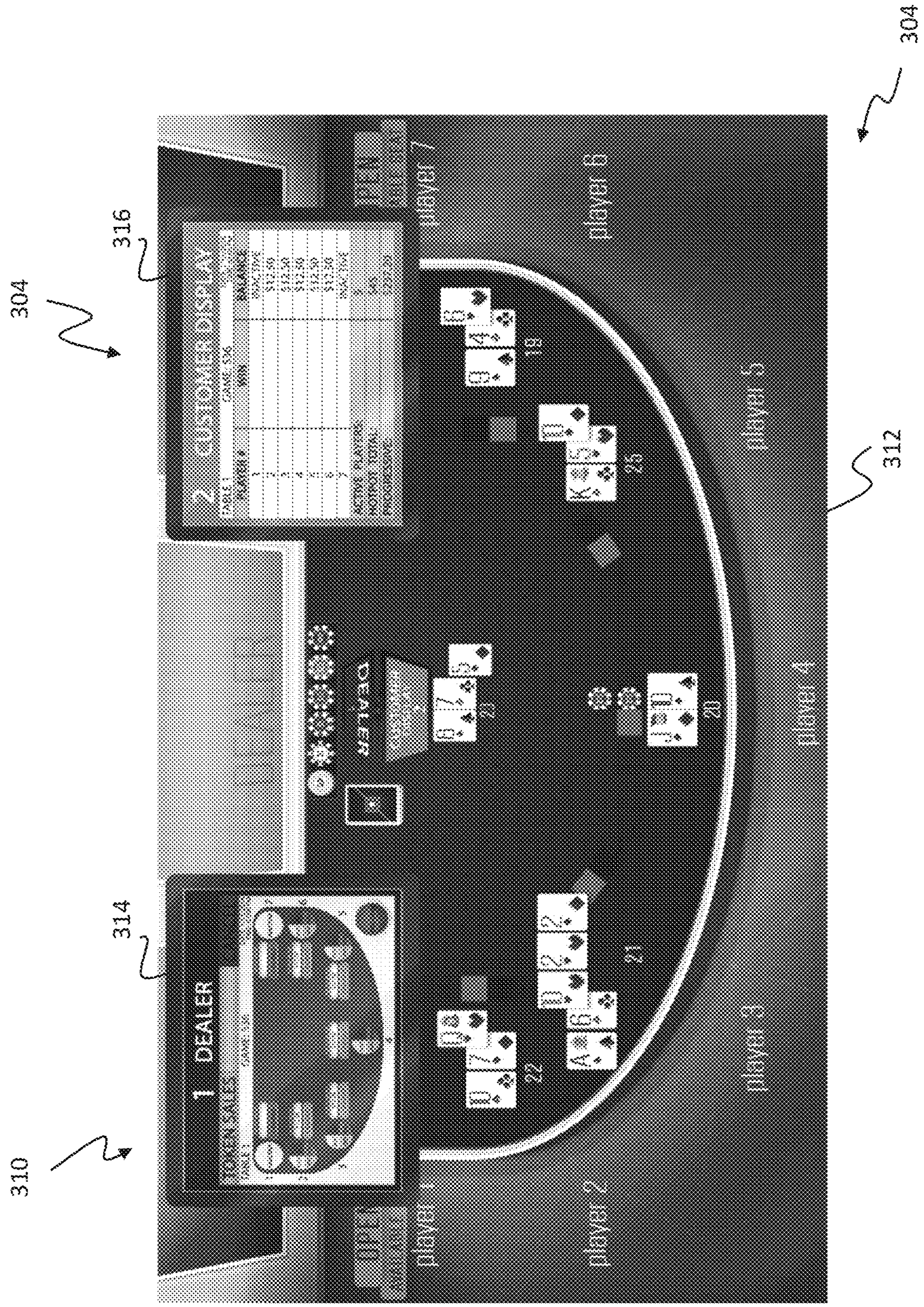

With specific reference to FIG. 19, the touch screen terminal 314 provides the dealer the option of inputting further aspects of pari-mutuel gameplay such as players "Splitting" via the touchscreen terminal. With specific reference to FIG. 20, players that placed wagers in the fixed odds game either lose their chips or are paid out by the dealer in chips as need be. Pari-mutuel wagers are cleared from the table. The dealer 306 is required to enter final game outcomes such as win, lose or Blackjack on a player by player basis using the touchscreen terminal 314 of the game input mechanism 310.

Figure 21:
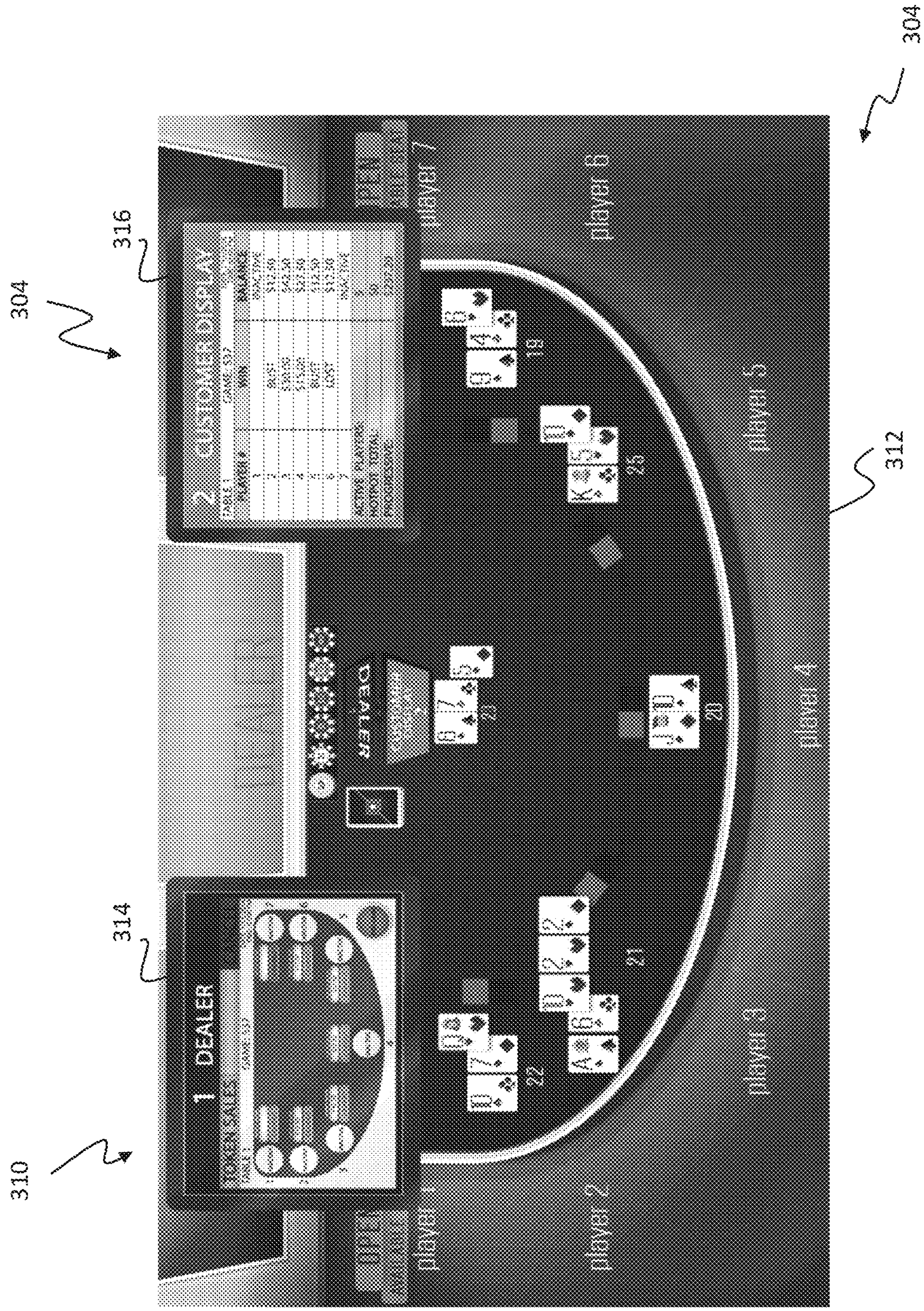

With specific reference to FIG. 21, the dealer 306 has updated and concluded gameplay by pressing the "End Game" button on the touchscreen terminal 314 and player win balances have been updated on the customer display 316 based on the outcome of the pari-mutuel game. The image shows cash-out buttons on the dealer terminal that would be activated in the event that a player elected to collect their winnings.

Returning to FIGS. 17, 17A and 17B, in one embodiment of the present invention, the system 10 includes a dealer device 300 and at least one player device 312. The dealer device 300 includes a dealer display device 300A, a memory device 300B and a dealer control unit 300C. The player device 312 includes a player display unit 312A and a player control unit 312B. The dealer device 312 is located at a gaming device 304, such as a table game 304. The gaming device 312 is configured to provide a game to a plurality of players. The dealer display unit 300A is configured to display a dealer screen including computer generated graphics. The memory device 300B is configured to store a data structure and a dealer execution program. The data structure stores a plurality of player accounts. The dealer control unit 300C is coupled to the dealer display unit 300A and the memory device 300B and executes the dealer execution program for allowing the dealer 306 to manage the player accounts. The dealer control unit 300C includes a processor programmed to display a dealer display structure on the dealer display unit 300A. The dealer display structure forms at least part of a dealer graphical user interface. The processor of the dealer control unit 300 is further programmed to allow a dealer to enter funds, received from one of the players, to a respective one of the plurality of player accounts.

The funds are stored in a financial unit utilized by the system. The financial unit has a base financial unit. As discussed above, the system 10 may use chips (real or virtual); currency or credits. In systems that use chips, multiple chips have different values (generally currency values). The base financial unit for systems using chips, currency or credits, would be the lowest denomination available, e.g., the lowest value chip, a cent ($0.01), or 1 credit. As discussed above, the system 10 generally allows for wagers or combination of wagers in for which payouts or awards to be made in fractions of the base financial unit.

The processor of the dealer control unit 300 is further programmed to allow the dealer to finalize wagers made on an instance of the game after one or more players have entered a wager, to allow the dealer to enter an outcome of the instance of the game played on the gaming device, to calculate a change in the player account of each player who made a wager on the instance of the game and to effectuate the respective change in each player account. The change in at least one of the player accounts is a fractional amount of the base financial unit. The at least one player device 312 may be located at the gaming device 304. Each player device 312 includes a player display unit 312A and a player control unit 312B. The player display unit 312A is configured to display a player screen including computer generated graphics. The player control unit 312B is coupled to the player display unit 312A and is programmed to allow each respective player to enter a wager on the instance of the game, to display the outcome of the instance of the game and to display wager and player account data to the player.

In one embodiment, the dealer device 300 may be a computer or tablet device. The player device 312 may be a computer or tablet device. Alternatively, the player display unit 312A may be coupled to the dealer display device. The player control unit 312A may be implemented, at least in part, by the processor of the dealer control unit 300C.

Once wagers are made and finalized, the game may be played in a conventional manner. For example, if the game is blackjack, the dealer starts an instance of the blackjack game by dealing a blackjack hand to each player and then a dealer hand. The instance of the blackjack hand is played out and once the outcome of the game for each player has been determined or established, the dealer enters the outcome of the instance of the blackjack game using the game input mechanism 310. In one embodiment, the processor of the dealer control unit 300C is programmed to allow the dealer to enter the outcome of the instance of the game by presenting to the dealer a menu of possible outcomes and allowing the dealer to select one of the possible outcomes.

In one embodiment, the dealer device 300 may receive an indication of the outcome from an outcome sensor and the processor is programmed to allow the dealer to enter the outcome of the instance of the game by presenting to the dealer the outcome received from the outcome sensor and allowing the dealer to accept the presented outcome. For example, as discussed above, the system 10 may utilize one or more card sensors, such as RFID readers, barcode scanners or cameras, to read and track the cards dealt to each player and the dealer. The processor receives the output of such sensors and establishes the outcome as a function thereof. In one embodiment, the system 10 may utilize a smart shoe coupled to the dealer device 300 from which the dealer distributes cards to the players during the instance of the game. The processor of the dealer device 300 may be programmed to receive data from the smart shoe related to the cards distributed to the players and to populate the outcome for each player as a function of the cards distributed to the players.

In one embodiment, the game has an associated pay table based on fixed odds, e.g., blackjack. The processor in calculating a change in the player account of each player is programmed to award the player an award as a function on the pay table in response to a winning outcome.

In some embodiments, the player control unit 312B is programmed to allow each player to enter a side bet on a side game. The side game may be related or unrelated to the main game. The processor of the dealer control unit 300C is programmed to allow the dealer to accept the side bet and to enter an outcome of the side bet game. The processor of the dealer control unit 300C, in calculating a change in the player account of each player, is programmed to allow the dealer to enter a side bet award to the player.

In one embodiment, the dealer device 300 may send a signal to an external security system (not shown), if the change in the player account exceeds a predetermined threshold. For example, the external security system may include one or more security cameras. The external security system automatically capture or record video in response to receiving the signal and/or may alert a user of the security of the system.

In one embodiment, the dealer may receive funds directly from the players, e.g., cash or physical chips. The dealer may enter the received funds using the dealer graphical user interface. The dealer control unit 300C converts the funds into the financial units of the system 10 (if needed) and adds the funds to the respective player account.

In one embodiment the player control unit 312B of each player device is implemented, at least in part, by the processor of the dealer control unit 300A. In another embodiment, each player control unit 312B includes a player device processor.

In another embodiment, the game is a pari-mutuel game, wherein each play plays against each other in the game. The processor may be further programmed to aggregate the wagers made by the players into a pot and subtract a rake from the pot. In a pari-mutuel game, the outcome entered by the dealer for each player is selected from a set of possible outcomes. The set of possible outcomes includes a loss outcome and a win outcome, wherein the processor awards each player with the win outcome a portion of the pot.

In another embodiment, each player plays against the dealer in an instance of the game. The at least one player device is programmed to allow the respective player to enter a first wager and a second wager. The first wager may have an associated first pay table and the second wager has a second pay table, wherein the first and second pay tables are different.

In one embodiment, any payout based on the second wager is paid to a dealer account, i.e., the payout may be treated as a tip to the dealer.

Each player may otherwise tip the dealer, at any time or at cashout.

The players may cashout upon request input at the player device 312. Upon receiving such a request, the processor of the dealer control unit 300C converts the funds in the player account to currency. Any remaining, i.e., fractional amounts, may be transferred to a separate virtual meter, which may be, for example, a dealer tip meter or a progressive jackpot meter.

Figure 17C:
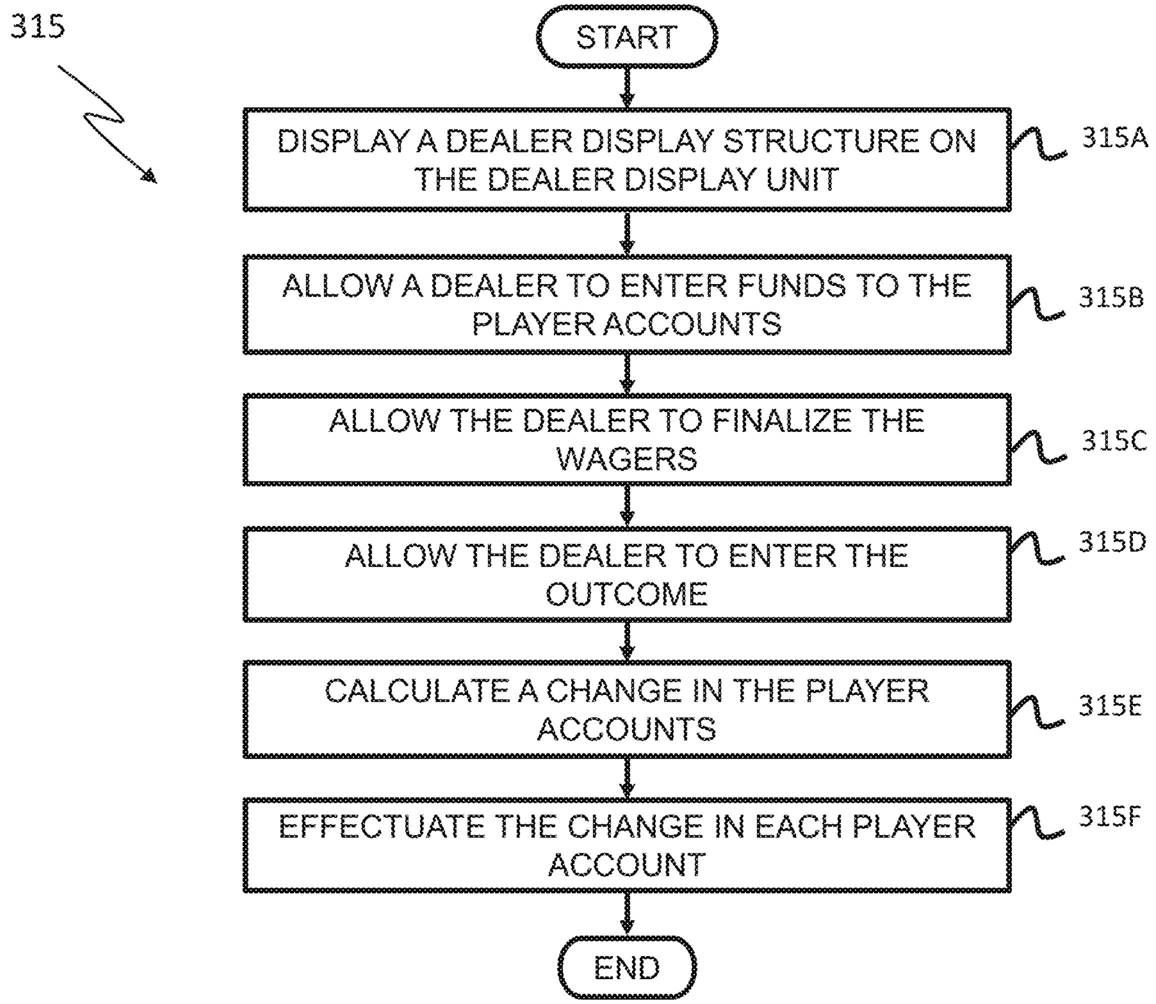
FIGS. 17C and 17D are flow diagrams of a method for operating a dealer device and a player device for use with a table game, according to a first secondary aspect of the present invention.
Figure 17D:
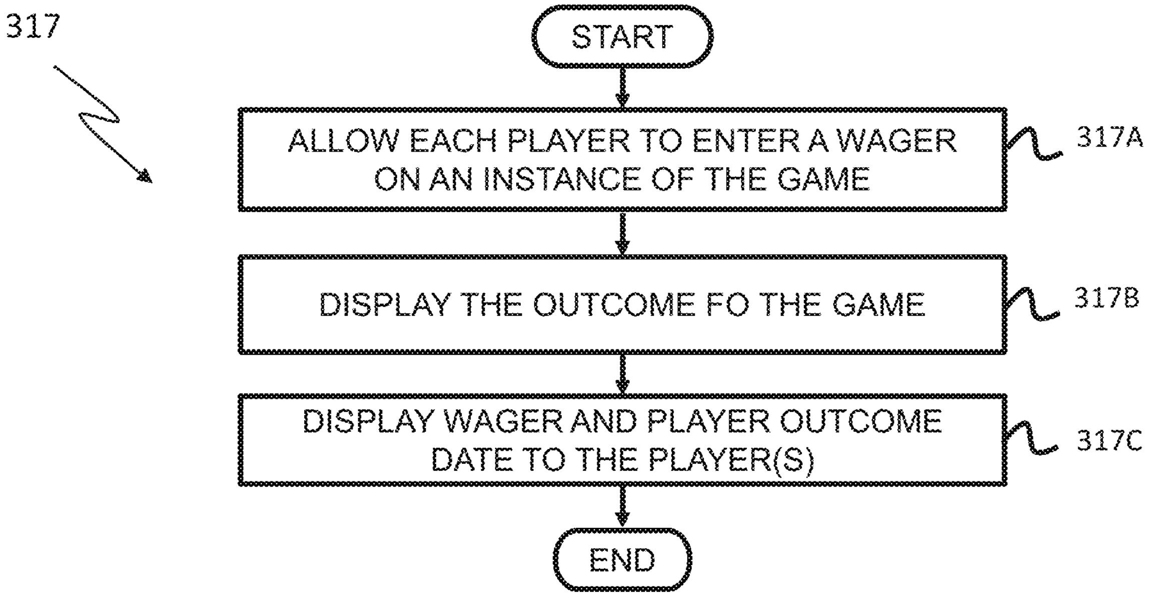
Figure 18:
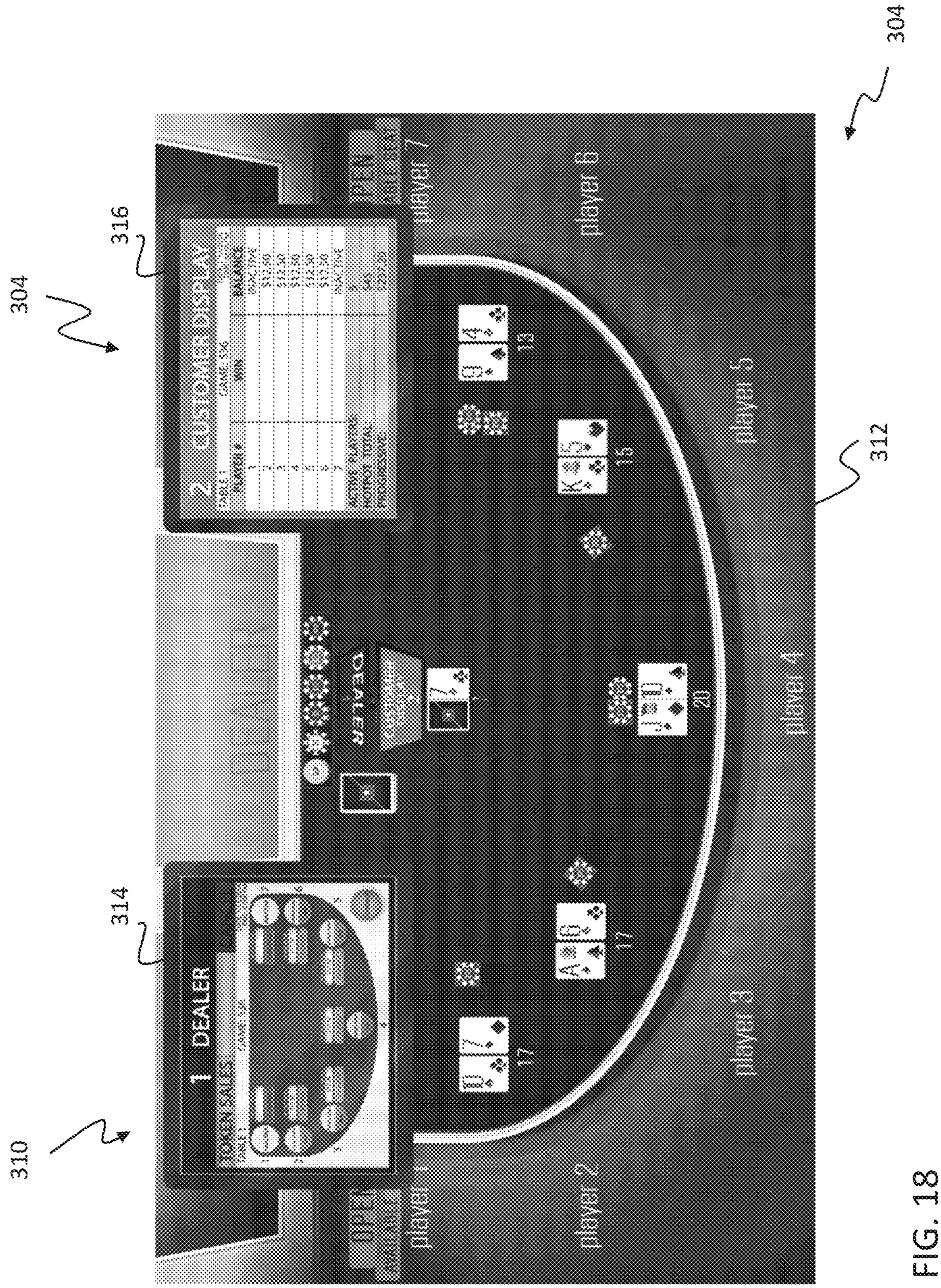
FIGS. 18-21 are graphic representations of a table game, virtual win meters, and a game input mechanism according to an embodiment of the first secondary aspect of the present invention.

With reference to FIGS. 17C and 17D, in another aspect of the present invention, a control method 315, 317 for operating a system 10 is provided. The system 10 may include a dealer device 300 and at least one player device 312 (see above). The operation of the dealer device 300 according to a method 314 in one embodiment is shown in FIG. 17C. The method 315 includes a first step 315A display a dealer display structure on the dealer display unit 300A. The dealer display structure includes computer graphics and may be part of a graphical user interface (see below). In a second step 315B, the method 315 allows the dealer to enter funds, received from one of the players. The funds are added to the respective one of the plurality of player accounts. As discussed above, the funds are stored in a financial unit utilized by the system 10. The financial unit has a base financial unit. In a third step 315C, the method 315 allows the dealer to finalize wagers made on an instance of the game after one or more players have entered a wager. In a fourth step 315D, the dealer is allowed to enter an outcome of the instance of the game played on the gaming device 304. A change the player account of each player who made a wager on the instance of the game is calculated in a fifth step 315E. The change is made or effectuated in a sixth step 315F.

With reference to FIG. 17D, a method 317 performed by the player device 312 according to one embodiment is shown. In a first step 317A, a player screen including computer generated graphics is displayed on the player display unit 312A. In a second step 317B, each respective player is allowed to enter a wager on the instance of the game. The outcome of the instance of the game is displayed in a third step 317C. In a fourth step 317D, wager and player account data is displayed to the player. Exemplary screenshots from the player device and the dealer device are shown in the embodiments discussed below.

Figure 40A:
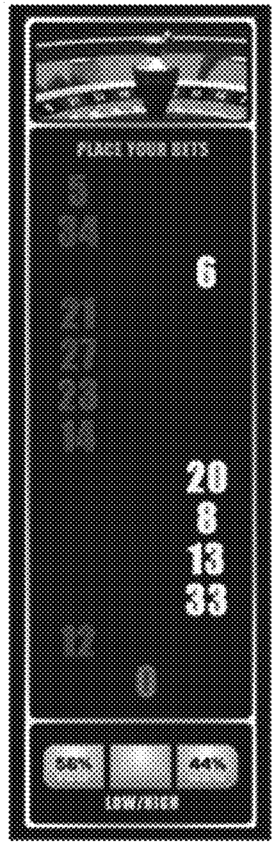
FIGS. 40A-40Z, 40A-A and 40A-B are exemplary screen shots from a first system for providing a dealer device and a player device for use with a table game, according to a first secondary aspect of the present invention.
Figure 40C:
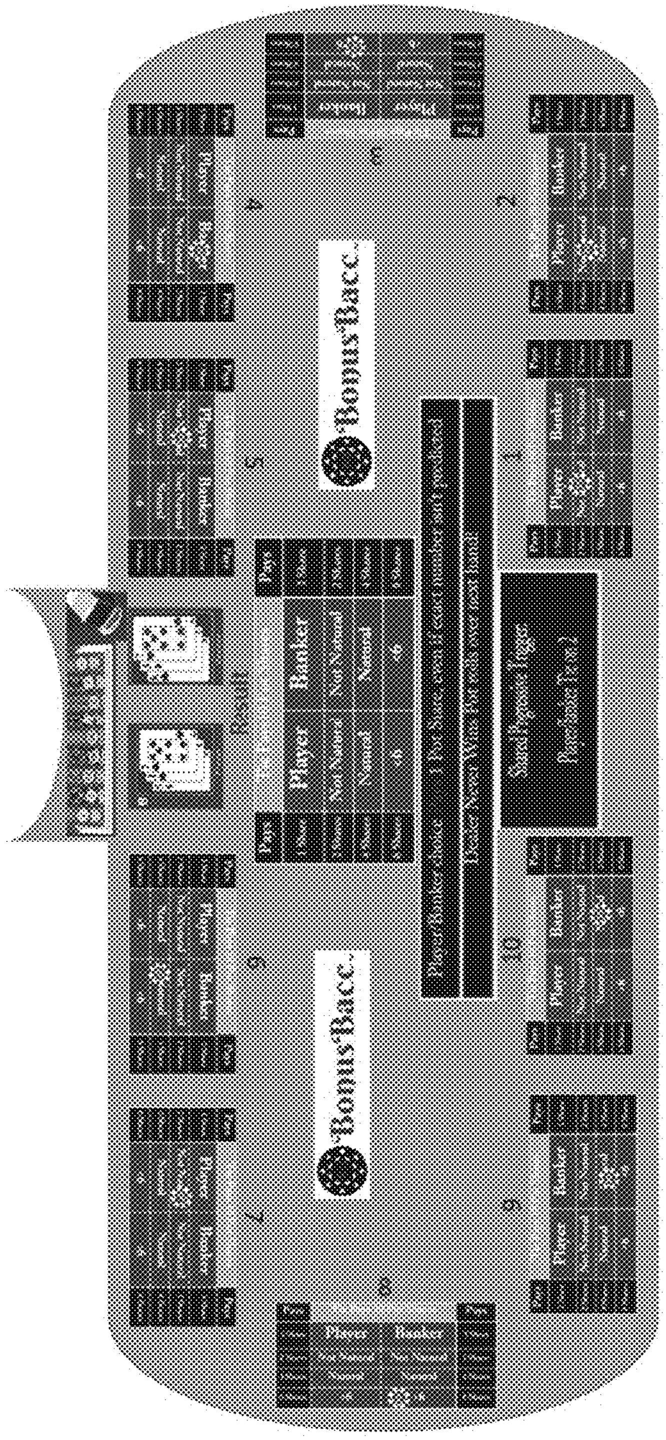
Figure 40D:
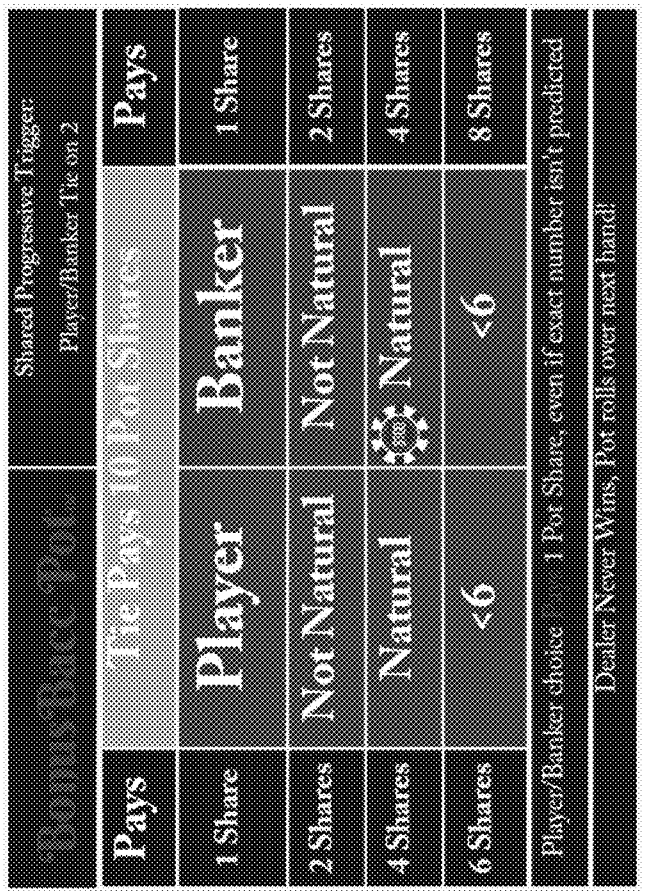
Figure 40E:
Figure 40F:
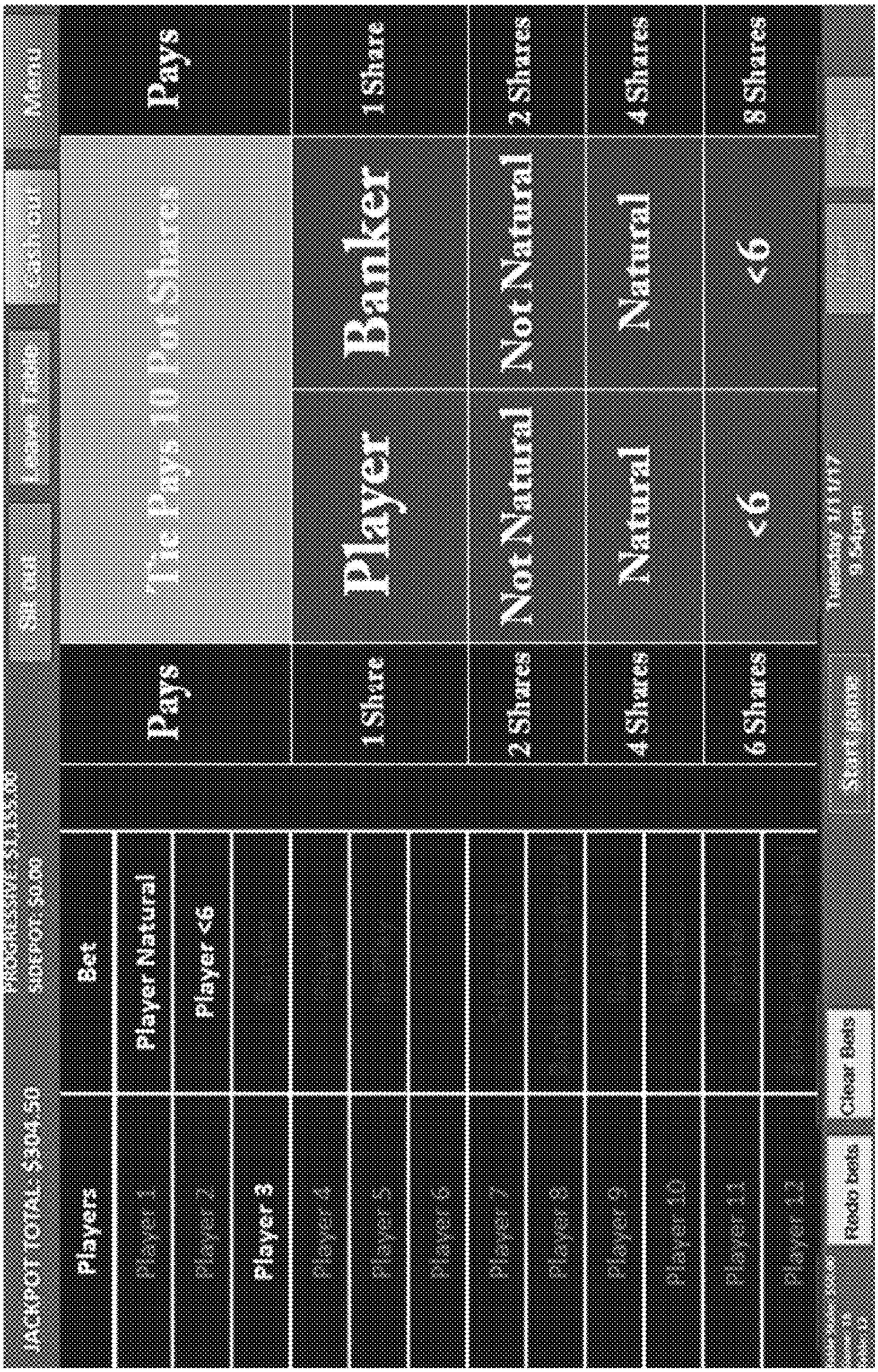
Figure 40G:
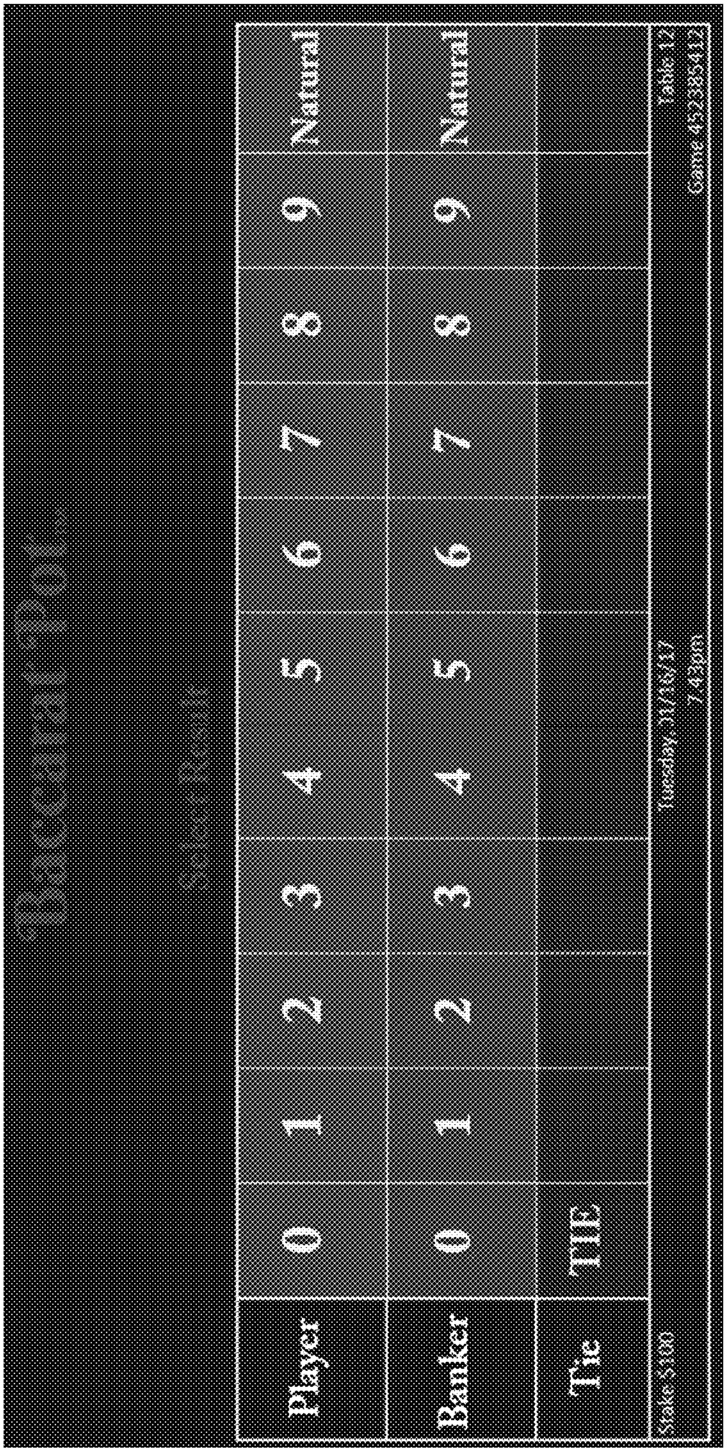
Figure 40H:
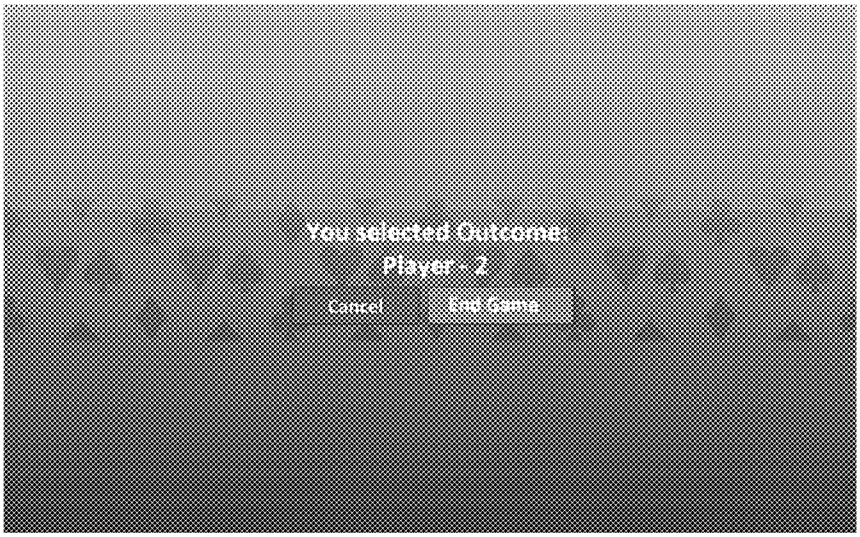
Figure 40I:
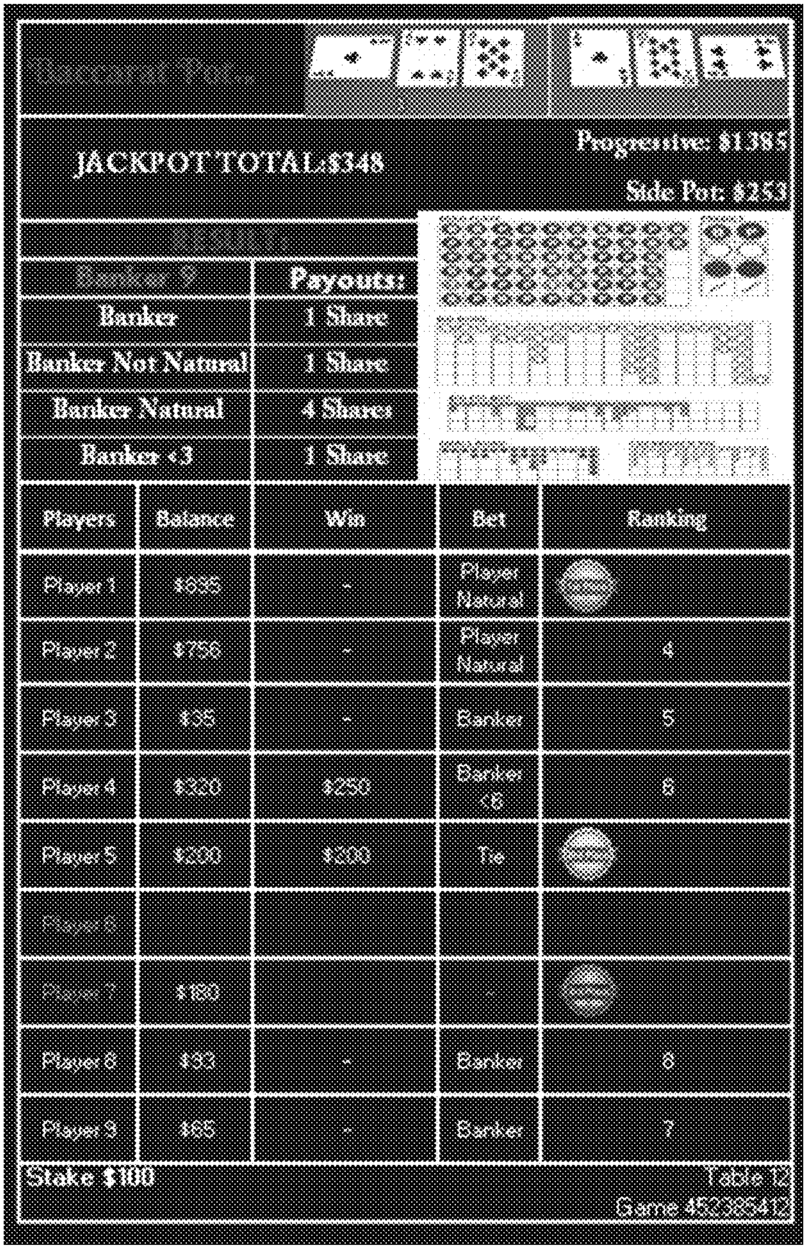
Figure 40J:
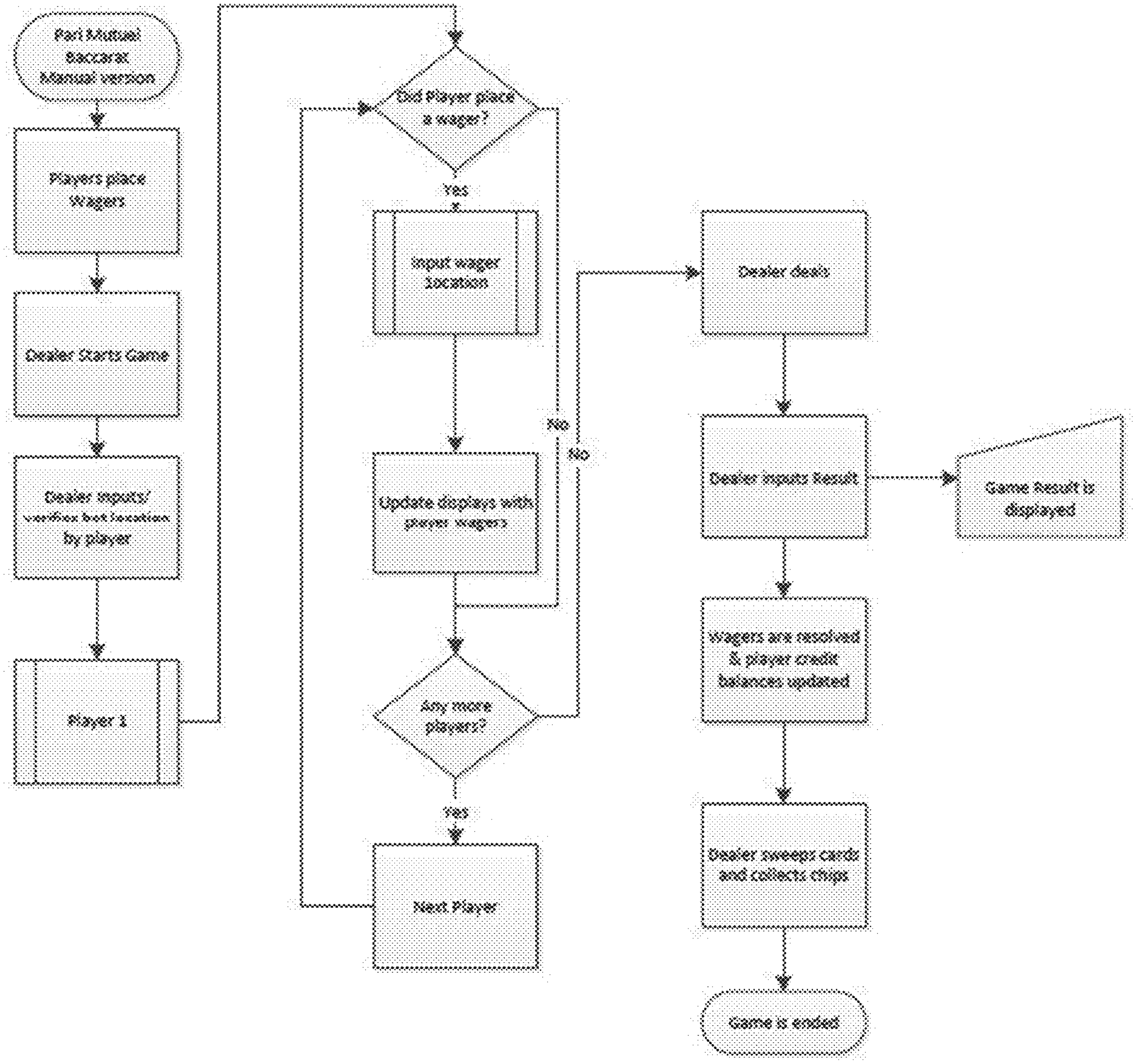
Figure 40K:
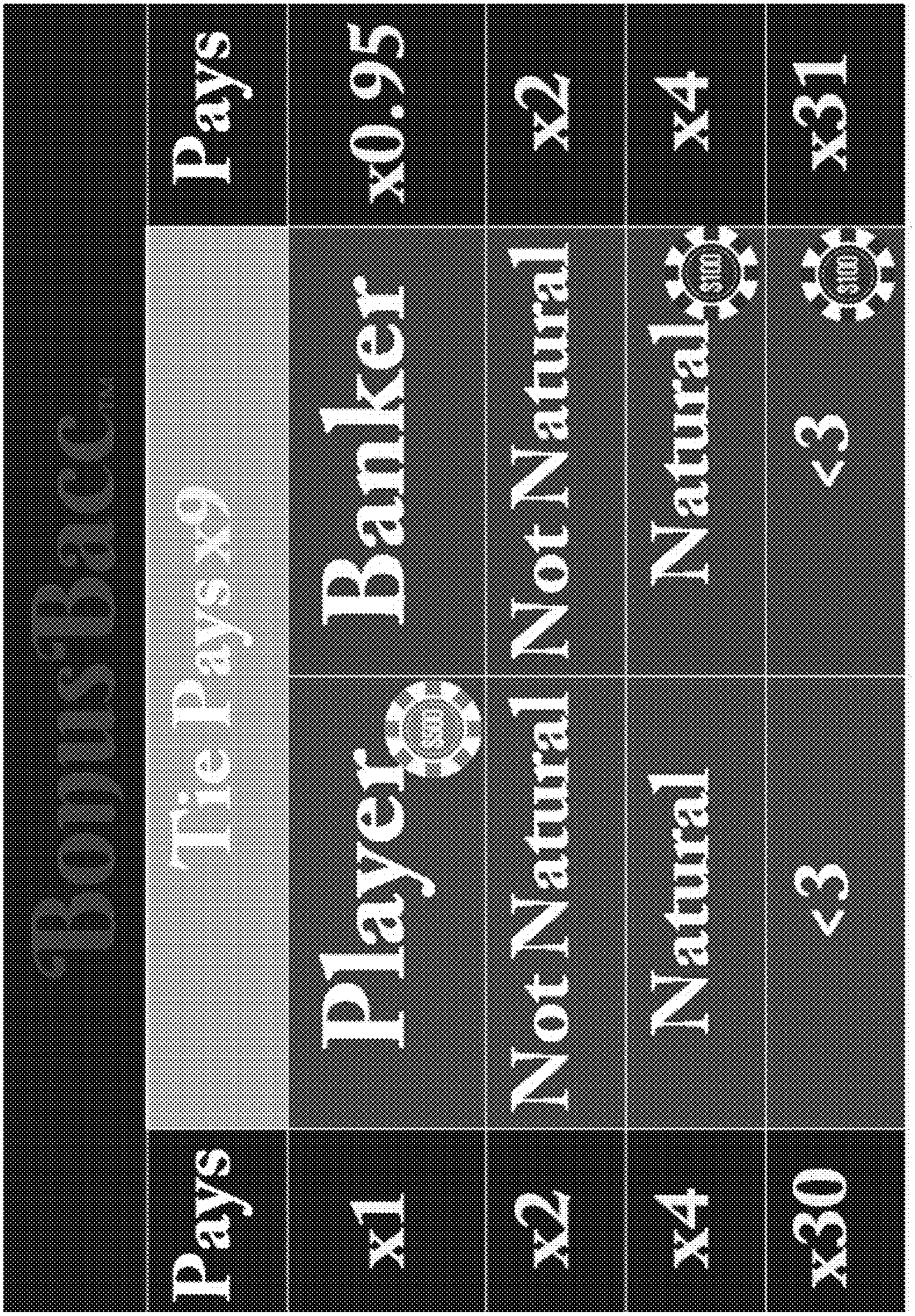
Figure 40L:
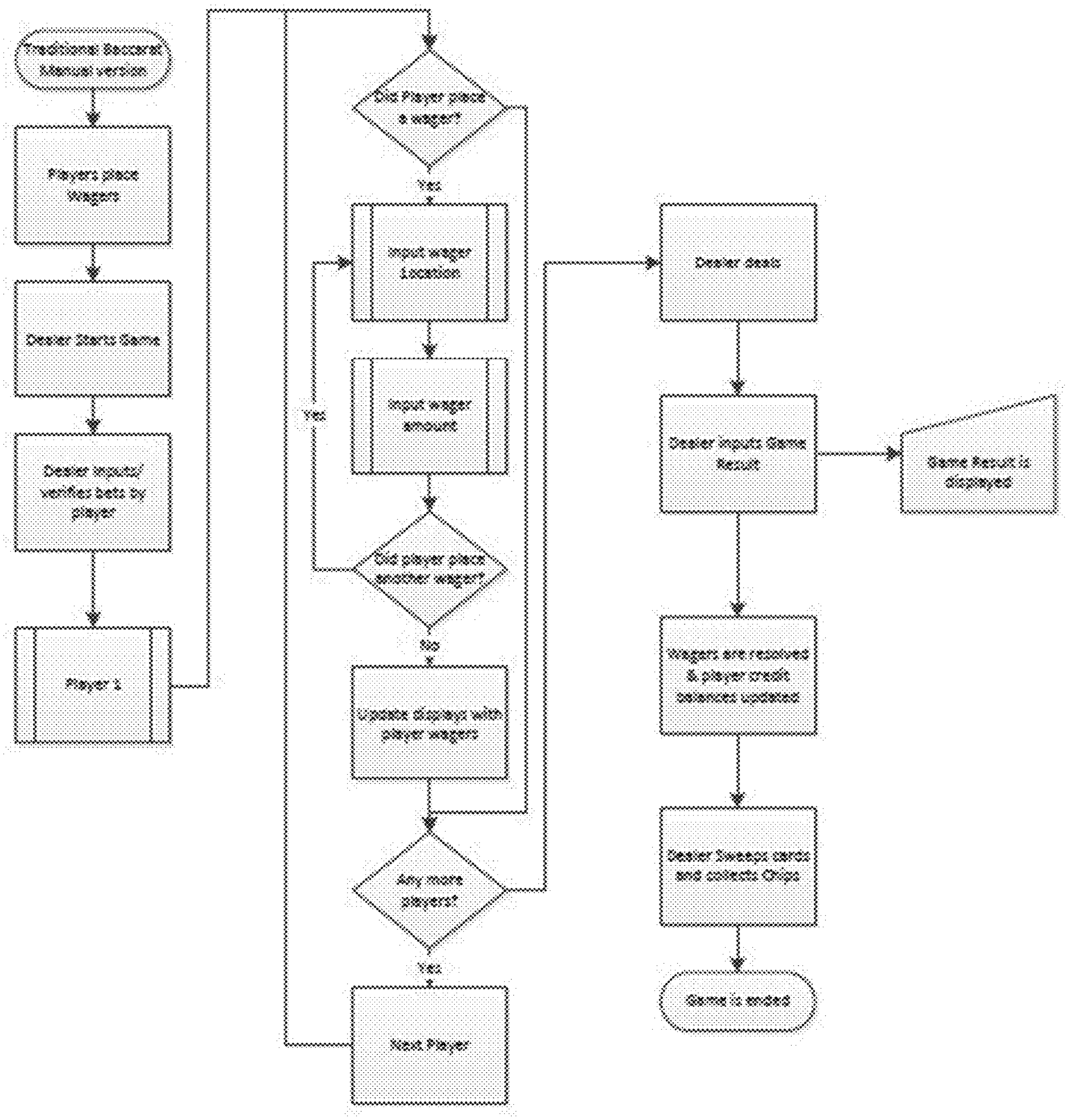
Figure 40M:
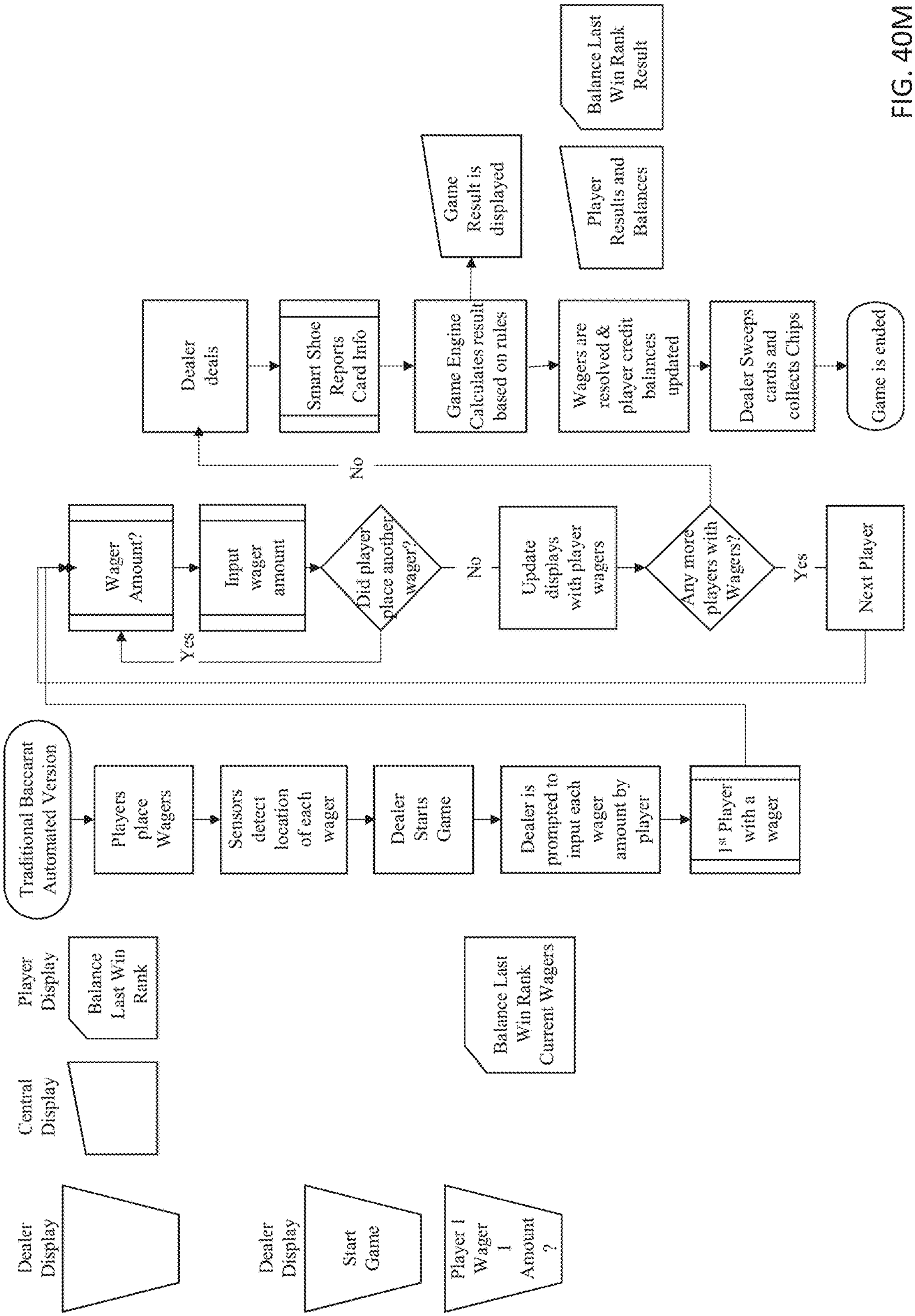
Figure 40N:
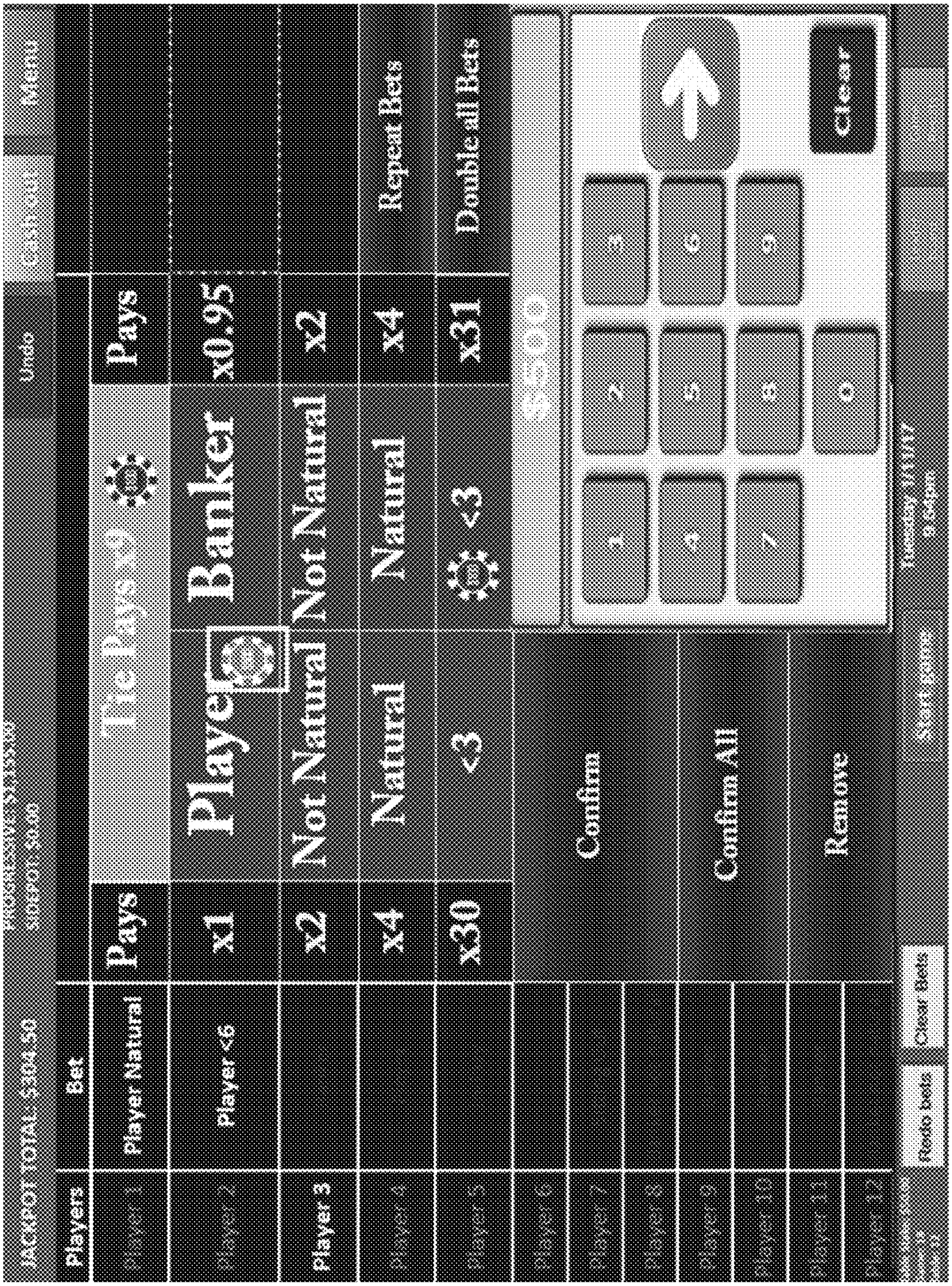
Figure 40O:
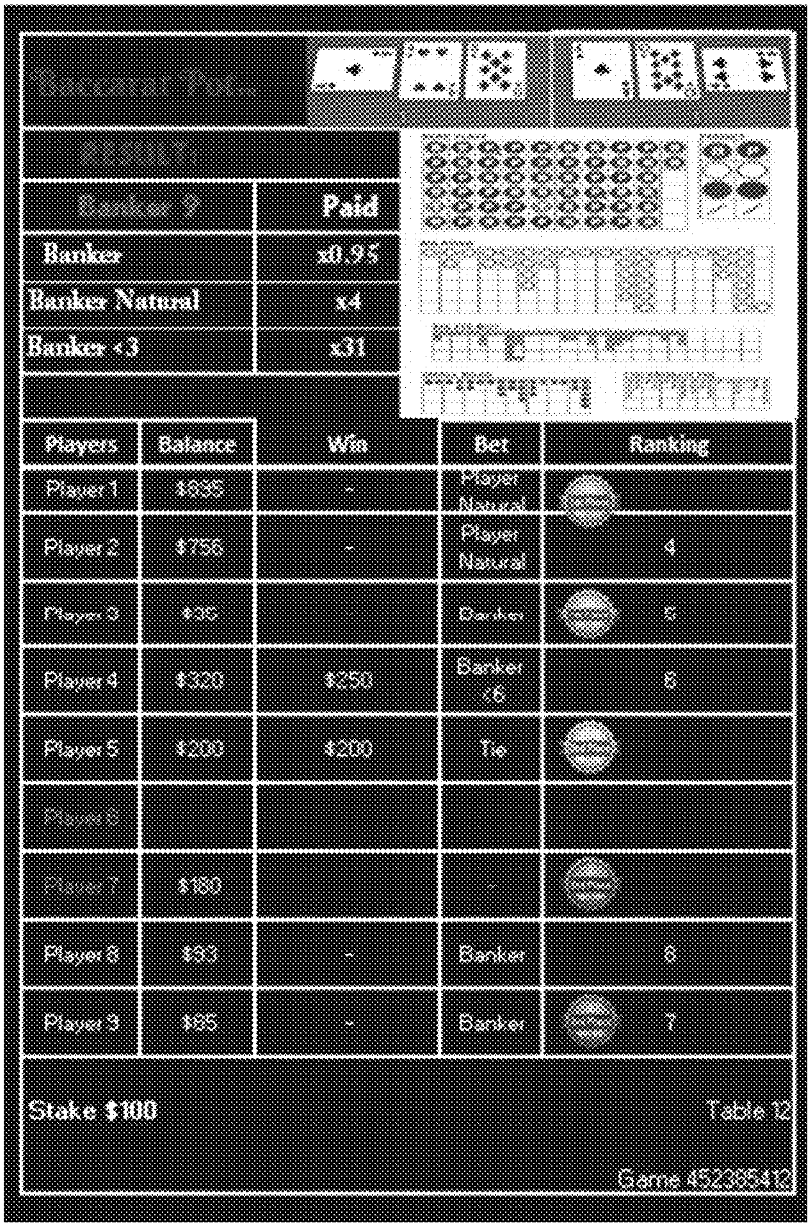
Figure 40P:
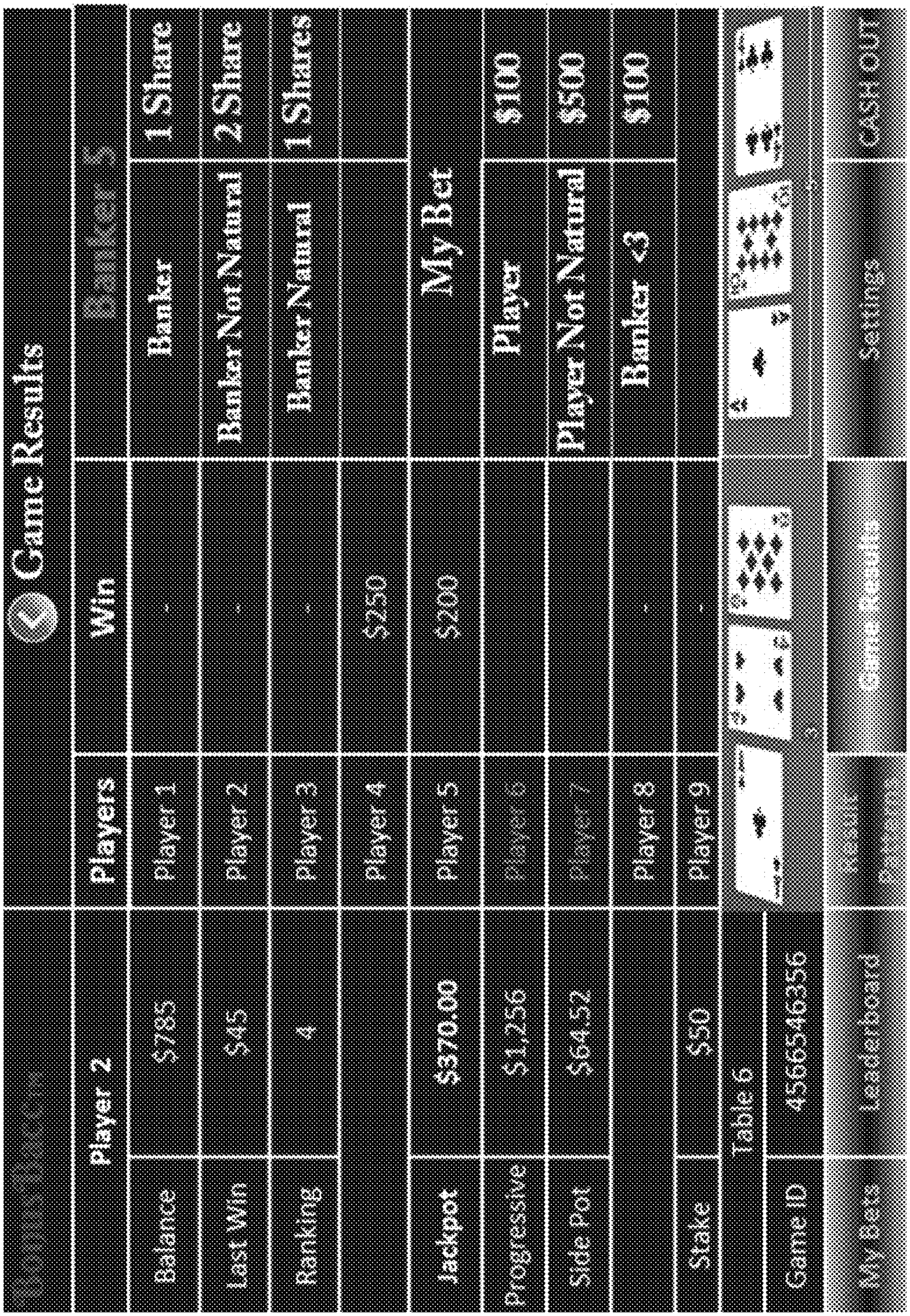
Figure 40Q:
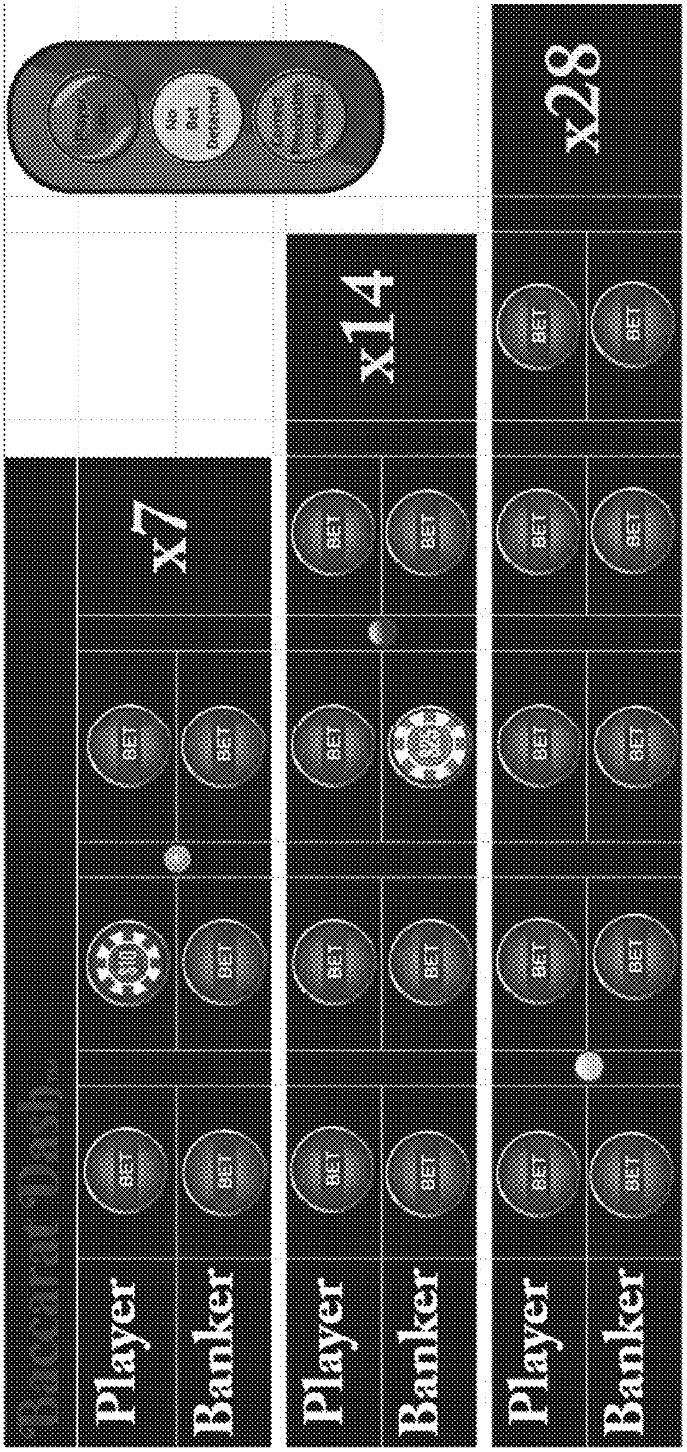
Figure 40R:
Figure 40S:
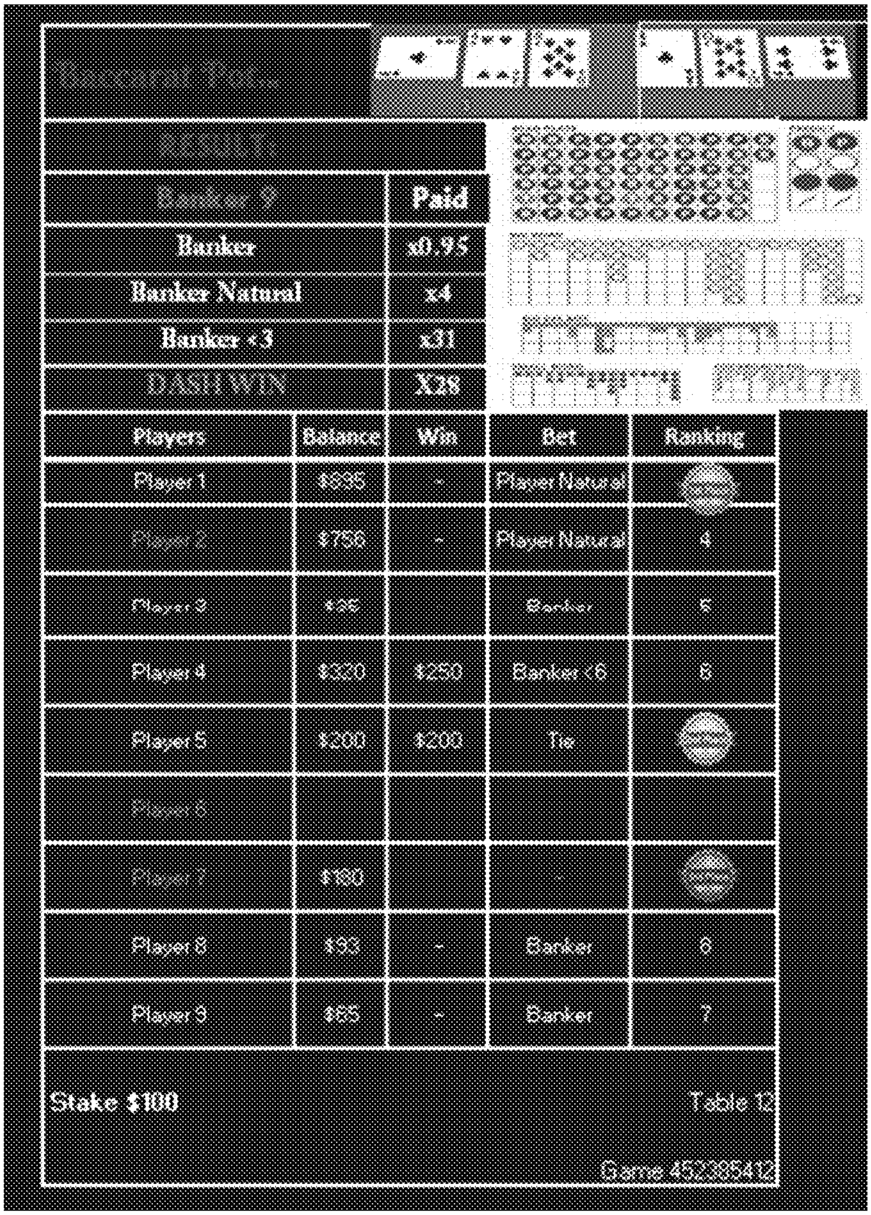
Figure 40T:
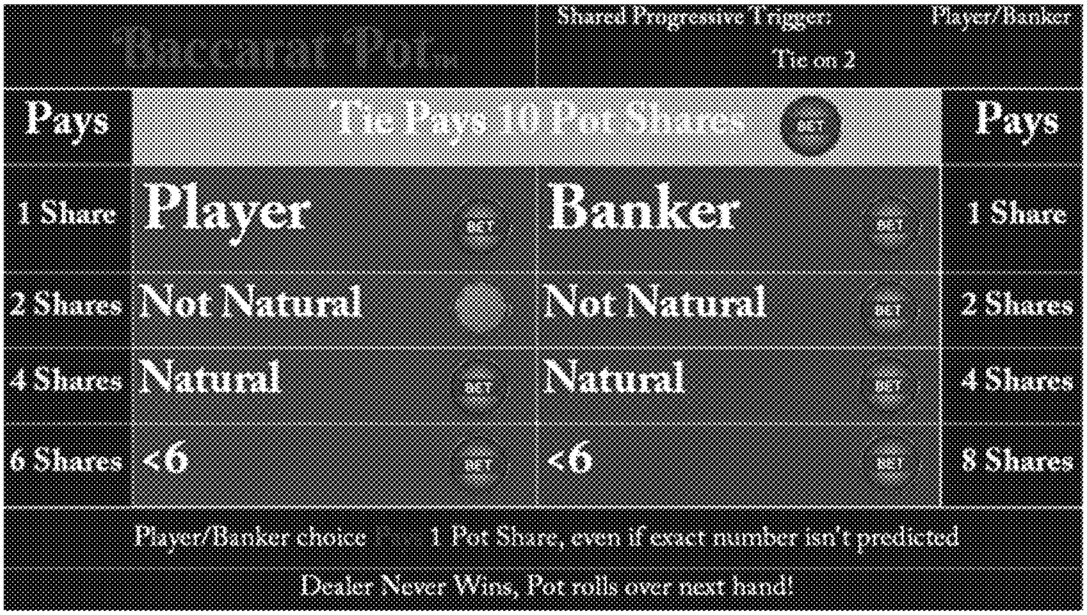
Figure 40U:
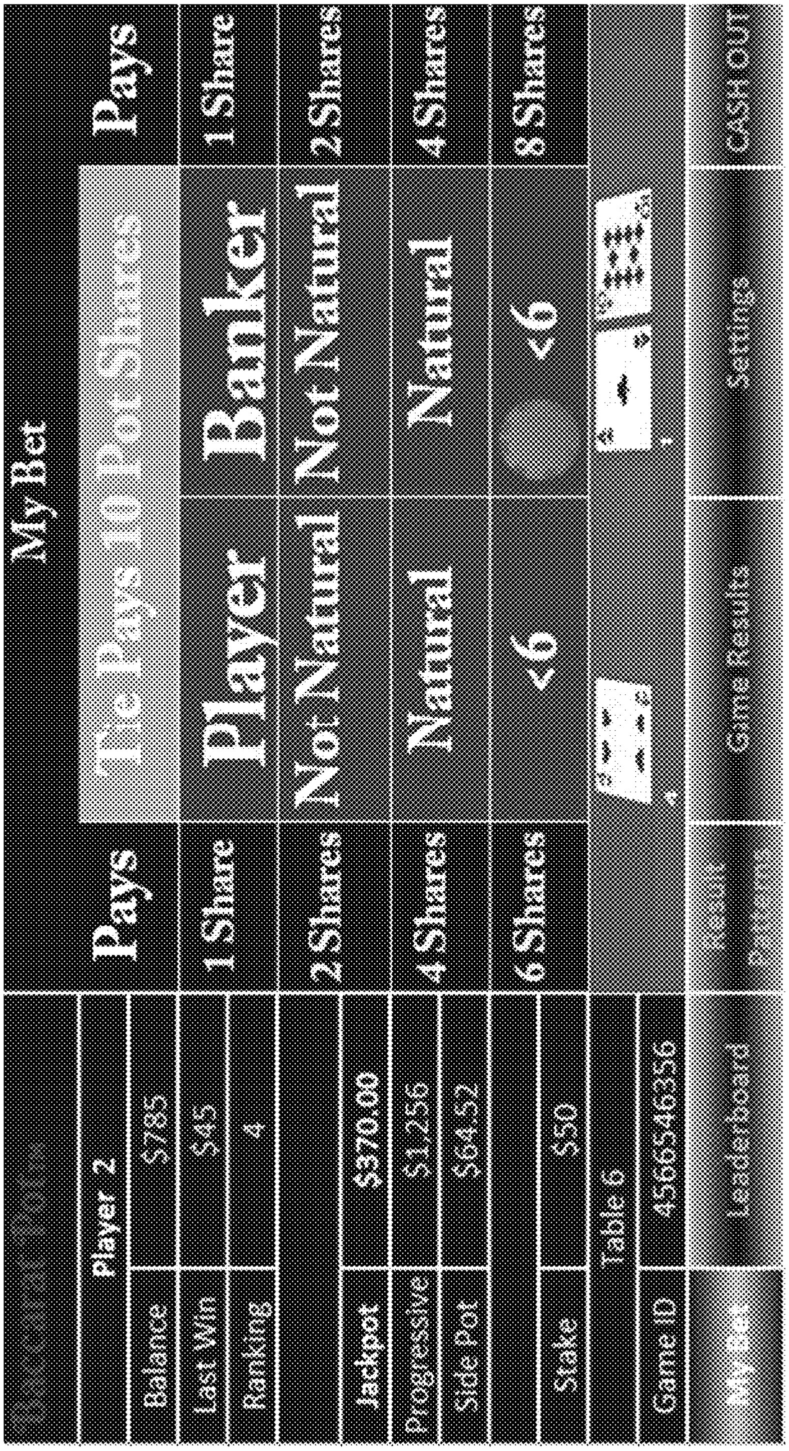
Figure 40V:
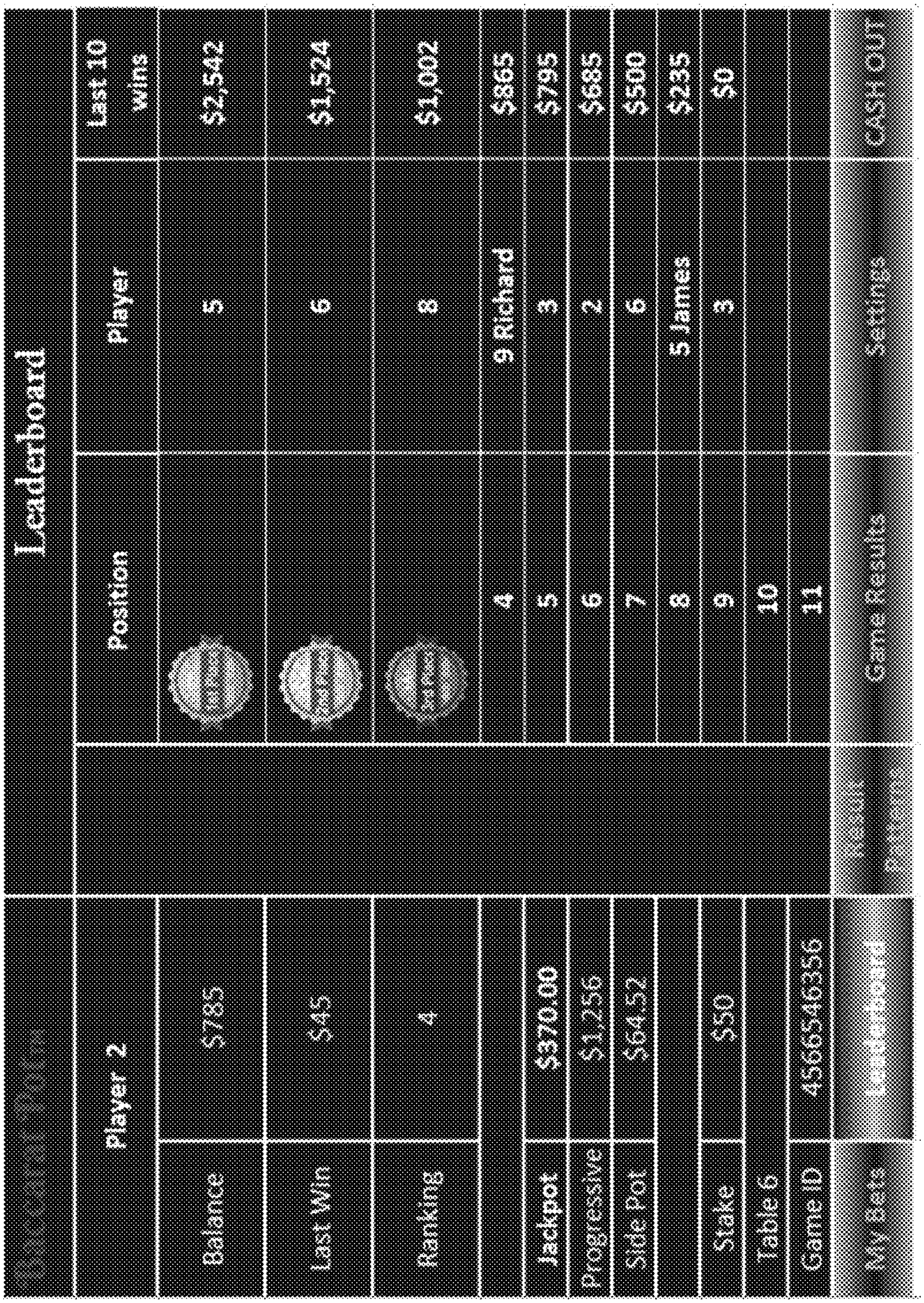
Figure 40W:
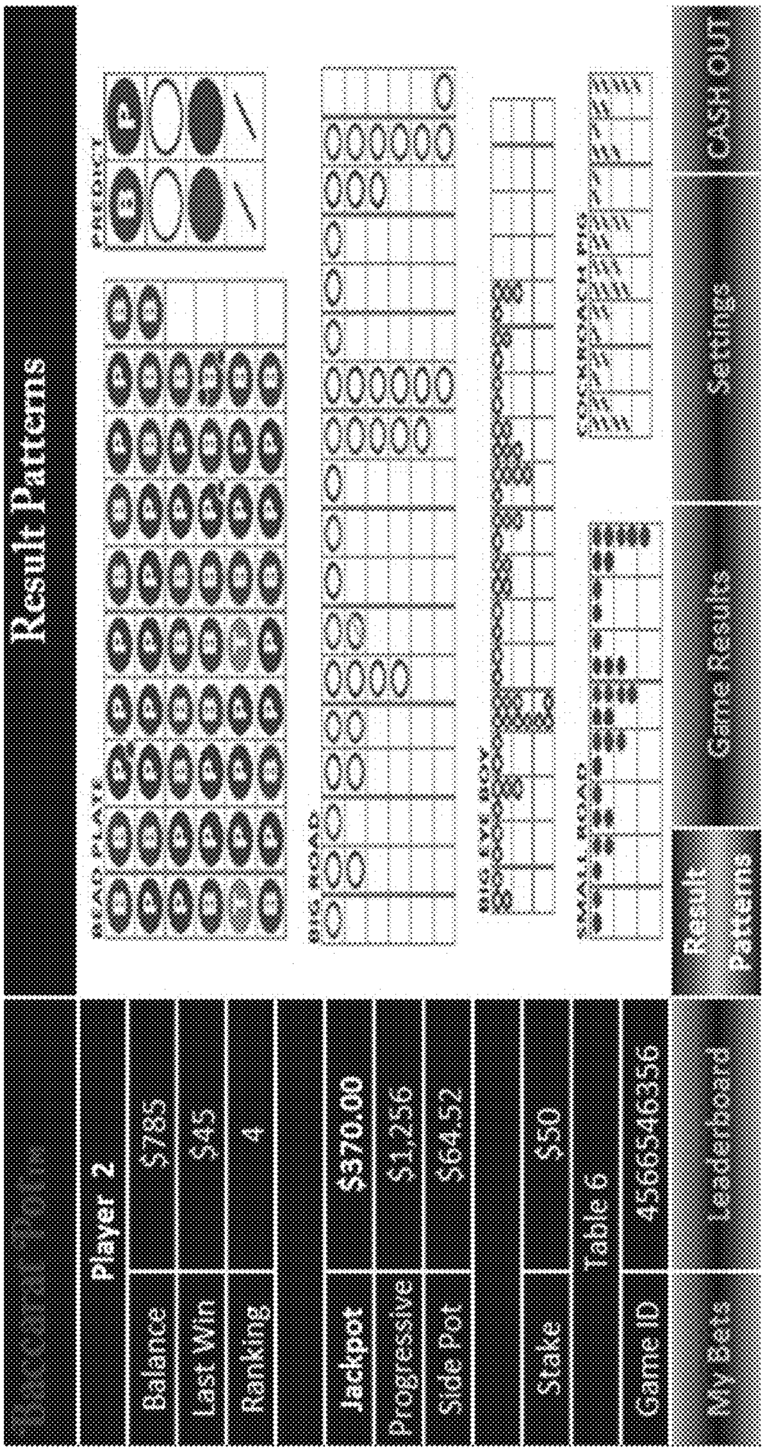
Figure 40X:
Figure 40Y:
Figure 40Z:
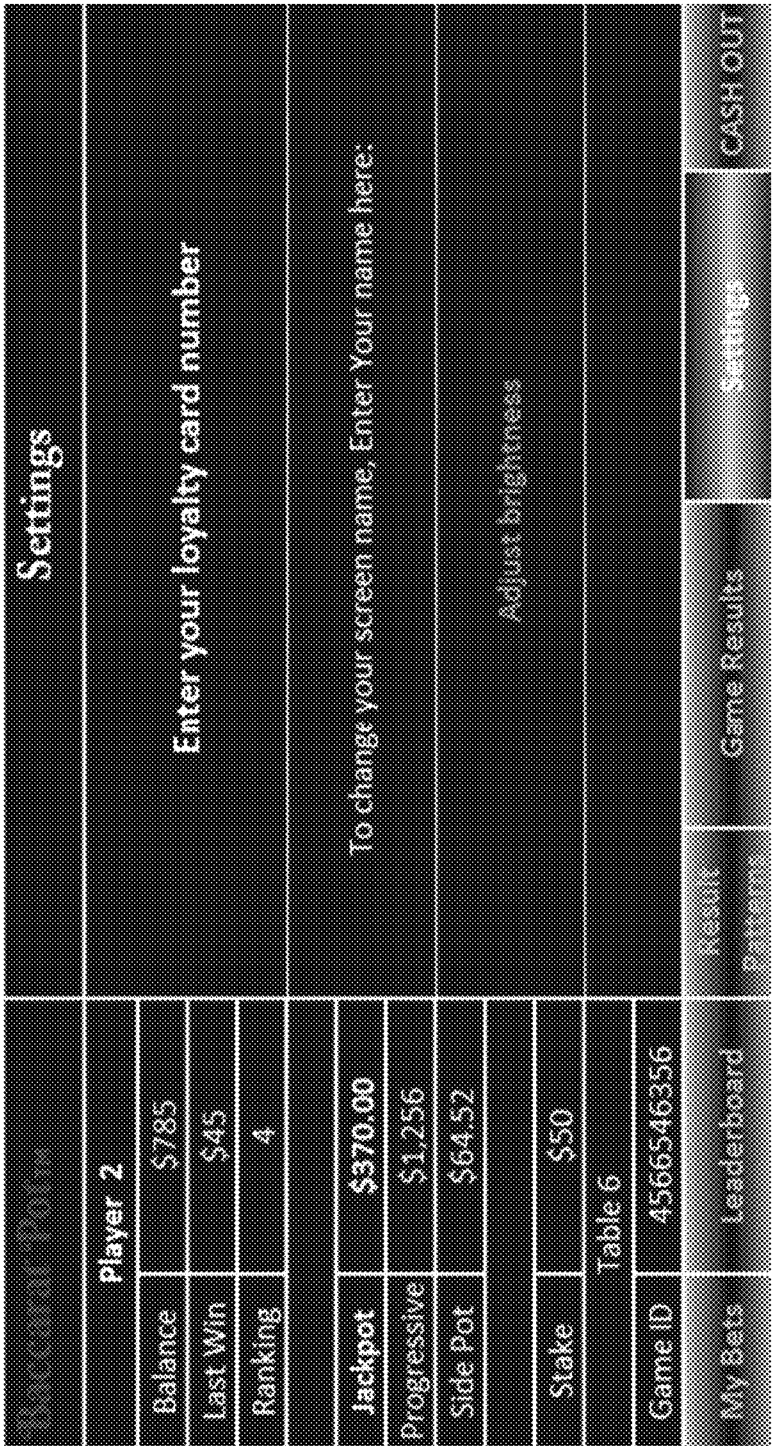

With reference to FIGS. 40A-40Z and FIG. 40A-A, an embodiment of the system 10 having a dealer device 300 and at least one player device 312 configured to provide a solution for a Baccarat based game. The Baccarat based game may be played on a table. The system 10 may be configured to work with different versions or variations of Baccarat. For example, the system may be made configurable to work with a pari-mutuel version of Baccarat ("Baccarat Pot"); a Baccarat game with additional bet options ("BonusBacc"); and/or a Baccarat game with a progressive play side bet game ("Baccarat Dash"). The progressive side bet game may be player with either Baccarat Pot or BonusBacc.

Baccarat Pot is a pari-mutuel version of baccarat in which the players play for a portion of a pot. While the players play each hand or coup of Baccarat against the dealer, as in a standard game of Baccarat, the player may be awarded a share of the pot based on the outcome of the coup.

The system 10 is based on a sub-system that maintains the funds in a plurality of player of accounts and that calculates the changes in the player accounts based on the outcome of instances, i.e., hands or coups of a Baccarat both the outcome of a main game, one or more side bets and/or a progressive game. Since all changes to the player accounts are calculated by the system 10, more complex wagers may be utilized. The wagers and/or combination of wagers permitted may result in changes to the player accounts that are fractions of the base unit, whether the base unit is a (low denomination) chip (virtual or real), a currency denomination, or credit.

The system 10 in the illustrated embodiment may be configured by the operator such that one of the available games are active, i.e., only one game may be active at any one time. Using the example games above, the operator may configure one of the following games to be active:

BonusBacc
BonusBacc with Dash
Baccarat Pot
Baccarat Pot with Dash
Regular Baccarat with Dash
Baccarat Pot The system 10 may be used with purely physical tables, i.e., on a physical table, with physical cards and chips. In such systems 10, the players play using the physical cards and chips and the dealer enters all wager and outcome information on the dealer unit 300. Alternatively, the system 10 may include separate player units 310. The separate player units 310 may be tablets or simple display screens with touchscreen sensors coupled to the dealer unit 300. The system 10 may use chip placement sensors, indicator lights and/or, a smart shoe to provide data to the dealer unit 300 regarding game play outcome of each coup.

With reference to FIG. 40A through FIG. 40A-A, various exemplary screens shots from the dealer unit 310 and the player unit(s) 312 are shown. In general, the dealer unit 310 and the player unit(s) 312 display a respective display structure comprised of computer graphics that a respective graphic user interface (GUI). The dealer display unit 300A and the player display unit 312A include touchscreen video display and the GUI displays information to the player or dealer and incorporate selective elements for the player or dealer to enter information to the system 10. An exemplary embodiment of BaccaratPot is described below.

With reference to FIG. 40A, the player display structure includes a game screen that allows a player to enter wager. In the illustrated embodiment of BaccaratPot, a configurable number of decks of standard playing cards are used. BaccaratPot provides a single stake pari-mutuel game in which winning players take a proportionate win from the total pot as a function of the outcome of each player's hand of Baccarat against the dealer. After each player makes a wager, the wagers are placed in the pot. A rake or portion is subtracted from the wagers to pay the dealer/house. The dealer/house does not otherwise win funds from the pot. The pot rolls from one hand/coup to the next if the dealer beats all of the players. In one embodiment, the pot may be rounded downward to reduce wins to the nearest set denomination. A progressive pool may be funded from the rake or from the rounding down function. In one embodiment, a progressive win may be shared among all player or non-players who placed a stake in the winning hand.

In general, the system 10 allows operators to set and control their house advantage by setting a preferred rake, i.e., to receive a fixed stake. Since the stakes are fixed, card counting risks are minimized. In additional, the opening low denomination tables or adding progressives becomes viable. A progressive jackpot on a Baccarat game can bring in a fresh demographic to the table market. Additionally, "unbanked" card games are considered eligible for approval in most Class II jurisdictions.

From the player's perspective, the players may enjoy greater volatility than that offered by traditional Baccarat, without having to greatly modify their game strategies or place side-bets. In BarracatPot, the players play against the dealer for shares of the pot, not for fixed returns. Since the house does not share in the Pot, players are effectively competing with each other for greater shares of the pot, and hence sessions may be very socially engaging. The system 10 may provide players access to lower denomination tables and potentially to large progressives.

In BaccaratPot with Dash, a plurality of players (up to a predetermined number of players, e.g., 12 or 100) enter a fixed stake (per table) by placing bets/wagers on a chose bet spot in a respective bet area on the table. A standard round of Baccarat round or hand is then played. Each player may win a number of shares of the pot based on the outcome of the game. The number of shares won by the winning players are summed and each winning player is awarded a proportional part of the pot based on the number of shares awarded. The number of shares provided to each winning player is set by a predetermined paytable. An exemplary paytable is shown in FIG. 40B. The winners split the pot according to their outcome's share allocation (Winning Pot Shares.) Winnings are accrued into win meters that are displayed on a customer facing centralized display (FIG. 40C showing accrued win meters by seat. Players can redeem funds from their accrued winnings at any point by requesting a cash out from the dealer.

As shown in FIG. 40D, players place their stake on one of shown bet options (the winning pot shares are shown by each area). In the illustrated embodiment, the player has placed a wager on PLAYER NATURAL. The player will be awarded 4 shares of the pot if the outcome matches the player wager. If the player wins, but it is not a natural win, then the player will be awarded 1 share since the player chose the winning hand correctly. If the result is the dealer or a tie, the player loses and receives no shared. If no player wins, i.e., if all players received 0 shares, then the pot is rolled over to the next instance of game or coup.

With reference to FIG. 40E an exemplary in game display or display structure is shown. In the illustrated embodiment, the display structure displays the cards being drawn (where available), a logo, a pot or jackpot total, a progressive total and side pot total. Also displayed are a table number, a Game ID, and the player's current stake. As shown, in the illustrated embodiment, the results of at least the previous hand may be shown for each player as well as all of the winning payouts, including number of shares and wagers. The respective player's current balance or stake is shown. If a seat is unpopulated, then the current balance or stake is blank. A player's initial balance is set to $0 until the player account is funded. The display structure includes a bet field. The bet field will be blank or empty if the seat is empty. The players may be identified by a name (if known) or generic place holder, e.g., "Player 1", if their name is not known. If the seat is empty or the seat is occupied then the generic place holder name may be modified to indicate that status, for example, displayed in grey text. If the seat is occupied, but the player does not make a wager, then "sitting out" may be displayed in the bet field.

In the illustrated embodiment, each player's position or ranking over the last 10 hands is shown. The top three players may be indicated using first, second and third place ribbon icons as shown.

The display structure includes a graphical outcome area in which the outcome of the current hand is displayed graphically.

With reference to FIG. 40F, an exemplary display structure 300DS displayed on the dealer device 300 is shown. The display structure 300DS shown in FIG. 40F may be used to display each player's wager or for the dealer to enter the player's wagers. The system 10 or the dealer may scroll through the player's to display or enter the player's wager. The display structure 300DS includes a wager information section to the right of the player names. The information in the wager information section corresponds to a selected or highlighted player on the left.

Once the dealer has interacted with a player, the yellow cursor and interaction moves to the next player. If the dealer manually jumps to another player, e.g., player 9) by tapping that player name, the dealer can interact with the wager information section or bet board for player 9 and then it will move to player 10. At the beginning of a session, the dealer proceeds through each player to manage the respective player's wager.

Once the dealer enters or selects an outcome, e.g., Banker <3, the name of the respective player, e.g., Player 1 is marked as Banker<3 in white text in the table. The player name ("Player 1") is then changed to a different color, e.g., green, because a bet has been placed and the action moves to the next player.

In the illustrated example, dealer manually proceeds to player 12, then entered results for players 1 & 2 and is currently ready to enter results for Player 3. The dealer may click select on the (red) bet word e.g. "banker" to repeat the same bet, or click on the bet board to choose a different option, choose to sit out or cash out that player.

When the dealer interface (bet page), i.e., display structure 300DS, opens at the end of a completed round, the dealer can remove players, cash them out and add new bets while the players are still viewing the Results page.

Players previous bets may be indicated in a different color, e.g., red. The dealer can tap any red result and the result will turn white (player has placed the same bet). The Redo Bets button marks all remaining red bets as the same bet again.

Once the dealer has placed all bets for all players (all the in-play marked green), the dealer clicks start game. The dealer deals a traditional hand of Baccarat, with all the standard rules. All interactions play according to house rules for Baccarat.

In embodiment, a progressive win is triggered when a specified outcome is dealt. For example, in the illustrated embodiment the progressive trigger is set to Tie on 2. If the dealer deals the progressive trigger hand, then the dealer clicks or selects a progressive button, and the funds are evenly split between all players participating (who placed a bet) in that hand. A celebratory animation may play out on the player display unit 312A and the Progressive is reset to $0, or to a configurable seed amount.

Once the dealer plays out the hand, the dealer records on the dealer device 300 the exact result of the hand with a single tap (see FIG. 40G). A pop up confirming the dealer selection opens, the dealer clicks to confirm/end game whereas the funds are distributed to players (see FIG. 40H).

The dealer is shown a start game screen and can add and remove players before the game starts. The players place their chips/bets on the table and the dealer calls No More Bets. The dealer clicks start game (the player display unit 312A will display an in-game screen). The dealer places the player bets on the table (see above). Once the dealer has placed bets for all players and the game has been played, the dealer may select a Select Result button and the Select result screen opens. The dealer inputs the results (e.g. Banker 2) and the calculator marks on the dealer display and the player display all the winning bets that match the result (see above). More than one outcome may be correct e.g. Banker 2 is a correct result for Banker, Banker not natural and Banker under 6; and even Player Natural receives 1 consolation share for the correct choice or player/banker/tie. For example, the result: "Banker 2" awards the following winning shares:

Banker: 1 share

Banker Not Natural: 2 shares

Banker Natural: 1 share (The result was wrong, but receives 1 share for the correct choice of player/banker/tie).

Banker <6: 6 Shares

All Player bets and Tie bets receive 0 shares.

An exemplary game result screen in the display structure is shown in FIG. 40I. The display structure includes the specific hands/cards that were drawn/dealt if the information is available. The result and win for each hand are displayed in respective columns. The pot consists of all stakes (minus house rake) and any funds rolled over from previous pots. Each player's winnings, calculated according to a player's outcome, are configurable in the system.

A player who chooses any of the Player/Banker options will receive 1 share if that player/banker selection is correct, even if the exact prediction is wrong. If the game outcome results in no shares being awarded, the pot rolls over to the next hand. Games can rollover multiple times until the funds are won.

The system 10 may include an optional/configurable leaderboard. The leaderboard may include current player status (outcomes, ranking stakes, etc. . . . ). The leaderboard may also include other information, e.g., most money won from last x hands (or configurable time period, e.g., all night). The leaderboard may include results on a per table bases or across multiple tables in a network configuration. The leaderboard may be available on the results screen on each player device 312 and may be displayed on a larger display viewable by others.

In one embodiment, special icons ($1^{st}$, $2^{nd}$, and $3^{rd}$ or King, Queen, Jack) may be used to indicate the current rankings.

The general operation of the system 10 when the Baccarat Pot game is being played is shown in FIG. 40J.

With specific reference to FIG. 40K through FIG. 40P, operation of the system 10 when the BonusBacc game is being played is described. The BonusBacc game works in a similar way to Baccarat pot but is a fixed odds game against the house, more in-line with traditional Baccarat. There is no pot or rollovers available. The premise of the game is that players can play regular Baccarat on this table, but can also add additional Bonus Bet options, in which the players may win more than the standard payouts. BonusBacc allows player to place multiple bets using different denominations allowing them to hedge their bets and create different patterns. The BonusBacc may or may not have a Progressive Jackpot. In one embodiment, the rounding of the pot may be enable or disabled by the operator.

In the illustrated embodiment, the BonusBacc game uses a configurable number of standard decks of cards. The BonusBacc game provides a multi-denomination, multi-stake Baccarat game in which the players play against the house. Any winnings are distributed to the player's account/credit meters which are shown on all player devices. As discussed above, a rounding pot may be used to reduce awards to the nearest denomination. The rounded amounts may be accrued in one or more other meters. The general operation of the system 10 when in the BonusBacc mode is shown in FIG. 40L. Operation when in an automated mode is shown in FIG. 40M.

The display structure 300DS that allows the dealer to enter wagers when the system 10 is configured to play the BonusBacc game is shown in FIG. 40N.

If the BonusBacc game is played manually, when the dealer taps on a bet spot, the system will put down the minimum bet chip on this area. Tapping again will add the same amount again and repeatedly. To move to the next bet, the dealer selects "confirm". To remove a specific bet from the board, the dealer clicks the offending chip and then clicks remove.

When in the automated mode, various sensors (see above) may be used to automatically populate or send data to the dealer control unit 300C. Using the automated system the table sensor marks where a player has put the chip and the dealer must input the amount for each one. The default when a player has activated the sensor is table minimum. If a player puts 3×$100 chips on the table in different spots and the dealer sees them all marked on the tablet, he clicks confirm all.

If the dealer wants to adjust the amounts the cursor (yellow box) goes from bet to bet from left top to bottom then right column top to bottom. Whenever a dealer taps in the new amount on the calculator (and enters with the green arrow) the bet amount changes and the cursor moves to the next chip needing amount change or confirmation.

If a dealer wants to change the amount on specific bet they can tap that bet (it will grow by the default minimum) and can then enter an actual amount using the keypad.

The dealer can select Repeat Bets if a player is placing the same bet as on the previous hand. The dealer may select Double All bets to multiply all a players bets by 2. The amount in the calculator starts at the table minimum (e.g., $100), if the dealer changes the bet to $500, the calculator stays on that amount. If the dealer wants to enter 3 bets of $500, the dealer may mark the first bet as $500, the cursor then moves to the next bet which shows $100 in the chip, but $500 in the calculator, by selecting the (green) arrow the dealer may quickly put the same amount on the next chips as well.

With reference to FIG. 40O, a BonusBacc results screen displays all of the outcomes that were paid to the players. The results are shown as multiples of a player's wager.

With reference to FIG. 40P, a second BonusBacc game result screen may display all of a player's individual bets.

With reference to FIG. 40Q through FIG. 40Y, various display screens are shown that are used in the Baccarat Dash game. The Baccarat Dash side game is a fixed odds progressive game against the house (see FIG. 40Q). A player must complete all correct predictions to win the Prize shown at the end of each game, i.e., "dash". In general, the player places a bet (any stake above minimum) on the first space of any one of the 3 dash game boards and predicts player or banker. If the player is correct, a green light is activated and the player may move their chips to the next spot in the game. Each time the player advances, the player can choose either player or banker. The players do not have to move the bet each time, but can stay in a spot until the player feels ready to compete. Once they have started the progressive game or dash, the player cannot remove the bet from the table after they have started the dash. If the result of a coup of the Baccarat game is a tie, the players stay in the same spot. The player's wager are not list, but the player does not advance.

If a player loses the bet, a red light indicates for the dealer to remove the bet from the table. The Dealer sees a players dash on their bet area on the UI, for that player and their status. On the automated system, both the player and dealer can see the dash status on their screen. Each chip area has a sensor. When the chips ate placed the system 10 records a player's progress.

In the illustrated embodiment, there are three dashes. All 3 dashes start with a yellow light, awaiting bet, any player can place a bet on the first spot, to reach the next spot, the player has to have made a correct prediction and see a green indicator to progress to the next spot.

The display structure 300DS that allows the dealer to enter wagers when the system 10 is configured to play the BonusBacc game is shown in FIG. 40R. Once a player puts a chip on the first cursor, the chip shows up on the display structure 300DS or dealerboard. The dealer changes or confirms the amount on his board. After the dealer has confirmed the bet, the amount (on the first bet of the dash) does not change. The player can move his bet forward when instructed (green light). When a red light is displayed, the player's name on the results page flashed in red. The dealer must then remove the wager from the table.

If the player has reached the end of a dash, then the win is recorded on the game result page (see FIG. 40S). The dealer enters each bet amount into the system 10 at the beginning of the process, so any winnings are calculated as a multiplier of the bet and the multiplier of the dash race chosen, funds are then paid out to the player.

In the above embodiment, the players are manually placing wagers using chips. All bets or wagers are entered by the dealer. In an alternative embodiment, an automated or semi-automatic system 10 that includes and uses chip Placement sensors; indicator lights on the table (multi-colored lights (red/yellow and green options) OR separate Red, Green and yellow, lights), a smart shoe for reading cards as the cards are dealt and individual player screens (7" Tablets).

The smart shoe would be used to read and display, the cards as the cards are pulled and dealt and the outcome of the game based on the dealt cards. Given the strict rules for dealing cards, all cards would be drawn in succession to the correct hands manually while the calculator follows automatically. The smart shoe would also speed up interactions, e.g., the games do not have to be positively started or activated by the dealer. Each hand may be started and activated when a first card is pulled from the shoe.

In addition, each bet spot would include a respective a sensor under the table, e.g., an 8 person table would need 72 sensors. Alternatively Video Recognition could be used to determine the location of wagers and scales can be used to determine the number of chips associated with each wager.

With reference to FIG. 40T, sensors in each bet spot and a green chip covering Player Not Natural are shown. Once the chip is placed, the system 10 is informed of the player's bet. The game is fixed stake so the actual wager amount is not needed. A player moves their bet from position to position, until the dealer calls no more bets and the game is started.

In general, the system 10 works the same way with BonusBacc, just showing multipliers instead of shares. Each player seat includes an individual (7") tablet (in landscape mode) to view info and basic interactions. An exemplary display screen associated with Player 2 is shown in FIG. 40U. The displayed information relates to the player's own stats (Last win, Ranking). When a player leaves the table, the tablet removes all personal and player specific details.

An exemplary leader board is shown in FIG. 40V and exemplary results screens are shown in FIGS. 40W, 40X and 40Y. An exemplary settings screen, in which the player, may update their name and/or enter a player or loyalty card number is shown in FIG. 40Z.

With reference to FIG. 40A-A, in a cashout screen, a player can scroll through previous cashouts to see the list of funds and the balance at the time of all funds cashed out in this session. After filling in the amount requested and clicking cash out, a cash out request is sent to the dealer device 300. The dealer is informed of a cash out request (e.g. Cash Out button flashes red on and off). When the dealer clicks the cash out button, a pop up with the request appears (see FIG. 40A-B). In the illustrated embodiment, the dealer pays the player in chips and confirms on his screen that the player has been paid.

In general, the system 10 records every hand (individual cards & result); the game outcome and the winning hands and payouts.

Figure 41A:
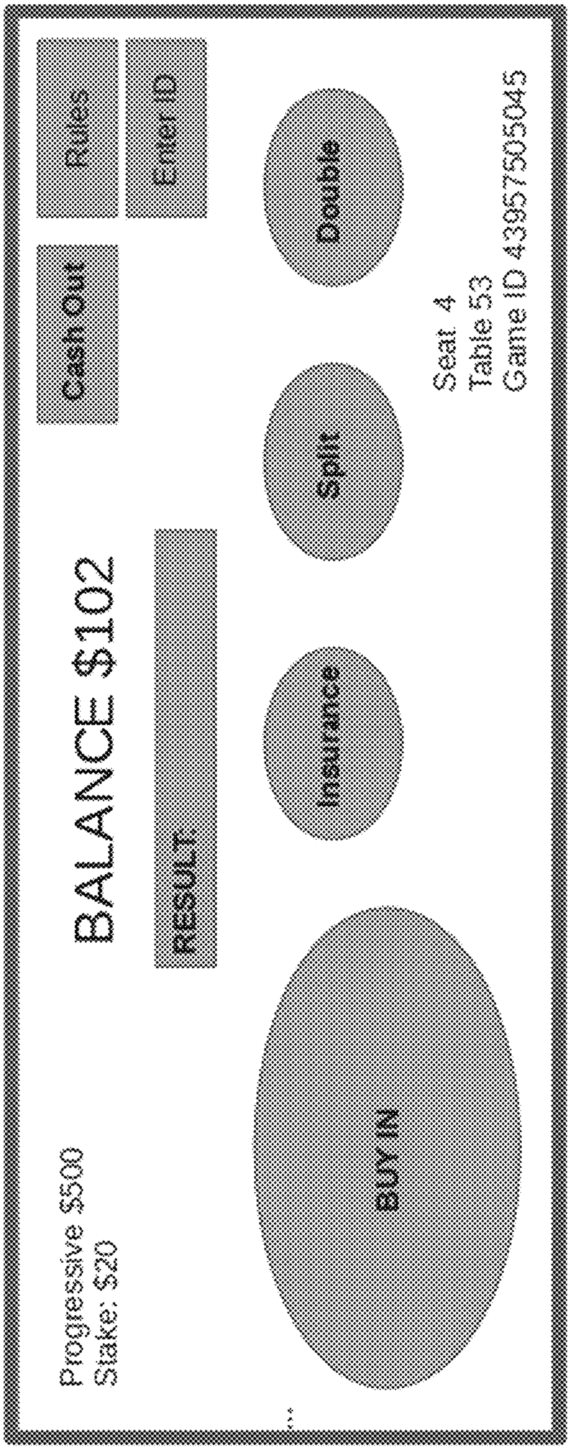
FIGS. 41A and 41B are exemplary screen shots from a second system for providing a dealer device and a player device for use with a table game, according to a first secondary aspect of the present invention.
Figure 41B:
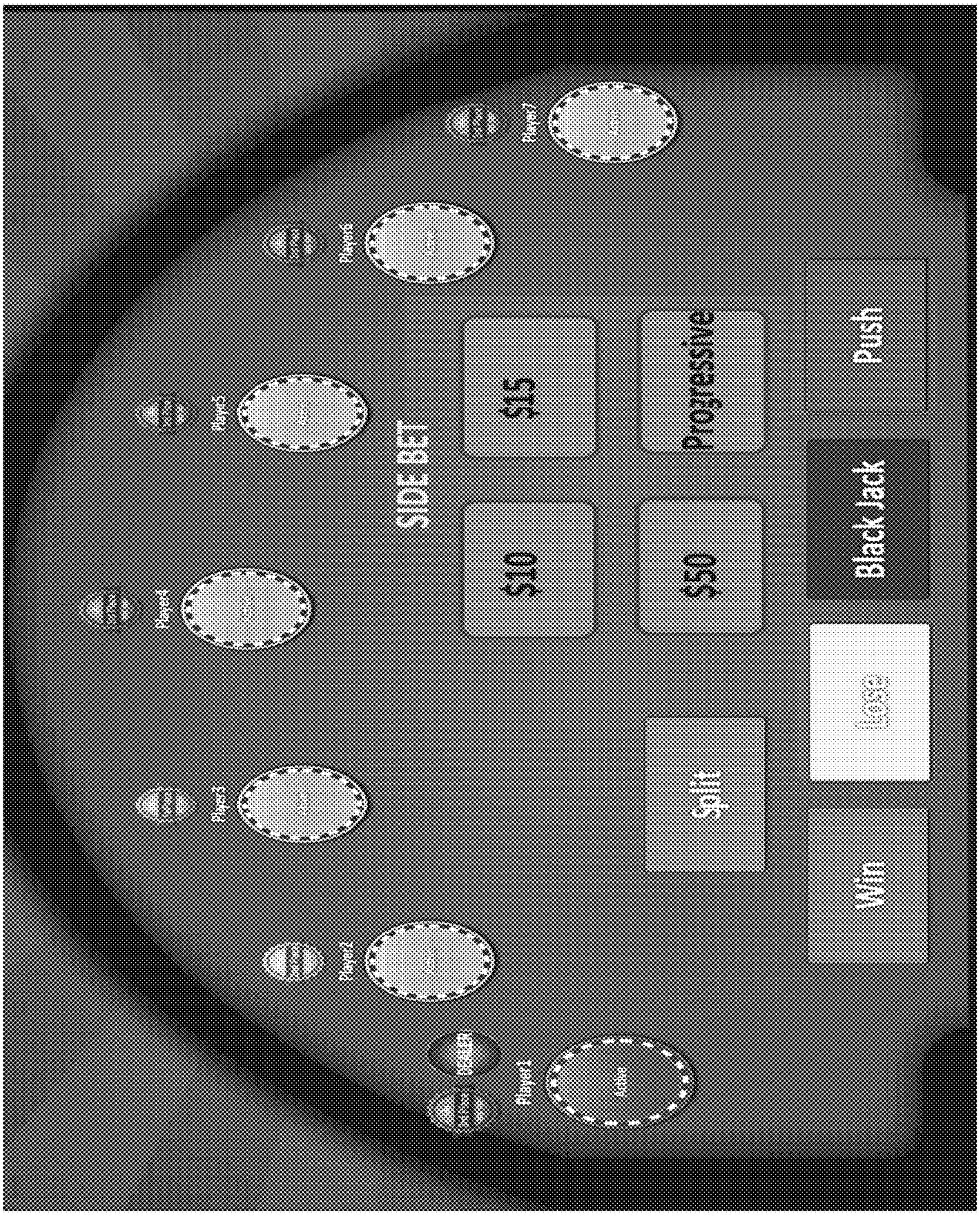

With reference to FIGS. 41A and 41B, an embodiment of the system 10 having a dealer device 300 and at least one player device 312 configured to provide a solution for a Blackjack based game is shown. In this embodiment, the dealer device 300 is embodied in a computer, server or tablet. The player device 312 may be embodied in tablets or computers that are coupled to the dealer device 300. In one embodiment, the player device 312 is hardwired to the dealer device 300. As shown in FIG. 41A, in the illustrated embodiment, the display structure or GUI displayed on the player device 312 includes the player's stake or balance in their account and other information and allows the player to make wagers or request a buy-in or cash-out.

In the illustrated embodiment, the players would buy into the table by giving the dealer cash or chips. The dealer adds funds to their seat/tablet using the dealer device 300.

The player(s) can now play directly from their player account (whether in currency or credits).

Player and dealer data, including player buy ins, balance and cash-out information and recorded game data are compiled into a database. The database may be accessible by third party table accounting and player management systems for realtime reporting.

In the illustrated embodiment, the system 10 includes one more large display device for providing or displaying information to the players or other viewers. The dealer device 300 may be implemented in a tablet computer that operates as a server device to, for example, the player device 312. The graphical user interface on the player device 312 is implemented in a secure browser running on each player device 312.

In order to begin playing or to open a game session, the player arrives at the table and gives the dealer cash/chips. The dealer receives the cash or chips and adds funds directly to the player's balance. At their chosen seat or player station, the player may enter their ID or loyalty number. When the player logs out or is logged out, the player information and history is deleted from the player device 312. In one embodiment, the player history is accessible by the player through the player device 312.

Figure 31A:
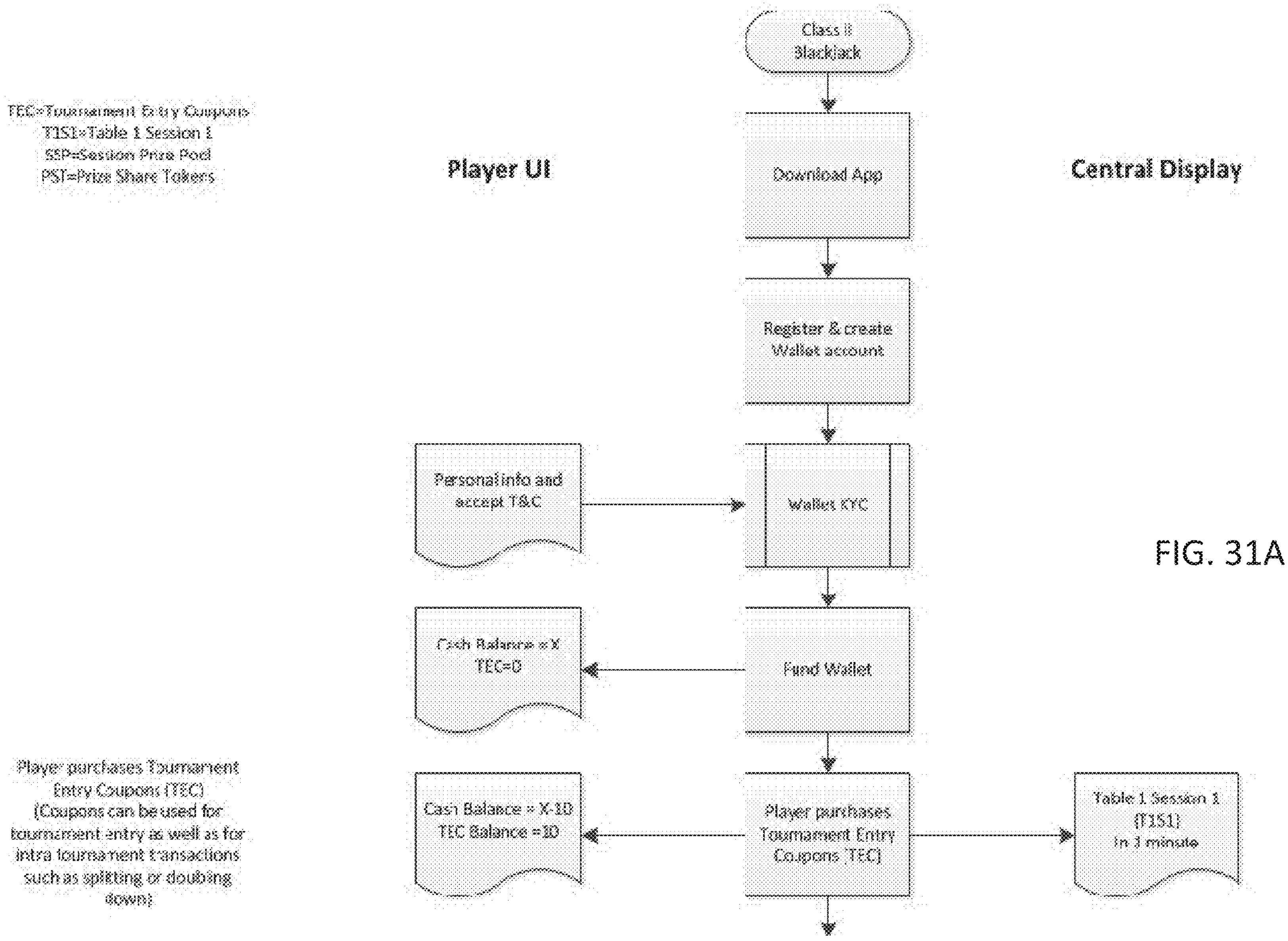
FIGS. 31A-31C present a sample game flow where the proposed scenario is implemented as an approvable Class II cash tournament.

As shown in FIG. 31A, the player may play an instance of the Blackjack game by selecting "Buy In" to enter the hand and optional side bet (if available). Once all bets have been placed, the dealer clicks start on the dealer device 300. The dealer then deals the hand to all players. The players may select Insurance on their tablet (half of the table stake is wagered by the player, and an indicator shows on all 3 tablets that the player has clicked insurance).

Players may select, during the gameplay, Split (an extra stake is wagered by the player and indicator shows on all 3 tablets that the player has split, dealer splits, continues hand).

Players may also select, during the gameplay, Double (an extra stake is wagered and an indicator shows on all 3 tablets that the player has doubled their stake and on which hand.)

Once the hand has played, the dealer enters the dealer result, e.g., bust, stand, Blackjack or win all. If dealer result is Blackjack, all players that selected insurance are returned their stake.

If a winning player selected Double during the game, their payout is doubled.

If a player selected a side bet, in addition to the standard payout options the dealer will see a menu of payouts for the side bet. If the player has not placed a side bet, the side bet payouts won't show.

The dealer can select a sidebet payout for the player and then select the player's outcome for the main game.

If the dealer does not select a side bet payout and simply selects the main game outcome, the player did not win the side bet and the cursor moves to the next player's outcome.

Once the dealer result has been added, the dealer enter each player's result. First any sidebet wager/result is entered then the results of the Blackjack hand (Split, Lose, Push, Win, Blackjack).

Once all results are entered, the dealer selects to end the games and all awards/funds are distributed to the player accounts.

Each player device should show the respective player's, e.g., Win $10 or Blackjack $15) and also show side pot, side bet or Crown/Ribbon if available. If included, any progressive win may also be shown.

Once all awards are distributed, the players may start entering wagers and side bets on next hand or request a cash out. Once paid out dealer confirms and clicks player paid then starts next hand. Players can be entering stakes for the next hand at any time from game end until the next game starts. The dealer can return funds to one or all players before starting the next round.

This written description uses examples to disclose the first secondary aspect of the present invention, including the best mode, and also to enable any person skilled in the art to practice the invention, including making and using any devices or systems and performing any incorporated methods. It should be understood that the proposed method of applying virtual "Win Meters" and a customized game calculator could be applied to any manual table game.

Second Secondary Aspect of the Present Invention

With reference to FIGS. 22-29, in a second secondary aspect of the present invention, the system 10 is configured to allow players (or users) 402 to access one or more target device(s) 404, such as a table game or electronic table game 406 through a central or game server 408 utilizing one or more network connected device(s) 410. In some embodiments of the invention, dealer activities and game details are published by the game server 408 and displayed on a variety of display devices associated with the network connected device(s) 410. Exemplary network connected devices 410 include, but is not limited to player(s)' mobile computing device(s). In this embodiment tables are identified by Bluetooth beacons (not shown) and players are able to connect their portable computing devices 410 to specific tables 406 when they are within range of the beacons. Once player(s) are connected, the player(s) can assume a "virtual" seat at their selected table and can then interact with the table using controls provided by an application or user interface that is executed or presented on their mobile computing device 410. In one embodiment, the players can place wagers and can interact with the table game 406 and/or the dealer on a game being played on the table game 406 as a player and/or can place alternative or "back-end" wagers on the game being played.

In particular, the system and method are configured to connect: (1) a single user device or network connected device 410 to one or more target devices 404 through the server 408 over a network; (2) two or more user devices 410 to a single target device 410 through a server 408 over a network; and (3) multiple user devices 410 to multiple target devices 404 through a server 408 over a network. The user devices are typically any network connected devices ("NCDs") 410 through which a user/player can access a network. The NCDs include, but are not limited to a personal computer, laptop computer, tablet computer, mobile phone, internet connected home video gaming system, portable gaming device, internet connected television system with browser or app capabilities or any other network connectable device through which a user can gain access to a network. The target devices 404 are typically interactive devices with which a user interacts in real-time or near real-time over the network such as electronic gaming devices including but not limited to slot machines, video games and electronic table games, interactive displays and home appliances. In different embodiments with NCDs 410 and target devices 404 configured in any particular way, the interaction among the users at the NCDs and the target devices is concurrent.

Each NCD 410 may be connected to a network 412 such as a local area network ("LAN"), an Ethernet network or the internet, among other network types. Using the network 4122, it is possible for a user to interact with the server 408, such as a web server that is either co-located or remotely located from the NCD 410. Using pre-loaded software in the form of an application ("app") resident on the NCD 410 known as an app that is downloaded by the user, or using a browser or other general purpose access program, an NCD 410 operated by a user may communicate over the network 412 to transmit and receive information and instructions to accomplish a task. Such systems provide a platform for users to connect to a wide variety of web servers and websites across geographies.

The system 10 is configured to such that (1) a single user device 410 to be connected to one or more target devices 404 through a server 408 over a network 412; (2) two or more user devices 410 to be connected to a single target device 404 through a server 408 over a network 410; and (3) multiple users 402 accessing multiple target devices 404 concurrently, with two or more combinations of these activities being layered interactively.

The present invention overcomes the shortcomings of the prior art. It is a system and method that provides a platform for connecting: (1) a single user NCD 410 to one or more target devices 404 through a server 408 over a network 410; (2) two or more user NCDs 410 to a single target device 404 through a server 408 over a network 412; and (3) multiple user NCDs 410 to multiple target devices 404 through a server 408 over a network 412.

Each server or other target device 404 includes a software controller ("SC"). The present invention views each web server, live dealer table or software controller ("SC") 414. A SC 414 is assigned to each live dealer table or each virtual dealer (if such a configuration was required), as a separate "room" 416. The SC 414 partitions the room 416 by the number of NCDs 410 to allow unique concurrent interaction for an arbitrary number of users. Essentially, the server 408 creates a map by first partitioning the rooms 416, and then partitioning each room 416 on users. The server 408 then projects the local "room map" onto each SC 414, thereby creating a relationship between users and an allocated interaction on the SC 414. In this manner, it is also possible for each NCD 510 to have concurrent, unique interaction with multiple SCs 414.

In one embodiment, the system 10 is configured to enable the following process:

(1) the server 408 becomes aware of a given SC 414;
(2) the server 408 creates a new room 416 for each SC 414;
(3) each room 416 needs at least one input from an NCD 410 and at least one output from an SC 414; and
(4) room requirements (security, NCD-SC interaction, etc.) may be specified based on example.

From a high level, the server 408 may create a partitioning map which allows an arbitrary NCD 410 to have a unique interaction with a given SC 414 without blocking other NCDs 410 from also having unique interactions with the same SC at the same time.

It should be noted that a SC 414 may also be an NCD 410. Also, an NCD 410 may be input only or input and output while an SC 414 may be output only or input and output.

Figure 23:
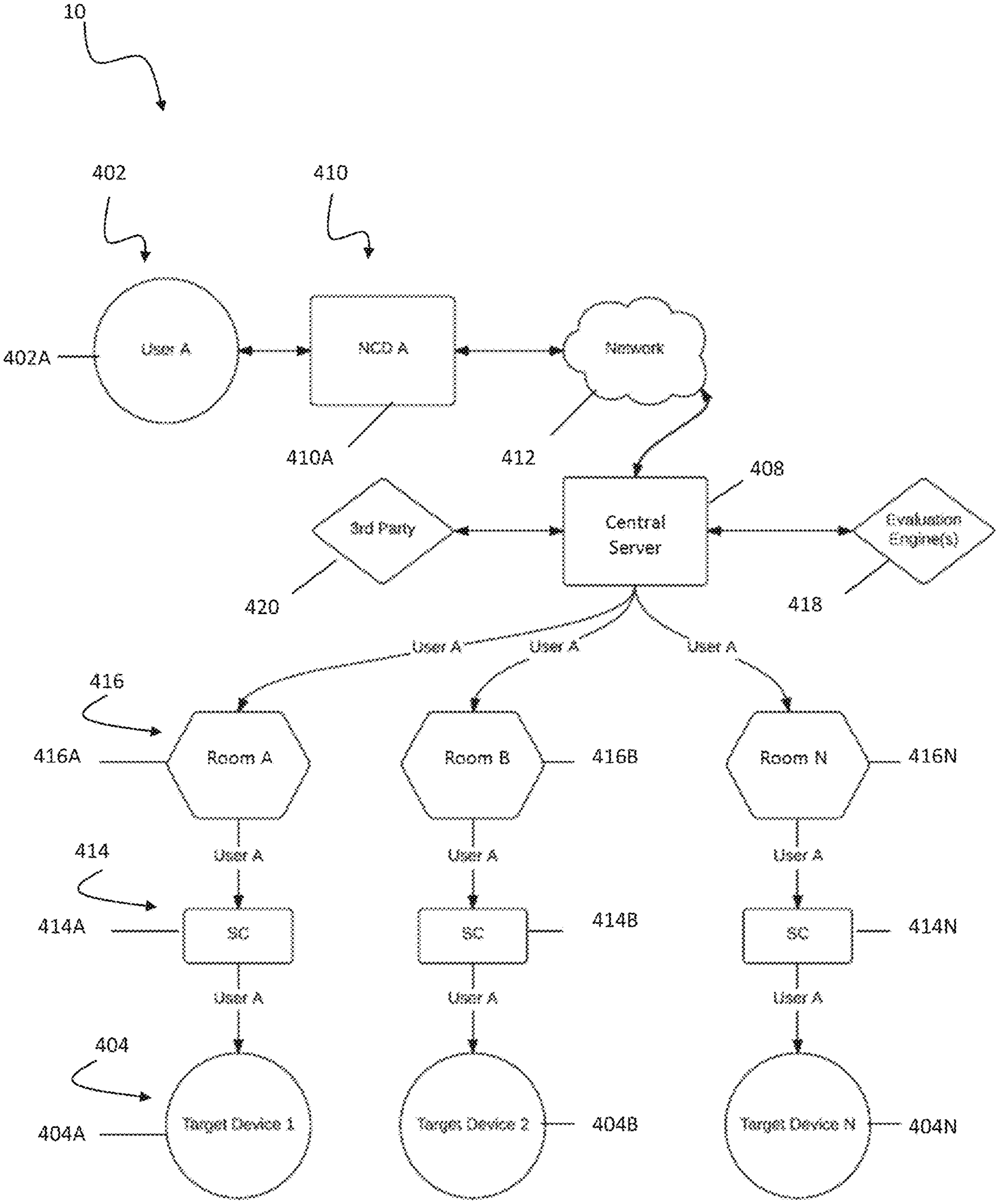
FIG. 23 is a block diagram of a system that allows a single user to connect to a plurality of target devices using a network connected device, according to an embodiment of the present invention.

With reference to FIG. 23, in one embodiment a single user 402 with a single NCD 410A is connected to multiple target devices 402A, 404B . . . , 404N over a network 412 served by a web server 408 with the target devices 404A, 404B . . . , 404N partitioned in different rooms, 414A, 414B . . . , 414N.

Figure 24:
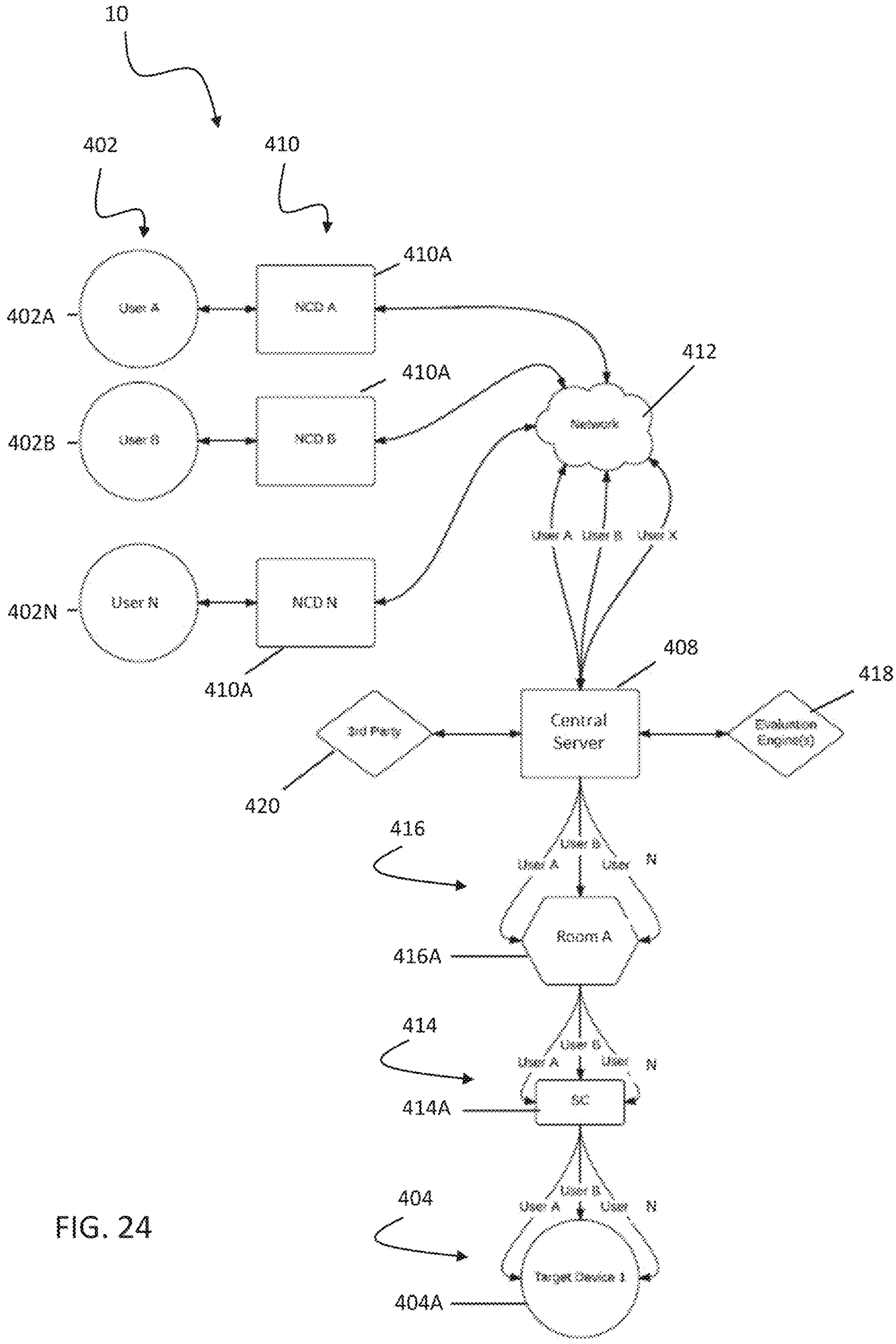
FIG. 24 is a block diagram of a system that allows a plurality of users to connect to a target device using respective network connected devices, according to an embodiment of the present invention.

With reference to FIG. 24, in one embodiment multiple users, User A, User B . . . , User N 402A, 402B . . . 402N, having associated NCDs 410A, 410B . . . , 410N are connected to a single target device 404A over a network 412 served by a web server 408. The target device 404A is partitioned in a single room 416A with or by a single software controller 414A.

Figure 25:
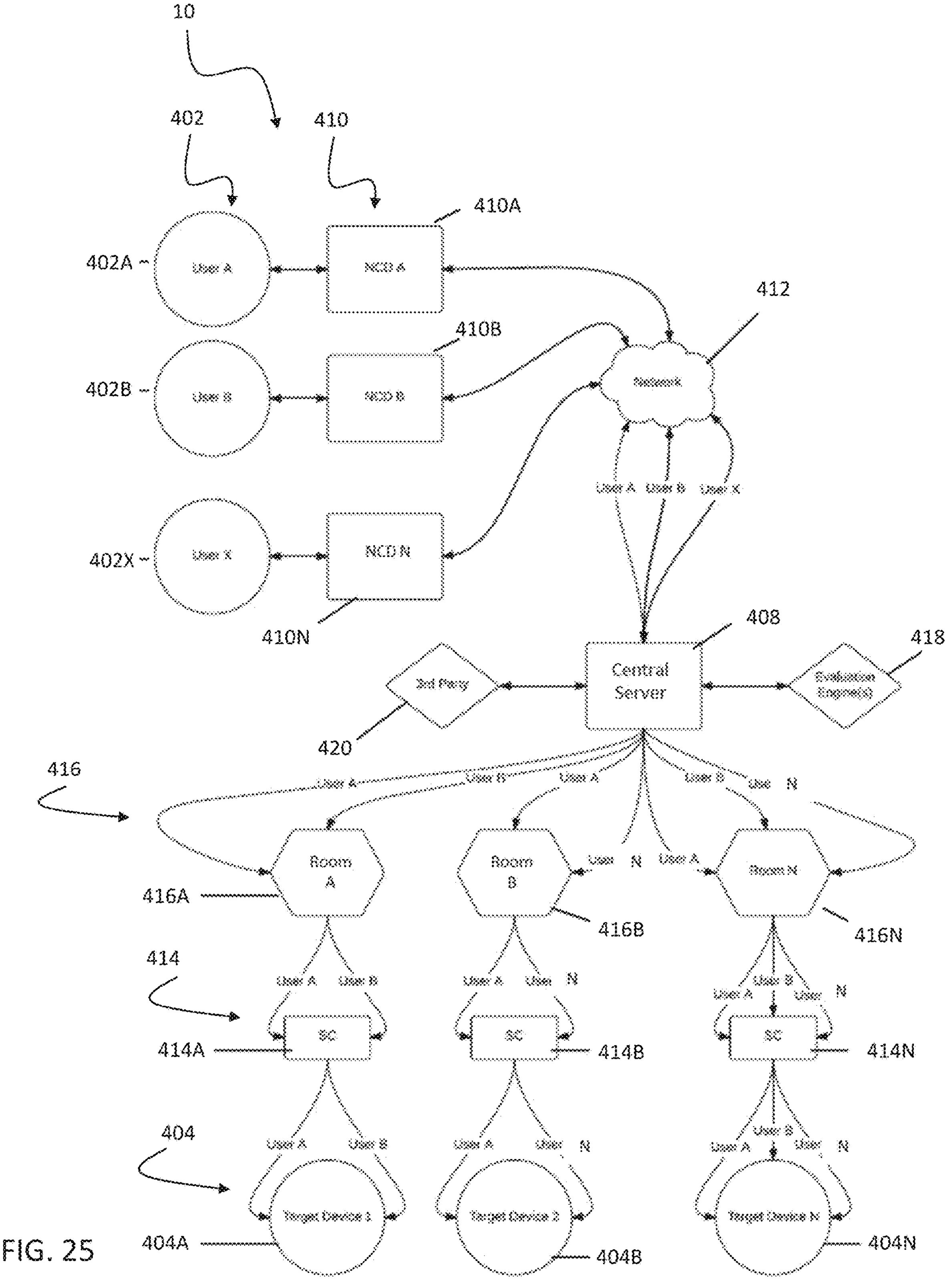
FIG. 25 is a block diagram of a system that allows a plurality of users to connect to a plurality of target devices using a plurality of network connected devices, according to an embodiment of the present invention.

With reference to FIG. 25, in another embodiment multiple users, User A, User B . . . , User X, having associated NCDs, NCD A 410A, NCD B 410B . . . , and NCD N 410N are connected to multiple target devices Target Device A 404A, Target Device B 404B . . . , and Target Device N 404, over a network 412 concurrently, served by a web server 408. The target devices 404A, 404B . . . , 404N are partitioned in different rooms, Room A 414A, Room B 414B . . . , and Room N 404N, wherein the activities of each user interacting with multiple target devices and each target device interacting with multiple users are concurrent.

FIG. 26 shows a sample Pari-mutuel Baccarat pay table that shows how many pot shares can be won by a player for correctly selecting a specific winning combination.

Figure 27:
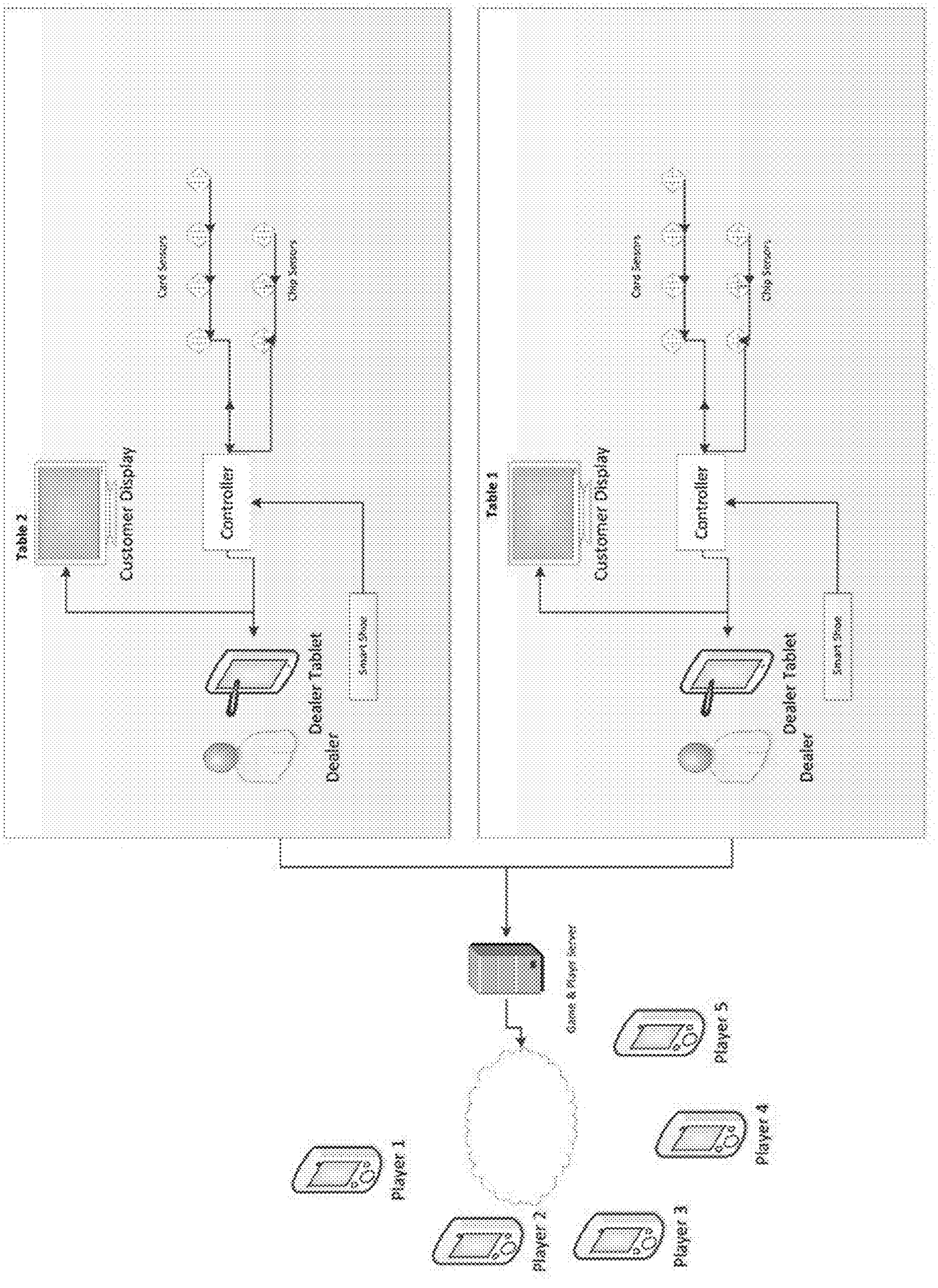
FIG. 27 is an exemplary table game configuration with multiple tables, according to an embodiment of the present invention.

FIG. 27 shows a sample table game configuration where there are multiple tables, configured with smart shoes, card and chip sensors, a controller and a dealer who is using a Tablet device to input game and player activities. A customer display shows players located at each table the status of each game while remote players are participating in gaming activities using mobile computing devices.

FIG. 28 shows a sample paytable of a complex version of Baccarat where players are able to wager on specific Player or Banker outcomes. Such a game would result in complex calculations and fractional chip payouts and would only become feasible if the table was managed using the described game calculator and Virtual Win Meters.

FIG. 29 shows a sample complex side bet game for Baccarat where players are able to wager on the future outcomes of a number of games. In this instance correctly predicting the Player/Banker combinations for 3 games would pay 7 times a players wager while 4 games would pay 14 times. Such a game would result in complex calculations and fractional chip payouts and would only become feasible if the table was managed using the described game calculator and Virtual Win Meters.

Figure 22:
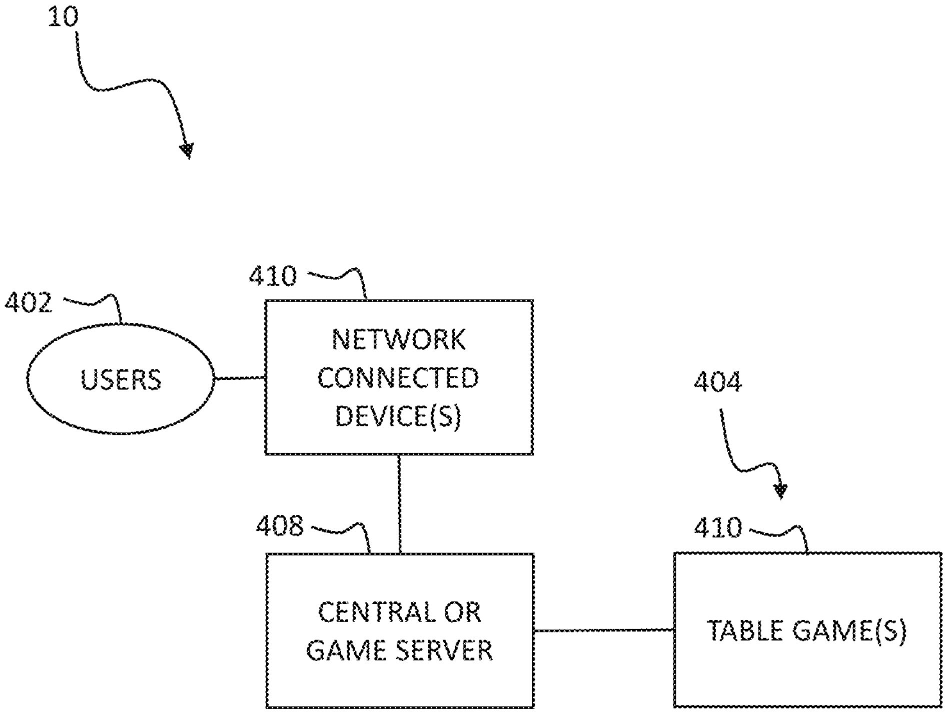
FIG. 22 is a block diagram of a system that allows one or more users to connect to one or more target devices using one or more network connected devices, according to an embodiment of the present invention.

With reference to FIG. 22, and the exemplary systems shown in FIGS. 23-25, the system 10 includes a central server 408. The central server or server 408 enables an arbitrary networked computing device (NCD) 410 to interact in real-time or near real-time with one or more software controllers (SCs) 414 concurrently. Furthermore, if an NCD 410 is interacting with more than one SC 414, interaction on one SC 414 does not necessarily affect interaction on any other SC 414. The multiple interaction between an NCD 410 and one or more SCs 414 is referred to throughout this specification as super-concurrency. At a high level, the server 408 may assign each of the software controllers 414 to a node, which is referred there as a "room" 416.

The server 408 partitions the room(s) 416 with a number of NCDs 410 interacting with a corresponding SC 414 thereby allowing concurrent unique interaction for an arbitrary number of users in a room 416. Essentially, the server 408 creates a room map by first partitioning on the rooms 416, and then partitioning each room 416 based on users 402. The server 408 projects the local "room map" onto each SC 414 creating a bidirectional relationship between users and allocated interaction on the software controllers 414.

In FIG. 23, a single user 402A is shown using the NCD 410A to gain access to the server 1408 through network 1412. Further, the multiple software controllers 414A, 414B . . . , 414N are shown each connected to a respective target device 404A, 404B . . . , 404N.

In FIG. 24, an alternative system configuration is shown in which two or more users 402A, 402B . . . 404N, each with a corresponding NCD 410A, 410B . . . , 410N, are connected to concurrently interact with a single target device 404A over network 408 served by the central server 408. The target 404A is partitioned in node or room A 416. Operation of the system configuration of FIG. 24 is similar to that of FIG. 23 with multiple users 402 and a single target device 404A.

FIG. 25 shows a third alternative configuration in which multiple users 402A, 402B . . . , 402X, each with a corresponding NCD 410A, 410B . . . , 410N access multiple target devices 404A, 404B . . . , 404N concurrently. In this configuration, two or more combinations of user activities taking place in respective rooms, Room A 416A, Room B 416B . . . , Room N 416N, are layered interactively. Operation of the system configuration of FIG. 25 is similar to that of FIGS. 23 and 24 with multiple users 402 and multiple target devices 404.

Operation of system 10 will now be described. Initially, a software controller 414 establishes a connection with the central server 408 using, for example, an asynchronous, event-driven bi-directional communications channel ("AEBC"). The connection is typically one using known technology such as web sockets, ash sockets, or other methods which recreate this connectivity functionality; and relying on an authentication/authorization procedure to establish that the software controller 414 is acceptable to connect and interact with the server 408. Initial authentication by the SC 414 is attempted using a login process involving the sending of a token or information packet. If the server 408 receives the authentication token and accepts it, an AEBC will be established between the software controller SC 414 and the server 408. Otherwise, the server 408 refuses further communications from the SC 414. If the SC 414 is not output only (i.e., input and output), then the SC 115 will attempt authorization.

The server 408 will use an authorization system to validate information from the authentication token or information packet and assign permissions to the SC 414. Note, this may be global authorization (allowing for any interaction from the SC 414), or it may be interaction specific (each interaction requires separate authorization). As shown in the configurations of FIGS. 23-25, the authorization system may require a 3rd party back-end 420 to perform the authorization. If the server 408 accepts authorization, then the SC 414 may interact with the server 408 in the specified manner. Otherwise, the SC 414 will remain output-only if the authorization is global, or the SC 414 will refrain from the specified interaction if the authorization is interaction-specific. The server 408 assigns the SC 414 to a room 416 based on the authentication token/information packet. It may be the case that the server 408 will need to create this room. The logic and mechanism for determining room assignment and creation is largely example-specific. The server 408 actively monitors the SC 414 through the use of standard keep-alive technology (heartbeats, or something similar) in order to make sure that the SC 414 is still active and connected. The server 408 maintains a running menu of active rooms and active SCs 414 in each room 416. The conditions on this menu (whether it is visible to a given user, whether a given room or SC is private, etc.) are largely example specific.

Establishing the use of an NCD 410 on the network 412 to connect to the server 408 requires authentication/authorization as is the case with connection of the software controllers 414. Upon acceptance of an NCD 410, the server 408 will assign the particular NCD 410 to one or more target software controllers 414. The process of accepting an NCD 410 begins when an NCD 414 locates the server 408 (in most cases through the use of a website over network 412. The NCD 410 attempts initial authentication, typically, through a login process involving the sending of a token or information packet. If the server 408 receives the authentication token and accepts it, an AEBC will be established between the NCD 410 and the server 408. Otherwise, the server 105 will refuse further communication from the NCD 410. The NCD 410 may be either input only or input and output. In either case, the NCD 410 will attempt authorization. The server 105 uses an authorization system to validate information from the authentication token or information packet and assign permissions to the software controller 414. Note, this may be global authorization (allowing for any interaction from the SC 414), or it may be interaction specific (each interaction requires separate authorization). As shown in the different configurations of FIGS. 23-25, the authorization system may require a 3rd party back-end 420 as described above.

If the server 408 accepts authorization, then the NCD 410 may interact with the server 408 in the (specified) manner. Otherwise, the server 105 will notify the NCD 410 and the AEBC will be terminated in the case that the authorization is global. Or the NCD 110 will refrain from the specified interaction in the case that the authorization is interaction-specific. The server 408 actively monitors the NCD 410 through the use of standard keep-alive technology (heartbeats, or something similar) in order to make sure that the NCD 410 is still active and connected. The server 105 assigns the NCD 410 to a room 416 based on the authentication/authorization information and on the room and active SC menu. Note, the NCD 410 may play some part in choosing this assignment depending on implementation (choosing a particular poker in which to play, for example). The server 408, through the use of evaluation engines 418, facilitates interaction between the NCD 410 and a target SC 414 by room 416. In the majority of cases, each interaction is authorized before being evaluated and sent on to the SC 414.

There is a log out process for both the SC 414 and the NCD 410. A log-out communication is sent through the AEBC. Upon receipt, the server 408 terminates the session with the AEBC. In most cases, all information pertaining to the SC 414 or the NCD 410 will be cleared. In some cases, however, it may be necessary to keep some information in permanent memory of server 408.

There are a variety of applications for the system and method of the invention. One example is for use in multi-player interactive games conducted on system 100 where multiple payers are playing the same game at the same time with the potential to interact with each other. Among the many different approaches to offering such games, two examples are land-based multi-player games and web-based multi-player games. It should be understood that other approaches may also be used, but for purposes of simplicity, these two examples are presented.

In land-based multi-player games, the game is presented to the player (or user 402) in a game cabinet in an arcade, a casino or another venue for offering electronic games by an operator. When the user enters the establishment, player 402 approaches a desired electronic gaming machine (EGM) on the floor. This device is a "target device" 414 as described above with respect to FIGS. 22-25. The Player 125 402 access the EGM 414 using a website/app through an NCD 402 such as a cell phone, tablet, PC or other device. The player 402 establishes a connection between the NCD 410 and the server 408, and will consequently log in to EGM 414. In this case, the player 402 will likely have a gaming account containing such things as a wallet, a profile, and a list of preferences, among other things stored on the server 408. Upon successful authentication, the player 402 identifies a desired gaming machine 404 among those in the facility connected to server 408. This can be accomplished through a variety of means: typing in a location code found on the physical EGM 414; reading a QR code or some other code with the NCD 410 on the machine or presented on the display of the machine; geolocation; etc.

Upon successful identification of desired the target device of EGM 414, the NCD 410 is assigned to a proper room 416 with a corresponding SC 414 which controls desired the EGM 414. The player 402 then plays the game through server 408 and the associated evaluation engine 418 using the authorization system when necessary (when exchanging money, for example). Other players may come and go and log-in to the same machine, potentially interacting with the original player according to game rules and in appropriate circumstances. Upon completion of the game, the player 402 will log-out of the gaming system, potentially cashing-out in the process if the game is a for-wager gambling game.

In web-based multi-player games, the game is presented to the player (or user 402) over a network accessed through a website on any device including but not limited to a smartphone or other NCD described herein as well as other access devices such as a dedicated a hotel room TV system or another medium for accessing and playing games remotely over a network. The user will log in to the gaming system from an NCD in a home, hotel room, or some other location.

In this case, as in the land-based use case, a player 402 will likely have a gaming account containing such things as a wallet, a profile, and a list of preferences, among other things stored on server 408. If necessary, the player 402 will identify and log in an independent display as an SC 414. For a hotel room, the player 402 identifies the TV in his or her room either through the hotel gaming system with room ID, QR code, location code, geolocation, or some other method.

Upon successful authentication, the player 402 chooses a game that he or she would like to enter among a selection of games offered. Once an open game is selected, the player 402 is assigned to a room 416 containing the appropriate SCs 414 which control independent displays for each player 402. The independent displays are on the NCD or other device being used by the player 402 to play the game.

The player 402 plays the game through server 408 and the associated evaluation engine(s) 418 using the authorization system. Evaluation engine(s) 418 determine which SCs the player 402 will interact with as well as the method of interaction. The player 402 may play in multiple games (rooms) concurrently. Furthermore, play in one game will not necessarily affect play in any other game simultaneously in play. Note—this is the above defined notion of super concurrency. Upon completion of the gaming experience, the player 402 logs-out of the gaming system.

Other uses of the system and method will be readily apparent to one of ordinary skill in the art. For example, the system can be used for control of a residential, commercial or industrial facility such as the heating system. In one application, the user would carry a NCD and would access the system to control the temperature to better accommodate the users preferences. It could also be used in a large factory setting in order to set safety preferences for a given user in a given "room" in which they are moving/operating. In this case, the networked mobile computing device might simply be a small enclosed chip that the person carries in a pocket or on a necklace.

Other uses include, but are not limited to an educational environment such as an interactive display at a museum, to interact with a ride at an amusement park, in the medical field for controlling medical devices servicing a patient or at a presentation where the SC might control a meeting room so that a presenter could control everything from lighting to a projector displaying a power point presentation on a screen through the use of an NCD.

System and Method for a Pari-Mutuel Tournament

In still another aspect of the present invention, the system 10 may be configured to provide a pari-mutuel tournament through which the volatility of "House Banked" gambling games, such as Blackjack, Baccarat, Craps and Roulette is controlled. Through control of the volatility of such games, the cash-flow risks associated with operating such games may be reduced, while at the same time offering the potential of winning larger awards relative to the size of their wagers for participating players. The invention is also applicable to other games such as video poker or Slot Games.

As described herein, the system 10 may also provide a method of adding new levels of social interaction and player dependencies into gambling games, such as wide area progressive for house banked (non-electronic or physical) table games. The system 10 may be used to convert traditional Class III gambling games into instant cash tournaments.

The methods described herein may be used to control the volatility of "House" operated gambling games, particularly, "house banked" table games such as Blackjack, Baccarat and Roulette by creating pari-mutuel style prize pools funded by participant players' wagers and awarding players' shares in the "prize pools" based on the outcomes of each gaming event. These methods may also be applied to any house banked gambling game such as slot machines, video poker, or in any situation in which traditional pay tables can be replaced with pari-mutuel style prizes funded by player wagers. Players play for prize pool shares that are driven by their game results, i.e., the player with the best winning result gets proportionally more than other winning players. Players with non-winning results win nothing.

There are risks associated with operating gambling games and that at times gambling game operators can face cash flow challenges for periods of time when players win more than they do. This challenge is common for operators of games that are highly volatile or have small house advantages such as traditionally "House Banked" table games such as Blackjack, Baccarat and Roulette. Hence there is a need for casino operators to find ways of minimizing the cash-flow risks associated with operating gambling games.

Historically one solution has been to introduce side bet opportunities such as "Insurance" with more beneficial house odds or by increasing the hold percentage of slot or lottery games. Players are often suspicious of such features or activities and are often unwilling to participate in them particularly if they influence players to change their basic game strategy. An ideal mechanism to address this need would be to allow players to play against each other as opposed to against the house as is common with the game of poker, where the house merely charges a fee to facilitate each game. Furthermore, if such fees were based on a percentage of total wagers the house would have the benefit of operating zero risk, fixed odds games.

At the same time, players are often frustrated by the level of volatility offered by gambling games, particularly games such as traditionally house banked games such as Blackjack, Baccarat and Roulette. In the example of Blackjack, players are accustomed to winning 1.5 times their wager as a top award for each game. Often players have the desire to put more or less at risk with each game event based on their gambling appetite. For example, some players might prefer the opportunity of winning 2, 3 or more times their wager during each gaming event.

One way of satisfying both players and game operators would be to have players effectively play for shares of wager based prize pools instead of playing for fixed rewards associated with odds and "PayTables".

For example, if a number of players were playing a game of blackjack each would make an opening wager which would be accrued to a game specific prize pool. The game operator might take a percentage of each wager or charge a fee to pay for facilitating the game; once the initial cards are dealt, players might choose to make additional wagers associated with wagering activities such as "Splitting" or "Doubling Down". Once again the operator might claim fees or percentages of such wagers. The balance of these incremental wagers would likewise be accrued into the game specific prize pool.

To resolve the game each player would make selections such as "Standing", or asking for more cards till they either achieve 21 or "Bust". Finally, the dealer would deal their final cards and either be forced by game rules to "Stand", or would on a player specific basis either win, draw, or lose. The outcome of the game would be that players would either "Win", "Lose", or "Draw".

Traditionally players would at this point either forfeit their wager or be awarded amounts equal to or 1.5 (sometimes 2) times the amount of their wager based on whether they "Bust", lost, drew or achieved "Blackjack"; and these awards would be distributed by the Dealer on behalf of the "House" (or in some Class II instances where players bank games, on their own behalf) and the awards would in no way contemplate other players that might have been involved in the game.

In the present invention, players would receive "Shares" in the prize pool based on their individual game outcomes, i.e., players that lost or "Bust" would receive zero, while players that "Drew" would each receive one share, players that beat the dealer with hands less than 21 would each receive two shares and players that got Blackjack would receive two and a half shares (or if applicable 3). The prize pool would then be divided amongst the winning players on a basis proportional to the number of prize pool shares held. In the event that that all the players either lost to the dealer or "Bust", the cash balance would be rolled forward into the next game's prize pool, making the award potential in that game that much larger.

A table containing a number of sample game results comparing traditional Class III Blackjack game payouts with volatility controlled payouts according to an exemplary embodiment is shown in FIG. 30.

In traditional house banked table games, players play against the house and there is little or no consequence attached to by other players to who wins and who loses. A secondary benefit of the proposed scenario is that players are directly impacted by the gaming results of other players, for example if 5 players were playing and 4 of them lost or bust, then the remaining player would win the entire pooled award, resulting in a more socially engaging game.

Wide Area Progressives for House Banked Table Games (without Wires)

In Traditional house banked table games, the odds providing the house advantage are often so small that they are a prohibitive factor to providing compelling progressively accrued awards. To compensate for this shortcoming, most traditional table game progressive bonusing products are funded by side or secondary wagers. Another benefit of the proposed scenario is the potential of offering large, rapidly accruing, progressive bonus awards without exposing the game operator to cash flow risks. Because game operators are able to set the house advantage, they are able to allocate portions of their fees to bonus events and accrued awards without exposing themselves to operating risk. One ideal implementation would be that the house takes 10% from every wager, keeping 50% of the fee to fund operations and allocating the balance to a progressive award. In some instances these progressive awards can be combined across tables and even in some instances across locations. A suitable triggering event such as a specific card sequence can be set to trigger the bonus award, for example Ace, 2,3,4,5 all of the same suite. Thus the first player to be dealt a hand comprising the triggering card sequence would win the accrued progressive award.

Class II and III Tournaments

Traditionally House banked games are not generally considered to be Class II approvable games, in fact traditional Blackjack is specifically excluded from the Class II group of games. Pari-mutuel style tournaments in which players compete against each other for pooled prizes are however accepted in most Class II jurisdictions as eligible approvable games. Traditionally tournaments consist of sessions/games and rounds. For example, players enter a tournament and play through a predefined number of games/sessions to complete a round. At times winners from more than one round are invited to complete in play-offs for grand prizes. One of the most common differences between a traditional Blackjack Tournament and a class III blackjack game is that tournaments consist of multiple sessions or games and awards or prizes are only distributed after the tournament is complete.

Figure 31B:
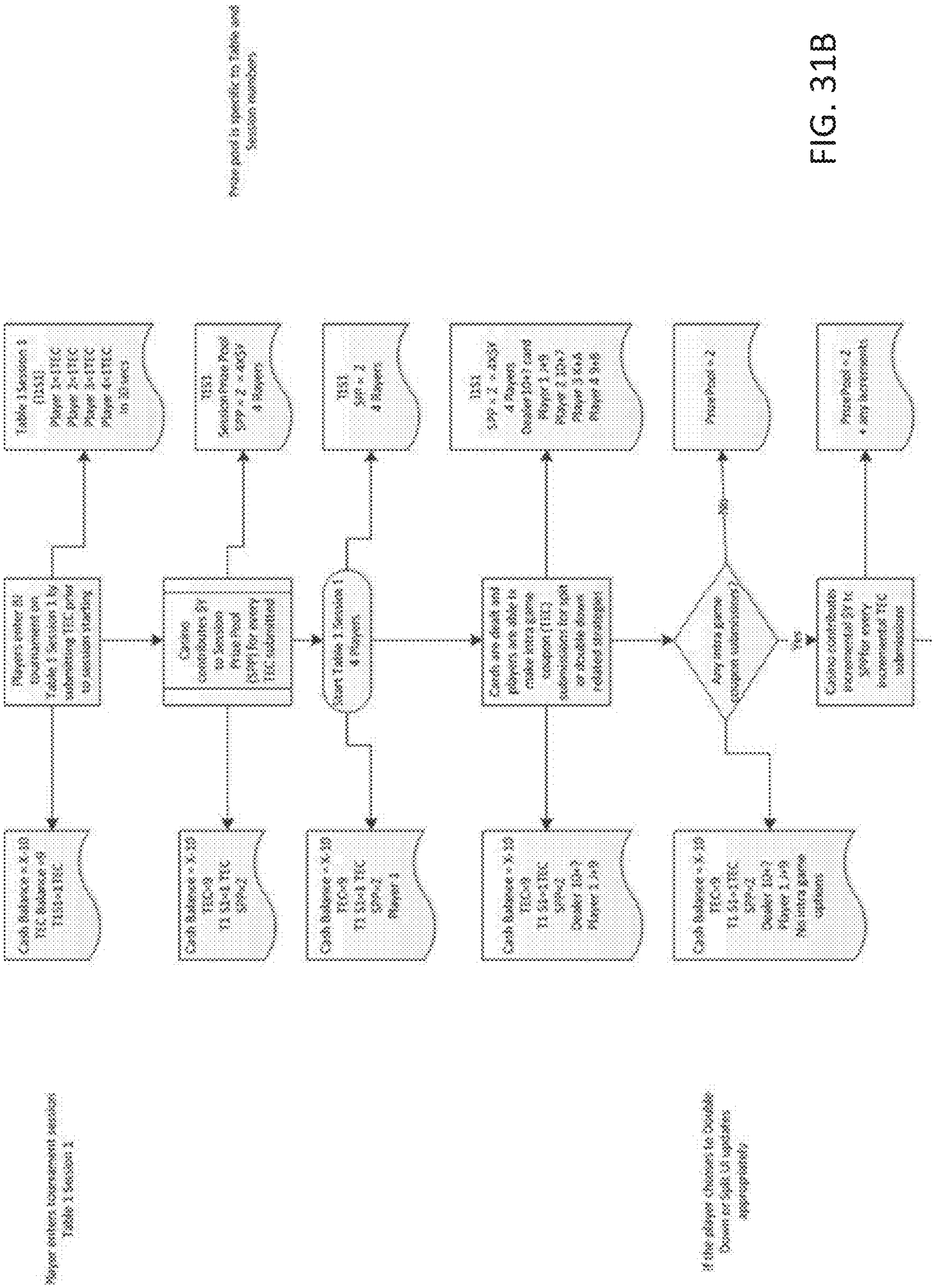
Figure 31C:
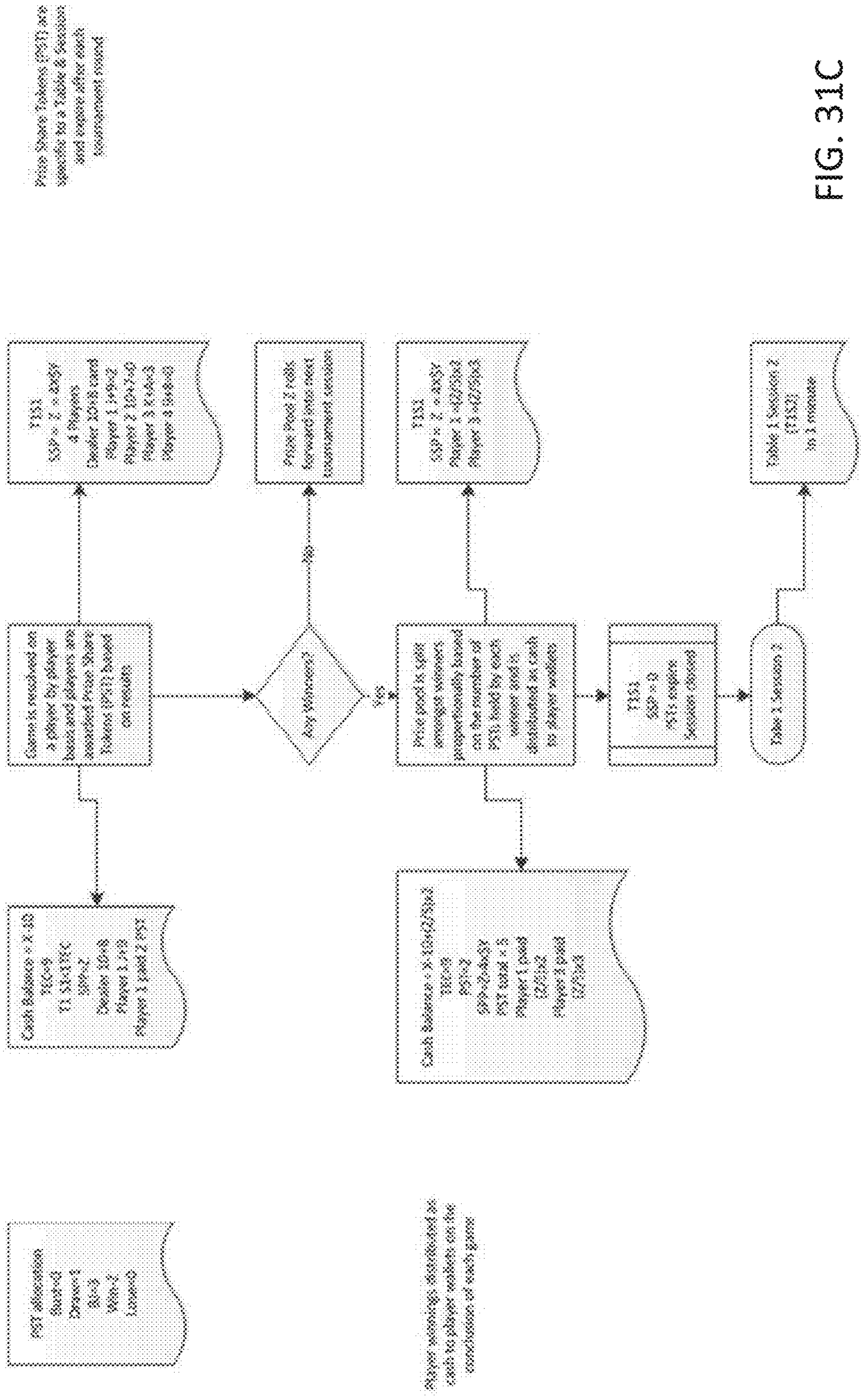
Figure 32:
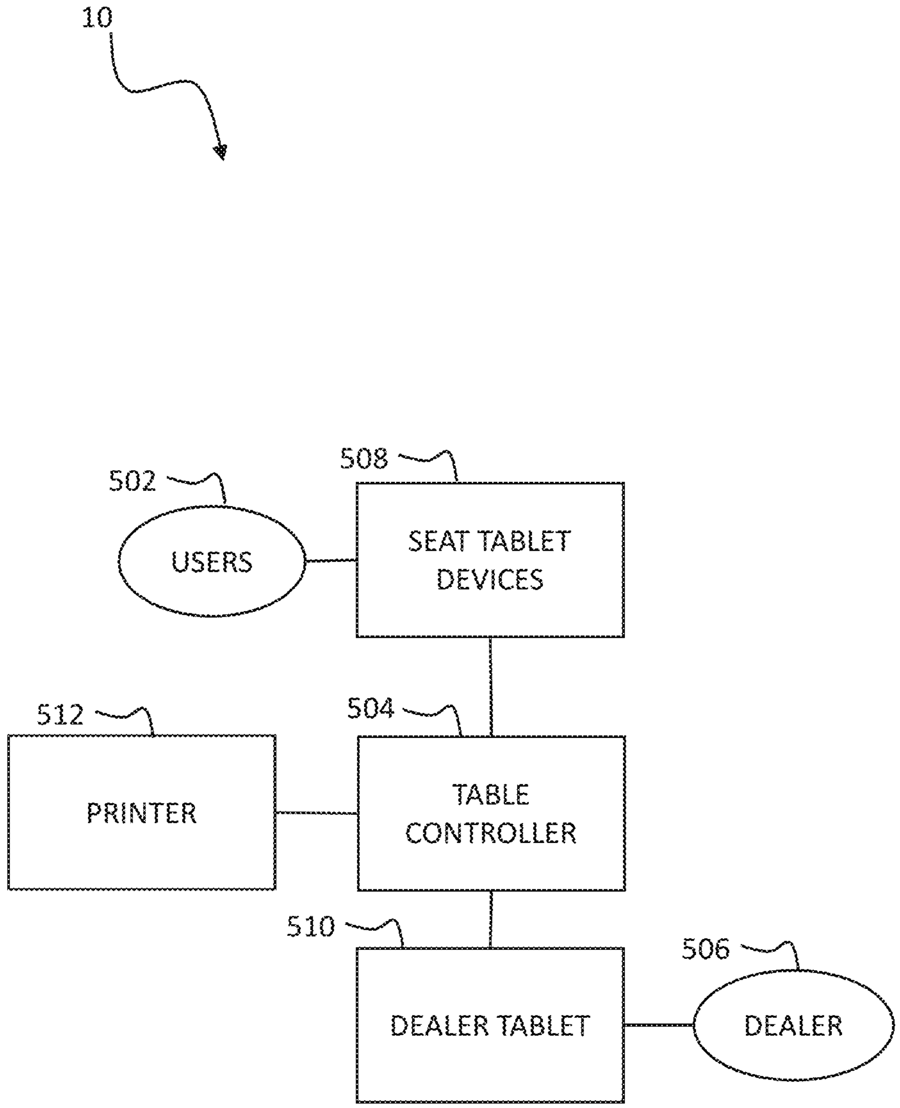
FIG. 32 is a block diagram of a system for providing an automated single session pari-mutuel tournament for a house-banked table games, according to an embodiment of the present invention.

The flow diagram in FIGS. 31A-31C, illustrates a sample game flow where the proposed scenario is implemented as an approvable Class II cash tournament. In this scenario a tournament consists of a single game/session and a cash prize is awarded on the conclusion of each game/session.

Figure 2:
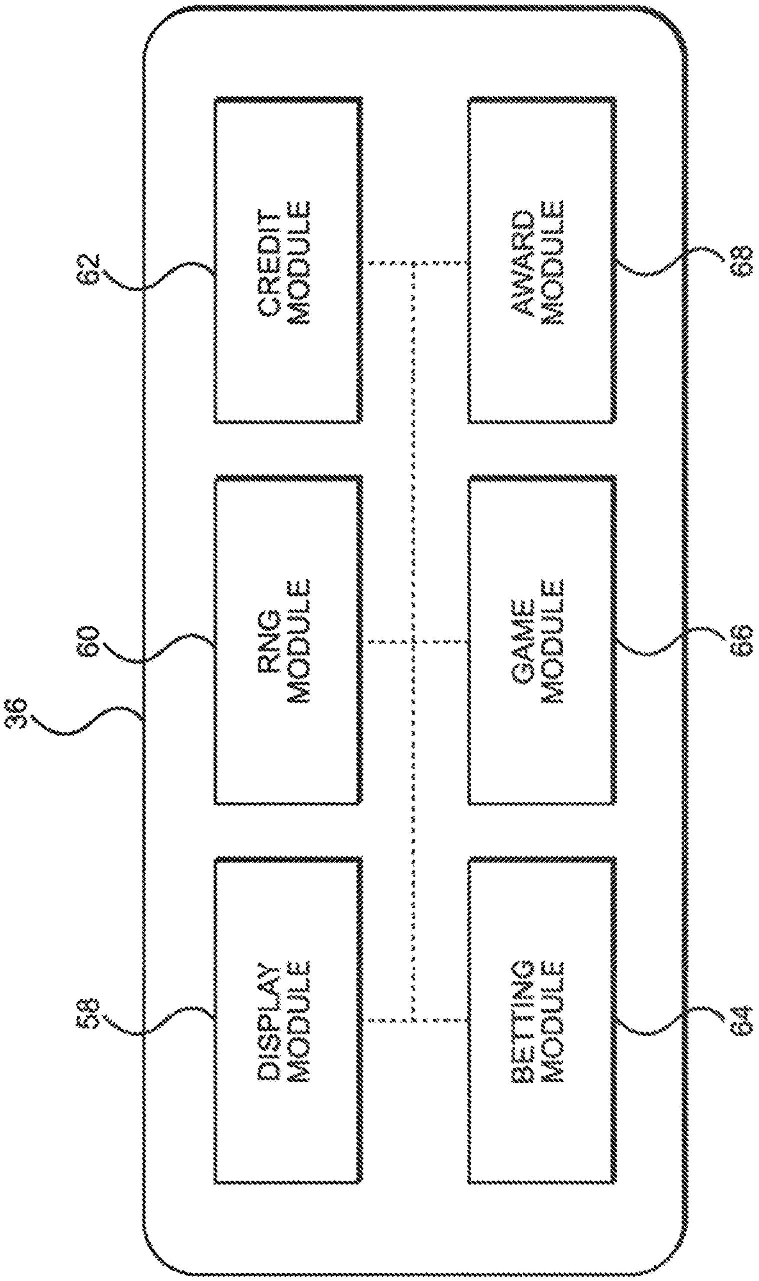
FIG. 2 is schematic view of a gaming controller that may be used with the system shown in FIG. 1.

In this scenario players purchase tournament entry coupons (TEC) from the game operator. The coupons are used to enter specific tournament sessions and are used instead of cash or credits to carry out intragame wagering activities such as splitting or doubling down. Game operators offer cash prizes for each tournament session based on the number of TECs submitted by players. (In the event that there are progressive awards, these awards increment in real-time based on the number of TECs submitted to each game.) For example, if 7 TECs were submitted during a specific tournament session the tournament the tournament operator might offer a prize of $5×7 for the tournament session. Players are awarded prize pool shares (PPS) based on the result of each game. These PPSs are redeemed for cash at the end of each tournament session. PPSs are specific to each unique tournament session and prize pool and expire once the prize pool is dispersed amongst winning players. Prize money can then be used by players to instantly purchase more TECs. (See FIG. 2) In this fashion the game flow is more in step with a traditional class III game of blackjack than with a Class II tournament.

Pari-Mutuel Baccarat

In the game of Baccarat players are used to placing wagers on whether the winning outcome of a dealt game will be Player, Banker or Tie. Traditionally in this game winning outcomes pay as follows:

Player 2×

Banker 1.95×

Tie 8×

And similarly to Blackjack, the house hold in the game is very low, usually below 1%. One way to make the game more interesting for players and also more lucrative for operators is to implement a tiered wagering model where wagers are placed not just on an outcome of player/banker or tie but on something more specific such as a "Player win with an outcome less than 9 or 8 or 7, etc." each with a slightly different number of pari-mutuel pot shares.

The pari-mutuel (or "Player Pot") tournaments may be configured to provide for single session pari-mutuel tournaments for tournaments for traditionally house-banked table games, such as Blackjack, Craps, Roulette and Baccarat. The system can easily be deployed on traditional felt tables to offer both operators and players several advantages over traditional multi session tournaments and even in some instances over their Class III game equivalents. From the operator's perspective, single session pari-mutuel tournaments allow operators to set and control their house advantage:

- Operators charge a fixed fee for tournament entries,
- Operators contribute a fixed amount to each table/session's pot per entry; i.e. Entry=$11, Pot contribution=$10, House %=10,
- Since tournament entry fees are fixed, card counting is not relevant,
- Single session tournaments keep cash in circulation and allow churn, and
- Pari-mutuel tournaments are Class II compliant From the player's perspective:

- Players can enjoy greater volatility than that offered by traditional Blackjack without having to modify their game strategies or place side-bets,
- Players play against the dealer (who does not share in the Pot) for shares of the pot and do not for fixed odds returns,
- Since the house does not share in the Pot players are effectively competing with each other for greater shares of the pot and hence sessions are very socially engaging,
- Single session tournaments pay awards at the end of every game allowing players cash-flow convenience.

The general game flow is described below. Players can enter tournament sessions using entry coupons. Similar coupons may be used to enable intragame wagering actions such as splitting or doubling down. The house contributes a fixed cash amount to each session's "Prize" for every coupon used by the players. Sessions consist of a single game cycle. Dealers complete gameplay normally, but pay winners "Prize" share tokens instead of chips:

- Loss=0 share tokens;
- Draw=1 share tokens;
- Win=2 share tokens; and,
- Blackjack=3 share tokens.

When the session is concluded, the dealer's total the number of tokens issued, and "Prizes" are divvied up amongst players/entrants based on the number of tokens they were awarded. If all the players lose the Prize rolls over into the next session.

Blackjack tables are an ideal target for Player Pot tournaments. Blackjack Player Pot Tournaments may be provided automated or manual.

Figure 33A:
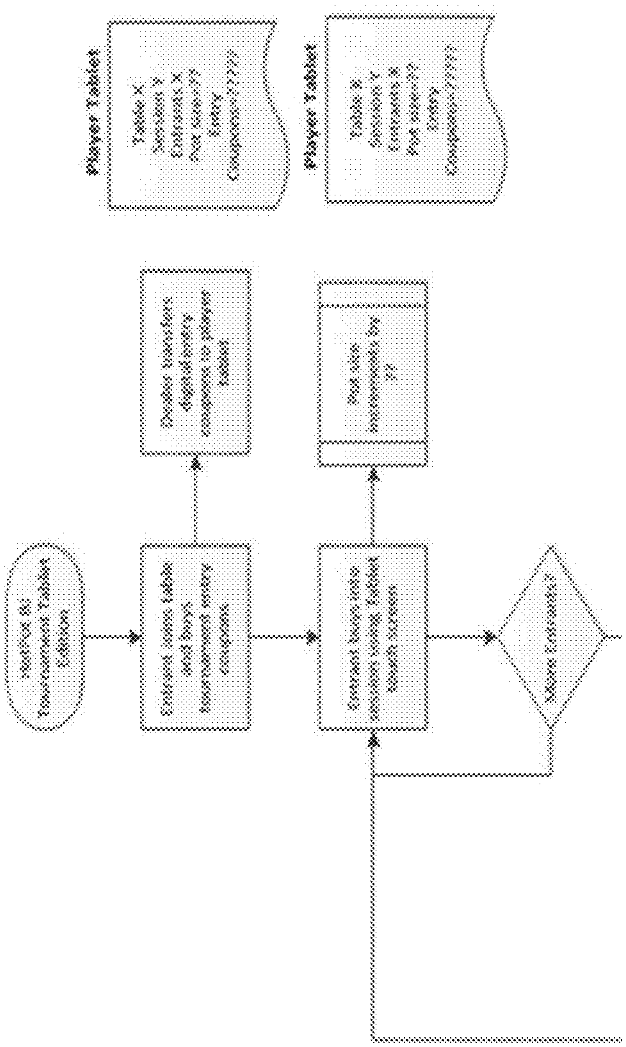
FIGS. 33A-33C are a flow diagrams associated with the system of FIG. 32, according to an embodiment of the present invention.
Figure 33B:
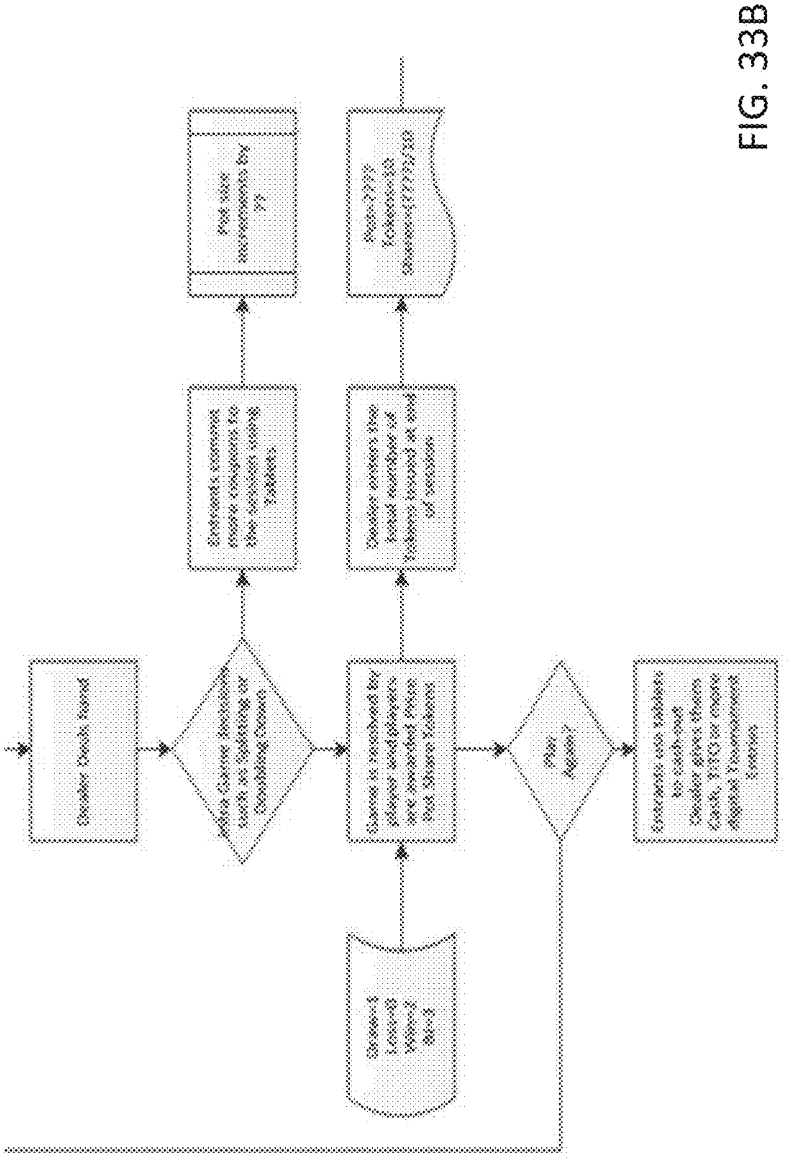
Figure 33C:
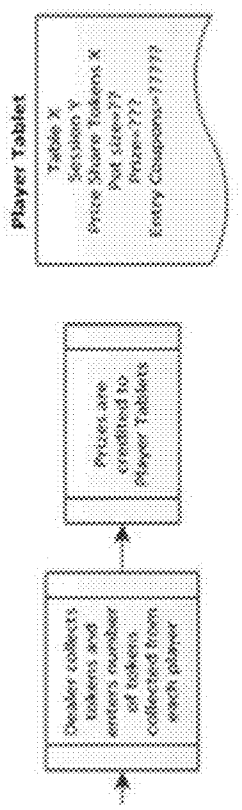
Figure 35:
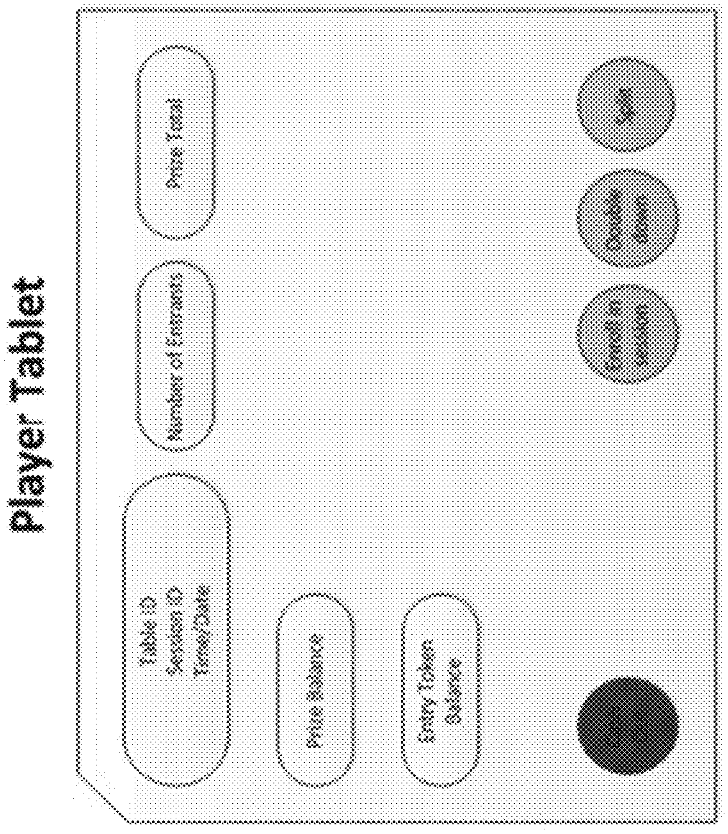
FIG. 35 is an exemplary screen shot of a player table of the system of FIG. 32, according to an embodiment of the present invention.
Figure 34:
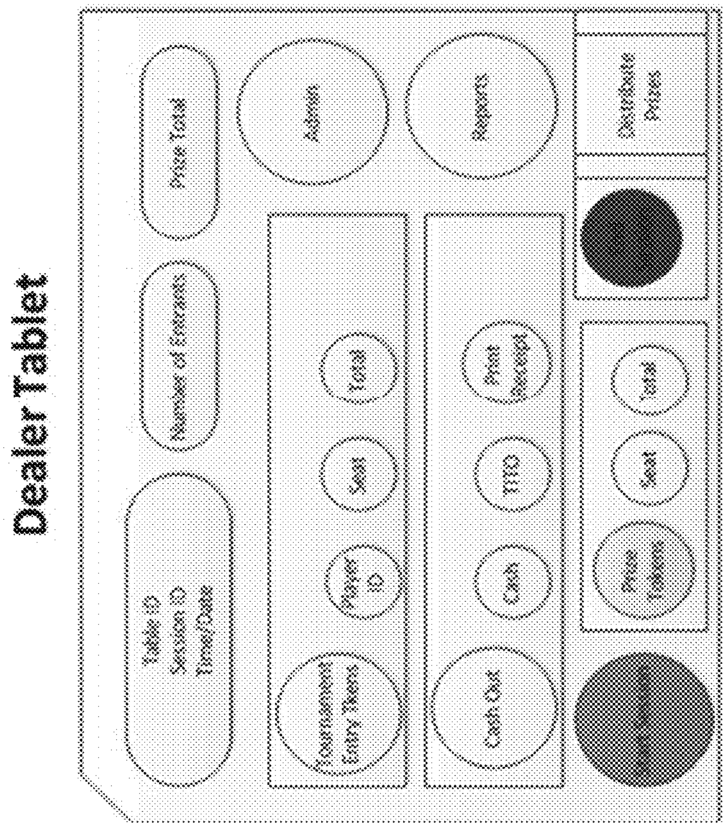
FIG. 34 is an exemplary screen shot of a dealer tablet of the system of FIG. 32, according to an embodiment of the present invention.
Figure 36:
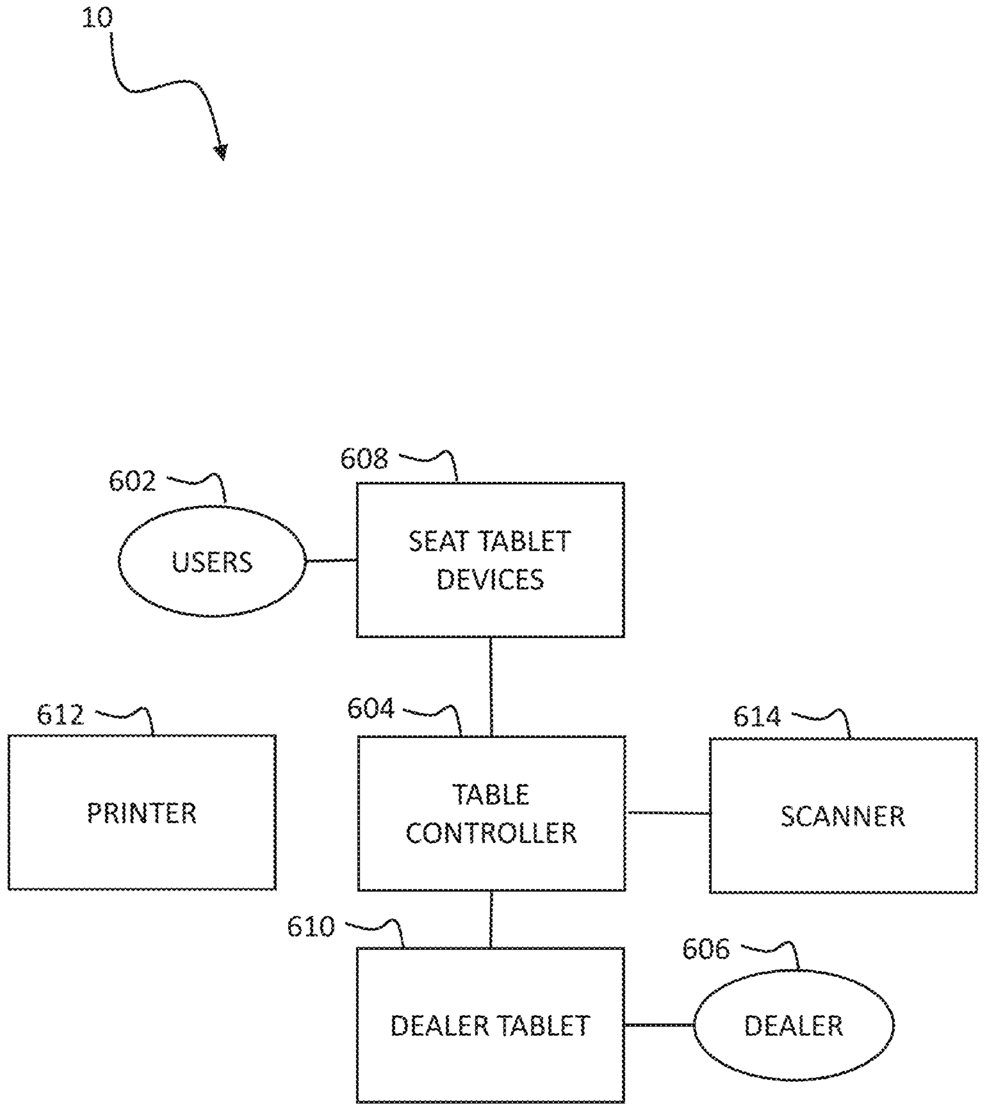
FIG. 36 is a block diagram of a system for providing an automated single session pari-mutuel tournament for a house-banked table games, according to an embodiment of the present invention.

With reference to FIGS. 32-35, an automated Blackjack Player Pot Tournament embodiment is shown. The automated tournament solution comprises of a set of seat tablet devices 508, for use by users or players 502 that are tethered or positioned at player positions on existing tables. The dealer 506 is equipped with a similar tablet 510 as well as a TITO printer 512 connected to a table controller 504. A flow diagram of the operation of the automated tournament solution is shown in FIG. 33. In general, the players buy tournament entry tokens at the table by giving the dealer cash or cash equivalent. The dealer, using the dealer table 510 (see FIG. 34) transfers digital entry tokens to the credit meter on the tablet located at the player's seat. Players use the tablet touch screen to buy into sessions and perform intra-game wagering transactions (see FIG. 35). The tablets 508, 510 display tournament session and prize pool information. At the conclusion of each game prizes are credited to players' respective tablets 508. Players can cash out at any time and are either given cash or a TITO ticket by the dealer. Relevant Tournament data is logged by the table controller 504 and reports are available to the dealer as well as to back of house functions through an Admin Application.

Figure 37A:
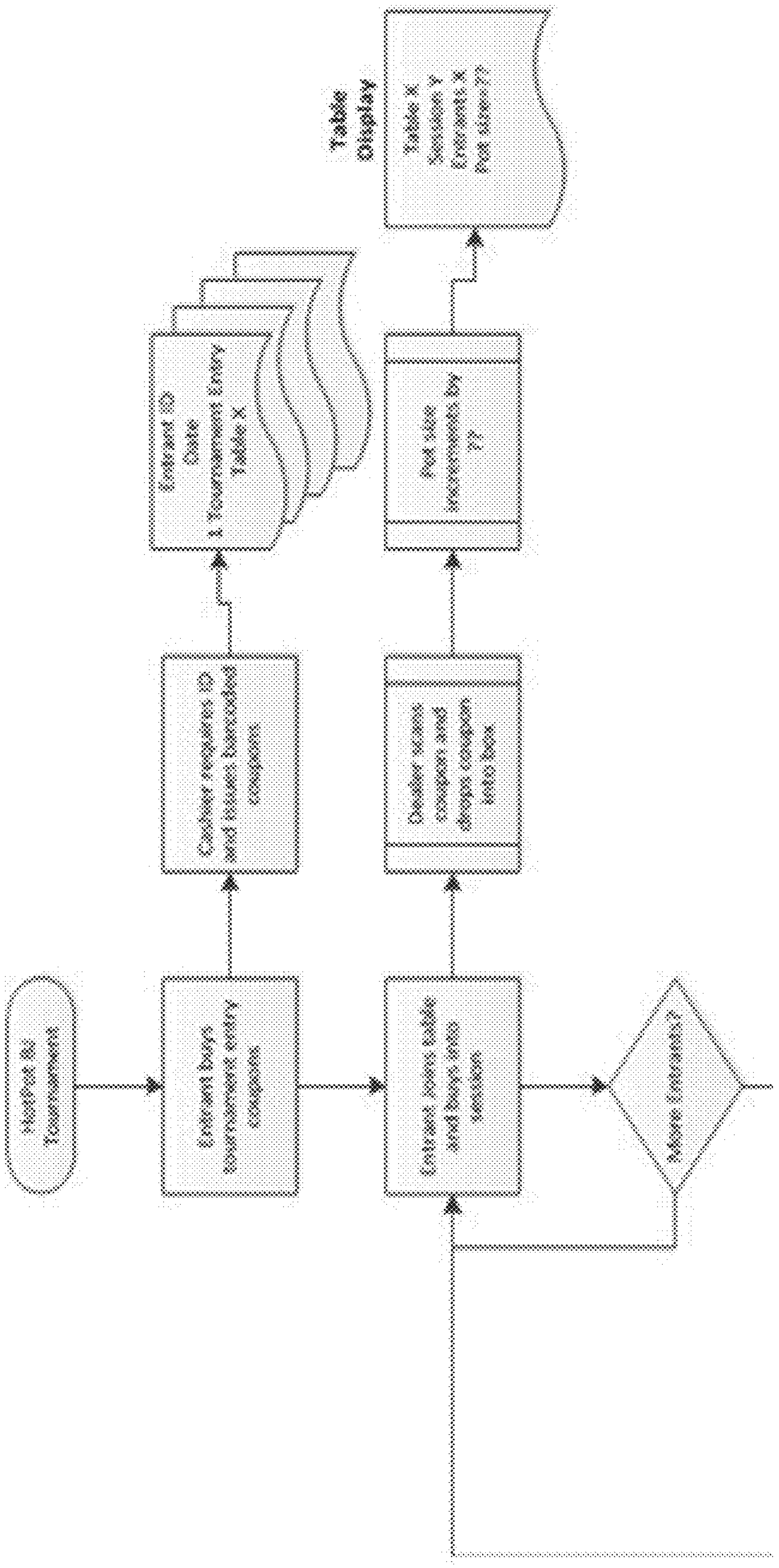
FIGS. 37A-37C are a flow diagrams associated with the system of FIG. 36, according to an embodiment of the present invention.
Figure 37B:
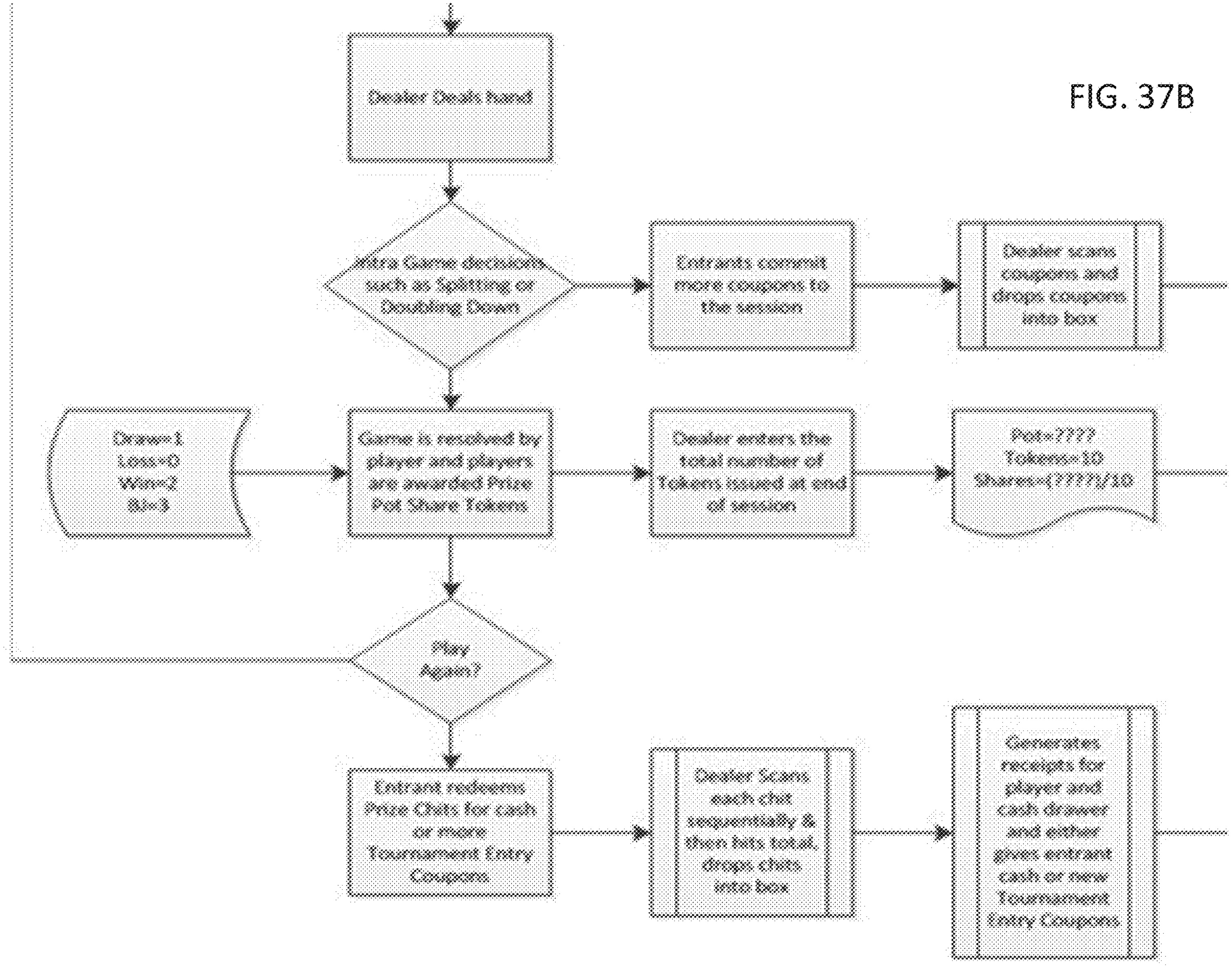
Figure 37C:
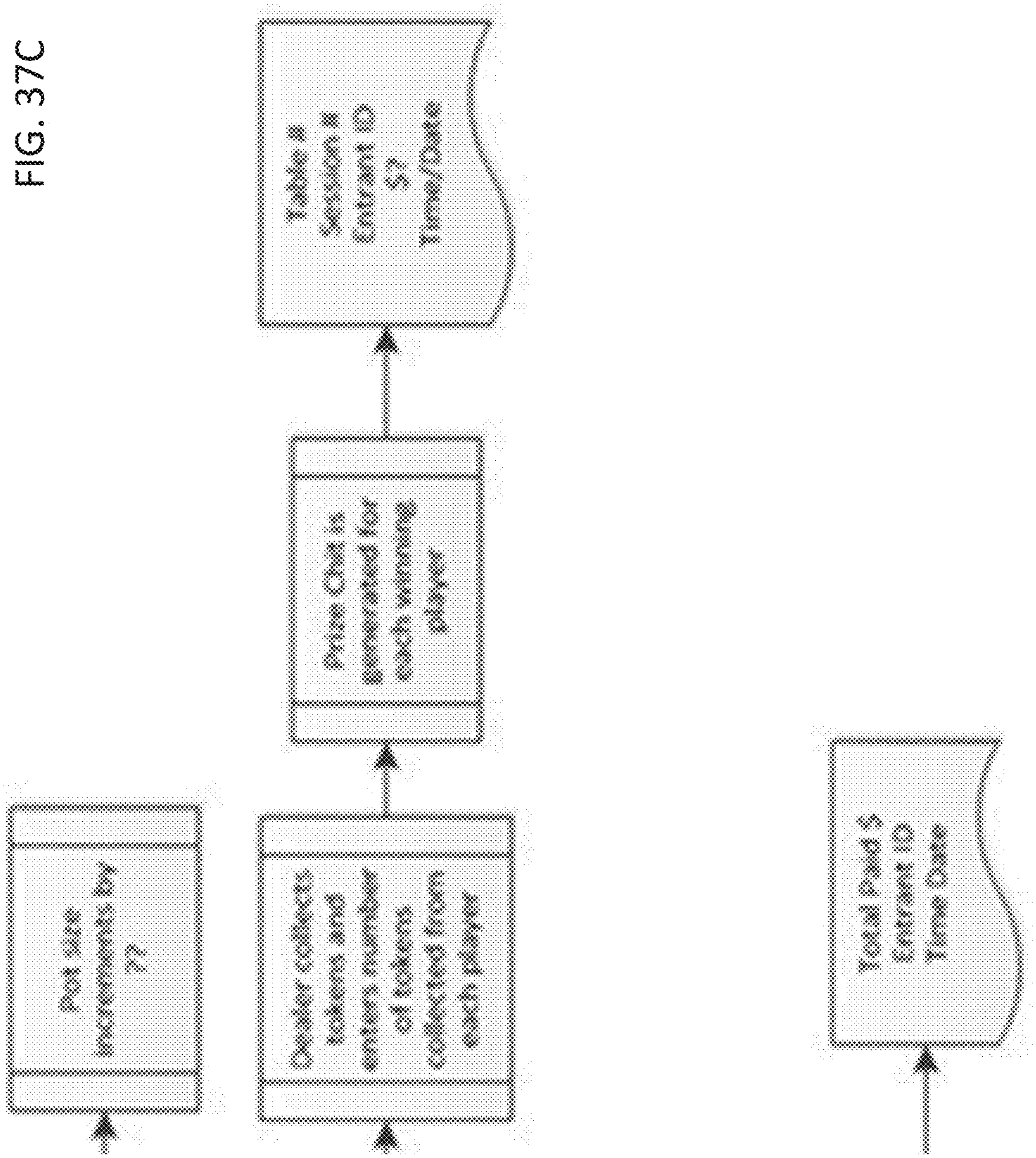
Figure 38:
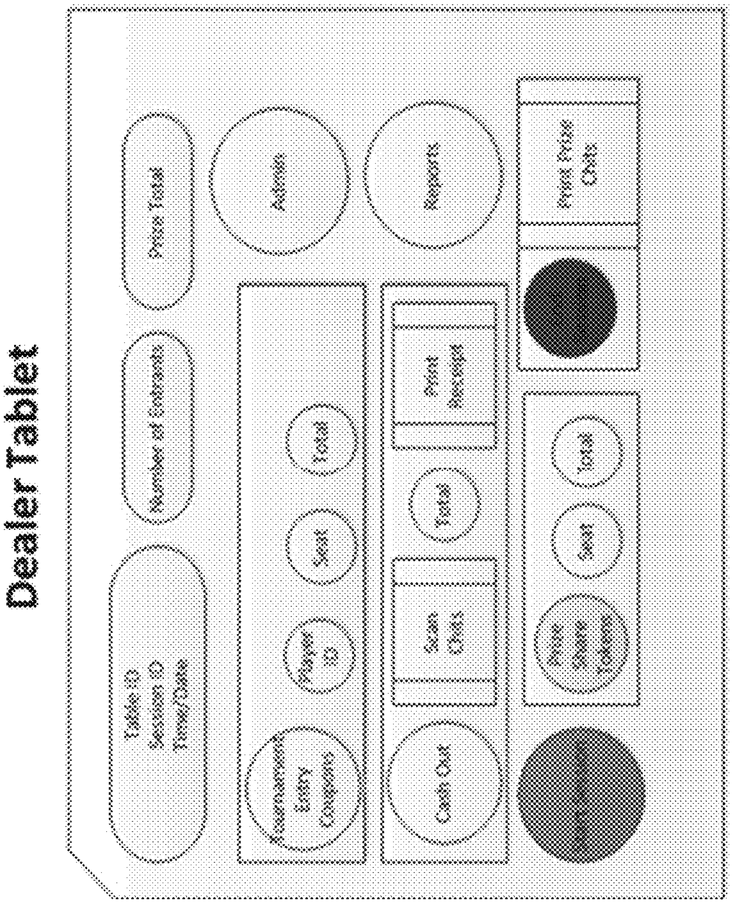
FIG. 38 is an exemplary screen shot of a dealer tablet of the system of FIG. 36, according to an embodiment of the present invention.
Figure 39:
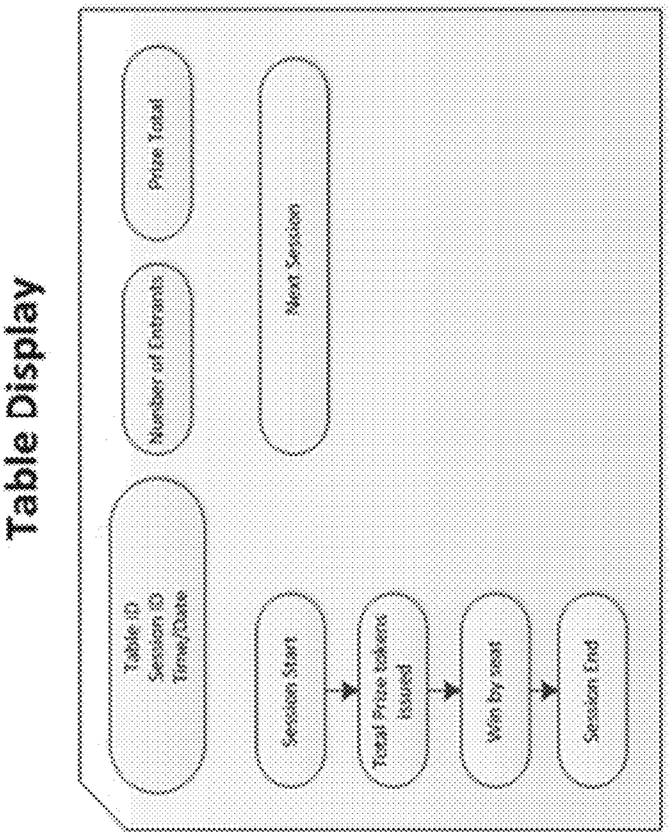
FIG. 39 is an exemplary screen shot of a player table of the system of FIG. 36, according to an embodiment of the present invention.

With reference to FIGS. 36-39, a manual automated Blackjack Player Pot Tournament embodiment is shown. The manual tournament solution comprises of a set of seat tablet devices 608, for use by users or players 602 that are tethered or positioned at player positions on existing tables. The dealer 606 is equipped with a similar tablet 610 as well as a TITO printer 612 and a barcode scanner 614 connected to a table controller 504. The table may also be provided a drop box for receiving cash and tickets. A flow diagram of the operation of the automated tournament solution is shown in FIG. 37. In general, the players buy tournament entry tokens at the table by giving the dealer cash or cash equivalent. The dealer, using the dealer table 610 (see FIG. 38) transfers digital entry tokens to the credit meter on the tablet located at the player's seat. Players use the tablet touch screen to buy into sessions and perform intra-game wagering transactions (see FIG. 39). The tablets 608, 610 display tournament session and prize pool information. At the conclusion of each game prizes are credited to players' respective tablets 608. Players can cash out at any time and are either given cash or a TITO ticket by the dealer. Relevant Tournament data is logged by the table controller 604 and reports are available to the dealer as well as to back of house functions through an Admin Application.

Returning to FIGS. 17, 17A and 17B, in one embodiment of the present invention, the system 10 includes a dealer device 300 and at least one player device 312. The dealer device 300 includes a dealer display device 300A, a memory device 300B and a dealer control unit 300C. The player device 312 includes a player display unit 312A and a player control unit 312B. The dealer device 312 is located at a gaming device 304, such as a table game 304. The gaming device 312 is configured to provide a game to a plurality of players. The dealer display unit 300A is configured to display a dealer screen including computer generated graphics. The memory device 300B is configured to store a data structure and a dealer execution program. The data structure stores a plurality of player accounts. The dealer control unit 300C is coupled to the dealer display unit 300A and the memory device 300B and executes the dealer execution program for allowing the dealer 306 to manage the player accounts. The dealer control unit 300C includes a processor programmed to display a dealer display structure on the dealer display unit 300A. The dealer display structure forms at least part of a dealer graphical user interface. The processor of the dealer control unit 300 is further programmed to allow a dealer to enter funds, received from one of the players, to a respective one of the plurality of player accounts.

The funds are stored in a financial unit utilized by the system. The financial unit has a base financial unit. As discussed above, the system 10 may use chips (real or virtual); currency or credits. In systems that use chips, multiple chips have different values (generally currency values). The base financial unit for systems using chips, currency or credits, would be the lowest denomination available, e.g., the lowest value chip, a cent ($0.01), or 1 credit. As discussed above, the system 10 generally allows for wagers or combination of wagers in for which payouts or awards to be made in fractions of the base financial unit.

The processor of the dealer control unit 300 is further programmed to allow the dealer to finalize wagers made on an instance of the game after one or more players have entered a wager, to allow the dealer to enter an outcome of the instance of the game played on the gaming device, to calculate a change in the player account of each player who made a wager on the instance of the game and to effectuate the respective change in each player account. The change in at least one of the player accounts is a fractional amount of the base financial unit. The at least one player device 312 may be located at the gaming device 304. Each player device 312 includes a player display unit 312A and a player control unit 312B. The player display unit 312A is configured to display a player screen including computer generated graphics. The player control unit 312B is coupled to the player display unit 312A and is programmed to allow each respective player to enter a wager on the instance of the game, to display the outcome of the instance of the game and to display wager and player account data to the player.

In one embodiment, the dealer device 300 may be a computer or tablet device. The player device 312 may be a computer or tablet device. Alternatively, the player display unit 312A may be coupled to the dealer display device. The player control unit 312A may be implemented, at least in part, by the processor of the dealer control unit 300C.

Once wagers are made and finalized, the game may be played in a conventional manner. For example, if the game is blackjack, the dealer starts an instance of the blackjack game by dealing a blackjack hand to each player and then a dealer hand. The instance of the blackjack hand is played out and once the outcome of the game for each player has been determined or established, the dealer enters the outcome of the instance of the blackjack game using the game input mechanism 310. In one embodiment, the processor of the dealer control unit 300C is programmed to allow the dealer to enter the outcome of the instance of the game by presenting to the dealer a menu of possible outcomes and allowing the dealer to select one of the possible outcomes.

In one embodiment, the dealer device 300 may receive an indication of the outcome from an outcome sensor and the processor is programmed to allow the dealer to enter the outcome of the instance of the game by presenting to the dealer the outcome received from the outcome sensor and allowing the dealer to accept the presented outcome. For example, as discussed above, the system 10 may utilize one or more card sensors, such as RFID readers, barcode scanners or cameras, to read and track the cards dealt to each player and the dealer. The processor receives the output of such sensors and establishes the outcome as a function thereof. In one embodiment, the system 10 may utilize a smart shoe coupled to the dealer device 300 from which the dealer distributes cards to the players during the instance of the game. The processor of the dealer device 300 may be programmed to receive data from the smart shoe related to the cards distributed to the players and to populate the outcome for each player as a function of the cards distributed to the players.

In one embodiment, the game has an associated pay table based on fixed odds, e.g., blackjack. The processor in calculating a change in the player account of each player is programmed to award the player an award as a function on the pay table in response to a winning outcome.

In some embodiments, the player control unit 312B is programmed to allow each player to enter a side bet on a side game. The side game may be related or unrelated to the main game. The processor of the dealer control unit 300C is programmed to allow the dealer to accept the side bet and to enter an outcome of the side bet game. The processor of the dealer control unit 300C, in calculating a change in the player account of each player, is programmed to allow the dealer to enter a side bet award to the player.

In one embodiment, the dealer device 300 may send a signal to an external security system (not shown), if the change in the player account exceeds a predetermined threshold. For example, the external security system may include one or more security cameras. The external security system automatically capture or record video in response to receiving the signal and/or may alert a user of the security of the system.

In one embodiment, the dealer may receive funds directly from the players, e.g., cash or physical chips. The dealer may enter the received funds using the dealer graphical user interface. The dealer control unit 300C converts the funds into the financial units of the system 10 (if needed) and adds the funds to the respective player account.

In one embodiment the player control unit 312B of each player device is implemented, at least in part, by the processor of the dealer control unit 300A. In another embodiment, each player control unit 312B includes a player device processor.

In another embodiment, the game is a pari-mutuel game, wherein each play plays against each other in the game. The processor may be further programmed to aggregate the wagers made by the players into a pot and subtract a rake from the pot. In a pari-mutuel game, the outcome entered by the dealer for each player is selected from a set of possible outcomes. The set of possible outcomes includes a loss outcome and a win outcome, wherein the processor awards each player with the win outcome a portion of the pot.

In another embodiment, each player plays against the dealer in an instance of the game. The at least one player device is programmed to allow the respective player to enter a first wager and a second wager. The first wager may have an associated first pay table and the second wager has a second pay table, wherein the first and second pay tables are different.

In one embodiment, any payout based on the second wager is paid to a dealer account, i.e., the payout may be treated as a tip to the dealer.

Each player may otherwise tip the dealer, at any time or at cashout.

The players may cashout upon request input at the player device 312. Upon receiving such a request, the processor of the dealer control unit 300C converts the funds in the player account to currency. Any remaining, i.e., fractional amounts, may be transferred to a separate virtual meter, which may be, for example, a dealer tip meter or a progressive jackpot meter.

Figure 42:
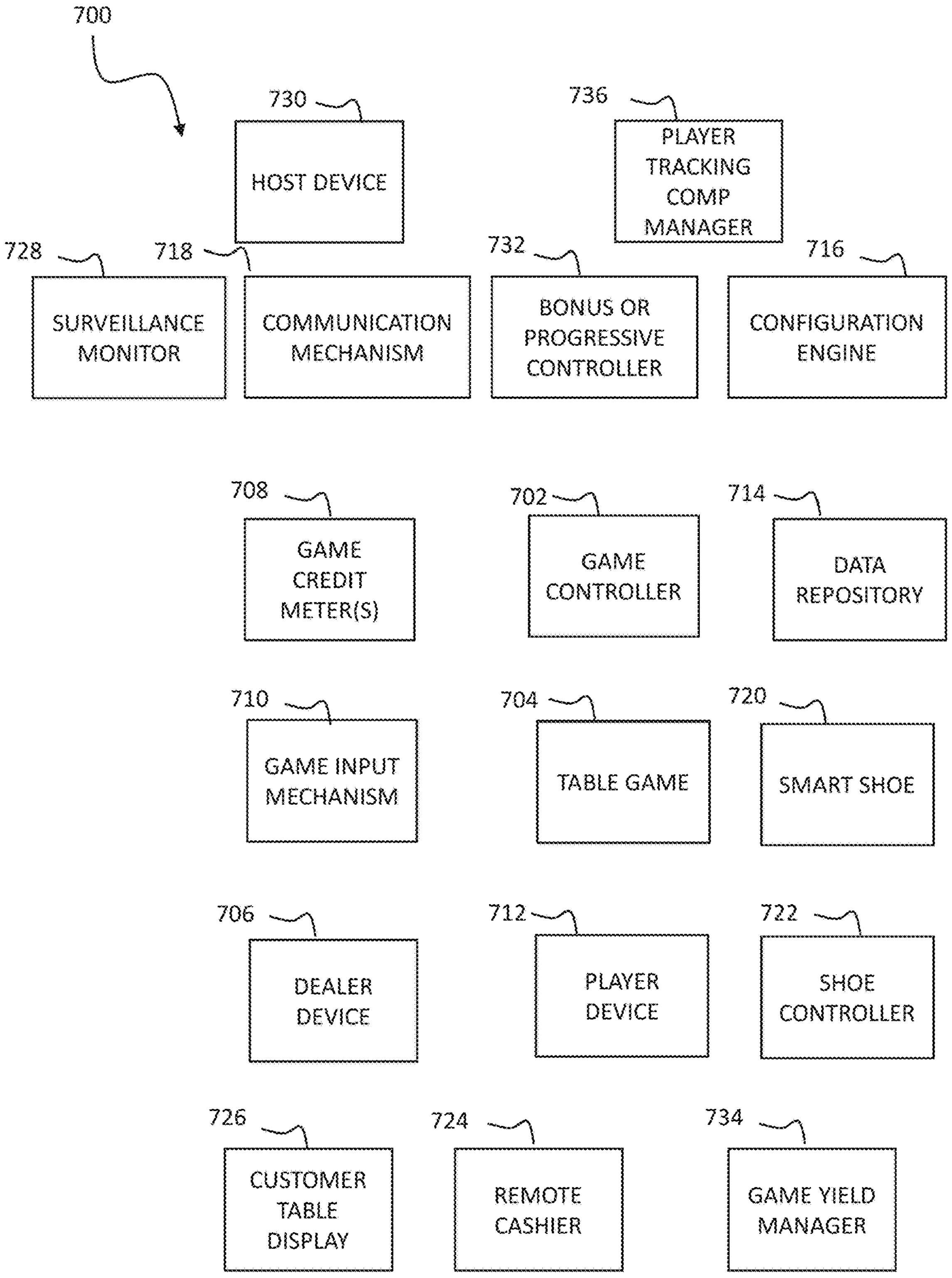
FIG. 42 is a block diagram of a standardized, chipless, table management system, according to an embodiment of the present invention.
Figure 42A:
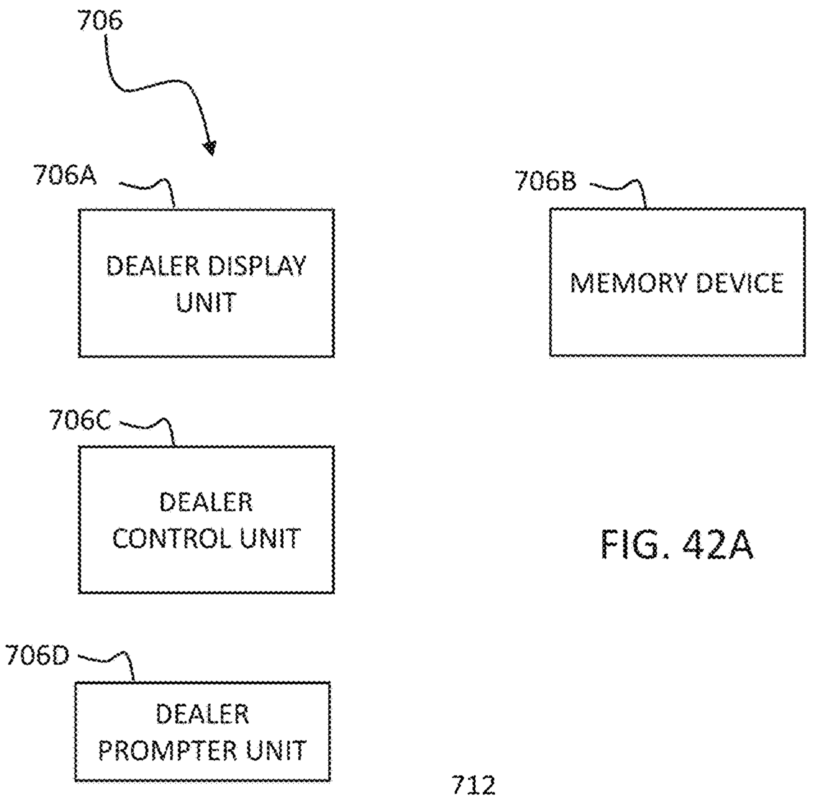
FIG. 42A is a block diagram of a dealer device of the standardized, chipless, table management system of FIG. 42.
Figure 42B:
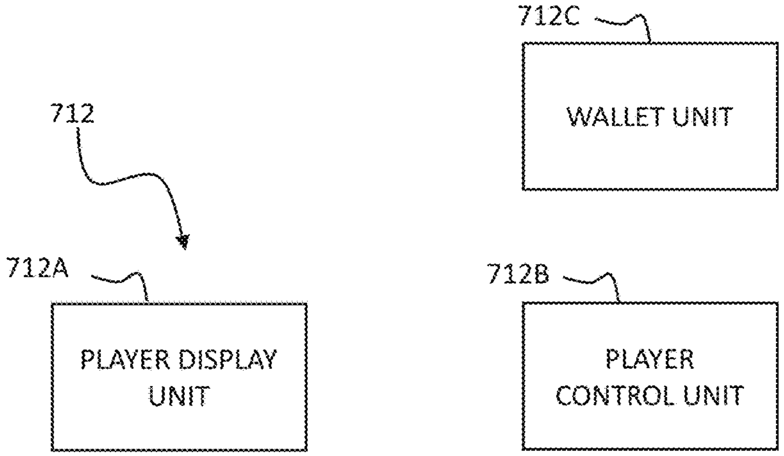
FIG. 42B is a block diagram of a player device of the standardized, chipless, table management system of FIG. 42.

Referring to FIGS. 42, 42A, and 42B, a standardized, chipless, table management system 700, according to the present invention, is shown. In one embodiment of the present invention, the system 700 includes a game controller 702, a table game or table game device 704, dealer device 706, a game credit meter 708, a game input mechanism 710, and at least one player device 712. The system 700 also includes a data storage facility or data repository 714, a configuration engine 716, and a communication mechanism 718. It should be appreciated that all components are a series of optionally active elements and these elements can be local or external to the component which, in turn, can be physical or virtual. It should also be appreciated that, in some instances, components could be merged or even omitted if complete system functionality is not required. It should further be appreciated that system outputs/inputs are all web enabled and browser based so that most functions could optionally be accessed via mobile devices.

The system 700 may further include a smart shoe or shuffler 720, a shoe controller 722, and a remote cashier 724. The system 700 may include a customer table display 726, a surveillance monitor 728, a host client 730, a bonus or progressive controller 732, a game yield manager 734, and a player tracking comp manager 736.

In one embodiment, the game controller 702 includes a processor that in real or near real-time processes data related to player wagers and decision inputs, cards that are dealt and other dealer inputs and provides associated outputs and results based on pre-defined game rules. The game controller 702 is linked directly or indirectly to all system components and communicates with the system components.

The table game or table game device 704 is configured to provide a game to a plurality of players. The table game device 704 may be real or virtual and is the location of gameplay. In the event of a real or physical table, the physical table can be generic showing only casino branding and player locations and no specific game information as game specific information can be displayed on player devices 712 and customer table displays 726. If the table is virtual, players can be remote from the dealer, but are grouped together by their selection of table and game and can view table and game information on their player devices 712 and strategically placed customer table displays 726. It should be appreciated that various technologies could be employed to connect players to specific tables.

Figure 43A:
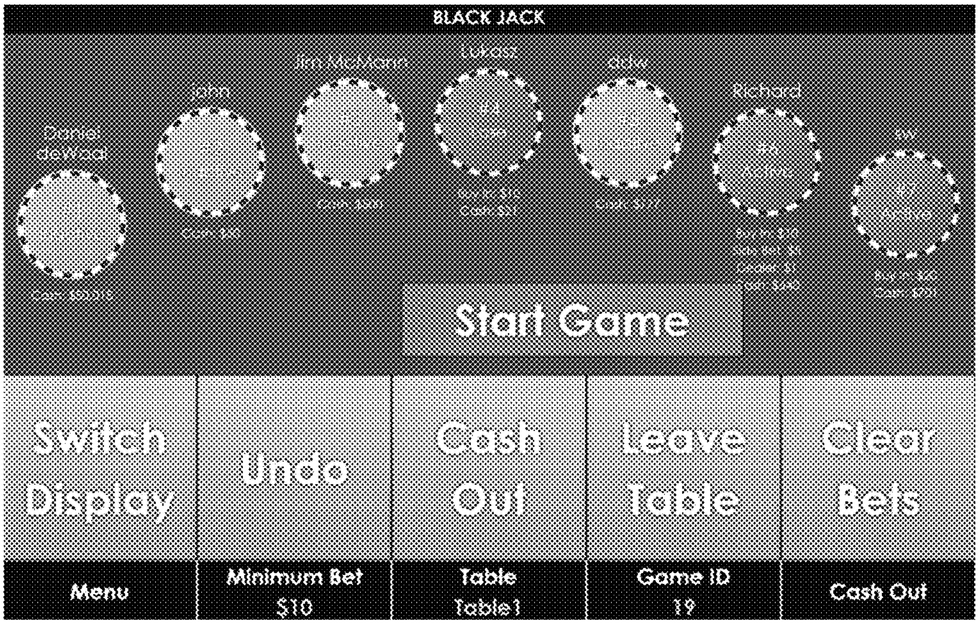
FIG. 43A is an exemplary screen shot of a dealer device of the standardized, chipless, table management system of FIG. 42.
Figure 43B:
FIG. 43B is an exemplary screen shot of a dealer prompter display of the standardized, chipless, table management system of FIG. 42.

The dealer device 706 is located at the table game device 704. The dealer device 706 provides dealers with a mechanism through which to accept players at a table, transfer credits to a specific seat credit meters, register players, start and end games, verify or override game results, view player inputs, game history, view/generate dealer and session reports and generate cash-outs as illustrated in FIG. 43A. As illustrated in FIG. 42A, the dealer device 706 includes a dealer display device 706A, a memory device 706B, a dealer control unit 706C, and a dealer prompter unit 706D. The dealer display device 706A is configured to display a dealer screen including computer generated graphics. The memory device 706B is configured to store a data structure and a dealer execution program. The data structure stores a plurality of player accounts. The dealer control unit 706C is coupled to or communicates with the dealer display unit 706A, the memory device 706B, and dealer prompter unit 706D and executes the dealer execution program for allowing the dealer to manage the player accounts. The dealer control unit 706C includes a processor programmed with an algorithm to display a dealer display structure on the dealer display unit 706A. The dealer display device 706A forms at least part of a dealer graphical user interface. The processor of the dealer control unit 706C is further programmed to allow a dealer to enter funds, received from one of the players, to a respective one of the plurality of player accounts. The dealer prompter unit 706D prompts a dealer how to deal by displaying how many cards, where to place them and what player actions are to occur. It should be appreciated that the dealer prompter unit 706D is located in front of the dealer and is a tool that assists dealers that are inexperienced or provides guidance when games are overly complex as illustrated in FIG. 43B.

In one embodiment, the game credit meters 708 store game play credits that can be used for wagering. In some instances, these credits are known as virtual chips. The game credit meters 708 can represent credits in multiple denominations and can track special categories of originating funds, for example, promotional funds that cannot be cashed out but only played through or have a cash-out conversion rate associated with them.

Figure 44A:
FIG. 44A is an exemplary screen shot of a player device of the standardized, chipless, table management system of FIG. 42.
Figure 44B:
FIG. 44B is an exemplary screen shot of a player display of the standardized, chipless, table management system of FIG. 42.

In one embodiment, the player device 712 provides players with a mechanism through which to select/join a table, select a game variant to play, place wagers on core, ancillary and side games, view game history, and request cash-outs and tip dealers. The player device 712 customarily has a browser-based user interface (UI) through which players can provide inputs and receive feedback and can be accessed via dedicated devices or optionally through player owned mobile devices as illustrated in FIG. 44A. As illustrated in FIG. 42B, the player device 712 includes a player display unit 712A, a player control unit 712B, and a wallet unit 712C. The player display unit 712A provides feedback to players and spectators about game activity and player performance as illustrated in FIG. 44B. The player control unit 712B includes a processor programmed with an algorithm to display a player display structure on the player display unit 712A. The wallet unit 712C is a logical container in which players store credentials and electronic funds and is connected to participating games so that funds can be converted and transferred to the game credit meters 708 for game play and, in turn, receive funds that have been converted from game credits when players complete game play and cash out, which can be done either directly or with cashier/dealer input. It should be appreciated that the player display unit 712A, the player control unit 712B, and the wallet unit 712C communicate with each other.

In one embodiment, the data repository 714 houses or stores all system related data. In one embodiment, the data repository 714 has a subscription engine that allows 3$^{rd}$ party systems to access relevant data in a controlled manner.

In one embodiment, the configuration engine 716 contains core and ancillary games, such as derivatives and side game, rules, dealing processes, and pay-tables. The configuration engine 716 is securely fixed for each game, but in some cases has configurable elements. It should be appreciated that the configurable elements can only be modified when a game is not in process and access to such configurations is secured.

In one embodiment, the communication mechanism 718 communicates information between the components. The communication mechanism 718 may use a wired or wireless connection to communicate with the components.

In one embodiment, the smart shoe 720 provides the dealer a mechanism from which to deal cards and have the dealt card data communicated in real-time to the game controller 702. In one embodiment, the shoe controller 722 may be employed. The show controller 722 receives instructions from the game controller 702 and can through an interface sends control messages to the smart shoe 720 that locks/unlocks such devices and updates device displays and data files.

In one embodiment, the remote cashier 724 can be utilized by either the dealer or a remote cashier. Through the remote cashier 724, the dealer/cashier can accept funds and convert those funds to game-credits that can be used for game-play. Similarly the remote cashier 724 can be used to convert credits back to funds post cash-out. It should be appreciated that the funds can be in the form of cash, chips, Tickets or Wallet/Account based Electronic.

In one embodiment, the customer table display 726 displays real-time and historic table/game and player relevant information. The customer table displays 726 can be strategically placed so that customers can watch game activities. It should be appreciated that the customer table displays 726 can also be accessed by players through the player devices 712.

In one embodiment, the surveillance monitor 728 provides real-time data to CCTV systems and surveillance personnel. It should be appreciated that the surveillance monitor 728 is secure and allows all aspects of player and dealer activities to be monitored and reviewed.

In one embodiment, the host device 730 allows Hosts and Casino execs to monitor in real-time wagering and win/loss activities associated with specific players and VIPs. It should be appreciated that the host device 730 may be a browser-based display driven off a suitable computing device and mounted at a location convenient for Hosts and Casino execs to monitor game activity.

In one embodiment, the bonus or progressive controller 732 optionally includes a random number generator (RNG) that can be used to drive bonus awards, but is primarily a progressive controller that tracks bet based accruals and dealer control unit/game controller initiated progressive awards/payouts. In one embodiment, the bonus or progressive controller 732 includes a drawing ticket engine that allows virtual drawing tickets to be awarded to players based on configurable inputs and for virtual drawings to be initiated and awarded based on wagering and gaming activities.

In one embodiment, the game yield manager 734 tracks the performance of each table/game/dealer/player against various baselines in real-time. It should be appreciated that the game yield manager 734 may be configured to provide alerts that are routed appropriately.

In one embodiment, the player tracking comp manager 736 is an engine configured to award play associated rewards to players based on game specific rules. The player tracking comp manager 736 can produce promotional credits with specific consumption and redemption rules that are interpreted by the game credit meters 708.

Figure 45A:
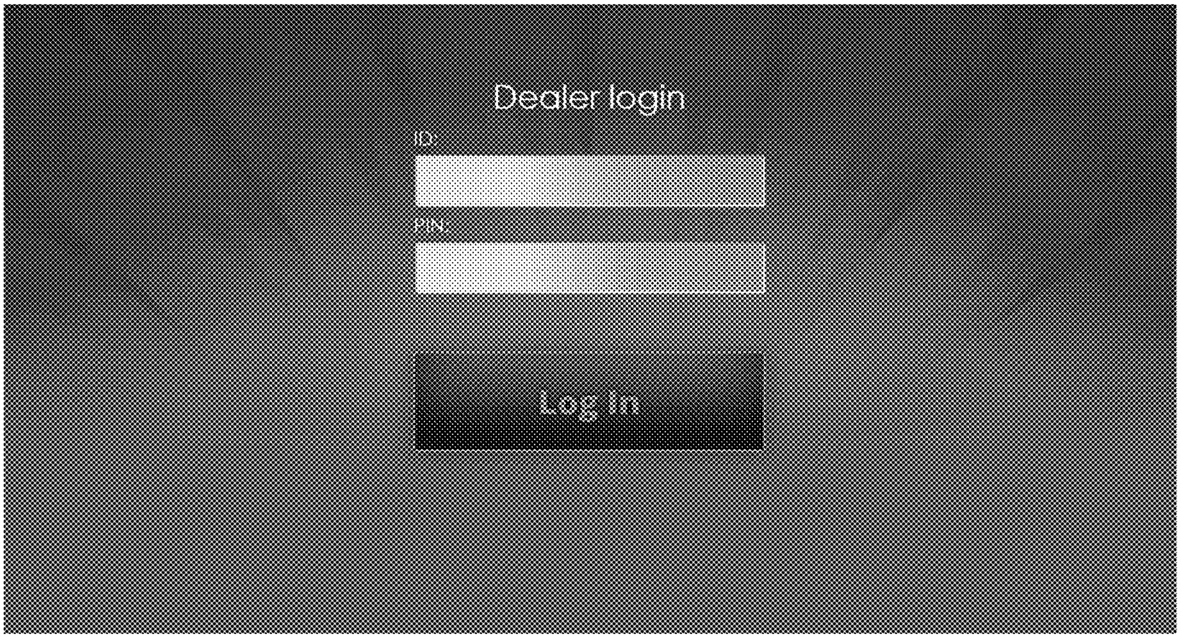
FIGS. 45A-45V are exemplary screen shots of a blackjack game using the standardized, chipless, table management system of FIG. 42.
Figure 45B:
Figure 45C:
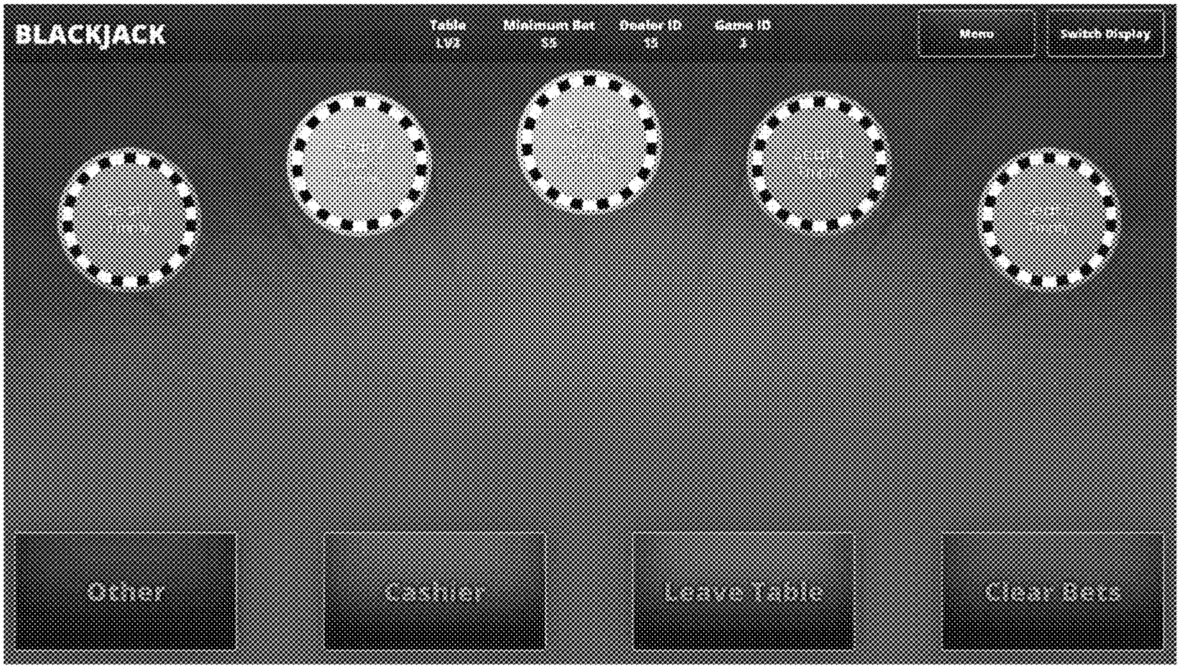
Figure 45D:
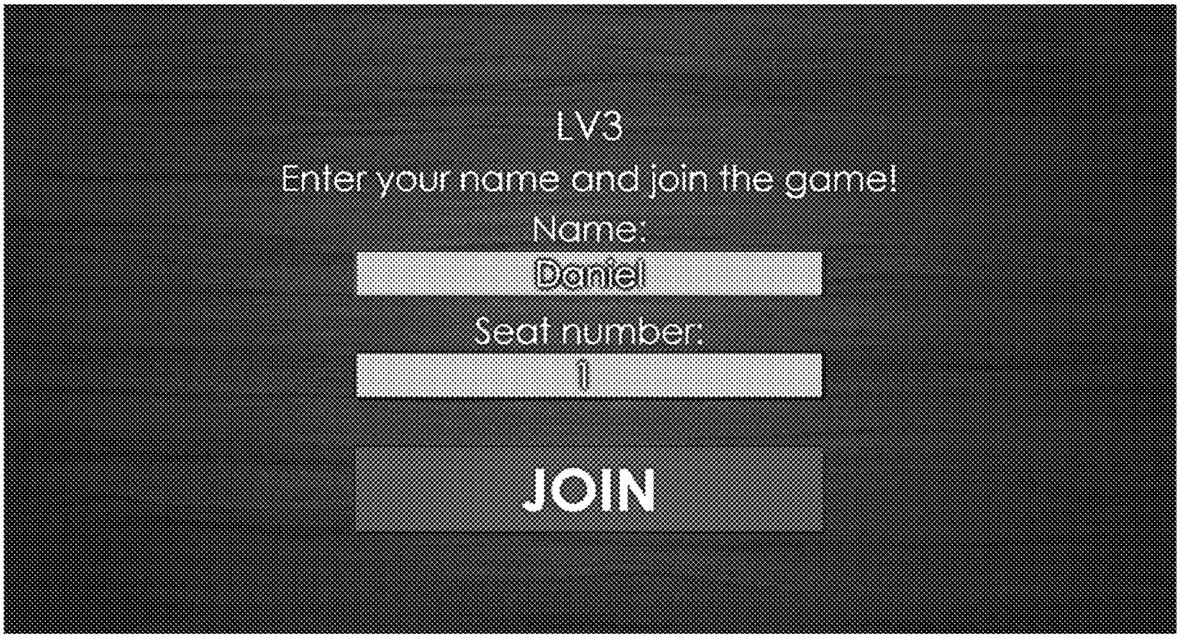
Figure 45E:
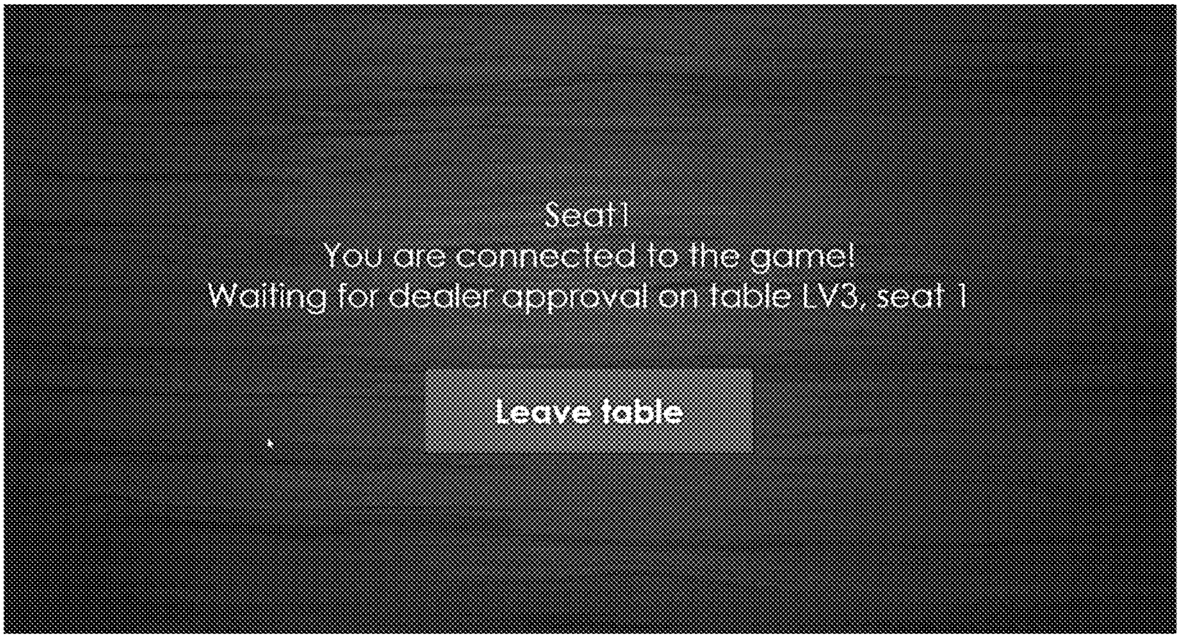
Figure 45F:
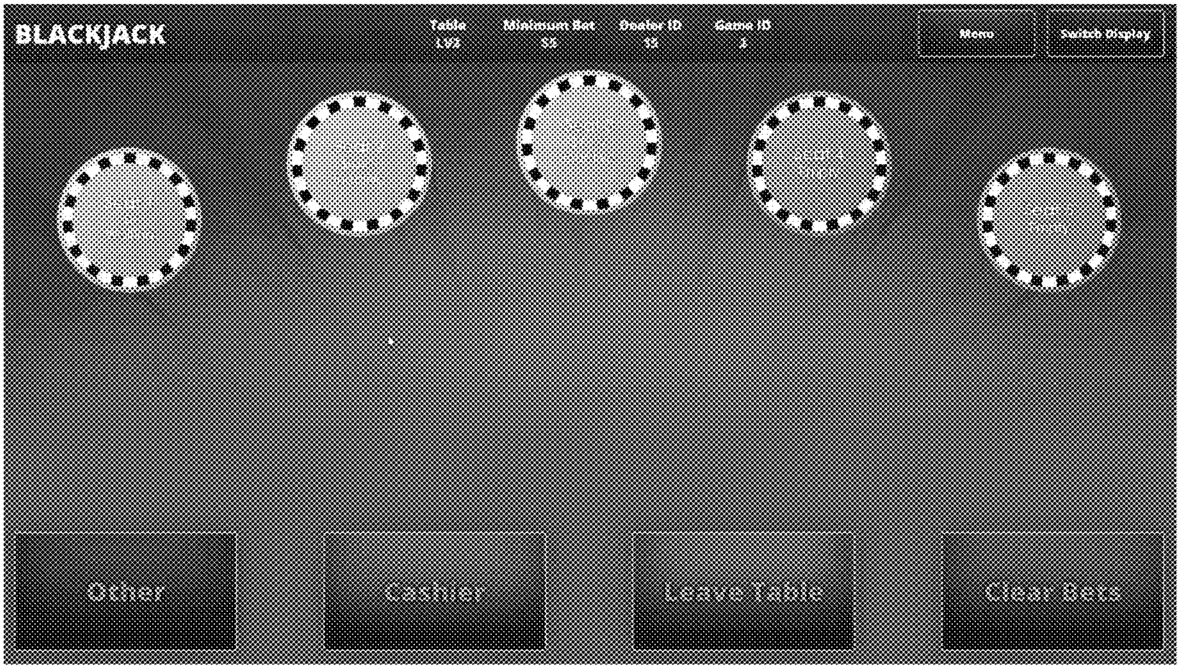
Figure 45G:
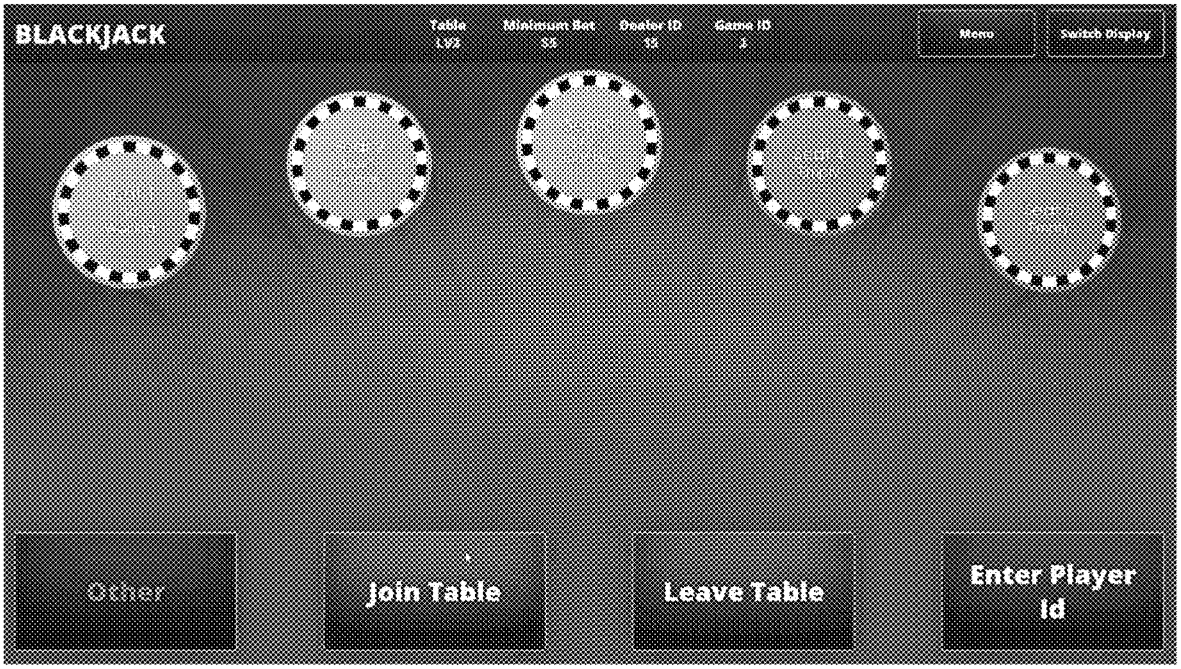
Figure 45H:
Figure 45I:
Figure 45J:
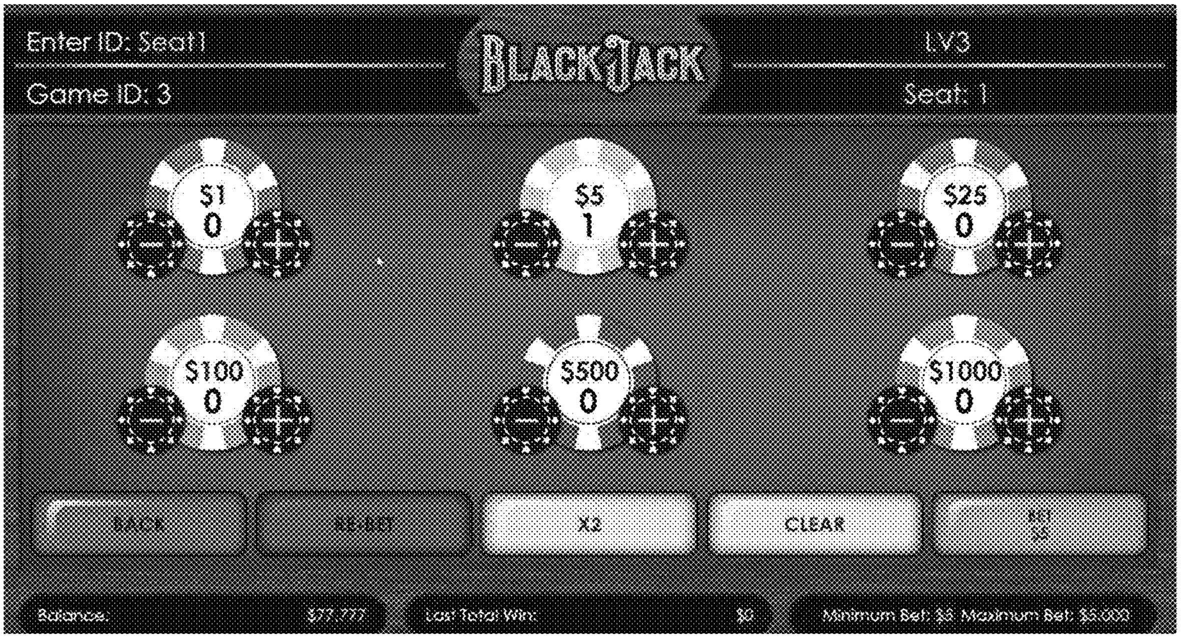
Figure 45K:
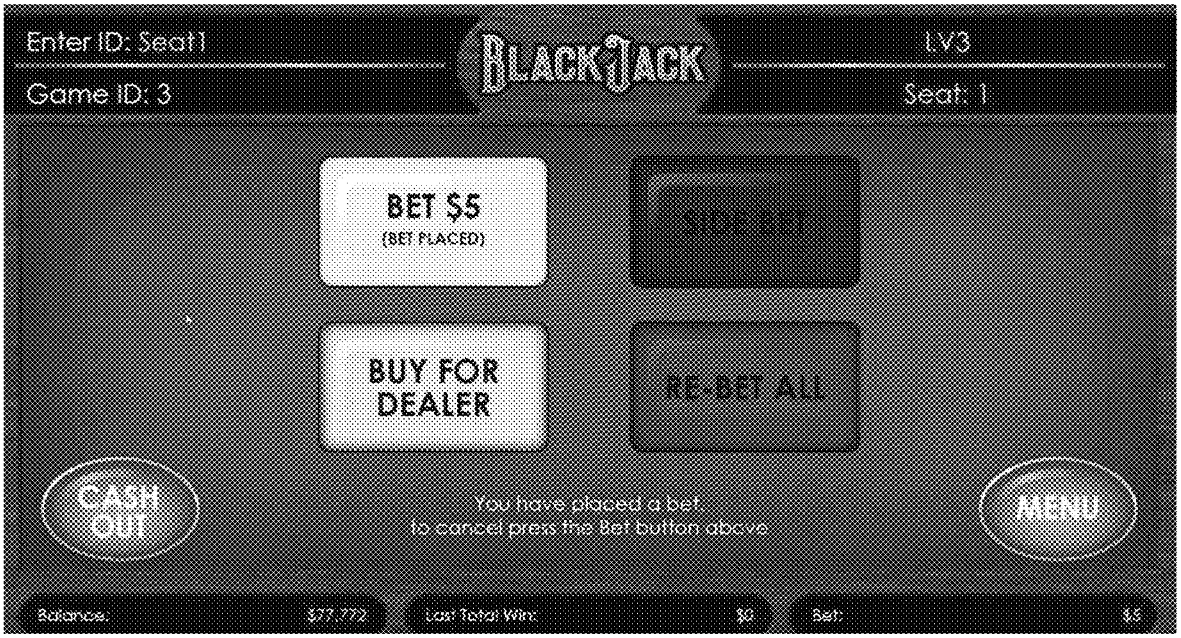
Figure 45L:
Figure 45M:
Figure 45N:
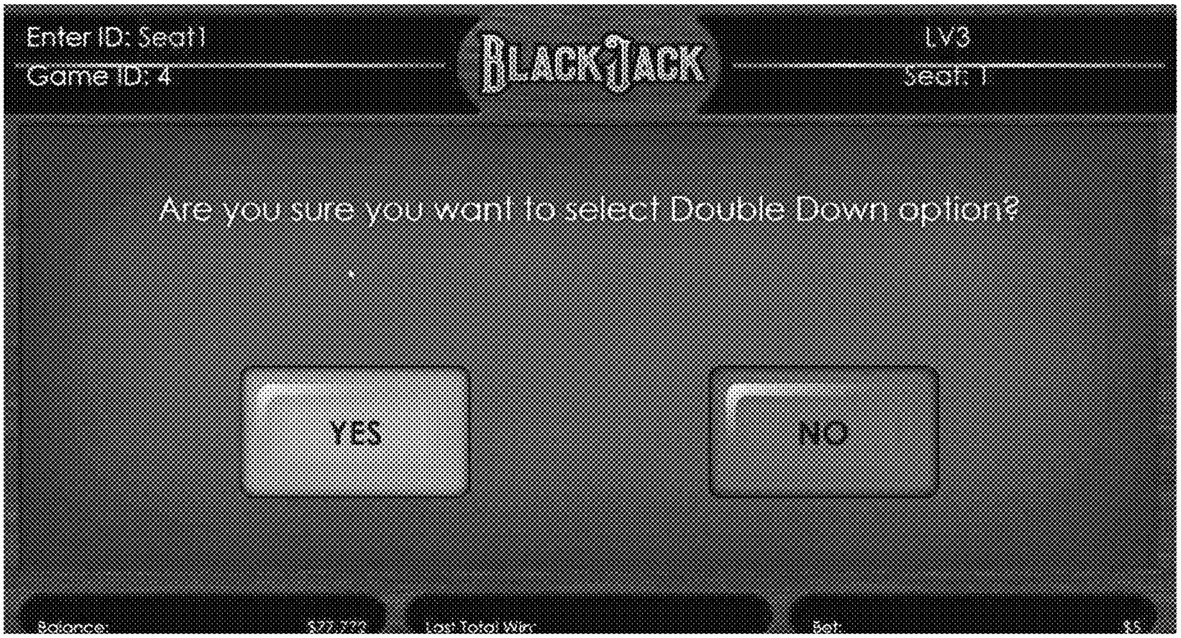
Figure 450:
Figure 45P:
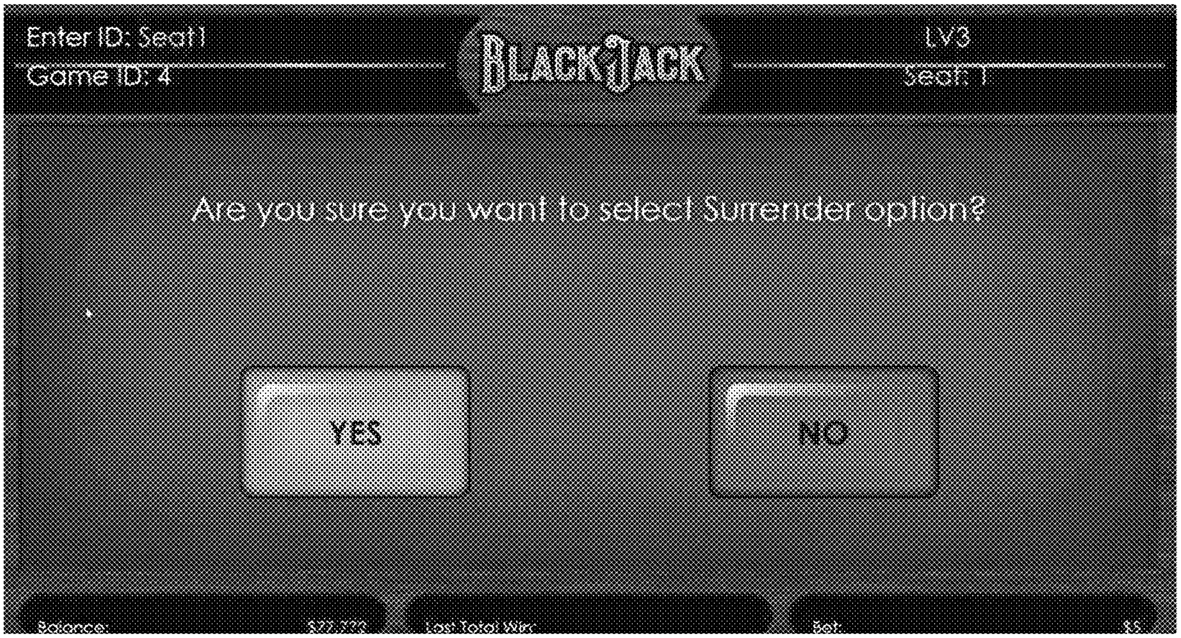
Figure 45Q:
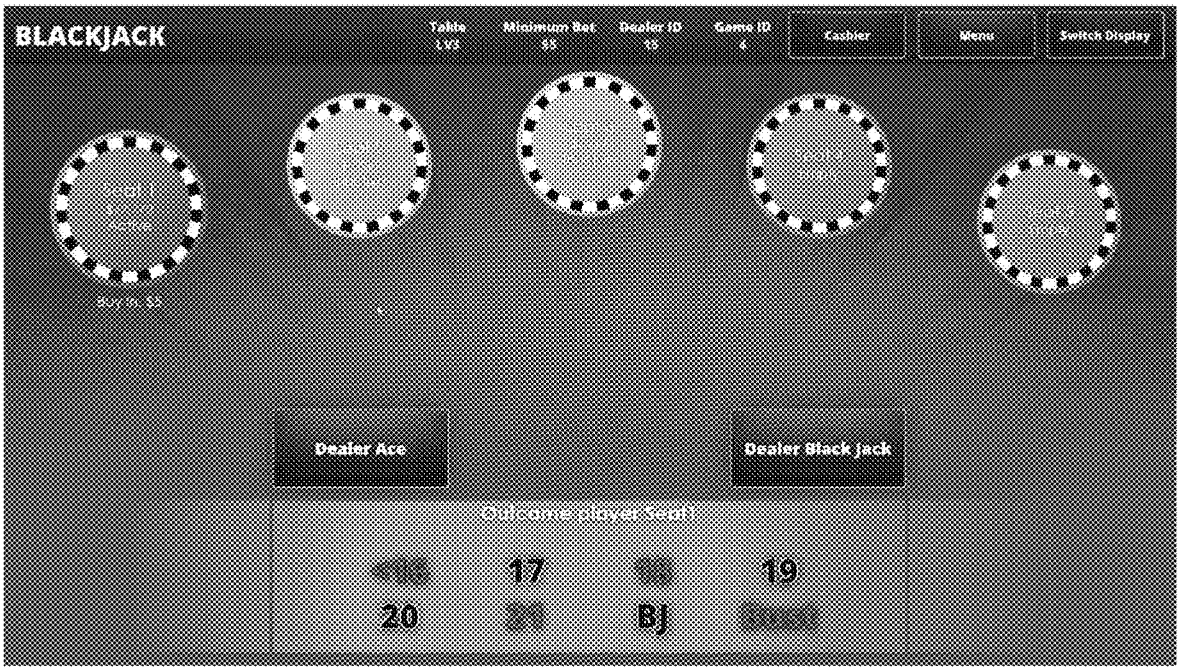
Figure 45R:
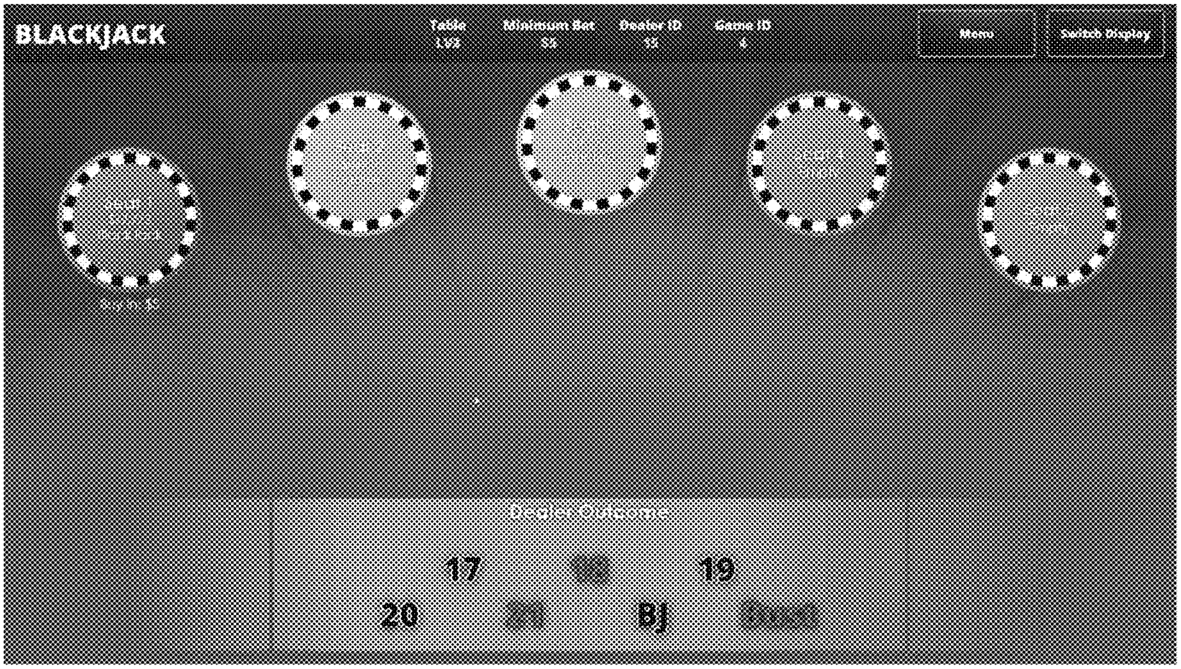
Figure 45S:
Figure 45T:
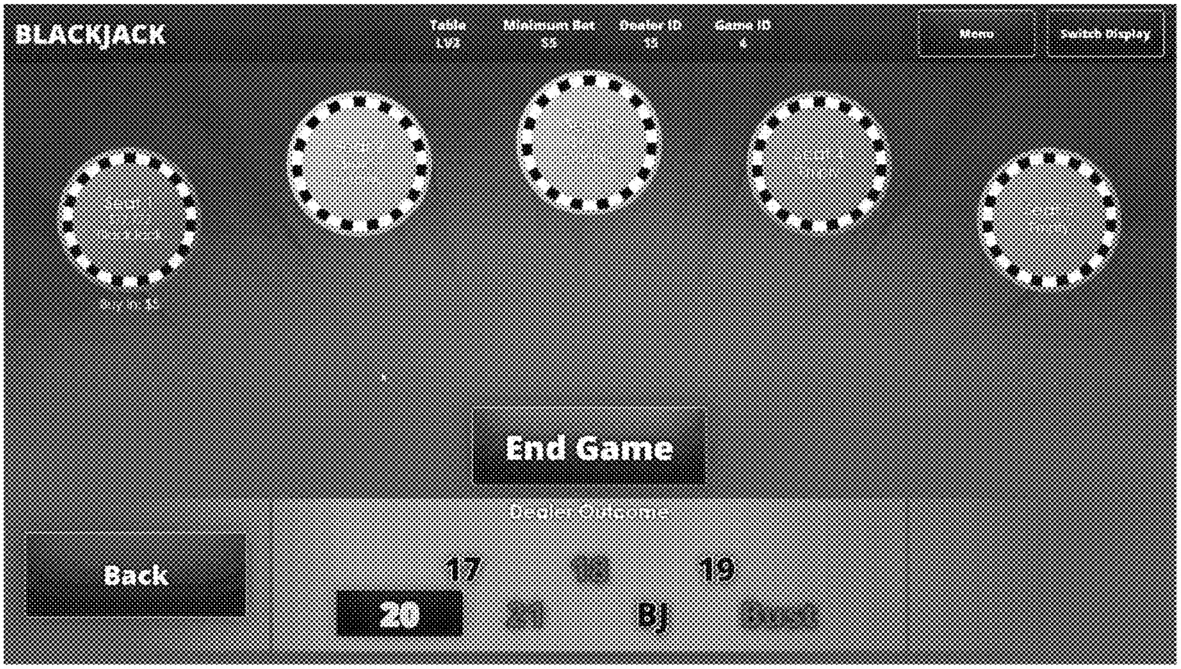
Figure 45U:
Figure 45V:

The flow of a blackjack game using the standardized, chipless, table management system 700 is shown in FIGS. 45A-45V. In operation, dealers are provided an ID and Pin that they use to open a table as illustrated in FIG. 45A. Dealers use the pop-up onscreen keypad to enter credentials as illustrated in FIG. 45B. Once a table is open, the dealer can allow players to join the table. Seats are shown as inactive until a player places a wager as illustrated in FIG. 45C. Players can join a table by selecting a seat and adding a name as illustrated in FIG. 45D. Once the player has provided a name and selected an open seat, the player has to wait for the dealer to add them to the table as illustrated in FIG. 45E. The dealer is prompted that a new player wishes to join the table as illustrated in FIG. 45F. The dealer can select the seat and add the player as illustrated in FIG. 45G. The dealer accepts cash or chips from the player and adds credits to the player's client as illustrated in FIG. 45H. The dealer is also able to swipe a player's player card or manually enter an account number to add a club number to the seat. In the event that a 3rd party TITO solution is in play, the dealer can accept a ticket from the player. Once the player has credits assigned to their respective client, they can place a wager as illustrated in FIG. 45I.

First players need to place a wager on the base game as illustrated in FIG. 45J. Players have several options to choose from to quickly and easily place the wager they want as illustrated in FIG. 45K. Once a base game wager is placed, the player has the option of placing a bet for the dealer or placing a side-bet if there is one available on the table as illustrated in FIG. 45L. Once all of the players have placed their bets, the dealer starts the game by either dealing the cards or pressing the start game button as illustrated in FIG. 45L. Once the cards have been dealt based on house rules, players can Double Down, Split, buy Insurance or Surrender as illustrated in FIG. 45M. If an option like Double Down, Split, or Surrender is selected, the player has to confirm their selection as illustrated in FIGS. 45N and 45O. If no smart shoe 720 is in play, the dealer uses their client to indicate if they have an Ace or a Blackjack. The dealer then inputs each player's outcome. If the smart shoe 720 is in play, the results are automated but still require confirmation from the dealer as illustrated in FIGS. 45P and 45Q. Finally the dealer inputs their own outcome as illustrated in FIG. 45R. Once all outcomes have been recorded and verified, the dealer ends the game as illustrated in FIG. 45S.

Prior to ending the game, the dealer can select and modify game results for themselves or any seat as illustrated in FIG. 45T. Once the dealer ends the game, each active player's result is displayed on their player device 712 as illustrated in FIG. 45U. Game results are also displayed on the customer table display 726 and are updated at the end of each successive game as illustrated in FIG. 45V.

With reference to FIGS. 40A-40Z and FIG. 40A-A, an embodiment of the system 10 having a dealer device 300 and at least one player device 312 configured to provide a solution for a Baccarat based game. The Baccarat based game may be played on a table. The system 10 may be configured to work with different versions or variations of Baccarat. For example, the system may be made configurable to work with a pari-mutuel version of Baccarat ("Baccarat Pot"); a Baccarat game with additional bet options ("BonusBacc"); and/or a Baccarat game with a progressive play side bet game ("Baccarat Dash"). The progressive side bet game may be player with either Baccarat Pot or BonusBacc.

Baccarat Pot is a pari-mutuel version of baccarat in which the players play for a portion of a pot. While the players play each hand or coup of Baccarat against the dealer, as in a standard game of Baccarat, the player may be awarded a share of the pot based on the outcome of the coup.

The system 10 is based on a sub-system that maintains the funds in a plurality of player of accounts and that calculates the changes in the player accounts based on the outcome of instances, i.e., hands or coups of a Baccarat both the outcome of a main game, one or more side bets and/or a progressive game. Since all changes to the player accounts are calculated by the system 10, more complex wagers may be utilized. The wagers and/or combination of wagers permitted may result in changes to the player accounts that are fractions of the base unit, whether the base unit is a (low denomination) chip (virtual or real), a currency denomination, or credit.

The system 10 in the illustrated embodiment may be configured by the operator such that one of the available games are active, i.e., only one game may be active at any one time. Using the example games above, the operator may configure one of the following games to be active:

BonusBacc
BonusBacc with Dash
Baccarat Pot
Baccarat Pot with Dash

Regular Baccarat with Dash
Baccarat Pot

The system 10 may be used with purely physical tables, i.e., on a physical table, with physical cards and chips. In such systems 10, the players play using the physical cards and chips and the dealer enters all wager and outcome information on the dealer unit 300. Alternatively, the system 10 may include separate player units 310. The separate player units 310 may be tablets or simple display screens with touchscreen sensors coupled to the dealer unit 300. The system 10 may use chip placement sensors, indicator lights and/or, a smart shoe to provide data to the dealer unit 300 regarding game play outcome of each coup.

With reference to FIG. 40A through FIG. 40A-A, various exemplary screens shots from the dealer unit 310 and the player unit(s) 312 are shown. In general, the dealer unit 310 and the player unit(s) 312 display a respective display structure comprised of computer graphics that a respective graphic user interface (GUI). The dealer display unit 300A and the player display unit 312A include touchscreen video display and the GUI displays information to the player or dealer and incorporate selective elements for the player or dealer to enter information to the system 10. An exemplary embodiment of BaccaratPot is described below.

With reference to FIG. 40A, the player display structure includes a game screen that allows a player to enter wager. In the illustrated embodiment of BaccaratPot, a configurable number of decks of standard playing cards are used. BaccaratPot provides a single stake pari-mutuel game in which winning players take a proportionate win from the total pot as a function of the outcome of each player's hand of Baccarat against the dealer. After each player makes a wager, the wagers are placed in the pot. A rake or portion is subtracted from the wagers to pay the dealer/house. The dealer/house does not otherwise win funds from the pot. The pot rolls from one hand/coup to the next if the dealer beats all of the players. In one embodiment, the pot may be rounded downward to reduce wins to the nearest set denomination. A progressive pool may be funded from the rake or from the rounding down function. In one embodiment, a progressive win may be shared among all player or non-players who placed a stake in the winning hand.

In general, the system 10 allows operators to set and control their house advantage by setting a preferred rake, i.e., to receive a fixed stake. Since the stakes are fixed, card counting risks are minimized. In additional, the opening low denomination tables or adding progressives becomes viable. A progressive jackpot on a Baccarat game can bring in a fresh demographic to the table market. Additionally, "unbanked" card games are considered eligible for approval in most Class II jurisdictions.

From the player's perspective, the players may enjoy greater volatility than that offered by traditional Baccarat, without having to greatly modify their game strategies or place side-bets. In BarracatPot, the players play against the dealer for shares of the pot, not for fixed returns. Since the house does not share in the Pot, players are effectively competing with each other for greater shares of the pot, and hence sessions may be very socially engaging. The system 10 may provide players access to lower denomination tables and potentially to large progressives.

In BaccaratPot with Dash, a plurality of players (up to a predetermined number of players, e.g., 12 or 100) enter a fixed stake (per table) by placing bets/wagers on a chose bet spot in a respective bet area on the table. A standard round of Baccarat round or hand is then played. Each player may win a number of shares of the pot based on the outcome of the game. The number of shares won by the winning players are summed and each winning player is awarded a proportional part of the pot based on the number of shares awarded. The number of shares provided to each winning player is set by a predetermined paytable. An exemplary paytable is shown in FIG. 40B. The winners split the pot according to their outcome's share allocation (Winning Pot Shares.) Winnings are accrued into win meters that are displayed on a customer facing centralized display (FIG. 40C showing accrued win meters by seat. Players can redeem funds from their accrued winnings at any point by requesting a cash out from the dealer.

As shown in FIG. 40D, players place their stake on one of shown bet options (the winning pot shares are shown by each area). In the illustrated embodiment, the player has placed a wager on PLAYER NATURAL. The player will be awarded 4 shares of the pot if the outcome matches the player wager. If the player wins, but it is not a natural win, then the player will be awarded 1 share since the player chose the winning hand correctly. If the result is the dealer or a tie, the player loses and receives no shared. If no player wins, i.e., if all players received 0 shares, then the pot is rolled over to the next instance of game or coup.

With reference to FIG. 40E an exemplary in game display or display structure is shown. In the illustrated embodiment, the display structure displays the cards being drawn (where available), a logo, a pot or jackpot total, a progressive total and side pot total. Also displayed are a table number, a Game ID, and the player's current stake. As shown, in the illustrated embodiment, the results of at least the previous hand may be shown for each player as well as all of the winning payouts, including number of shares and wagers. The respective player's current balance or stake is shown. If a seat is unpopulated, then the current balance or stake is blank. A player's initial balance is set to $0 until the player account is funded. The display structure includes a bet field. The bet field will be blank or empty if the seat is empty. The players may be identified by a name (if known) or generic place holder, e.g., "Player 1", if their name is not known. If the seat is empty or the seat is occupied then the generic place holder name may be modified to indicate that status, for example, displayed in grey text. If the seat is occupied, but the player does not make a wager, then "sitting out" may be displayed in the bet field.

In the illustrated embodiment, each player's position or ranking over the last 10 hands is shown. The top three players may be indicated using first, second and third place ribbon icons as shown.

The display structure includes a graphical outcome area in which the outcome of the current hand is displayed graphically.

With reference to FIG. 40F, an exemplary display structure 300DS displayed on the dealer device 300 is shown. The display structure 300DS shown in FIG. 40F may be used to display each player's wager or for the dealer to enter the player's wagers. The system 10 or the dealer may scroll through the player's to display or enter the player's wager. The display structure 300DS includes a wager information section to the right of the player names. The information in the wager information section corresponds to a selected or highlighted player on the left.

Once the dealer has interacted with a player, the yellow cursor and interaction moves to the next player. If the dealer manually jumps to another player, e.g., player 9) by tapping that player name, the dealer can interact with the wager information section or bet board for player 9 and then it will move to player 10. At the beginning of a session, the dealer proceeds through each player to manage the respective player's wager.

Once the dealer enters or selects an outcome, e.g., Banker <3, the name of the respective player, e.g., Player 1 is marked as Banker<3 in white text in the table. The player name ("Player 1") is then changed to a different color, e.g., green, because a bet has been placed and the action moves to the next player.

In the illustrated example, dealer manually proceeds to player 12, then entered results for players 1 & 2 and is currently ready to enter results for Player 3. The dealer may click select on the (red) bet word e.g. "banker" to repeat the same bet, or click on the bet board to choose a different option, choose to sit out or cash out that player.

When the dealer interface (bet page), i.e., display structure 300DS, opens at the end of a completed round, the dealer can remove players, cash them out and add new bets while the players are still viewing the Results page.

Players previous bets may be indicated in a different color, e.g., red. The dealer can tap any red result and the result will turn white (player has placed the same bet). The Redo Bets button marks all remaining red bets as the same bet again.

Once the dealer has placed all bets for all players (all the in-play marked green), the dealer clicks start game. The dealer deals a traditional hand of Baccarat, with all the standard rules. All interactions play according to house rules for Baccarat.

In embodiment, a progressive win is triggered when a specified outcome is dealt. For example, in the illustrated embodiment the progressive trigger is set to Tie on 2. If the dealer deals the progressive trigger hand, then the dealer clicks or selects a progressive button, and the funds are evenly split between all players participating (who placed a bet) in that hand. A celebratory animation may play out on the player display unit 312A and the Progressive is reset to $0, or to a configurable seed amount.

Once the dealer plays out the hand, the dealer records on the dealer device 300 the exact result of the hand with a single tap (see FIG. 40G). A pop up confirming the dealer selection opens, the dealer clicks to confirm/end game whereas the funds are distributed to players (see FIG. 40H).

The dealer is shown a start game screen and can add and remove players before the game starts. The players place their chips/bets on the table and the dealer calls No More Bets. The dealer clicks start game (the player display unit 312A will display an in-game screen). The dealer places the player bets on the table (see above). Once the dealer has placed bets for all players and the game has been played, the dealer may select a Select Result button and the Select result screen opens. The dealer inputs the results (e.g. Banker 2) and the calculator marks on the dealer display and the player display all the winning bets that match the result (see above). More than one outcome may be correct e.g. Banker 2 is a correct result for Banker, Banker not natural and Banker under 6; and even Player Natural receives 1 consolation share for the correct choice or player/banker/tie. For example, the result: "Banker 2" awards the following winning shares:

Banker: 1 share

Banker Not Natural: 2 shares

Banker Natural: 1 share (The result was wrong, but receives 1 share for the correct choice of player/banker/tie).

Banker <6: 6 Shares

All Player bets and Tie bets receive 0 shares.

An exemplary game result screen in the display structure is shown in FIG. 40I. The display structure includes the specific hands/cards that were drawn/dealt if the information is available. The result and win for each hand are displayed in respective columns. The pot consists of all stakes (minus house rake) and any funds rolled over from previous pots. Each player's winnings, calculated according to a player's outcome, are configurable in the system.

A player who chooses any of the Player/Banker options will receive 1 share if that player/banker selection is correct, even if the exact prediction is wrong. If the game outcome results in no shares being awarded, the pot rolls over to the next hand. Games can rollover multiple times until the funds are won.

The system 10 may include an optional/configurable leaderboard. The leaderboard may include current player status (outcomes, ranking stakes, etc. . . . ). The leaderboard may also include other information, e.g., most money won from last x hands (or configurable time period, e.g., all night). The leaderboard may include results on a per table bases or across multiple tables in a network configuration. The leaderboard may be available on the results screen on each player device 312 and may be displayed on a larger display viewable by others.

In one embodiment, special icons ($1^{st}$, $2^{nd}$, and $3^{rd}$ or King, Queen, Jack) may be used to indicate the current rankings.

The general operation of the system 10 when the Baccarat Pot game is being played is shown in FIG. 40J.

With specific reference to FIG. 40K through FIG. 40P, operation of the system 10 when the BonusBacc game is being played is described. The BonusBacc game works in a similar way to Baccarat pot but is a fixed odds game against the house, more in-line with traditional Baccarat. There is no pot or rollovers available. The premise of the game is that players can play regular Baccarat on this table, but can also add additional Bonus Bet options, in which the players may win more than the standard payouts. BonusBacc allows player to place multiple bets using different denominations allowing them to hedge their bets and create different patterns. The BonusBacc may or may not have a Progressive Jackpot. In one embodiment, the rounding of the pot may be enable or disabled by the operator.

In the illustrated embodiment, the BonusBacc game uses a configurable number of standard decks of cards. The BonusBacc game provides a multi-denomination, multi-stake Baccarat game in which the players play against the house. Any winnings are distributed to the player's account/credit meters which are shown on all player devices. As discussed above, a rounding pot may be used to reduce awards to the nearest denomination. The rounded amounts may be accrued in one or more other meters. The general operation of the system 10 when in the BonusBacc mode is shown in FIG. 40L. Operation when in an automated mode is shown in FIG. 40M.

The display structure 300DS that allows the dealer to enter wagers when the system 10 is configured to play the BonusBacc game is shown in FIG. 40N.

If the BonusBacc game is played manually, when the dealer taps on a bet spot, the system will put down the minimum bet chip on this area. Tapping again will add the same amount again and repeatedly. To move to the next bet, the dealer selects "confirm". To remove a specific bet from the board, the dealer clicks the offending chip and then clicks remove.

When in the automated mode, various sensors (see above) may be used to automatically populate or send data to the dealer control unit 300C. Using the automated system the table sensor marks where a player has put the chip and the dealer must input the amount for each one. The default when a player has activated the sensor is table minimum. If a player puts 3×$100 chips on the table in different spots and the dealer sees them all marked on the tablet, he clicks confirm all.

If the dealer wants to adjust the amounts the cursor (yellow box) goes from bet to bet from left top to bottom then right column top to bottom. Whenever a dealer taps in the new amount on the calculator (and enters with the green arrow) the bet amount changes and the cursor moves to the next chip needing amount change or confirmation.

If a dealer wants to change the amount on specific bet they can tap that bet (it will grow by the default minimum) and can then enter an actual amount using the keypad.

The dealer can select Repeat Bets if a player is placing the same bet as on the previous hand. The dealer may select Double All bets to multiply all a players bets by 2. The amount in the calculator starts at the table minimum (e.g. $100), if the dealer changes the bet to $500, the calculator stays on that amount. If the dealer wants to enter 3 bets of $500, the dealer may mark the first bet as $500, the cursor then moves to the next bet which shows $100 in the chip, but $500 in the calculator, by selecting the (green) arrow the dealer may quickly put the same amount on the next chips as well.

With reference to FIG. 40O, a BonusBacc results screen displays all of the outcomes that were paid to the players. The results are shown as multiples of a player's wager.

With reference to FIG. 40P, a second BonusBacc game result screen may display all of a player's individual bets.

With reference to FIG. 40Q through FIG. 40Y, various display screens are shown that are used in the Baccarat Dash game. The Baccarat Dash side game is a fixed odds progressive game against the house (see FIG. 40Q). A player must complete all correct predictions to win the Prize shown at the end of each game, i.e., "dash". In general, the player places a bet (any stake above minimum) on the first space of any one of the 3 dash game boards and predicts player or banker. If the player is correct, a green light is activated and the player may move their chips to the next spot in the game. Each time the player advances, the player can choose either player or banker. The players do not have to move the bet each time, but can stay in a spot until the player feels ready to compete. Once they have started the progressive game or dash, the player cannot remove the bet from the table after they have started the dash. If the result of a coup of the Baccarat game is a tie, the players stay in the same spot. The player's wager are not list, but the player does not advance.

If a player loses the bet, a red light indicates for the dealer to remove the bet from the table. The Dealer sees a players dash on their bet area on the UI, for that player and their status. On the automated system, both the player and dealer can see the dash status on their screen. Each chip area has a sensor. When the chips ate placed the system 10 records a player's progress.

In the illustrated embodiment, there are three dashes. All 3 dashes start with a yellow light, awaiting bet, any player can place a bet on the first spot, to reach the next spot, the player has to have made a correct prediction and see a green indicator to progress to the next spot.

The display structure 300DS that allows the dealer to enter wagers when the system 10 is configured to play the BonusBacc game is shown in FIG. 40R. Once a player puts a chip on the first cursor, the chip shows up on the display structure 300DS or dealerboard. The dealer changes or confirms the amount on his board. After the dealer has confirmed the bet, the amount (on the first bet of the dash) does not change. The player can move his bet forward when instructed (green light). When a red light is displayed, the player's name on the results page flashed in red. The dealer must then remove the wager from the table.

If the player has reached the end of a dash, then the win is recorded on the game result page (see FIG. 40S). The dealer enters each bet amount into the system 10 at the beginning of the process, so any winnings are calculated as a multiplier of the bet and the multiplier of the dash race chosen, funds are then paid out to the player.

In the above embodiment, the players are manually placing wagers using chips. All bets or wagers are entered by the dealer. In an alternative embodiment, an automated or semi-automatic system 10 that includes and uses chip Placement sensors; indicator lights on the table (multi-colored lights (red/yellow and green options) OR separate Red, Green and yellow, lights), a smart shoe for reading cards as the cards are dealt and individual player screens (7" Tablets).

The smart shoe would be used to read and display, the cards as the cards are pulled and dealt and the outcome of the game based on the dealt cards. Given the strict rules for dealing cards, all cards would be drawn in succession to the correct hands manually while the calculator follows automatically. The smart shoe would also speed up interactions, e.g., the games do not have to be positively started or activated by the dealer. Each hand may be started and activated when a first card is pulled from the shoe.

In addition, each bet spot would include a respective a sensor under the table, e.g., an 8 person table would need 72 sensors. Alternatively Video Recognition could be used to determine the location of wagers and scales can be used to determine the number of chips associated with each wager.

With reference to FIG. 40T, sensors in each bet spot and a green chip covering Player Not Natural are shown. Once the chip is placed, the system 10 is informed of the player's bet. The game is fixed stake so the actual wager amount is not needed. A player moves their bet from position to position, until the dealer calls no more bets and the game is started.

In general, the system 10 works the same way with BonusBacc, just showing multipliers instead of shares. Each player seat includes an individual (7") tablet (in landscape mode) to view info and basic interactions. An exemplary display screen associated with Player 2 is shown in FIG. 40U. The displayed information relates to the player's own stats (Last win, Ranking). When a player leaves the table, the tablet removes all personal and player specific details.

An exemplary leader board is shown in FIG. 40V and exemplary results screens are shown in FIGS. 40W, 40X and 40Y. An exemplary settings screen, in which the player, may update their name and/or enter a player or loyalty card number is shown in FIG. 40Z.

With reference to FIG. 40A-A, in a cashout screen, a player can scroll through previous cashouts to see the list of funds and the balance at the time of all funds cashed out in this session. After filling in the amount requested and clicking cash out, a cash out request is sent to the dealer device 300. The dealer is informed of a cash out request (e.g. Cash Out button flashes red on and off). When the dealer clicks the cash out button, a pop up with the request appears (see FIG. 40A-B). In the illustrated embodiment, the dealer pays the player in chips and confirms on his screen that the player has been paid.

In general, the system 10 records every hand (individual cards & result); the game outcome and the winning hands and payouts.

With reference to FIGS. 41A and 41B, an embodiment of the system 10 having a dealer device 300 and at least one player device 312 configured to provide a solution for a Blackjack based game is shown. In this embodiment, the dealer device 300 is embodied in a computer, server or tablet. The player device 312 may be embodied in tablets or computers that are coupled to the dealer device 300. In one embodiment, the player device 312 is hardwired to the dealer device 300. As shown in FIG. 41A, in the illustrated embodiment, the display structure or GUI displayed on the player device 312 includes the player's stake or balance in their account and other information and allows the player to make wagers or request a buy-in or cash-out.

In the illustrated embodiment, the players would buy into the table by giving the dealer cash or chips. The dealer adds funds to their seat/tablet using the dealer device 300.

The player(s) can now play directly from their player account (whether in currency or credits).

Player and dealer data, including player buy ins, balance and cash-out information and recorded game data are compiled into a database. The database may be accessible by third party table accounting and player management systems for realtime reporting.

In the illustrated embodiment, the system 10 includes one more large display device for providing or displaying information to the players or other viewers. The dealer device 300 may be implemented in a tablet computer that operates as a server device to, for example, the player device 312. The graphical user interface on the player device 312 is implemented in a secure browser running on each player device 312.

In order to begin playing or to open a game session, the player arrives at the table and gives the dealer cash/chips. The dealer receives the cash or chips and adds funds directly to the player's balance. At their chosen seat or player station, the player may enter their ID or loyalty number. When the player logs out or is logged out, the player information and history is deleted from the player device 312. In one embodiment, the player history is accessible by the player through the player device 312.

As shown in FIG. 31A, the player may play an instance of the Blackjack game by selecting "Buy In" to enter the hand and optional side bet (if available). Once all bets have been placed, the dealer clicks start on the dealer device 300. The dealer then deals the hand to all players. The players may select Insurance on their tablet (half of the table stake is wagered by the player, and an indicator shows on all 3 tablets that the player has clicked insurance).

Players may select, during the gameplay, Split (an extra stake is wagered by the player and indicator shows on all 3 tablets that the player has split, dealer splits, continues hand).

Players may also select, during the gameplay, Double (an extra stake is wagered and an indicator shows on all 3 tablets that the player has doubled their stake and on which hand.)

Once the hand has played, the dealer enters the dealer result, e.g., bust, stand, Blackjack or win all. If dealer result is Blackjack, all players that selected insurance are returned their stake.

If a winning player selected Double during the game, their payout is doubled.

If a player selected a side bet, in addition to the standard payout options the dealer will see a menu of payouts for the side bet. If the player has not placed a side bet, the side bet payouts won't show.

The dealer can select a sidebet payout for the player and then select the player's outcome for the main game.

If the dealer does not select a side bet payout and simply selects the main game outcome, the player did not win the side bet and the cursor moves to the next player's outcome.

Once the dealer result has been added, the dealer enter each player's result. First any sidebet wager/result is entered then the results of the Blackjack hand (Split, Lose, Push, Win, Blackjack).

Once all results are entered, the dealer selects to end the games and all awards/funds are distributed to the player accounts.

Each player device should show the respective player's, e.g., Win $10 or Blackjack $15) and also show side pot, side bet or Crown/Ribbon if available. If included, any progressive win may also be shown.

Once all awards are distributed, the players may start entering wagers and side bets on next hand or request a cash out. Once paid out dealer confirms and clicks player paid then starts next hand. Players can be entering stakes for the next hand at any time from game end until the next game starts. The dealer can return funds to one or all players before starting the next round.

This written description uses examples to disclose the first secondary aspect of the present invention, including the best mode, and also to enable any person skilled in the art to practice the invention, including making and using any devices or systems and performing any incorporated methods. It should be understood that the proposed method of applying virtual "Win Meters" and a customized game calculator could be applied to any manual table game.

Those skilled in the art will readily appreciate that the systems and methods described herein may be a standalone system or incorporated in an existing gaming system. The system of the invention may include various computer and network related software and hardware, such as programs, operating systems, memory storage devices, data input/output devices, data processors, servers with links to data communication systems, wireless or otherwise, and data transceiving terminals. It should also be understood that any method steps discussed herein, such as for example, steps involving the receiving or displaying of data, may further include or involve the transmission, receipt and processing of data through conventional hardware and/or software technology to effectuate the steps as described herein. Those skilled in the art will further appreciate that the precise types of software and hardware used are not vital to the full implementation of the methods of the invention so long as players and operators thereof are provided with useful access thereto, either through a mobile device, gaming platform, or other computing platform via a local network or global telecommunication network.

Although specific features of various embodiments of the invention may be shown in some drawings and not in others, this is for convenience only. In accordance with the principles of the invention, any feature of a drawing may be referenced and/or claimed in combination with any feature of any other drawing.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. The terms used herein, such as modules like display module, betting module, award module, servers, like player account server, database server, etc. are for ease in describing and illustrating features and operations of the invention and are not to be considered limiting in any way. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Those skilled in the art will readily appreciate that the systems and methods described herein may be a standalone system or incorporated in an existing gaming system. The system of the invention may include various computer and network related software and hardware, such as programs, operating systems, memory storage devices, data input/output devices, data processors, servers with links to data communication systems, wireless or otherwise, and data transceiving terminals. It should also be understood that any method steps discussed herein, such as for example, steps involving the receiving or displaying of data, may further include or involve the transmission, receipt and processing of data through conventional hardware and/or software technology to effectuate the steps as described herein. Those skilled in the art will further appreciate that the precise types of software and hardware used are not vital to the full implementation of the methods of the invention so long as players and operators thereof are provided with useful access thereto, either through a mobile device, gaming platform, or other computing platform via a local network or global telecommunication network.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A standardized, chipless, table management system for managing a plurality of table game types, comprising:

- a table game device configured to provide a game to a plurality of players;
- a dealer device located at the table game device, the dealer device including:
  - a dealer display unit configured to display a dealer screen including computer generated graphics;
  - a memory device configured to store a data structure and a dealer execution program, the data structure for storing a plurality of player accounts;
  - a dealer prompter device located in front of a dealer to prompt the dealer on when the system is ready for a game to begin; and
  - a dealer control unit, coupled to the dealer display unit and the memory device, for executing the dealer execution program for allowing the dealer to manage the player accounts, the dealer control unit including a processor programmed with an algorithm to:
    - display a dealer display structure on the dealer display unit, the dealer display structure forming at least part of a dealer graphical user interface;
    - allow the dealer to accept players at a table, transfer credits to a specific seat credit meters, register players, start and end games, verify or override game results, view player inputs, game history, view/generate dealer and session reports and generate cash-outs;
- at least one player device located at the table game device, each player device including:
  - a player display unit configured to display a player screen including computer generated graphics;

a player control unit, coupled to the player display unit, the player control unit programmed with an algorithm to:

allow each respective player to enter a wager on the instance of the game;

display the outcome of the instance of the game; and, display wager and player account data to the player; and a player wallet unit to allow players to store credentials and electronic funds and in communication with the table game device so that funds can be converted and transferred to game credit meters for game play and, in turn, receive funds that have been converted from game credits when players complete game play and cash out;

wherein the dealer execution program allows the dealer to:

allows each respective player to enter a base game wager on an outcome of the game played;

finalize player base game wagers made on the outcome of the game after one or more players have entered the base game wager;

start the game;

allow the play to be played; and determine an outcome of the game.

2. The standardized, chipless, table management system as set forth in claim 1 wherein the game is a CRAPs game comprising a CRAPs table including a plurality of cameras mounted in the frame of the CRAPS table and connected to a processing unit to detect dice movement and send signals to lock all player bets and then record and display the dice results when the dice stop moving.

3. The standardized, chipless, table management system as set forth in claim 2 including a game controller in communication with the table game device, the dealer device, and the player device, the game controller having a processor to process data related to the player wagers and decision inputs, dice that are rolled, and other dealer inputs and provide associated outputs and results based on predefined game rules.

4. The standardized, chipless, table management system as set forth in claim 3 wherein start the game comprises starting the game by the dealer when a player rolls the dice once all the players have placed their base game wagers.

5. The standardized, chipless, table management system as set forth in claim 1 wherein the game is a Roulette game comprising a Roulette wheel including a plurality of sensors in the Roulette wheel connected to a processing unit to detect the movement of the ball and send signals to lock all player bets based on the movement of the ball and then record and display Ball drop results when the ball stops moving.

6. The standardized, chipless, table management system as set forth in claim 5 including a game controller in communication with the table game device, the dealer device, and the player device, the game controller having a processor to process data related to the player wagers and decision inputs, balls that are rolled, and other dealer inputs and provide associated outputs and results based on predefined game rules.

7. The standardized, chipless, table management system as set forth in claim 6 wherein start the game comprises starting the game by the dealer releasing the ball onto the wheel once all the players have placed their base game wagers.

8. The standardized, chipless, table management system as set forth in claim 2 or claim 6 including a game credit meter in communication with the game controller to store game play credits of the players that can be used for wagering.

9. The standardized, chipless, table management system as set forth in claim 8 including a game input mechanism in communication with the game controller.

10. The standardized, chipless, table management system as set forth in claim 8 including a data repository in communication with the game controller to store all system related data.

11. The standardized, chipless, table management system as set forth in claim 8 including a configuration engine in communication with the game controller to contain base and ancillary games.

12. The standardized, chipless, table management system as set forth in claim 8 including a communication mechanism in communication with the game controller to communicate information between components of the system.

13. The standardized, chipless, table management system as set forth in claim 8 including a customer table display in communication with the game controller to display real-time and historic table/game and player relevant information.

14. The standardized, chipless, table management system as set forth in claim 8 including a progressive controller in communication with the game controller and the dealer control unit that tracks wager based accruals and the game controller initiated progressive awards/payouts.

15. A control method for a standardized, chipless, table management system for managing a plurality of table game types, said method comprising the steps of:

configuring a table game device to provide a game to a plurality of players;

locating a dealer device at the table game device, the dealer device including:

a dealer display unit configured to display a dealer screen including computer generated graphics;

a memory device configured to store a data structure and a dealer execution program, the data structure for storing a plurality of player accounts;

a dealer prompter device located in front of a dealer to prompt the dealer on when the system is ready for a game to begin; and a dealer control unit, coupled to the dealer display unit and the memory device, for executing the dealer execution program for allowing the dealer to manage the player accounts, the dealer control unit including a processor programmed with an algorithm to:

display a dealer display structure on the dealer display unit, the dealer display structure forming at least part of a dealer graphical user interface;

allow a dealer to accept players at a table, transfer credits to a specific seat credit meters, register players, start and end games, verify or override game results, view player inputs, game history, view/generate dealer and session reports and generate cash-outs;

locating at least one player device, each player device including:

a player display unit configured to display a player screen including computer generated graphics;

a player control unit, coupled to the player display unit, the player control unit programmed with an algorithm to:

allow each respective player to enter a wager on the instance of the game;

display the outcome of the instance of the game; and, display wager and player account data to the player; and a player wallet unit to allow players to store credentials and electronic funds and in communication with the table game device so that funds can be converted and transferred to game credit meters for game play and, in turn, receive funds that have been converted from game credits when players complete game play and cash out;

allowing each respective player to enter a base game wager on an outcome of the game played;

finalizing base game wagers made on the outcome of the game after one or more players have entered the base game wager;

starting the game by the dealer;

allowing the game to be played; and determining an outcome of the game.

16. The method as set forth in claim 15 wherein the game is a CRAPs game comprising a CRAPs table including a plurality of cameras mounted in the frame of the CRAPS table and connected to a processing unit to detect dice movement and send signals to lock all player bets and then record and display the dice results when the dice stop moving.

17. The method as set forth in claim 16 wherein the step of starting the game by the dealer comprises starting the game by the dealer when a player rolls the dice once all the players have placed their base game wagers.

18. The method as set forth in claim 15 wherein the game is a Roulette game comprising a Roulette wheel including a plurality of sensors in the Roulette wheel connected to a processor unit to detect the movement of the ball and send signals to lock all player bets based on the movement of the ball and then record and display Ball drop results when the ball stops moving.

19. The method as set forth in claim 18 wherein the step of starting the game by the dealer comprises starting the game by the dealer releasing the ball onto the wheel once all the players have placed their base game wagers.

20. The method as set forth in claim 15 including the step of recording and verifying all outcomes by the players and the dealer and ending the game.

* * * * *